US008585788B2

(12) United States Patent
Drozd et al.

(10) Patent No.: US 8,585,788 B2
(45) Date of Patent: Nov. 19, 2013

(54) METHODS AND SYSTEMS FOR PROCESSING SOLID FUEL

(75) Inventors: J. Michael Drozd, Raleigh, NC (US); Michael C. Druga, Lawrenceville, GA (US); Steven L. Lawson, Marietta, GA (US); Frederick Christopher Lang, Sugar Hill, GA (US); Herbie L. Bullis, Punta Gorda, FL (US)

(73) Assignee: CoalTek, Inc., Chelmsford, MA (US)

( * ) Notice: Subject to any disclaimer, the term of this patent is extended or adjusted under 35 U.S.C. 154(b) by 770 days.

(21) Appl. No.: 12/435,514

(22) Filed: May 5, 2009

(65) Prior Publication Data

US 2009/0272028 A1      Nov. 5, 2009

Related U.S. Application Data

(63) Continuation-in-part of application No. 11/695,554, filed on Apr. 2, 2007, which is a continuation-in-part of application No. 12/247,004, filed on Oct. 7, 2008.

(60) Provisional application No. 61/050,498, filed on May 5, 2008, provisional application No. 60/978,199, filed on Oct. 8, 2007, provisional application No. 60/788,297, filed on Mar. 31, 2006, provisional application No. 60/820,482, filed on Jul. 26, 2006, provisional application No. 60/828,031, filed on Oct. 3, 2006, provisional application No. 60/867,749, filed on Nov. 29, 2006.

(51) Int. Cl.
*C10L 5/00* (2006.01)

(52) U.S. Cl.
USPC ............... 44/620; 44/551; 44/553; 44/569; 44/577; 44/626

(58) Field of Classification Search
USPC .............. 44/551, 569, 577, 553, 620, 626
See application file for complete search history.

(56) References Cited

U.S. PATENT DOCUMENTS

| | | | |
|---|---|---|---|
| 2,164,933 A * | 7/1939 | Maurel | ........................ 44/569 |
| 3,356,469 A | 12/1967 | Stephenson et al. | |
| 3,500,266 A | 3/1970 | De Torre | |
| 3,566,152 A | 2/1971 | Casey et al. | |
| 3,694,728 A | 9/1972 | Kanngiesser et al. | |
| 3,704,523 A | 12/1972 | Guerga et al. | |
| 3,884,794 A | 5/1975 | Bull et al. | |
| 3,954,647 A | 5/1976 | Neros et al. | |
| 3,954,674 A | 5/1976 | Reis | |
| 3,958,199 A | 5/1976 | Seitz, Jr. et al. | |
| 4,019,115 A | 4/1977 | Lips | |
| 4,076,607 A | 2/1978 | Zavitsanos et al. | |
| 4,123,230 A | 10/1978 | Kirkbride | |
| 4,148,614 A | 4/1979 | Kirkbride | |
| 4,152,120 A | 5/1979 | Zavitsanos et al. | |
| 4,158,760 A | 6/1979 | Bowen et al. | |
| 4,164,772 A | 8/1979 | Hingorani | |
| 4,227,063 A | 10/1980 | Edgar et al. | |
| 4,253,005 A | 2/1981 | Gordon et al. | |
| 4,259,560 A | 3/1981 | Rhodes | |
| 4,268,315 A * | 5/1981 | Burke | ........................ 106/632 |
| 4,280,033 A * | 7/1981 | Wagener et al. | ............ 219/700 |
| 4,282,066 A | 8/1981 | Wagener et al. | |
| 4,329,686 A | 5/1982 | Mourou | |
| 4,365,975 A | 12/1982 | Williams et al. | |
| 4,376,034 A | 3/1983 | Wall | |
| 4,408,999 A | 10/1983 | Nadkarni et al. | |
| 4,412,841 A | 11/1983 | Du Broff et al. | |
| 4,435,628 A | 3/1984 | Bowen et al. | |
| 4,441,003 A | 4/1984 | Eves, II et al. | |
| 4,469,156 A | 9/1984 | Norimoto et al. | |
| 4,488,027 A | 12/1984 | Dudley et al. | |
| 4,567,340 A | 1/1986 | Latchum, Jr. | |
| 4,589,050 A | 5/1986 | Cutler et al. | |
| 4,663,507 A | 5/1987 | Trerice | |
| 4,678,478 A | 7/1987 | Kelland | |
| 4,684,777 A | 8/1987 | Eves, II et al. | |
| 4,825,330 A | 4/1989 | Walchle | |
| 4,981,627 A | 1/1991 | Eves, II | |
| 4,999,469 A | 3/1991 | Dudley et al. | |
| 5,055,180 A | 10/1991 | Klaila | |
| 5,079,433 A | 1/1992 | Smith | |
| 5,136,458 A | 8/1992 | Durivage, III | |
| 5,172,291 A | 12/1992 | Bakely et al. | |

(Continued)

FOREIGN PATENT DOCUMENTS

CN    1048055    12/1990
CN    1914299    2/2007

(Continued)

OTHER PUBLICATIONS

Mahadevan, V et al., "Erdoel Erdgas Kohle", *Urban Verlag*, DE, vol. 48, No. 1, Jan. 1995,33-38.

(Continued)

*Primary Examiner* — Cephia D Toomer
(74) *Attorney, Agent, or Firm* — Mintz Levin Cohn Ferris Glovsky and Popeo, P.C.

(57) ABSTRACT

In embodiments of the present invention, a method of heat treating a solid fuel briquette may include heating the solid fuel briquette using energy from at least one of a heat furnace or an electromagnetic energy system of a solid fuel treatment facility as the solid fuel briquette is moved through the treatment facility to a specified internal temperature, and sealing the heat-treated solid fuel briquette in a vessel for a duration of time.

33 Claims, 52 Drawing Sheets

(56) References Cited

U.S. PATENT DOCUMENTS

| | | | |
|---|---|---|---|
| 5,185,586 A | 2/1993 | Zucker | |
| 5,254,139 A | 10/1993 | Adams | |
| 5,350,431 A | 9/1994 | Yamashita | |
| 5,389,114 A | 2/1995 | Forder | |
| 5,393,311 A | 2/1995 | Marhanka | |
| 5,421,450 A | 6/1995 | Kitagawa et al. | |
| 5,468,265 A | 11/1995 | Adams | |
| 5,489,818 A | 2/1996 | Naff et al. | |
| 5,491,624 A | 2/1996 | Levran et al. | |
| 5,756,975 A | 5/1998 | Harris et al. | |
| 5,828,338 A | 10/1998 | Gerstenberg | |
| 5,841,342 A | 11/1998 | Hegmann et al. | |
| 5,854,729 A | 12/1998 | Degeneff et al. | |
| 5,873,982 A | 2/1999 | Yoshimura et al. | |
| 5,892,208 A | 4/1999 | Harris et al. | |
| 5,958,276 A | 9/1999 | Eves, II et al. | |
| 5,997,288 A | 12/1999 | Adams | |
| 6,068,737 A | 5/2000 | De Chamorro et al. | |
| 6,115,269 A | 9/2000 | Gunnarsson et al. | |
| 6,127,664 A | 10/2000 | Eves, II et al. | |
| 6,163,444 A | 12/2000 | Lam | |
| 6,169,391 B1 | 1/2001 | Lei | |
| 6,265,703 B1 | 7/2001 | Alton | |
| 6,274,858 B1 | 8/2001 | Alton | |
| 6,325,001 B1 | 12/2001 | Sheldon et al. | |
| 6,340,912 B1 | 1/2002 | Gerstenberg et al. | |
| 6,404,656 B1 | 6/2002 | Jonsson et al. | |
| 6,559,404 B1 | 5/2003 | Ookawa et al. | |
| 6,576,212 B2 | 6/2003 | Miura et al. | |
| 6,704,184 B2 | 3/2004 | Alton | |
| 6,849,971 B1 | 2/2005 | Anger et al. | |
| 6,942,707 B2 | 9/2005 | Goraczko | |
| 7,002,122 B2 | 2/2006 | Eves, II et al. | |
| 7,785,902 B2 | 8/2010 | Nikitin et al. | |
| 7,811,339 B2 | 10/2010 | Werner | |
| 7,901,473 B2 | 3/2011 | Weinberg et al. | |
| 2002/0154000 A1 | 10/2002 | Kline | |
| 2004/0134857 A1 | 7/2004 | Huling et al. | |
| 2004/0238533 A1 | 12/2004 | Alton et al. | |
| 2004/0256384 A1 | 12/2004 | Alton et al. | |
| 2005/0059064 A1 | 3/2005 | Obst et al. | |
| 2005/0082283 A1 | 4/2005 | Hein et al. | |
| 2005/0089460 A1 | 4/2005 | Tranquilla | |
| 2005/0155281 A1 | 7/2005 | Clark | |
| 2005/0160667 A1 | 7/2005 | Weinberg et al. | |
| 2006/0006959 A1 | 1/2006 | Harris | |
| 2006/0049185 A1 | 3/2006 | Masson et al. | |
| 2006/0073752 A1 | 4/2006 | Enzien et al. | |
| 2006/0101755 A1 | 5/2006 | Harris | |
| 2006/0130396 A1 | 6/2006 | Werner | |
| 2006/0231550 A1 | 10/2006 | Wendel et al. | |
| 2007/0151147 A1 | 7/2007 | Learey et al. | |
| 2007/0295590 A1 | 12/2007 | Weinberg et al. | |
| 2009/0038213 A1 | 2/2009 | Weinberg et al. | |
| 2009/0119981 A1 | 5/2009 | Drozd et al. | |
| 2009/0137437 A1 | 5/2009 | Hohner | |
| 2009/0235577 A1 | 9/2009 | Flanery et al. | |
| 2009/0272028 A1 | 11/2009 | Drozd et al. | |

FOREIGN PATENT DOCUMENTS

| | | |
|---|---|---|
| DE | 2907886 A1 | 9/1980 |
| DE | 3121050 A1 | 12/1982 |
| DE | 8234316 U1 | 3/1983 |
| DE | 3234315 A1 | 3/1984 |
| DE | 3234315 A1 | 3/1984 |
| DE | 102005004634 B4 | 3/2011 |
| EP | 1443096 A1 | 8/2004 |
| GB | 2017744 A | 10/1979 |
| JP | 54-127901 A | 10/1979 |
| JP | 59-049292 A | 3/1984 |
| JP | 3-275797 A | 12/1991 |
| JP | 5-311183 A | 11/1993 |
| JP | H6-47232 | 6/1994 |
| JP | H6-290867 | 10/1994 |
| JP | 09040980 A2 | 2/1997 |
| JP | 2002-161278 A | 6/2002 |
| JP | 2002-524651 A | 8/2002 |
| RU | 2096354 C1 | 11/1997 |
| RU | 2156969 C1 | 9/2000 |
| RU | 2166751 C1 | 5/2001 |
| SU | 563920 A3 | 6/1977 |
| WO | WO-9707185 A1 | 2/1997 |
| WO | WO-00/15734 A1 | 3/2000 |
| WO | WO-02099925 A1 | 12/2002 |
| WO | WO-2004007649 A1 | 1/2004 |
| WO | WO-2005043953 A2 | 5/2005 |
| WO | WO-2005043953 A3 | 5/2005 |
| WO | WO-2005059064 A1 | 6/2005 |
| WO | WO-2007/115267 A2 | 10/2007 |
| WO | WO-2007115267 A2 | 10/2007 |
| WO | WO-2007115267 A3 | 10/2007 |
| WO | WO-2009/048875 A2 | 4/2009 |
| WO | WO-2009137437 A1 | 11/2009 |

OTHER PUBLICATIONS

Chironis, N. P., "Microwaves Dry Fine Coal", *Coal Age*,91, (1986),12:64-65.

Lindroth, D. P., "Microwave Drying of Fine Coal", *Report of Investigations 9005 U.S. Dept of the Interior Bureau of Mines*, (1986).

Ipea, "Notification of Transmittal of the International Preliminary Report on Patentability", (Dec. 6, 2005),all.

"U.S. Appl. No. 11/695,554, Non-Final Office Action mailed May 10, 2010", , 16 pages.

"U.S. Appl. No. 11/695,554, Final Office Action mailed Oct. 26, 2010", , 18.

"International Application Serial No. PCT/US2009/042780, Search Report and Written Opinion mailed Sep. 30, 2009", 12 pgs.

Derwent World Patent Index, "WPI Acc. No. 1984-076275/198413", (English language abstract for DE 3234315A1) (1984).

Supplemental European Search Report dated Oct. 9, 2012 for European Patent Application No. 09743423 Search Report.

U.S. Appl. No. 11/009,301, Non-Final Office Action dated May 11, 2010.

U.S. Appl. No. 11/009,301, Notice of Allowance dated Dec. 30, 2010.

U.S. Appl. No. 11/695,554, Final Office Action dated Oct. 26, 2010.

U.S. Appl. No. 11/695,554, Non-final Office Action dated May 10, 2010.

U.S. Appl. no. 11/009,301, Final Office Action dated Oct. 6, 2009.

EPO 07759973 Search Report dated Mar. 4, 2010.

International Search Report and Written Opinion for PCT/US2008/079087 dated Aug. 28, 2009.

International Search Report and Written Opinion for PCT/US2009/042780 dated Sep. 30, 2009.

International Search Report and Written Opinion for PCT/US2004/041786 dated Apr. 14, 2005.

International Search Report and Written Opinion for PCT/US2007/065801 dated Feb. 27, 2008.

Translation of Official Action issued by the Russian Patent Office dated Jul. 17, 2008 for RU Patent Application No. 2006124866.

Translation of Office Action issued by the Ukraine Patent dated Sep. 2, 2010 for UA Patent Application No. 200607632.

* cited by examiner

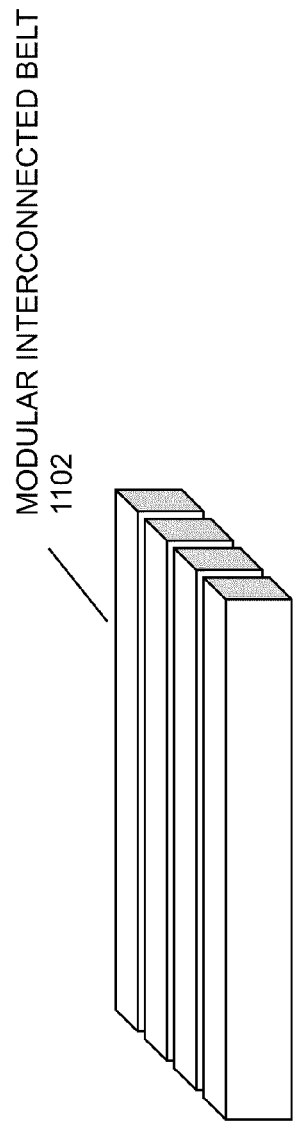
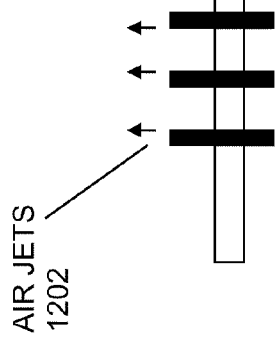
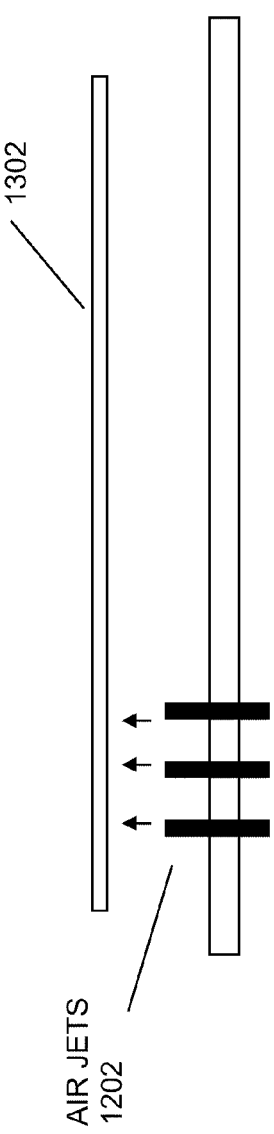
FIG. 11 MODULAR INTERCONNECTED BELT 1102
FIG. 12 AIR JETS 1202
FIG. 13 1302 AIR JETS 1202

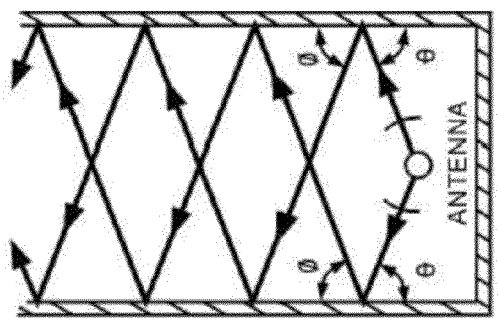
Fig. 25B
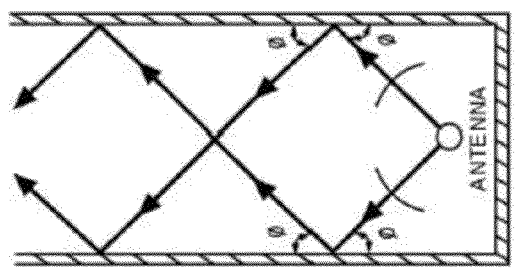
Fig. 25A
Fig. 25

2700

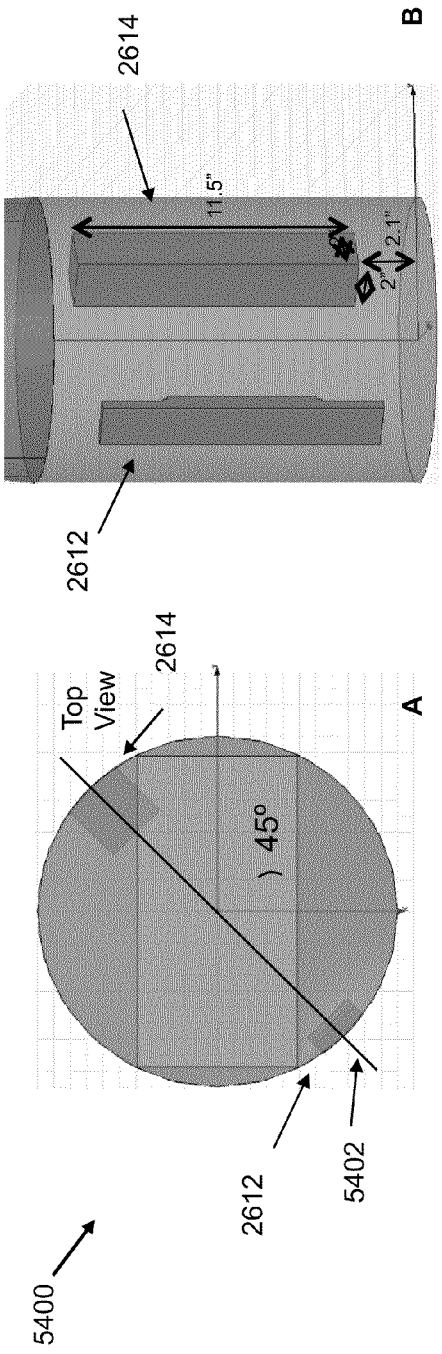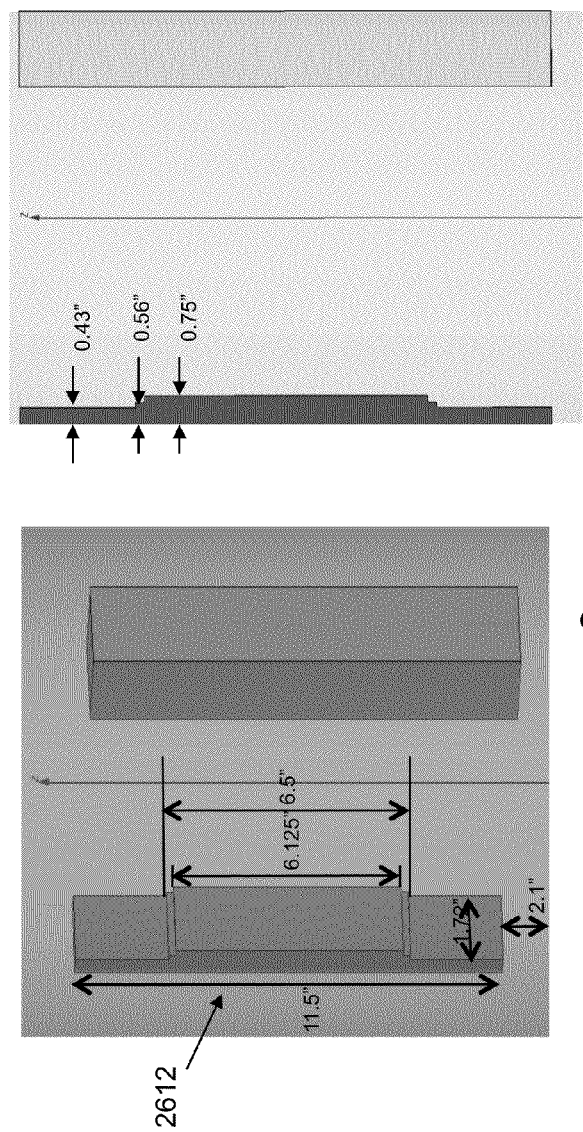
Fig. 54

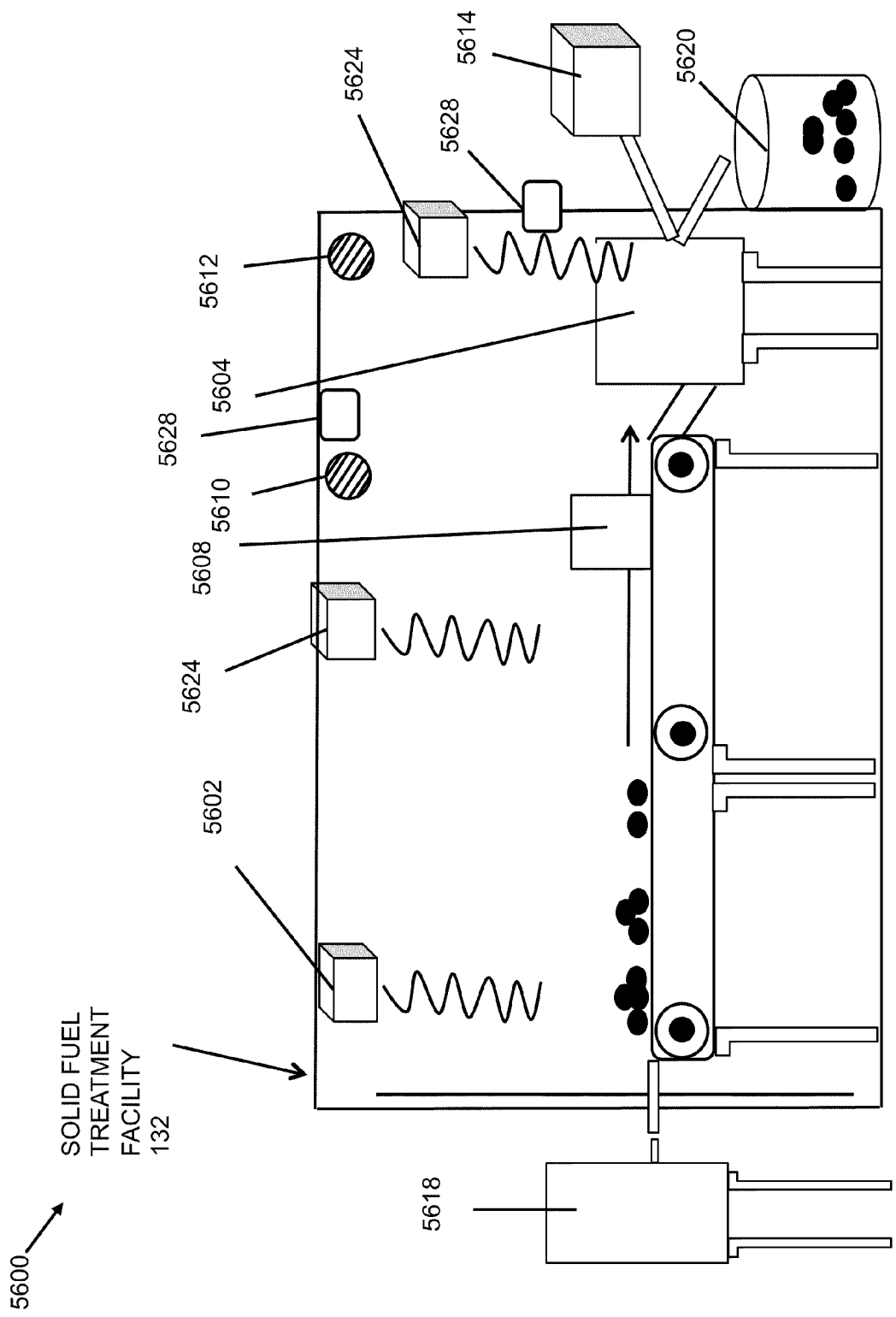

METHODS AND SYSTEMS FOR PROCESSING SOLID FUEL

CROSS-REFERENCE TO RELATED APPLICATIONS

This application claims the benefit of the following provisional application, which is hereby incorporated by reference in its entirety: U.S. Provisional Application No. 61/050,498, filed May 5, 2008.

This application is a continuation-in-part of the following U.S. patent applications, each of which is incorporated by reference herein in its entirety: U.S. patent application Ser. No. 11/695,554, filed Apr. 2, 2007 which claims the benefit of the following provisional applications, each of which is hereby incorporated by reference in its entirety: U.S. Provisional Application No. 60/788,297 filed Mar. 31, 2006; U.S. Provisional Application No. 60/820,482 filed Jul. 26, 2006; U.S. Provisional Application No. 60/828,031 filed Oct. 3, 2006; and U.S. Provisional Application No. 60/867,749 filed Nov. 29, 2006; this application is also a continuation-in-part of the following U.S. patent application, U.S. patent application Ser. No. 12/247,004 filed Oct. 7, 2008 which claims the benefit of the following U.S. patent application, which is incorporated by reference herein in its entirety: U.S. Provisional Application No. 60/978,199, filed Oct. 8, 2007.

BACKGROUND

1. Field

This invention relates to the treatment of solid fuels, and more particularly, treatment of solid fuels using microwave energy to remove contaminants and reduce moisture content.

2. Description of the Related Art

The presence of moisture, ash, sulfur and other materials in varied amounts in all solid fuels generally results in inconsistencies in fuel burn parameters and contamination produced by the burning process. The burning of solid fuels may result in the production of noxious gases, such as nitrous oxides (NOx) and sulfur oxides (SOx). Additionally, burning solid fuel may result in the generation of inorganic ash with elements of additional materials. Amounts of carbon dioxide ($CO_2$) that are generated as a result of burning solid fuels may contribute to global warming. Each of these byproducts will be produced at varying levels depending on the quality of the solid fuel used.

The presence of moisture in varied amounts in solid fuels generally reduces the power output of the solid fuel upon combustion. Reduction of the moisture content of the solid fuel may allow for increased thermal efficiency upon combustion. Increasing the thermal efficiency of solid fuel combustion may result in lower costs for power generation because less fuel is needed. Increased thermal efficiency may also reduce other emissions generated during combustion, such as those of $SO_2$ and NOx.

Various processes have been used in the treatment of solid fuels such as washing, air drying, tumble drying, and heating to remove some of the unwanted materials that are be present in the solid fuels. These processes may require the solid fuel to be crushed, pulverized, or otherwise processed into a size that is not be optimum for an end-user. To further reduce emissions, exhaust scrubbers may be used at the combustion facility. There exists a need to further reduce the moisture content of solid fuel and the harmful emissions produced as a result of burning solid fuels and reduce the costs associated with the control of such emissions.

SUMMARY

In embodiments of the present invention, improved capabilities are described for treating solid fuel. The method and system may comprise providing a microwave energy source, guiding microwave energy from the microwave energy source through a waveguide, and exposing solid fuel within the microwave chamber to the microwave energy.

In an embodiment, the method and system may further include monitoring the temperature of the exposed solid fuel. In an embodiment, the method and system may also include monitoring the moisture content, the contaminant level of the solid fuel before and after treatment, and the like. In an embodiment, the microwave energy source is a 125 kW microwave generator.

In an embodiment, the waveguide through which the microwave energy flows has a diameter of 11 inches. The waveguide may include a mechanism for polarizing microwave energy. Further, the polarization may be linear, circular, elliptical or some other type of polarization. The wave guide may include two integral square rods or two integral rectangular rods or two half round rods or some other type of rods. Furthermore, the square rods may have a height and width of 1.5 inches or 2.5 inches or some other height and width. The two square rods may have a length of 13.43 inches or 17.37 inches or some other length. The two half-round rods may have a rod radius of at least 2 inches.

In an embodiment, a method and system of thermally aberrant solid fuel pre-determination may comprise transporting solid fuel past an x-ray machine, detecting solid fuel that contains a predetermined amount of metallic material, and taking action on the solid fuel that contains the at least predetermined amount of metallic material. The action may include removing the solid fuel with the predetermined amount of metallic material.

In an embodiment, a method and system of thermally aberrant solid fuel pre-determination may comprise transporting solid fuel past a materials analysis system, detecting solid fuel that contains a predetermined amount of metallic material, and taking action on any of the solid fuel that contains at least the predetermined amount of metallic material. In an embodiment, the action may include removing the solid fuel with the predetermined amount of metallic material.

In an embodiment, a method and system of thermally aberrant solid fuel pre-determination may comprise transporting solid fuel past an electromagnetic scattering system, detecting solid fuel that contains a predetermined amount of metallic material, and taking action on any of the solid fuel that contains at least the predetermined amount of metallic material. In an embodiment, the action may be removing the solid fuel with the predetermined amount of metallic material.

In an aspect of the invention, a method and system of thermally aberrant solid fuel pre-determination may comprise transporting solid fuel past a magnetic detection system, detecting solid fuel that contains a predetermined amount of magnetic material, and taking action on any of the solid fuel that contains at least the predetermined amount of magnetic material. In the method and system, the action may be removing the solid fuel with the predetermined amount of magnetic material.

In an embodiment, a method and system for solid fuel thermal management may comprise transporting solid fuel through a solid fuel treatment facility, treating the solid fuel using energy from a microwave system, and transporting the solid fuel through a cooling station between microwave systems. In an embodiment, the cooling station may provide surface application of cooling chemicals or may include a cooling gas to control the solid fuel temperature.

In an embodiment, a method and system of dust control in a solid fuel treatment facility may comprise providing a dust collection facility associated with the solid fuel treatment facility, collecting solid fuel dust generated by the transport and treatment of solid fuel in the solid fuel treatment facility with the dust collection facility, and processing the collected dust in the solid fuel treatment facility. In an embodiment, the dust may be collected from a conveyor belt, a chamber atmosphere, a solid fuel storage area or some other type of collection facility.

In an embodiment, methods and systems may be provided for treating a solid fuel product in the solid fuel treatment facility. The methods may comprise treating a solid fuel product using a microwave energy source, briquetting the solid fuel product during treatment to form briquettes, and collecting the formed briquettes. Briquetting may be performed on a briquetting press, machine, and some other type of briquetting machine or apparatus. In embodiments, the solid fuel product may be grinded or crushed before briquetting.

In an embodiment, methods and systems may be provided for briquetting the solid fuel product after the treatment. The methods may comprise treating the solid fuel product using a microwave energy source, briquetting the solid fuel product after treatment to form briquettes, and collecting the formed briquettes. In an aspect of the invention, the solid fuel product may be grinded or crushed before briquetting.

In other embodiments, the briquetting may be done by using binders such as starch, molasses, plastic clay, and some other type of binders.

In embodiments, the briquetting may be a pressure-briquetting. The product upon passing through a pressure-briquetting press or some other type of briquetting machine may bind product particles with pressure. Thereby, resulting in formation of solid briquettes.

In an aspect of the invention, a method of a circular polarization waveguide may comprise providing energy at an input polarization to a polarization waveguide section, the polarization waveguide section comprising polarization elements such that the polarization of microwave energy meeting the elements is transformed to circular polarization; and presenting energy exiting from the polarization waveguide section into a microwave chamber. In an embodiment, the polarization elements may be at least one of square rods, rectangular rods, half-round rods, and the like. In an embodiment, the method may further comprise exposing solid fuel in the microwave chamber to the energy exiting the polarization waveguide.

An aspect of the present invention relates to cleaning solid fuels based at least in part on the initial condition of the solid fuel. In embodiments, the solid fuel is tested or sampled to generate an initial data set relating to the starting characteristics of the fuel. Target or final (treated) fuel characteristics may be known and the treatment process may be set up, monitored and/or regulated with respect to the initial characteristics and the target characteristics. A method and system described herein may include providing as inputs, a starting solid fuel sample data and desired solid fuel characteristics to determine a product start and finish composition delta; comparing and combining the inputs relative to a solid fuel treatment facility capabilities for determination of operational treatment parameters to produce the desired treated product; and transmitting the operational parameters to a monitoring facility and controller for controlling the treatment of the product in a solid fuel treatment facility.

An aspect of the present invention relates to feeding information relating to treated solid fuels back to the solid fuel treatment facility to further regulate the process. A method and system disclosed herein may include testing a solid fuel following a cleaning treatment and then feeding information pertaining to the test back to the treatment facility. A solid fuel output parameter facility may receive the final treated solid fuel characteristics from a post treatment testing facility; the characteristics may be representative of the final produced treated solid fuel; the solid fuel output parameter may transmit the final treated solid fuel characteristics to a monitoring facility; the monitoring facility may compare the final treated solid fuel characteristics to desired solid fuel characteristics for determination of solid fuel treatment operational parameter adjustments; and the adjustments made for the final treated solid fuel characteristics may be in addition to any other solid fuel operational parameter adjustments.

A method and system disclosed herein may include a solid fuel continuous feed treatment facility controlled by operational parameters. A controller may provide solid fuel treatment operational parameters to the continuous feed treatment facility components such as a transport belt, microwave systems, sensors, collection systems, preheat facility, cool down facility, and the like. Continuous feed treatment facility sensors may measure solid fuel treatment process results, component operation, continuous feed treatment facility environmental conditions, and transmitting the measured information to the controller and a monitoring facility. The monitoring facility may compare the measured information to the solid fuel treatment operational parameters and adjust the operational parameters. The adjusted operational parameters may be provided to the continuous feed treatment facility controller.

A method and system disclosed herein may include monitoring and adjusting the treatment of a solid fuel using generated processing parameters and sensor input. The method and system may involve receiving operational treatment parameters from a parameter generation facility for the control of solid fuel treatment within a continuous feed treatment facility. The method and system may involve monitoring and adjusting the operational treatment parameters based on input from the continuous feed treatment facility sensors. The method and system may involve providing the adjusted operational treatment parameters to a controller, the controller providing the operational parameters to the components of the continuous feed treatment facility.

A method and system disclosed herein may include sensors used to measure operational performance of a solid fuel belt facility. Sensors of a solid fuel treatment belt facility may measure the products released from the solid fuels such as moisture, sulfur, sulfate, sulfide, ash, chlorine, mercury and the like. Sensors of the solid fuel continuous feed treatment facility may measure operational parameters of the continuous feed treatment facility components used to treat the solid fuel. The sensors may transmit measured information to a continuous feed treatment facility controller, a monitoring facility, and a pricing transactional facility. The released product sensor information may be used by the monitoring facility and controller to adjust the belt facility operational parameters. The component operational sensor information may be used by the pricing transactional facility for determination of operational cost.

A method and system disclosed herein may include controlling solid fuel treatment using a continuous real time operational parameter feedback loop. The method and system may involve providing a continuous feed treatment facility controller with component parameters from a parameter generation facility. The continuous feed treatment facility controller may apply the component parameters to operate the various treatment components for the proper treatment of the solid fuel. Belt facility sensors may measure various operational and solid fuel released products and transmit the measurement information to the monitoring facility. The monitoring facility may adjust the solid fuel treatment parameters by a comparison of the sensor measurements and the operational requirements; and the monitoring facility may transmit the adjusted parameters to the controller. The controller/sensor/monitor adjustment loop may be continuous in a real time feedback loop to maintain the desired final treated solid fuel.

A method and system disclosed herein may include the monitor and control of a solid fuel microwave system operation. A microwave system set of operational parameters such as frequency, power, and duty cycle may be controlled by a belt facility controller during the treatment of the solid fuel. The microwave system outputs and solid fuel released products may be measured by sensors to determine the effectiveness of the microwave parameters; the measurements may be transmitted to a monitoring facility. The monitoring facility may adjust the microwave system operational parameters based on comparison of the sensor measured information and the required operational requirements (e.g. parameter generation facility). The adjusted microwave operational parameters may be transmitted to the microwave system by the continuous feed treatment facility controller.

A method and system disclosed herein may include controlled removal of solid fuel released products using a solid fuel continuous feed treatment facility. A set of sensors may measure the volume or rate of release of the solid fuel released products. The set of sensors may transmit the released products information to the controller and monitoring facility to provide rate of removal information. The set of sensors may transmit the released products removal rate to the pricing transactional facility; the pricing transactional facility may determine the value of the released products or the cost to dispose of the released products.

An aspect of the present invention relates to a conveyor that operates within a continuous feed treatment facility. The conveyor may carry the solid fuel through the treatment facility while the solid fuel is being treated (e.g. carrying coal through a microwave energy field). A method and system of providing a conveyor facility may involve adapting it to transport solid fuel through a treatment facility. The conveyor may include a combination of features such as low microwave loss, high abrasion resistance, prolonged elevated temperature resistance, temperature insulation, burn-through resistance, high melt point, non-porous, and resistance to thermal run-away. The conveyor facility may be a substantially continuous belt. The conveyor facility may include a plurality of ridge sections that are flexibly coupled.

Aspects of the present invention relate to a solid fuel treatment methods and systems. Embodiments of the present invention relate to a conveyor belt adapted to move solid fuel (e.g. coal) through a treatment facility. In embodiments, the solid fuel treatment facility is adapted to treat the solid fuel by processing it through a microwave field. In embodiments the conveyor system is specially adapted to provide resilient performance when used in conjunction with the solid fuel treatment process.

Embodiments of the present invention relate to systems and methods of transporting solid fuel through a solid fuel treatment facility. The systems and methods may involve providing a conveyor facility adapted to transport the solid fuel through a solid fuel microwave processing facility. In embodiments the conveyor facility is adapted to have at least one of or a combination of features such as low microwave loss, high abrasion resistance, prolonged elevated temperature resistance, localized elevated temperature resistance, temperature insulation, burn-through resistance, high melting point, non-porous with respect to particulates, non-porous with respect to moisture, resistance to thermal run-away or the other such features that create a resilient conveyor facility.

In embodiments the conveyor facility is a conveyor belt. The conveyor belt may be a substantially contiguous belt. The conveyor belt may comprise a plurality of rigid sections flexibly coupled together. In other embodiments, the conveyor is another physical arrangement intended to transport the solid fuel through a continuous or substantially continuous treatment process.

In embodiments the solid fuel treatment facility may be a microwave treatment facility and it may also process the solid fuel through other systems as well, such as heating, washing, gasification, burning, and steaming. The conveyor facility may be made of a low microwave loss material. For example it may be adapted to have low loss between microwave frequencies of approximately 300 MHz and approximately 1 GHz. The conveyor facility may be resistant to prolonged high temperatures. For example it may be resistant to prolonged temperatures within the range of approximately 200 F or above. The conveyor facility may be resistant to high localized temperatures. For example it may be resistant to localized temperatures of approximately 600 F or above. There are many other conveyor facility attributes and materials as well as processes for managing the conveyor system described herein.

An aspect of the present invention relates improved methods and systems for operating microwave generating magnetrons associated with a continuous feed solid fuel treatment facility. A method and system disclosed herein may include powering the magnetron through a direct utility high voltage transmission supply to avoid the step of stepping the voltage down (e.g. at a sub station) and then back up (e.g. for use at the magnetron). The power system may include providing a high voltage power conversion facility that may be adapted to receive high voltage alternating current and deliver high voltage direct current.

A method and system disclosed herein may include direct high voltage usage by receiving high voltage alternating current from a high power distribution facility; directly generating high voltage direct current from the high voltage alternating current; and applying the high voltage direct current to a magnetron associated with a continuous feed solid fuel treatment facility.

A method and system disclosed herein may include direct high voltage usage by receiving high voltage alternating current from a high power distribution facility; converting the high voltage alternating current to high voltage direct current; and applying the high voltage direct current to a magnetron associated with a continuous feed solid fuel treatment facility, the high power distribution facility may be protected by a non-transforming inductor facility in association with a high speed circuit breaker.

A method and system disclosed herein may include transactional pricing for solid fuel treatment using processing feedback. A transactional facility may receive solid fuel treatment operational information from solid fuel facility systems such as a monitoring facility, sensors, removal system, solid fuel output parameter facility, or the like. The transactional facility may be able to determine the operational cost of the final treated solid fuel using the operational information of the above systems. The cost may include the power requirements for the various solid treatment belt facility components, solid fuel released products collected in the removal system, inert gases used, and the like. The transactional facility may determine the final value of the treated solid fuel by adding the treatment cost to the starting cost of the raw solid fuel.

A method and systems disclosed herein may include modeling cost associated with processing solid fuel for a specific end-use facility. The method and system may involve providing a database containing a set of solid fuel characteristics for a plurality of solid fuel samples, a set of specifications for solid fuel substrates used by a set of end-user facilities, a set of operational parameters used to transform a solid fuel sample into a solid fuel substrate used by an end-user and a set of solid fuels associated with implementation of the set of operational parameters. The method and system may further involve identifying solid fuel characteristics for a designated starting solid fuel sample; identifying specifications for the solid fuel substrate used by the end-user facility; retrieving from the database the set of operational parameters associated with transforming the starting solid fuel sample into the solid fuel substrate; and retrieving from the database the set of costs associated with the set of operational parameters A method and system disclosed herein may include a transaction involving producing solid fuel adapted for a selected end use facility. The method and system may involve obtaining specifications from a selected end use facility for a solid fuel substrate; comparing the specifications to a set of characteristics for a starting solid fuel sample; determining operational treatment parameters for processing the starting solid fuel sample to transform it into a solid fuel substrate conforming to the specifications from the selected end use facility; processing the starting solid fuel sample in accordance with the operational treatment parameters, measuring characteristics of the solid fuel substrate; and calculating a price for the solid fuel substrate.

A method and system disclosed herein may include a database for solid fuel processing; a set of solid fuel characteristics for a plurality of solid fuel samples; a set of specifications for solid fuel substrates used by a set of end-user facilities; and a set of operational parameters used to transform a solid fuel sample into a solid fuel substrate used by the end-user facility.

A method and system disclosed herein may include compiling a database for solid fuel processing. The method and system may involve aggregating a set of solid fuel characteristics for a plurality of solid fuel samples; aggregating a set of specifications for solid fuel substrates used by a set of end-user facilities; and aggregating a set of operational parameters used to transform a solid fuel sample into a solid fuel substrate used by an end-user.

A method and system disclosed herein may include generating solid fuel treatment parameters based on a desired final treated characteristic. The method and system may involve providing as inputs, the starting solid fuel sample data and desired solid fuel characteristics for a selected end-use facility; comparing and combining the inputs relative to the solid fuel treatment facility capabilities for determination of operational treatment parameters to produce a treated solid fuel suitable for the selected end-use facility; and transmitting the operational parameters to a monitoring facility and controller for controlling the treatment of the product in the solid fuel treatment facility.

A method and system disclosed herein may include producing solid fuel adapted for a selected end-use facility. The method and system may involve determining a first set of characteristics for a starting solid fuel sample; identifying a set of characteristics for output solid fuel adapted for a selected end-use facility; determining operational treatment parameters for processing the starting solid fuel sample to transform it into output solid fuel adapted for the selected end-use facility; and processing the starting solid fuel sample in accordance with the operational treatment parameters, whereby the starting solid fuel sample may be transformed into output solid fuel adapted for the selected end-use facility.

A method and system may include solid fuel gasification by selecting a solid fuel suitable for gasification; identifying characteristics of the solid fuel pertinent to gasification; determining solid fuel treatment operational parameters for the solid fuel based on the characteristics pertinent to gasification; treating the solid fuel using the operational parameters to release a gas; and collecting the gas released during treatment of the solid fuel. The solid fuel may be treated using microwave technology, treated using heating technology, treated using pressure, treated using steam, or the like. The gas may be syngas, hydrogen, carbon monoxide, or the like.

A method and system may include solid fuel gasification by selecting a solid fuel suitable for gasification; determining solid fuel treatment operational parameters based on a gasification requirement from an end-user; treating the solid fuel using the operational parameters to release a gas; and collecting the gas released during treatment of the solid fuel. The end-user may be a power generation facility, a chemical facility, a fuel cell facility, or the like. The solid fuel may be treated using microwave technology, treated using heating technology, treated using pressure, treated using steam, or the like. The gas may be syngas, hydrogen, carbon monoxide, or the like.

A method and system may include solid fuel gasification by selecting a solid fuel suitable for gasification; determining solid fuel treatment operational parameters based on a gasification requirement; treating the solid fuel using the operational parameters to release a gas; and collecting the gas released during treatment of the solid fuel. The gasification requirement may include obtaining a preselected amount of the gas. The gasification requirement may include obtaining a preselected gas. The solid fuel may be treated using microwave technology, treated using heating technology, treated using pressure, treated using steam, or the like. The gas may be syngas, hydrogen, carbon monoxide, or the like.

A method and system may include solid fuel liquefaction by selecting a solid fuel suitable for liquefaction; identifying characteristics of the solid fuel pertinent to liquefaction; determining solid fuel treatment operational parameters for the solid fuel based on the characteristics pertinent to liquefaction; treating the solid fuel using the operational parameters to produce a desired liquid; and collecting the desired liquid. The operational parameters may include using a Fischer-Tropsch process, using a Bergius process, using a direct hydrogenation process, using a low temperature carbonization (LTC) process, or the like.

A method and system may include solid fuel treatment by selecting a solid fuel for treatment; identifying characteristics of the solid fuel; determining solid fuel treatment operation parameters for the solid fuel based on the characteristics; and treating the solid fuel using the operational parameters, the operational parameters may include pre-heating the solid fuel, and the operational parameters may include post heating the solid fuel.

A system for integrated solid fuel treatment may include a solid fuel continuous feed treatment facility that removes contaminants from a solid fuel to produce a cleaned solid fuel energy source (e.g. coal cleaned using a continuous feed microwave treatment facility); and a solid fuel usage facility (e.g. a power plant, steel plant, etc.), co-located with the solid fuel treatment facility, wherein the cleaned solid fuel energy source is used as an energy source in the co-located usage facility. The solid fuel treatment facility may provide treated solid fuel directly to the solid fuel usage facility, to the solid fuel usage facility, to the solid fuel usage facility, or the like. The solid fuel treatment facility may provide treated solid fuel indirectly to the solid fuel usage facility, to the solid fuel usage facility, to the solid fuel usage facility, or the like. The solid fuel usage facility may request a particular solid fuel treatment from the solid fuel treatment facility. The particular solid fuel treatment may produce a type of solid fuel energy source for the solid fuel usage facility. The particular solid fuel treatment may produce a type of non-solid fuel product for the solid fuel usage facility. The particular solid fuel treatment may produce a specific characteristic in the solid fuel. The solid fuel energy source may be syngas, hydrogen, or the like. The solid fuel energy source may be a solid fuel usage facility optimized solid fuel. The non-solid fuel product may be ash, sulfur, water, sulfur, carbon monoxide, carbon dioxide, syngas, hydrogen, or the like. The solid fuel usage facility may be a power generation facility, a steel mill, chemical facility, a landfill, a water treatment facility, or the like.

A method and systems disclosed herein may include providing a starting solid fuel sample data relating to one or more characteristics of a solid fuel to be treated by a solid fuel treatment facility; providing a desired solid fuel characteristic; comparing the starting solid fuel sample data relating to one or more characteristics to the desired solid fuel characteristic to determine a solid fuel composition delta; determining an operational treatment parameter for the operation of the solid fuel treatment facility to clean the solid fuel based at least in part on the solid fuel composition delta; and monitoring contaminants emitted from the solid fuel during treatment of the solid fuel and regulating the operational treatment parameter with respect thereto to create a cleaned solid fuel. The solid fuel treatment facility may be a microwave solid fuel treatment facility. The solid fuel may be coal. The solid fuel sample data may be a database.

The solid fuel characteristic may be water moisture percentage, ash percentage, sulfur percentage, a type of solid fuel, or the like.

The operational treatment parameter may be microwave power, a microwave frequency, a frequency of microwave application, or the like.

The contaminants may include water, hydrogen, hydroxyls, sulfur gas, liquid sulfur, ash, or the like.

The emitted contaminates may be monitored by solid fuel facility sensors. The sensors may provide feedback information for the regulating of the operational treatment parameter.

The method and system may further include the step of providing a high voltage power from a utility owned power transmission line directly to a microwave generator in the treatment facility, wherein the utility owned power transmission line may be adapted to carry high voltage (e.g. over 15 kv.)

The method and system may further include the step of providing a multi-layered conveyor belt to carry the solid fuel through the treatment facility, wherein the multi-layered conveyor belt may be adapted to pass a substantial portion of microwave energy through the belt while having a top layer that may be resistant to abrasion and a second layer that may be resistant to high temperatures.

A method and system of thermally aberrant solid fuel pre-determination may include preheating a solid fuel using microwave energy, detecting solid fuel temperature is above a predetermined temperature, and taking action on the solid fuel that is above the predetermined temperature. The method and system may further include the action of removing the above temperature solid fuel and extinguishing the above temperature solid fuel. In the method and system, the energy is high energy microwaves, long duration microwaves, different microwave frequencies, and the like.

A method and system of thermally aberrant solid fuel pre-determination may include transporting solid fuel past a magnetic source and removing solid fuel containing magnetic material using the magnetic source. The method and system may further include passing the solid fuel past a magnet to magnetize any metallic material within the solid fuel and removing the magnetized solid fuel with the magnetic source.

A method and system of thermally aberrant solid fuel pre-determination may include transporting solid fuel past a metal detector, detecting solid fuel that contains a predetermined amount of metallic material, and taking action on the solid fuel that contains the at least predetermined amount of metallic material. The method and system may further include the action of removing the solid fuel with the predetermined amount of metallic material.

A method and system of thermally aberrant solid fuel pre-determination may include transporting solid fuel past a mass spectrometer, detecting solid fuel that contains a predetermined amount of metallic material, and taking action on any of the solid fuel that contains at least the predetermined amount of metallic material. The method and system may further include the action of removing the solid fuel with the predetermined amount of metallic material.

A method and system of thermally aberrant solid fuel pre-determination may comprise transporting solid fuel past a magnetic resonance imaging (MRI) facility, detecting solid fuel that contains a predetermined amount of metallic material, and taking action on any of the solid fuel that contains at least the predetermined amount of metallic material. The method and system may further include the action of removing the solid fuel with the predetermined amount of metallic material.

A method and system of thermally aberrant solid fuel pre-determination may include transporting solid fuel through a coil winding facility, detecting a current induced by passing the solid fuel through the coil winding facility, and taking action on any of the solid fuel that induces a predetermined amount of current. The method and system may further include the action of removing the solid fuel with the predetermined amount of metallic material.

A method and system of thermally aberrant solid fuel detection may include transporting solid fuel through a solid fuel treatment facility, detecting solid fuel exceeding a predetermined temperature with a thermographic camera facility, and taking action on any of the solid fuel that exceeds the predetermined temperature.

A method and system of thermally aberrant solid fuel detection may include transporting solid fuel through a solid fuel treatment facility, detecting solid fuel exceeding a predetermined temperature with an infrared (IR) facility, and taking action on any of the solid fuel that exceeds the predetermined temperature.

A method and system of thermally aberrant solid fuel removal may include transporting solid fuel through a solid fuel treatment facility, detecting solid fuel that has exceeded a predetermined temperature using a detection facility, the detection facility providing location information for a detected solid fuel to a robotic device, and removing the detected solid fuel using the robotic device. The method and system may further include removing the detected solid fuel from solid fuel treatment facility, removing the detected solid fuel and adding it to a solid fuel inventory that receives non-microwave treatment, and removing the detected solid fuel and adding it to a solid fuel inventory that does not receive further treatment.

A method and system of thermally aberrant solid fuel suppression may include transporting solid fuel through a solid fuel treatment facility, detecting solid fuel that has exceeded a predetermined temperature using a detection facility, the detection facility providing location information for a detected solid fuel to a liquid spray facility, and spraying the detected solid fuel with a liquid to suppress the detected solid fuel. In the method and system, the liquid may be water, coolant, and the like.

A method and system of thermally aberrant solid fuel suppression may comprise transporting solid fuel through a solid fuel treatment facility, detecting solid fuel that has exceeded a predetermined temperature using a detection facility, the detection facility providing location information for a detected solid fuel to a liquid spray facility, and flowing combustion suppression materials onto the detected solid fuel at predetermined locations within the solid fuel treatment facility. In the method and system, the combustion suppression material may be water, nitrogen, an inert gas, and the like.

A method and system of thermally aberrant solid fuel suppression may include transporting solid fuel through a solid fuel treatment facility and removing air to create at least a partial vacuum at predetermined locations within the solid fuel treatment facility, the partial vacuum extinguishing solid fuel that has exceeded a predetermined temperature.

A method and system of thermally aberrant solid fuel management may include transporting solid fuel through a solid fuel treatment facility, treating the solid fuel using energy from a microwave system, and preventing the development of thermally aberrant solid fuel within the treated solid fuel by controlling the amount of microwave energy using a microwave duty cycle. In the method and system, the duty cycle is pulsing the microwave system, the duty cycle is turning the microwave system on and off, and the like.

A method and system of thermally aberrant solid fuel management may include transporting solid fuel through a solid fuel treatment facility, treating the solid fuel using energy from a microwave system, and transporting the solid fuel through a cooling station between microwave systems. In the method and system, the cooling station is a non-microwave station between microwave stations. In the method and system, the cooling station includes air of a lower temperature to control the solid fuel temperature, inert gas to control the solid fuel temperature, nitrogen to control the solid fuel temperature, and the like.

A method and system of thermally aberrant solid fuel management may include transporting solid fuel through a solid fuel treatment facility, treating the solid fuel using energy from a microwave system, detecting solid fuel that exceeds a predetermined temperature, and reducing the microwave system energy when the predetermined temperature has been detected.

A method and system of solid fuel transportation may include providing a conveyor system transporting solid fuel through a solid fuel treatment facility, the conveyor system is substantially microwave energy transparent, supporting the weight and temperature of the solid fuel during the solid fuel treatment, and transporting the solid fuel through the solid fuel treatment facility, wherein the solid fuel is treated using microwave energy. In the method and system, the conveyor system is at least on of a pliable conveyor belt, a multi-layer conveyor belt, a set of individual conveyor belts, a slipstick conveyor, a cork screw conveyor, an air cushion conveyor, a coated conveyor belt, an asbestos conveyor belt, a cooled belt, and a disposable conveyor belt. In the method and system, the solid fuel weight may be approximately 50 lbs/ft3. In the method and system, the solid fuel temperature may be approximately 250° F.-600° F.

A method and system of multiple layer conveyor belt configuration may comprise providing a multiple layer conveyor belt for transporting solid fuel through a solid fuel treatment facility, wherein each of the multiple layers include at least one material, exposing the conveyor belt to microwave energy during treatment of the solid fuel, configuring the conveyor belt layers in a combined conveyor belt system to provide abrasion resistance, heat resistance, and strength. In the method and system, the multiple conveyor belt layers may include a cover layer, a heat resistant layer, and a strength layer. In the method and system, the material may be at least one of silicone, aflas, fiberglass, silica, ceramics, Kevlar, gore, PTFE fiberglass, Teflon asbestos, EPDM rubber, polyester, nylon, butyl, and RTV.

A method and system of conveyor belt repair may comprise providing a conveyor belt system for transporting solid fuel through a solid fuel treatment facility, determining that the conveyor belt system requires repair, and repairing the conveyor belt system using a repair technology. In the method and system, the repair determination may be made while the conveyor belt is within the solid fuel treatment facility. In the method and system, the repair determination may be made external to the solid fuel treatment facility. In the method and system, the repair technology may be repairing conveyor belt system holes with RTV rubber. In the method and system, the repair technology may be replacing a section of the conveyor belt system splicing at least one new section of conveyor belt to the conveyor belt system.

A method and system of conveyor belt cooling may comprise providing a conveyor belt system for transporting solid fuel through a solid fuel treatment facility, driving the conveyor belt system using at least one pulley, the pulley constructed to provide cooling passages within the pulley, flowing a cooling agent through the pulley cooling passages to provide a cooled pulley, and transferring heat from the conveyor belt to the cooled pulley by providing a contact surface between the conveyor belt and the cooled pulley. In the method and system, the cooling agent may be at least one of air, gas, inert gas, water, water based coolant, oil-based coolant, antifreeze. The method and system may further comprise using the cooling agent in a solid fuel temperature suppressor or extinguisher.

A method and system of conveyor belt cooling may comprise providing a conveyor belt system for transporting solid fuel through a solid fuel treatment facility, driving the conveyor belt system using at least one pulley, the pulley constructed to provide a large surface area, and transferring heat from the conveyor belt to the large surface area pulley by providing a contact surface between the conveyor belt and the pulley.

A method and system of conveyor belt cooling may comprise providing a conveyor belt system for transporting solid fuel through a solid fuel treatment facility, driving the conveyor belt system using at least one pulley, the pulley constructed with a thermal conductivity material, and transferring heat from the conveyor belt to the large surface area pulley by providing a contact surface between the conveyor belt and the pulley. In the method and system, the thermal conductivity material may be selected from copper, steel, and aluminum.

A method and system of conveyor belt increased life may comprise providing a conveyor belt system for transporting solid fuel through a solid fuel treatment facility, driving the conveyor belt system using at least one pulley, and increasing the life of the conveyor belt by bending force reduction using a large curvature pulley. In the method and system, the curvature of the pulley may be based on the construction materials of the conveyor belt.

In embodiments, methods and systems of solid fuel thermal management may be provided. The methods may comprise treating the solid fuel using a microwave energy source, and blending the treated solid fuel to lower temperature of the solid fuel. In embodiments, the solid fuel may be coal. In embodiments, same type of coal with different sizes, shape, and some other type of characteristics may be used for blending, to reduce the temperature of coal.

In embodiments, methods and systems of creating solid fuel blends in a solid fuel treatment facility may be provided. The methods may comprise treating the solid fuel using a microwave energy source, blending the treated solid fuel to form solid fuel blends, and collecting the formed solid fuel blends. In embodiments, the solid fuel may be coal. Coal from different sources, such as from different mines, local stockpiles, and coal with different mineral content may be used for creating coal blends.

In embodiments, methods and systems of dust control in a solid fuel treatment facility may be provided. The methods may comprise treating the solid fuel using a microwave energy source, and blending the treated solid fuel to control dust. In embodiments, the solid fuel may be coal. In embodiments, the solid fuel may be blended with dust suppressants such as surfactants, humectants, emulsions, and some other type of dust suppressants.

In embodiments, the solid fuel may be a wood-chip, a wood pellet, an agro-forestry pellet, and some other type of wood based pellet.

In embodiments, methods and systems of creating solid fuel agglomerates in a solid fuel treatment facility may be provided. The methods may comprise treating the solid fuel using a microwave energy source, agglomerating the treated solid fuel to create solid fuel agglomerates, and collecting the formed solid fuel agglomerates. In embodiments, the solid fuel may be coal. In embodiments, the agglomeration may be a chemical agglomeration. In embodiments, agglomeration may be performed to protect the treated solid fuel product from weathering. Further, the agglomeration may help in reducing fines and dust associated with the solid fuel.

A method and system of treating solid fuel may comprise providing a microwave energy source, guiding microwave energy from the microwave energy source through a waveguide, polarizing the microwave energy as it passes through a polarization section of the waveguide and into a microwave chamber, and exposing solid fuel within the microwave chamber to the polarized microwave energy. The method and system may further comprise monitoring the temperature of the exposed solid fuel. The method and system may further comprise monitoring the moisture content of the solid fuel before and after treatment. The method and system may further comprise monitoring the contaminant level of the solid fuel before and after treatment. The method and system may further comprise capturing the moisture released from the solid fuel upon treatment. In the method and system, the microwave energy source may be a 125 kW microwave generator. In the method and system, the polarization may be at least one of linear, circular, or elliptical.

A method and system of treating solid fuel may comprise providing a microwave energy source, launching microwave energy from the microwave energy source into a microwave chamber, and exposing solid fuel within the microwave chamber to the polarized microwave energy. The method and system may further comprise guiding the microwave energy through a waveguide into the microwave chamber. The method and system may further comprise polarizing the microwave energy as it passes through a polarization section of the waveguide and into the microwave chamber. In the method and system, the polarization may be at least one of linear, circular, or elliptical. In the method and system, the microwave energy source may be a 125 kW microwave generator.

A method and system of increasing the thermal efficiency of solid fuel may comprise providing a solid fuel, and exposing the solid fuel to microwave energy to remove a portion of the moisture within the solid fuel. In the method and system, the microwave energy may be polarized. In the method and system, the polarization may be at least one of linear, circular, or elliptical.

A method and system of treating solid fuel may comprise providing a microwave generator, launching microwave energy from the generator into a circular polarization waveguide to polarize the microwave energy, and exposing the solid fuel in a chamber to the circular polarized microwave energy. In the method and system, the circular polarization waveguide may comprise an integral polarization element. In the method and system, the polarization element in the waveguide may tilt the microwaves by 45 degrees so that the microwaves start rotating. In the method and system, the polarization element may be at least one of rectangular, oval, asymmetrical, symmetrical, and cylindrical. In the method and system, the circular polarization waveguide may be formed by extrusion. In the method and system, the waveguide may be coupled to the chamber at an angle. In the method and system, the waveguide may have the shape of at least one of an ellipse, a cone, a circle, a cylinder, a parabola, a square, a rectangle, and a triangle. The method and system may further comprise providing a waveguide between the circular polarization waveguide and the chamber.

A method and system of exposing an item to microwave energy may comprise providing a microwave generator, launching microwave energy from the generator into a polarization waveguide to polarize the microwave energy, coupling an elliptical horn radiator to the waveguide to distribute the polarized microwave energy into a chamber containing the item, and exposing the item in the chamber to the polarized microwave energy. In the method and system, the item may be solid fuel. The method and system may further comprise providing an array of elliptical horn radiators distributing microwave energy into the chamber. The method and system may further comprise arranging the array of radiators in a pattern. The method and system may further comprise disposing the elliptical horn radiators at an angle with respect to one another. In the method and system, the angle is 90 degrees. In the method and system, the array may also include non-elliptical horn radiators. In the method and system, the polarization may be at least one of linear, circular, and elliptical. In the method and system, the radiator may be coupled to the chamber at an angle. In the method and system, the waveguide may have the shape of at least one of an ellipse, a cone, a circle, a cylinder, a parabola, a square, a rectangle, and a triangle.

A method and system of exposing an item to microwave energy may comprise providing a microwave generator, launching microwave energy from the generator into an elliptical horn radiator, coupling the elliptical horn radiator to the chamber, and exposing the item in the chamber to the microwave energy. In the method and system, the item may be solid fuel. The method and system may further comprise providing an array of elliptical horn radiators distributing microwave energy into the chamber. The method and system may further comprise arranging the array of radiators in a pattern. The method and system may further comprise disposing the elliptical horn radiators at an angle with respect to one another. In the method and system, the angle may be 90 degrees. In the method and system, the array may also include non-elliptical horn radiators. In the method and system, the polarization may be at least one of linear, circular, and elliptical. In the method and system, the radiator may be coupled to the chamber at an angle. In the method and system, the microwave energy may be polarized.

A method and system of exposing an item to microwave energy may comprise providing a microwave generator, launching microwave energy from the generator into a polarization waveguide to polarize the microwave energy, coupling a parabolic reflector to the waveguide to distribute the polarized microwave energy into a chamber containing the item, and exposing the item in the chamber to the polarized microwave energy. In the method and system, the item may be solid fuel. The method and system may further comprise providing an array of parabolic reflectors distributing microwave energy into the chamber. The method and system may further comprise arranging the array of reflectors in a pattern. The method and system may further comprise disposing the parabolic reflectors at an angle with respect to one another. In the method and system, the angle may be 90 degrees. In the method and system, the array may also include non-parabolic reflectors. In the method and system, the polarization may be at least one of linear, circular, and elliptical. In the method and system, the reflector may be coupled to the chamber at an angle. In the method and system, the waveguide has the shape of at least one of an ellipse, a cone, a circle, a cylinder, a parabola, a square, a rectangle, and a triangle.

A method and system of exposing an item to microwave energy, comprising, providing a microwave generator, launching microwave energy from the generator into a parabolic reflector, coupling the parabolic reflector to the chamber containing the item, and exposing the item in the chamber to the microwave energy. In the method and system, the item may be solid fuel. The method and system may further comprise providing an array of parabolic reflectors distributing microwave energy into the chamber. The method and system may further comprise arranging the array of reflectors in a pattern. The method and system may further comprise arranging the array of reflectors in a pattern. The method and system may further comprise disposing the parabolic reflectors at an angle with respect to one another. In the method and system, the angle may be 90 degrees. In the method and system, the array may also include non-parabolic reflectors. In the method and system, the polarization may be at least one of linear, circular, and elliptical. In the method and system, the antenna may be coupled to the chamber at an angle. In the method and system, the microwave energy may be polarized.

A method and system of exposing an item to microwave energy may comprise providing a microwave generator, launching microwave energy from the generator into a polarization waveguide to polarize the microwave energy, coupling a tapered horn antenna to the waveguide to distribute the polarized microwave energy into a chamber containing the item, and exposing the item in the chamber to the polarized microwave energy. In the method and system, the item may be solid fuel. The method and system may further comprise providing an array of tapered horn antennas distributing microwave energy into the chamber. The method and system may further comprise arranging the array of antennas in a pattern. The method and system may further comprise disposing the tapered horn radiators at an angle with respect to one another. In the method and system, the angle may be 90 degrees. In the method and system, the array may also include non-tapered horn antennas. In the method and system, the polarization may be at least one of linear, circular, and elliptical. In the method and system, the antenna may be coupled to the chamber at an angle. In the method and system, the waveguide may have the shape of at least one of an ellipse, a cone, a circle, a cylinder, a parabola, a square, a rectangle, and a triangle.

A method and system of exposing an item to microwave energy may comprise providing a microwave generator, launching microwave energy from the generator into a polarization waveguide to polarize the microwave energy, coupling a tapered horn antenna to the waveguide to distribute the polarized microwave energy into a chamber containing the item, and exposing the item in the chamber to the polarized microwave energy. In the method and system, the item may be solid fuel. The method and system may further comprise providing an array of parabolic reflectors distributing microwave energy into the chamber. The method and system may further comprise arranging the array of reflectors in a pattern. The method and system may further comprise disposing the parabolic reflectors at an angle with respect to one another. In the method and system, the angle may be 90 degrees. In the method and system, the array may also include non-parabolic reflectors. In the method and system, the polarization may be at least one of linear, circular, and elliptical. In the method and system, the antenna may be coupled to the chamber at an angle. In the method and system, the microwave energy may be polarized.

A method and system of optimizing microwave energy distribution to solid fuel may comprise designing a microwave antenna with variable features for distributing microwave energy to a chamber containing solid fuel, simulating the electric field pattern generated in the solid fuel by the microwave antenna, and validating the behavior of the microwave antenna. The method and system may further comprise modifying a variable and performing a simulation of an electric field pattern. In the method and system, the behavior may be performance. In the method and system, the behavior may be reliability. The method and system may further comprise simulating the electric field pattern generated by an array of antennas. The method and system may further comprise simulating the electric field pattern generated by different arrangements of the array of antennas. In the method and system, a variable feature may be the size. In the method and system, a variable feature may be the shape of the coupling to the chamber. In the method and system, a variable feature may be the power. In the method and system, a variable feature may be the cost. In the method and system, a variable feature may be the composition. In the method and system, a variable feature may be the polarization capability. In the method and system, a variable feature may be a bend in the antenna. In the method and system, a variable feature may be the distance to the solid fuel. In the method and system, a variable feature may be the angle of insertion to the chamber. The method and system may further comprise varying the chamber in the simulation. In the method and system, the width of the chamber may be variable. In the method and system, a dimension of the chamber may be variable. In the method and system, the atmosphere of the chamber may be variable. In the method and system, the simulation may be a spectral plot. In the method and system, the simulation may be an electric field pattern. In the method and system, the simulation may be a return loss measurement.

A method and system of evenly distributing microwave energy to solid fuel in a chamber may comprise providing a microwave generator, generating microwave energy and transporting the energy into a chamber, and exposing solid fuel within the chamber to the microwave energy, wherein the solid fuel has been filtered to remove solid fuel particles smaller than a threshold size to optimize distribution of microwave energy to the solid fuel. In the method and system, optimizing distribution of microwave energy may further include varying the power of the microwave generator.

A method and system of evenly distributing microwave energy to solid fuel in a chamber may comprise providing a microwave generator, generating microwave energy and transporting the energy into a chamber, and exposing solid fuel within the chamber to the microwave energy, wherein the solid fuel has been distributed within the chamber to a density to optimize distribution of microwave energy to the solid fuel. In the method and system, the distribution of solid fuel may be even. In the method and system, optimizing distribution of microwave energy may further include varying the power of the microwave generator.

A method and system of evenly distributing microwave energy to solid fuel in a chamber may comprise providing a microwave generator, generating microwave energy and transporting the energy into a chamber, and exposing solid fuel within the chamber to the microwave energy, wherein the solid fuel has been distributed in a pattern within the chamber to optimize distribution of microwave energy to the solid fuel. In the method and system, the distribution of solid fuel may be even. In the method and system, optimizing distribution of microwave energy may further include varying the power of the microwave generator.

A method and system of evenly distributing microwave energy to solid fuel in a chamber may comprise providing a microwave generator, generating microwave energy and transporting the energy into a chamber, and exposing solid fuel within the chamber to the microwave energy, wherein the shape of the microwave energy transported into the chamber is optimized for even distribution of microwave energy to the solid fuel. In the method and system, the shape of the microwave energy may be determined by the shape of a waveguide. In the method and system, optimizing distribution of microwave energy may further include varying the power of the microwave generator.

A method and system of evenly distributing microwave energy to solid fuel in a chamber may comprise providing a microwave generator, generating microwave energy and transporting the energy into a chamber through a waveguide, and exposing solid fuel within the chamber to the microwave energy, wherein the shape of the waveguide is optimized for even distribution of microwave energy to the solid fuel in the chamber. In the method and system, optimizing distribution of microwave energy may further include varying the power of the microwave generator.

A method of evenly distributing microwave energy to solid fuel in a chamber may comprise providing a microwave generator, generating microwave energy and transporting the energy into a chamber through an array of waveguides, and exposing solid fuel within the chamber to the microwave energy, wherein the arrangement of the waveguides is optimized for even distribution of microwave energy to the solid fuel in the chamber. In the method and system, the arrangement may be a pattern. In the method and system, the arrangement may be an angle of insertion to the chamber. In the method and system, the arrangement may be a positioning angle with respect to another waveguide. In the method and system, optimizing distribution of microwave energy may further include varying the power of the microwave generator.

A method and system of evenly distributing microwave energy to solid fuel in a chamber may comprise providing a microwave generator, generating microwave energy and transporting the energy into a chamber through a polarization waveguide, and exposing solid fuel within the chamber to the polarized microwave energy, wherein the polarization of the microwave energy is optimized for even distribution of microwave energy to the solid fuel in the chamber. In the method and system, optimizing distribution of microwave energy may further include varying the power of the microwave generator.

A method and system of minimizing return loss in energy distribution to solid fuel in a chamber may comprise providing a microwave generator, generating microwave energy and transporting the energy into a chamber, and exposing solid fuel within the chamber to the microwave energy, wherein the pattern of solid fuel in the chamber is optimized for minimizing return loss. In the method and system, minimizing return loss may further include varying the power of the microwave generator.

A method and system of minimizing return loss in energy distribution to solid fuel in a chamber may comprise providing a microwave generator, generating microwave energy and transporting the energy into a chamber through a waveguide, and exposing solid fuel within the chamber to the microwave energy, wherein the inserted waveguide is impedance matched to the chamber to minimize return loss. In the method and system, minimizing return loss may further include varying the power of the microwave generator.

A method and system of treating solid fuel may comprise providing solid fuel, transporting the solid fuel to the interior of a microwave chamber, wherein the coal rests, and is optionally conveyed, along a belt, providing a microwave generator, guiding launched microwave energy from the generator through a waveguide, coupling the waveguide to the microwave chamber, and exposing solid fuel within the chamber to microwave energy from the waveguide. The method and system may further comprise polarizing the microwave energy.

In an aspect of the invention, a method and system of a circular polarization waveguide may comprise transmitting energy at an input polarization to a polarization waveguide section, the polarization waveguide section comprising polarization elements such that the polarization of microwave energy meeting the elements is transformed to circular polarization, presenting energy exiting from the polarization waveguide section into a microwave chamber, and exposing solid fuel in the microwave chamber to the energy exiting the polarization waveguide. In the method and system, the polarization elements may be square rods. The square rods may be placed at 45° from a plane of symmetry. The square rods may have a height and width of 1.5 inches. The square rods may have a height and width of 2.25 inches. The square rods may have a length of 13.43 inches. The square rods may have a length of 17.37 inches. In the method and system, the polarization elements may be rectangular rods. In the method and system, the polarization elements may be half-round rods. The rod radius may be two inches.

In an aspect of the invention, a system and method of a thermally aberrant solid fuel pre-determination may comprise transporting solid fuel past an x-ray machine, detecting solid fuel that contains a predetermined amount of metallic material, and taking action on the solid fuel that contains the at least predetermined amount of metallic material. In the method and system, the action may be removing the solid fuel with the predetermined amount of metallic material. The solid fuel may be removed by a robotic device. In an aspect of the invention, a system and method of thermally aberrant solid fuel pre-determination may comprise transporting solid fuel past a materials analysis system, detecting solid fuel that contains a predetermined amount of metallic material, and taking action on any of the solid fuel that contains at least the predetermined amount of metallic material. In the system and method, the action may be removing the solid fuel with the predetermined amount of metallic material. The solid fuel may be removed by a robotic device.

In an aspect of the invention, a system and method of thermally aberrant solid fuel pre-determination may comprise transporting solid fuel past an electromagnetic scattering system, detecting solid fuel that contains a predetermined amount of metallic material, and taking action on any of the solid fuel that contains at least the predetermined amount of metallic material. In the system and method, the action may be removing the solid fuel with the predetermined amount of metallic material. The solid fuel may be removed by a robotic device.

In an aspect of the invention, a system and method of thermally aberrant solid fuel pre-determination may comprise transporting solid fuel past a magnetic detection system, detecting solid fuel that contains a predetermined amount of magnetic material, and taking action on any of the solid fuel that contains at least the predetermined amount of magnetic material. In the system and method, the action may be removing the solid fuel with the predetermined amount of magnetic material. The solid fuel may be removed by a robotic device.

In an aspect of the invention, a system and method of solid fuel thermal management may comprise transporting solid fuel through a solid fuel treatment facility, treating the solid fuel using energy from a microwave system, and transporting the solid fuel through a cooling station between microwave systems to cool the treated solid fuel. In the system and method, the cooling station may provide surface application of cooling chemicals to control the solid fuel temperature. In the system and method, the cooling station may apply a cooling gas to control the solid fuel temperature. In the system and method, the cooling station may be a cooled conveyor facility.

In an aspect of the invention, a system and method of solid fuel thermal management may comprise treating the solid fuel using a microwave energy source, and blending the treated solid fuel with solid fuel with a lower temperature solid fuel to lower the temperature of the treated solid fuel. In the system and method, the treated solid fuel and lower temperature solid fuel may be of the same type. In the system and method, the treated solid fuel and lower temperature solid fuel may be of a different type. In the system and method, the treated solid fuel and lower temperature solid fuel may be of one or more sizes. In the system and method, the treated solid fuel and lower temperature solid fuel may be of one or more shapes. In the system and method, blending may be done after the solid fuel is treated. In the system and method, blending may be done during solid fuel treatment.

In an aspect of the invention, a system and method of creating a solid fuel blend in a solid fuel treatment facility may comprise treating the solid fuel using a microwave energy source, and blending the treated solid fuel with at least one solid fuel with a difference in at least one characteristic to form a solid fuel blend. In the system and method, the characteristic may be a solid fuel source. In the system and method, the characteristic may be a treatment status. In the system and method, the characteristic may be a solid fuel type. In the system and method, the characteristic may be a size. In the system and method, the characteristic may be a shape. In the system and method, blending may be done as the solid fuel after the solid fuel is treated. In the system and method, blending may be done during solid fuel treatment.

In an aspect of the invention, a system and method of dust control in a solid fuel treatment facility may comprise associating a dust collection facility with the solid fuel treatment facility, collecting solid fuel dust generated by the transport and treatment of solid fuel in the solid fuel treatment facility with the dust collection facility, and processing the dust collected in the solid fuel treatment facility. In the system and method, the dust may be collected from the conveyor belt. In the system and method, the dust may be collected from the chamber atmosphere. In the system and method, the dust may be collected from a solid fuel storage area. The system and method may further comprise blending the solid fuel to control for dust. In the system and method, the solid fuel may be blended with a dust suppressant. The dust suppressant may be at least one of a humectant, a surfactant, an emulsion, and an agglomerant. Blending may be done during treatment. Blending may be done after treatment. In the system and method, processing may comprise briquetting the dust.

In an aspect of the invention, a system and method of forming a solid fuel briquette may comprise treating a solid fuel using a microwave energy source, and briquetting the solid fuel to form a solid fuel briquette. The system and method may further comprise grinding the solid fuel prior to briquetting. In the system and method, briquetting may be done on the solid fuel during treatment. In the system and method, briquetting may be done on the solid fuel after treatment. In the system and method, briquetting may comprise adding a binder to the solid fuel product. The binder may be a starch. The binder may be molasses. In the system and method, briquetting may comprise applying pressure during briquetting. In the system and method, the solid fuel is a wood chip. In the system and method, the solid fuel is a wood pellet. In the system and method, the solid fuel is an agro-forestry pellet. In the system and method, the solid fuel is coal.

In an aspect of the invention, a system and method of creating a solid fuel agglomerate in a solid fuel treatment facility may comprise treating a solid fuel using a microwave energy source, agglomerating the treated solid fuel to form a solid fuel agglomerate, and recovering the solid fuel agglomerates. In the system and method, the solid fuel may be coal. In the system and method, the agglomerant may be a solid. In the system and method, the agglomerant may be a liquid. In the system and method, agglomeration may be a chemical agglomeration. The chemical agglomerant may be an amine. The amine may be at least one of a tertiary amine, a cyclic amines, and an organic amine. The chemical agglomerant may be at least one of pentane, 2-methylbutane, 1,1,2-trichloro-1,2,2-trifluoroethane, and trichlorofluoromethane. In the system and method, the solid fuel agglomerate is protected from weathering. In the system and method, agglomeration may be performed during treatment. In the system and method, agglomeration may be performed after treatment.

In an aspect of the invention, a method and system of treating solid fuel may comprise transporting the solid fuel to the interior of a microwave chamber, wherein the solid fuel rests, and is optionally conveyed along, a belt, guiding launched microwave energy from a microwave generator through a polarization waveguide section, the polarization waveguide section comprises polarization elements, coupling the polarization waveguide section to the microwave chamber, and exposing solid fuel within the chamber to microwave energy exiting from the polarization waveguide section. In the method and system, the polarization elements may be square rods disposed along an interior face of the polarization waveguide section. The square rods may be placed at 45° from a plane of symmetry for microwave energy. The square rods may have a height and width of at least 1.5 inches. The square rods may have a height and width of at least 2 inches. The square rods may have a length of at least 13 inches. The square rods may have a length of at least 17 inches. In the method and system, the polarization elements may be rectangular rods. In the method and system, the polarization elements may be half-round rods. The rod radius may be at least 2 inches.

In an aspect of the invention, a system and method may comprise transporting a solid fuel to an interior of a microwave chamber, wherein the solid fuel rests, and is optionally conveyed along, a belt, guiding launched microwave energy from a microwave generator through a plurality of waveguides, each of the plurality of waveguides arranged to direct a substantial portion of the microwave energy to different portions of the belt, and exposing the solid fuel within the chamber to microwave energy exiting from the plurality of waveguides. In the method and system, the belt may have a lateral dimension that is substantially perpendicular to its primary direction of travel. In the method and system, each of the plurality of waveguides may be further arranged to direct a substantial portion of the microwave energy to a different portion of the belt with respect to the lateral dimension such that substantially all of the solid fuel laying within the lateral dimension is exposed to at least some microwave radiation. While each waveguide may be directing a substantial portion of the microwave energy to a different portion of the belt, there may be a substantially overlapping section such that the solid fuel receives microwave energy from each of the plurality of waveguides. In the method and system, each of the waveguides may provide linearly polarized microwave energy. In the method and system, each of the waveguides may provide circularly polarized microwave energy. In the method and system, at least one of the waveguides may provide circularly polarized microwave energy. In the method and system, at least one of the waveguides may provide linearly polarized microwave energy. In the method and system, at least one of the waveguides may be associated with a substantially elliptical exit portion. In the method and system, at least one of the waveguides may be associated with a substantially parabolic exit portion. In the method and system, at least one of the waveguides may be associated with a substantially tapered exit portion.

In an aspect of the invention, a system and method of forming a solid fuel briquette may include transporting solid fuel through a continuous feed solid fuel treatment facility; treating the solid fuel using energy from an electromagnetic energy system of the solid fuel treatment facility as it is moved through the treatment facility; and briquetting the treated solid fuel by applying pressure to the treated solid fuel with a briquetting facility to form a solid fuel briquette. The system and method may further include reducing the size of the solid fuel prior to briquetting. Reducing the size may include grinding and/or crushing the solid fuel before entering the treatment facility. Reducing the size may include grinding and/or crushing the solid fuel to less than ⅛ inch. A binder may be added to the solid fuel. The binder may be at least one of a starch, a wheat starch, a corn starch, a sugar, molasses, saw dust, gilsonite, ground asphalt, rosin, plastic, guar gum, lignin and PET (poly(ethylene terephthalate)). The binder may be added before sizing the solid fuel. The binder may be added after sizing the solid fuel but prior to treatment. The binder may be added after treatment but prior to briquetting. In the method and system, the solid fuel may be at least one of a wood-based product, an agro-forestry product, a biomass product, and coal. The coal may be at least one of sub-bituminous coal, lignite coal, peat, anthracite, metallurgical coal, and bituminous coal. The coal may be coal fines. The size of the coal fines may be less than 28 mesh. The coal fines may be in at least one of a slurry, sludge, or paste. The fines may be from a metallurgic coal wash process. The fines may be from a waste coal area or impoundment. In the method and system, the electromagnetic energy may be microwave energy. In the method and system, electromagnetic energy may be RF energy. In the method and system, the electromagnetic energy may operate at a frequency between about 900 and 930 MHz. In the method and system, the electromagnetic energy may operate at a power of about 50 kW or greater. In the method and system, the briquetting facility adjusts at least one or more properties selected from the following: roll-torque, screw-torque, roll force, and screw force. The method and system may further include elevating the temperature of the solid fuel as it enters the briquetting facility. The temperature may be at least 60.degree. F. When the solid fuel is sub-bituminous coal, the temperature may be at least 150.degree. F. When the solid fuel is bituminous coal, the temperature may be at least 200.degree. F. In the method and system, the solid fuel may be processed to a desired moisture content prior to entering the briquetting facility. The moisture content may be below 12%. When the solid fuel is sub-bituminous coal, the moisture content may be below 10%. When the solid fuel is sub-bituminous coal, the moisture content may be above 2%. When the solid fuel is bituminous coal, the moisture content may be below 5%. The method and system may further include adding a coating to the briquette. The coating may be wax. The method and system may further include mixing additional solid fuel material with the treated solid fuel material. The additional solid fuel material may be at least one of sub-bituminous coal, lignite coal, peat, anthracite, metallurgical coal, and bituminous coal. The additional solid fuel material has been treated using energy from an electromagnetic energy system. The method and system may further include placing the briquettes in an outdoor environment after treatment and protecting the briquettes from environmental moisture. In the method and system, both of a binder and a coating may be added to the briquette. The binder may be at least one of saw dust, a starch, a wheat starch, a corn starch, a sugar, molasses, gilsonite, ground asphalt, rosin, plastic, guar gum, lignin, and PET. The coating may be wax. The method and system may further include exposing the solid fuel to steam by combining the treated solid fuel, wherein the treated solid fuel is elevated in temperature from treatment, with untreated solid fuel.

In an aspect of the invention, a method and system of treating solid fuel may include transporting solid fuel through a continuous feed solid fuel treatment facility, treating the solid fuel using energy from an electromagnetic energy system of the solid fuel treatment facility as it is moved through the treatment facility, exposing the solid fuel to steam by combining the treated solid fuel, wherein the treated solid fuel is elevated in temperature from treatment, with untreated solid fuel, and briquetting the treated solid fuel by applying pressure to the treated solid fuel with a briquetting facility to form a solid fuel briquette. In the method and system, the solid fuel may be pre-heated prior to treatment. The method and system may further include sizing the solid fuel prior to briquetting. In the method and system, a binder may be added to the solid fuel. The binder may be at least one of a starch, a wheat starch, a corn starch, a sugar, molasses, saw dust, gilsonite, ground asphalt, rosin, plastic, guar gum, lignin, and PET. The solid fuel may be at least one of a wood-based product, an agro-forestry product, and coal. In the method and system, the electromagnetic energy may be microwave energy. In the method and system, the electromagnetic energy may be RF energy. In the method and system, the electromagnetic energy may operate at a frequency between about 900 and 930 MHz. In the method and system, the electromagnetic energy may operate at a power of about 50 kW or greater. In the method and system, the briquetting facility may adjust at least one or more properties selected from the following: roll-torque, screw-torque, roll force, and screw force. The method and system may further include elevating the temperature of the solid fuel as it enters the briquetting facility. The temperature may be at least 250° F. The temperature may range between 60° F. to about 400° F. When the solid fuel is sub-bituminous coal, the temperature may be at least 150° F. When the solid fuel is bituminous coal, the temperature may be at least 200° F. In the method and system, the solid fuel may be processed to a desired moisture content prior to entering the briquetting facility. The method and system may further include adding a coating to the briquette. The untreated solid fuel may be at least one of sub-bituminous coal, lignite coal, peat, anthracite, metallurgical coal, and bituminous coal. The method and system may further include placing the briquettes in an outdoor environment after exposure to steam and protecting the briquettes from environmental moisture. In the method and system, both of a binder and a coating are added to the briquette.

In an aspect of the invention, a method of heat treating a solid fuel briquette may include transporting a solid fuel briquette through a heat treatment facility; and heating the solid fuel briquette as the solid fuel briquette is moved through the heat treatment facility to a specified internal temperature. The briquette may include a binder. The binder may be at least one of a starch, a wheat starch, a corn starch, a sugar, molasses, saw dust, gilsonite, ground asphalt, rosin, plastic, guar gum, lignin, and PET. The solid fuel may be at least one of a wood-based product, an agro-forestry product, coal, sub-bituminous coal, bituminous coal, and waste coal. The specified internal temperature may be at least 400 degrees F., may be at least 200 degrees F., and may range between 60 degrees F. to about 500 degrees F. The method may further include maintaining the specified internal temperature for a specified duration of time. The specified duration of time may be at least one second, may range from 1 to 30 seconds, or may be at least thirty seconds. The method may further include placing the heat-treated solid fuel briquette in a vessel until the briquette reaches a specified internal temperature. The vessel may be insulated. A cushion of nitrogen may be disposed above the treated solid fuel when the briquette reaches the specified internal temperature. Oxygen may be partially or completely removed from the vessel when the briquette reaches the specified internal temperature. The specified internal temperature may be at least 400 degrees F. The method may further include transporting the solid fuel briquette through a cooling station to cool the solid fuel briquette prior to transporting the solid fuel briquette to an accumulation site. The cooling station may include a facility for applying cooling chemicals to control the solid fuel briquette temperature. The cooling station may include a facility for applying a cooling gas to control the solid fuel briquette temperature. The cooling station may include a facility for applying a mist of water to enable evaporative cooling of the solid fuel briquette. The cooling station may include a low oxygen environment. The heat treatment facility may include a low oxygen environment. The low oxygen environment may be obtained by injecting steam into the facility. In an aspect of the invention, a solid fuel briquette may be produced by the method. The briquette may be resistant to aqueous degradation. Immersion in water does not significantly change the structural integrity of the briquette. The crush strength of the briquette may be at least 180 psi.

In an aspect of the invention, a method of heat treating a solid fuel may include transporting the solid fuel through a heat treatment facility, wherein the solid fuel has been processed with electromagnetic radiation to a desired percent moisture, heating the solid fuel as the solid fuel is moved through the heat treatment facility to a specified internal temperature, and briquetting the heat-treated solid fuel to form a solid fuel briquette. The briquette may include a binder. The binder may be at least one of a starch, a wheat starch, a corn starch, a sugar, molasses, saw dust, gilsonite, ground asphalt, rosin, plastic, guar gum, lignin, and PET. The solid fuel may be at least one of a wood-based product, an agro-forestry product, coal, sub-bituminous coal, bituminous coal, and waste coal. The specified internal temperature may be at least 400 degrees F., may be at least 200 degrees F., and may range between 60 degrees F. to about 500 degrees F. The method may further include maintaining the specified internal temperature for a specified duration of time. The specified duration of time may be at least one second, may range from 1 to 30 seconds, or may be at least thirty seconds. The method may further include placing the heat-treated solid fuel briquette in a vessel until the briquette reaches a specified internal temperature. The vessel may be insulated. A cushion of nitrogen may be disposed above the treated solid fuel when the briquette reaches the specified internal temperature. Oxygen may be partially or completely removed from the vessel when the briquette reaches the specified internal temperature. The specified internal temperature may be at least 400 degrees F. The method may further include transporting the solid fuel briquette through a cooling station to cool the solid fuel briquette prior to transporting the solid fuel briquette to an accumulation site. The cooling station may include a facility for applying cooling chemicals to control the solid fuel briquette temperature. The cooling station may include a facility for applying a cooling gas to control the solid fuel briquette temperature. The cooling station may include a facility for applying a mist of water to enable evaporative cooling of the solid fuel briquette. The cooling station may include a low oxygen environment. The heat treatment facility may include a low oxygen environment. The low oxygen environment may be obtained by injecting steam into the facility. In an aspect of the invention, a solid fuel briquette may be produced by the method. The briquette may be resistant to aqueous degradation. Immersion in water does not significantly change the structural integrity of the briquette. The crush strength of the briquette may be at least 180 psi.

In an aspect of the invention, a method of heat treating a solid fuel briquette may include transporting solid fuel to the interior of a microwave chamber, exposing solid fuel within the chamber to microwave energy, wherein an exposure profile of the microwave energy is selected to achieve a desired percent moisture in the solid fuel, briquetting the treated solid fuel to form a solid fuel briquette, transporting the solid fuel briquette to a heat treatment facility, and heating the solid fuel briquette to a specified internal temperature within the heat treatment facility. The solid fuel may be conveyed along a belt in at least one of the microwave chamber and the heat treatment facility. The solid fuel may be conveyed along a belt though the microwave chamber, from the microwave chamber to the heat treatment facility, and through the heat treatment facility. The briquette may include a binder. The binder may be at least one of a starch, a wheat starch, a corn starch, a sugar, molasses, saw dust, gilsonite, ground asphalt, rosin, plastic, guar gum, lignin, and PET. The solid fuel may be at least one of a wood-based product, an agro-forestry product, coal, sub-bituminous coal, bituminous coal, and waste coal. The specified internal temperature may be at least 400 degrees F., at least 200 degrees F., or the specified internal temperature may range between 60 degrees F. to about 500 degrees F. The method may further include maintaining the specified internal temperature for a specified duration of time. The specified duration of time may be at least one second, may range from 1 to 30 seconds, or may be at least thirty seconds. The method may further include placing the heat-treated solid fuel briquette in a vessel until the briquette reaches a specified internal temperature. The vessel may be insulated. A cushion of nitrogen may be disposed above the treated solid fuel when the briquette reaches the specified internal temperature. Oxygen may be removed from the vessel when the briquette reaches the specified internal temperature. The specified internal temperature is at least 400 degrees F. The method may further include transporting the solid fuel briquette through a cooling station to cool the solid fuel briquette prior to transporting the solid fuel briquette to an accumulation site. The cooling station may include a facility for applying cooling chemicals to control the solid fuel briquette temperature. The cooling station may include a facility for applying a cooling gas to control the solid fuel briquette temperature. The cooling station may include a facility for applying a mist of water to enable evaporative cooling of the solid fuel briquette. The cooling station may include a low oxygen environment. The heat treatment facility may include a low oxygen environment. The low oxygen environment may be obtained by injecting steam into the facility. A solid fuel briquette may be produced by the method. The briquette may be resistant to aqueous degradation. Immersion in water does not significantly change the structural integrity of the briquette. The crush strength of the briquette may be at least 180 psi.

In an aspect of the invention, a method of heat treating a solid fuel briquette may include transporting the solid fuel through a solid fuel treatment facility, wherein the solid fuel is processed with electromagnetic radiation to a desired percent moisture, briquetting the treated solid fuel to form a solid fuel briquette, and placing the solid fuel briquette in a vessel until the solid fuel briquette reaches a specified internal temperature. The vessel may be insulated. An inert gas may be introduced to the vessel when the briquette reaches the specified internal temperature, such as to terminate the self-heat reaction and cool the briquettes. Oxygen may be partially or completely removed from the vessel when the briquette reaches the specified internal temperature. The specified internal temperature may be at least 400 degrees F.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 11 depicts an embodiment of a modular interconnected conveyor belt;

FIGS. 12 and 13 depict an embodiment of an air cushion conveyor belt;

FIG. 25 depicts linear polarization in a rectangular waveguide;

FIGS. 54A, B, C, and D depict a top view and perspective views of a circular polarizer.

FIG. 56 depicts a configuration of a solid fuel treatment facility.

DETAILED DESCRIPTION

Throughout this disclosure the phrase "such as" means "such as and without limitation." Throughout this disclosure the phrase "for example" means "for example and without limitation." Throughout this disclosure the phrase "in an example" means "in an example and without limitation." Throughout this disclosure the phrase "in another example" means "in another example and without limitation." Generally, any and all examples may be provided for the purpose of illustration and not limitation.

Figure 1:
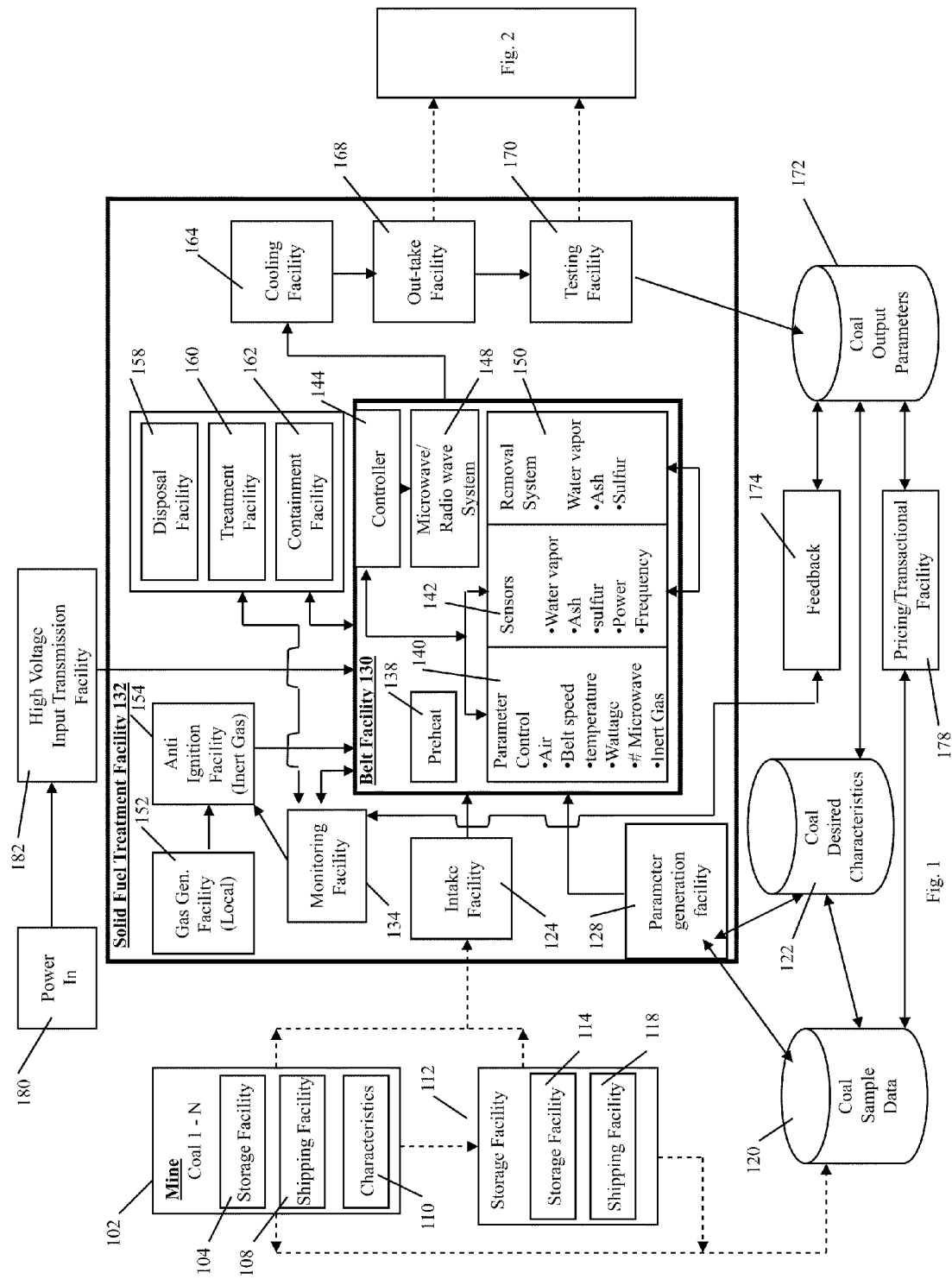
FIG. 1 depicts an embodiment of the overall system architecture of the solid fuel treatment facility.

FIG. 1 illustrates aspects of the present invention that relate to a solid fuel treatment facility 132 using electromagnetic energy to remove products from a solid fuel by heating the products contained within the solid fuel to enhance the solid fuel properties. In an embodiment, the solid fuel treatment facility 132 may be used to treat any type of solid fuel, including, for example and without limitation, coal, coke, charcoal, peat, wood, briquettes, biomass, biodegradable waste, wood-chips, wood-pellets, agro-forestry pellets, living and recently dead biological material, biomass crops such as Miscanthus, Switchgrass, Hemp, Maize, poplar, willow, bamboo, sorghum, eucalyptus, pinus, coconut, sunflower, palm, sugar cane, algae, bagasse, straw, grass, vegetable residues, organic garbage, and the like. While many embodiments of the present invention will be disclosed in connection with coal processing, it should be understood that such embodiments may relate to other forms of solid fuel processing such as coke, charcoal, peat, wood, briquettes, biomass, biodegradable waste, wood-chips, wood-pellets, agro-forestry pellets, living and recently dead biological material, biomass crops such as Miscanthus, Switchgrass, Hemp, Maize, poplar, willow, bamboo, sorghum, eucalyptus, pinus, coconut, sunflower, palm, sugar cane, algae, bagasse, straw, grass, vegetable residues, organic garbage, and the like and the like.

As depicted in FIG. 1, the solid fuel treatment facility 132 may be used as a stand-alone facility, or it may be associated with, a coal mine 102, a coal storage facility 112, or the like. As depicted in more detail in FIG. 2, the solid fuel treatment facility 132 may be associated with a coal use facility such as a coal combustion facility 200, coal conversion facility 210, a coal byproduct facility 212, a coal shipping facility 214, a coal storage facility 218, or the like.

In embodiments, the solid fuel treatment facility 132 may be used to improve the quality of a coal by removing non-coal products that may prevent the optimum burning characteristics of the particular type coal. Non-coal products may include moisture, sulfur, sulfate, sulfide, ash, chlorine, mercury, water, hydrogen, hydroxyls, volatile matter, or the like. The non-coal products may reduce the BTU/lb burn characteristics of a coal by requiring BTU to heat and remove the non-coal product before the coal can burn (e.g. water), or such products may inhibit air flow into the structure of the coal during burning (e.g. ash). Coal may have a plurality of grades that may be rated by the amount of non-coal products in the coal (e.g. water, sulfur, hydrogen, hydroxyls and ash). In an embodiment, the solid fuel treatment facility 132 may treat coal by performing a number of process steps directed at removing the non-coal products from the coal. In an embodiment, a method of removing non-coal products from the coal may be accomplished by heating of the non-coal products within the coal to allow the release of the non-coal products from the coal. The heating may be accomplished by using electromagnetic energy in the form of microwave or radio wave energy (microwave) to heat non-coal products. In embodiments, the coal may be treated using a transportation system to move coal passed at least one microwave system 148 and/or other process steps.

Figure 2:
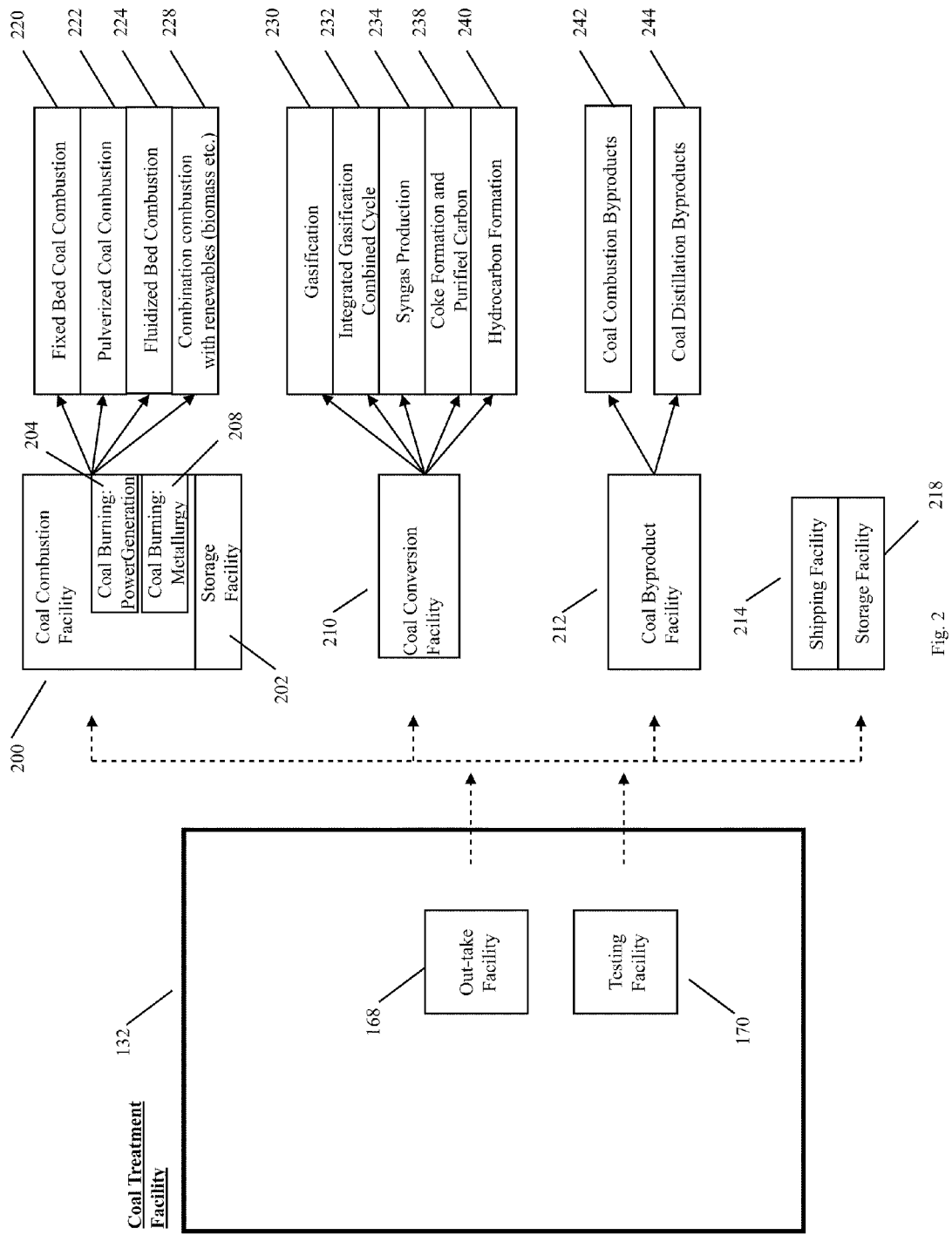
FIG. 2 depicts an embodiment of the relationship of the solid fuel treatment facility to end users of the treated solid fuel.

Referring to FIG. 1, aspects of the solid fuel treatment facility 132 are shown with an embodiment of the solid fuel treatment facility 132 with other associated coal treatment components. The solid fuel treatment facility 132 may receive coal from at least a mine 102 or a coal storage facility 112. There may be a number of databases that track and store coal characteristics of raw mined coal and the desired coal characteristics 122 of a particular type of coal or a particular batch of coal. The solid fuel treatment facility 132 may have a plurality of systems and facilities to support the treatment of coal that may determine operational parameters, monitor and modify the operational parameters, transport the coal through a chamber for the treatment of coal, remove non-coal products from the chamber, collect and dispose of non-coal products, output the treated coal, and the like. After the coal has been treated in accordance with the systems and methods described herein, it may be transferred to a coal usage facility, as shown in FIG. 2. In addition, data and other relevant information produced during testing of the treated coal may be transferred to a coal usage facility, as shown in FIG. 2.

Referring to FIG. 2, aspects of the coal usage after the solid fuel treatment facility 132 treatment of the coal is shown. The solid fuel treatment facility 132 may improve the coal quality by removing non-coal products that may allow the various coal use facilities to use the coal with improved burn rates and fewer byproducts. Coal use facilities may include, but not limited to, coal combustion facilities (e.g. power generation, heating, metallurgy), coal conversion facilities (e.g. gasification), coal byproduct facilities, coal shipping facilities, coal storage facilities, and the like. By using treated coal from the solid fuel treatment facility 132, the coal use facilities may be able to use lesser grades of coal, have fewer byproducts, have lower emissions, have higher burn rates (e.g. BTU/lb), and the like. Depending, for example, on the coal volumes required by a particular coal use facility, there may be a solid fuel treatment facility 132 directly associated with a coal use facility or the solid fuel treatment facility 132 may be remote from the coal use facility.

At a high level, the solid fuel treatment facility 132 may include a number of components that may provide the aspects of the invention; some of the components may contain additional components, modules, or systems. Components of the solid fuel treatment facility 132 may include a parameter generation facility 128, intake facility 124, monitoring facility 134, gas generation facility 152, anti-ignition facility 154, belt facility 130, containment facility 162, treatment facility 160, disposal facility 158, cooling facility 164, out-take facility 168, testing facility 170, and the like. The belt facility 130 may additionally include a preheat facility 138, controller 144, microwave/radio wave system 148, parameter control facility 140, sensor system 142, removal system 150, and the like. The solid fuel treatment facility 132 may receive coal from at least a coal mine 102 or coal storage facility 112 and may provide treated coal to at least a coal combustion facility 200, coal conversion facility 210, coal byproduct facility 212, coal shipping facility 214, coal storage facility 218 and the like.

Referring again to FIG. 1, the solid fuel treatment facility 132 may receive raw coal from a plurality of different raw coal sources such as coal mines 102 or coal storage facilities 112. The output of the solid fuel treatment facility 132 may be to a plurality of different coal use enterprises such as coal combustion facilities 200, coal conversion facilities 210, coal byproduct facilities 212, coal shipping facilities 214, treated coal storage facilities 218, and the like. The treatment of coal in a solid fuel treatment facility 132 may input raw coal at the beginning of a process, perform a number of processes (heating, cooling, non-coal product collection), and output the treated coal to an out-take facility 168 for distribution. The solid fuel treatment facility 132 may be associated with a coal source (e.g. coal mine or storage facility), stand alone facility, associated with a coal use facility, or the like.

In embodiments, the solid fuel treatment facility 132 may be located at a coal source to allow the coal source to provide optimum coal characteristics for the coal it produces. For example, the coal mine may be mining a low grade coal with a high moisture content. The coal mine may be able to mine the coal and treat the coal at the same location and therefore be able to provide the highest grade of that particular grade of coal. Another example may be a coal mine 102 with varying grades of coal, where the coal mine 102 may be able to treat the various grades of coal to have similar properties by treating the coal in a solid fuel treatment facility 132. This may allow the coal mine 102 to have a simplified storage system by being able to store a single grade of coal instead of storing various grades of the coal in a number of locations. This single coal grade storage may also allow the coal mine 102 to provide its customers with a consistent high quality single grade of coal. This may also simplify the customer's coal burning requirements by only managing the use of a single coal grade quality. Consistency of coal supply may enhance the efficiency of coal usage, as described below in conjunction with FIG. 2.

In embodiments, the solid fuel treatment facility 132 may be a stand-alone facility that may receive raw coal from a plurality of individual coal mines 102 and coal storage facilities 112 and process the coal to a higher quality grade of coal for resale. The stand-alone solid fuel treatment facility 132 may store a plurality of different raw and treated coals on-site. For example, based on a customer request, the solid fuel treatment facility may be able to select a grade of raw coal and treat the coal to a certain specification for delivery to that customer. The solid fuel treatment facility 132 may also treat and store coal types and grades that customers may regularly request.

A solid fuel treatment facility 132 associated with a coal use enterprise may receive raw coal from a plurality of coal mines 102 and coal storage facilities 112 for treatment of the raw coal for its own purposes, as described below in more detail in connection with FIG. 2. In this manner, the coal use enterprise may be able to treat the coal to the specifications it requires. The coal use enterprise may also have a dedicated solid fuel treatment facility 132, for example if the enterprise requires a high volume of treated coal.

As depicted in FIG. 1, raw coal may be obtained directly from a coal mine 102. The coal mine 102 may be a surface mine or an underground mine. A coal mine 102 may have varying grades of the same type of coal or may have various types of coal within the single coal mine 102. After mining, the coal the coal mine 102 may store the raw mined coal at an on-site coal storage facility 104 that may store different coal types and/or may store various grades of coal. After mining, the raw coal may be tested to determine the characteristics 110 of the raw coal. The coal mine 102 may use a standard coal testing facility to determine the characteristics 110 of the coal. The coal characteristics may include percent moisture, percent ash, percentage of volatiles, fixed-carbon percentage, BTU/lb, BTU/lb M-A Free, forms of sulfur, Hardgrove grindability index (HGI), total mercury, ash fusion temperatures, ash mineral analysis, electromagnetic absorption/reflection, dielectric properties, and the like. The raw coal may be tested using standard test such as the ASTM Standards D 388 (Classification of Coals by Rank), the ASTM Standards D 2013 (Method of Preparing Coal Samples for Analysis), the ASTM Standards D 3180 (Standard Practice for Calculating Coal and Coke Analyses from As-Determined to Different Bases), the US Geological Survey Bulletin 1823 (Methods for Sampling and Inorganic Analysis of Coal), and the like.

The coal storage facility 104 may also sort or resize the coal that is received from the coal mine 102. The as-mined raw coal may not be in a required size or shape for resale to a coal use enterprise. If resizing is desirable, the coal storage facility 104 may resize the raw coal by using a pulverizer, a coal crusher, a ball mill, a grinder, or the like. After the raw coal has been resized, the coal may be sorted by size for storage or may be stored as received from the resizing process. Different coal use enterprises may find different coal sizes advantageous for their coal burning processes; fixed bed coal combustion 220 may require larger coal that will have a long burn time, pulverized coal combustion 222 may require very small coal sizes for rapid burning.

Using the raw coal characteristics 110, the coal mine 102 storage facility 104 may be able to store the raw coal by raw coal classifications for shipment to coal treatment facilities or coal use enterprises. A shipping facility 108 may be associated with the coal storage facility 108 for shipping the raw coal to customers. The shipping facility 108 may be by rail, ship, barge, or the like; these may be used separately or in combination to deliver the coal to a customer. The coal storage facility 104 may use a transportation system that may include conveyor belts 300, carts, rail car, truck, tractor, or the like to move the classified coal to the shipping facility 108. In an embodiment, there may at least one coal transportation system to transport the raw coal to the shipping facility 108.

A coal storage facility 112 may be a stand alone coal storage enterprise that may receive raw coal from a plurality of coal mines 102 for storage and resale. The received raw coal from the coal mine 102 may be as-mined coal, resized coal, sorted coal, or the like. The coal mine 102 may have previously tested the coal for characteristics 110 and may provide the coal characteristics to the coal storage facility 112. The coal storage facility 112 may be an enterprise that purchases coal from coal mines 102 for distribution and resale to a plurality of customers or may be associated with the coal mine 102 that may be a remote location storage facility 112.

As part of the coal storage facility 112, the raw coal may be tested to determine its characteristics. The coal storage facility 112 may use a standard coal testing facility to determine the characteristics of the coal. The coal characteristics may include percent moisture, percent ash, percentage of volatiles, fixed-carbon percentage, BTU/lb, BTU/lb M-A Free, forms of sulfur, Hardgrove grindability index (HGI), total mercury, ash fusion temperatures, ash mineral analysis, electromagnetic absorption/reflection, dielectric properties, and the like. The raw coal may be tested using standard test such as the ASTM Standards D 388 (Classification of Coals by Rank), the ASTM Standards D 2013 (Method of Preparing Coal Samples for Analysis), the ASTM Standards D 3180 (Standard Practice for Calculating Coal and Coke Analyses from As-Determined to Different Bases), the US Geological Survey Bulletin 1823 (Methods for Sampling and Inorganic Analysis of Coal), and the like.

The coal storage facility 112 may also sort or resize the coal that is received from the coal mine 102 if, for example, the as-mined coal is not suitably sized or shaped for resale to a coal use enterprise. The coal storage facility 112 may resize the raw coal by using a pulverizer, a coal crusher, a ball mill, a grinder, or the like. After the raw coal has been resized, the coal may be sorted by size for storage or may be stored as received from the resizing process. Different coal use enterprises may find different coal sizes advantageous. For example, in coal combustion, certain fixed bed coal combustion 220 systems may require larger coal that will have a long burn time, while others may require very small coal sizes for rapid burning.

Using the raw coal characteristics, the storage facility 104 may be able to store the raw coal by raw coal classifications for shipment to coal treatment facilities or coal use enterprises. A shipping facility 118 may be associated with a coal storage facility 114 for shipping the raw coal to customers. The shipping facility 118 may be by rail, ship, barge, or the like; these may be used separately or in combination to deliver the coal to a customer. The coal storage facility 114 may use a transportation system that may include conveyor belts 300, carts, rail car, truck, tractor, or the like to move the classified coal to the shipping facility 118. In an embodiment, there may at least one coal transportation system to transport the raw coal to the shipping facility 118.

Coal characteristics 110 from both the coal mines 102 and coal storage facilities 112 may be stored in a coal sample data facility 120. The coal sample data facility 120 may contain all the data for a particular coal lot, batch, grade, type, shipment, or the like that may have been characterized with parameters that may include the percent moisture, percent ash, percentage of volatiles, fixed-carbon percentage, BTU/lb, BTU/lb M-A Free, forms of sulfur, Hardgrove grindability index (HGI), total mercury, ash fusion temperatures, ash mineral analysis, electromagnetic absorption/reflection, dielectric properties, and the like.

In embodiments, the coal sample data facility 120 may be an individual computer device or a set of computer devices to store and track the coal characteristics 110. The computer devices may be a desktop computer, server, web server, laptop computer, CD device, DVD device, hard drive system, or the like. The computer devices may all be located locally to each other or may be distributed over a number of computer devices in remote locations. The computer devices may be connected by a LAN, WAN, Internet, intranet, P2P, or other network type using wired or wireless technology. The coal sample data facility 120 may include a collection of data that may be a database, relational database, XML, RSS, ASCII file, flat file, text file, or the like. In an embodiment, the coal sample data facility 120 may be searchable for the retrieval of needed data characteristics for a coal.

The coal sample data facility 120 may be located at the coal mine 102, coal storage facility 112, the solid fuel treatment facility 132, or may be remotely located from any of these facilities. In an embodiment, any of these facilities may have access to the coal characteristic data using a network connection. Updating and modification access may be granted to any of the connected facilities. In an embodiment, the coal sample data facility 120 may be an independent enterprise for the storage and distribution of coal characteristic data.

The coal sample data facility 120 may provide baseline information to a parameter generation facility 128, coal desired characteristics facility 122, and/or a pricing/transactional facility 178. In embodiments, the baseline information may not be modified by these facilities, but may be used, for example, to determine operational parameters for the solid fuel treatment facility 132, to memorialize the initial coal characteristics, or to calculate the cost of a coal batch.

Desired characteristics for coal are determined in the coal desired-characteristics facility 122. The coal desired-characteristics facility 122 may be an individual computer device or a set of computer devices to store the final desired coal characteristics for an identified coal. The computer devices may be a desktop computer, server, web server, laptop computer, CD device, DVD device, hard drive system, or the like. The computer devices may all be located locally to each other or may be distributed over a number of computer devices in remote locations. The computer devices may be connected by a LAN, WAN, Internet, intranet, P2P, or other network type using wired or wireless technology.

The coal desired-characteristics facility 122 may include a collection of data that may be a database, relational database, XML, RSS, ASCII file, flat file, text file, or the like. In an embodiment, the coal desired-characteristics facility 122 may be searchable for the retrieval of the desired data characteristics for a coal.

In an embodiment, the coal desired characteristics 122 may be determined and maintained by the solid fuel treatment facility 132, for example, the desired characteristics of the final treated coal for each type and grade of coal that the facility may treat. These characteristics may be stored in the coal desired-characteristics facility 122 and may be use in conjunction with the information from the coal sample data facility 120 by a parameter generation facility 128 to create the operational parameters for the solid fuel treatment facility 132.

In an embodiment, there may be a plurality of coal desired-characteristics 122 data records; there may be a data record for each coal type and coal grade that the solid fuel treatment facility 132 may treat.

In an embodiment, there may be a coal desired-characteristics 122 data record for each shipment of coal received by a solid fuel treatment facility. There may be coal desired characteristics 122 developed by the solid fuel treatment facility 132 based on the quality of the received coal and the changes effected by the solid fuel treatment facility 132. For example, the solid fuel treatment facility 132 may only be able to reduce the amount of sulfur or ash by certain percentages, therefore a coal desired characteristic 122 may be developed based on the starting sulfur and ash percentages in view of the changes that the solid fuel treatment facility 132 is capable of effectuating.

In an embodiment, the coal desired characteristics 122 may be developed based on the requirements of a customer. The coal desired characteristics 122 may be developed to provide improved burn characteristics, reduction of certain emissions, or the like.

Based on the characteristics of the coal sample and the data from the desired-characteristics facility 122, operational parameters may be determined for processing the coal in the solid fuel treatment facility 132. The operational parameters may be provided to the belt facility 130 controller 144 and the monitoring facility 134. The operational parameters may be used to control the belt facility 130 gas environment, intake of coal volume, preheat temperatures, required sensor settings, microwave frequency, microwave power, microwave duty cycle (e.g. pulse or continuous), out-take volume, cooling rates, and the like.

In embodiments, a parameter generation facility 128 may generate the base operational parameters for the various facilities and systems of the solid fuel treatment facility 132. The parameter generation facility 128 may be an individual computer device or a set of computer devices to store the final desired coal characteristics for an identified coal. The computer devices may be a desktop computer, server, web server, laptop computer, or the like. The computer devices may all be located locally to each other or may be distributed over a number of computer devices in remote locations. The computer devices may be connected by a LAN, WAN, Internet, intranet, P2P, or other network type using wired or wireless technology. The parameter generation facility 128 may be capable of storing the base operational parameters as a database, relational database, XML, RSS, ASCII file, flat file, text file, or the like. In an embodiment, the stored base operational parameters may be searchable for the retrieval of the desired data characteristics for a coal.

To begin the parameter generation process, the solid fuel treatment facility 132 may identify a certain coal shipment that may be processed and request the parameter generation facility 128 to generate operational parameters for this coal shipment. The solid fuel treatment facility 132 may further indicate the required final treated coal parameters. The parameter generation facility 128 may query both coal sample data facility 120 and the coal desired-characteristics facility 122 to retrieve the required data to generate the operational parameters.

From the coal sample data facility 120, the data for the raw coal characteristics 110 may be requested to determine the beginning characteristics of the coal. In an embodiment, there may be more than one data record for a particular coal shipment. The parameter generation facility 128 may select the latest characteristics, average the characteristics, select the earliest characteristics, or the like. There may be an algorithm to determine the proper data to use for the beginning coal characteristics from the coal sample data 120.

From the coal desired characteristics 122, the data for the final treated coal may be selected. In an embodiment, the solid fuel treatment facility 132 may have selected a particular coal desired characteristic 122. In an embodiment, the parameter generation facility 128 may select a coal desired-characteristic 122 record based on the characteristics that may best match the final treated coal parameters requested by the solid fuel treatment facility 132. The parameter generation facility 128 may provide the solid fuel treatment facility 132 with an indication of the selected coal desired characteristics 122 for approval before proceeding with the operational parameter generation.

In an embodiment, the parameter generation facility 128 may use a computer application that may apply rules for treating the raw coal to create the final treated coal. The rules may be part of the application or may be stored as data. The rules applied by the application may determine the operation parameters that may be required by the solid fuel treatment facility 132 to process the coal. A resulting data set may be created that may contain the baseline operational parameters of the solid fuel treatment facility 132.

In an embodiment, there may be a set of predetermined baseline operational parameters for the treatment of certain coals. The parameter generation facility 128 may perform a best match between the coal sample data 120, coal desired characteristics 122, and the preset parameters for the determination the baseline operational parameters.

The parameter generation facility 128 may also determine the operational parameter tolerances that may be maintained to treat coal to the required final treated coal characteristics.

Once the baseline operational parameters are determined, the parameter generation facility 128 may provide the operational parameters to the controller 144 and the monitoring facility 134 for the control of the solid fuel treatment facility 132.

As shown in FIG. 1, coal that is to be processed by the solid fuel treatment facility 132 may be subjected to a set of processes from raw coal to final treated coal such as intake 124, processing in the belt facility 130, processing in the cooling facility 164, and out-take to and external location. Within the belt facility 130, there may be a number of coal treatment processes such as preheating the coal, microwaving the coal, collecting the non-coal products (e.g. water, sulfur, hydrogen, hydroxyls), and the like. In an embodiment, the coal to be treated may be processed by some or all of the available processes, some processes may be repeated a number of times while others may be skipped for a particular type of coal. All of the process steps and process parameters may be determined by the parameter generation facility 128 and provided to the controller 144 for the control of the processes and the monitor facility 134 for revisions to the operational parameters based on sensor 142 feedback. The monitoring facility 134 may also be transmitted a set of sensor parameters that may be used to determine if the coal treatment processes are treating the coal as required.

In embodiments, a solid fuel product in the solid fuel treatment facility 132 may be subjected to a step of briquetting, during the treatment. Briquetting may also be performed after solid fuel treatment, as will be further disclosed herein. The briquetting step may be applied before the solid fuel product comes off the conveyor belt facility or as it is being processed on the conveyor belt facility. In an embodiment, the solid fuel product may be treated using a microwave energy source. During the treatment, the solid fuel product may be briquetted to form briquettes.

Referring to FIG. 56, in an embodiment, after processing with electromagnetic radiation, which may include drying the solid fuel to a particular moisture level or range or obtaining a temperature level or range in the solid fuel, in a solid fuel treatment facility 132, the solid fuel may be immediately briquetted. The electromagnetic energy may be RF or microwave energy. For example, the microwave energy source 5602 may operate at a frequency between 900 and 930 MHz. The microwave energy source 5602 may be a high power microwave system, such as over 50 kW, over 100 kW, and the like. In some embodiments, a heat furnace or an additional microwave energy source 5624 may elevate the internal temperature of the solid fuel to a temperature higher than the temperature achieved during exposure to the first microwave energy source 5602 along the conveyor belt facility. Any solid fuel may be briquetted. In an embodiment, the solid fuel may be coal. For example, the solid fuel may be sub-bituminous coal, peat, bituminous coal, anthracite, lignite coal, coal fines, metallurgical coal, and the like. In the example, the coal fines may be from a metallurgic coal wash process, a waste coal storage area, and the like. The coal fines may be less than 28 mesh, less than 100 mesh, in a slurry, sludge, or paste form, in a coal waste area or impoundment, and the like.

The removal of moisture by processing with electromagnetic radiation may enable the step of briquetting. If moisture levels in the solid fuel are too high, the briquettes may not be able to form. However, removal of sufficient moisture, such as treatment with electromagnetic radiation, may enable briquetting and obtaining a water-resistant briquette. In an embodiment, the briquetting step may commence when the solid fuel has reached a particular moisture level and/or temperature. For example, a microwave energy source may be tuned for a particular energy profile and duration such that a particular moisture level and/or temperature is reached in the solid fuel being treated on a conveyor facility associated with the microwave source. Once a particular moisture level and/or temperature is reached, the solid fuel may be routed to a briquetting facility 5604. In an embodiment, the solid fuel may be immediately briquetted after treatment. For example, coal may be processed to a moisture content between 2 and 9%, less than 12%, or the like. In another example, sub-bituminous coal may be processed to a moisture content between 5 and 7%, less than 10%, above 2%, or the like. In another example, bituminous coal may be processed to a moisture content of less than 5%, or the like.

In an embodiment, the temperature of the solid fuel as it enters the briquetting facility 5604 may be elevated. Elevating the temperature of the solid fuel at a particular temperature, such as at least 60 degrees F., between 60 degrees F. to about 400 degrees F., or between 160 degrees F. and about 240 degrees F., at least 150 degrees F., at least 150 degrees F. for sub-bituminous coal, at least 200 degrees F. for bituminous coal, or the like, may facilitate briquetting. The temperature may be maintained by any heating, cooling, or temperature maintenance facilities. Being able to maintain or adjust the temperature may enable obtaining a higher quality briquette.

In an embodiment, the amount of steam or water vapor in the solid fuel as it enters the briquetting facility may be maintained. Maintaining the amount of steam or water vapor may facilitate briquetting. The amount of steam or water vapor may be maintained by any heating, cooling, or temperature maintenance facilities.

Briquetting the solid fuel after processing it with electromagnetic energy may enable creating a briquette meeting certain desired characteristics. For example, briquetting the treated solid fuel may improve the strength characteristics of the solid fuel. Briquetting may provide protection from the environment. Briquetting may enable achieving a desired shape. For example, briquetting may enable obtaining a half pill shape. In embodiments, the parameters of briquetting may be set to obtain any dimension of briquette.

In an embodiment, briquettes may be formed before processing with electromagnetic energy, immediately after processing with electromagnetic energy, either before or after grinding, either before or after adding binder, and the like.

In an aspect of the present invention, the solid fuel product may be sized by being ground or crushed using grinding equipment such as a grinder, milling machine, or some other type of grinding equipment. The solid fuel may be sized in a grinding facility 5608 prior to briquetting. In an embodiment, the solid fuel may be ground before exposure to electromagnetic energy. The grinding facility may be located outside of the solid fuel treatment facility, or it may be located within the solid fuel treatment facility, as shown in FIG. 56. Grinding the solid fuel prior to electromagnetic treatment may result in less thermally aberrant solid fuel, may increase the efficiency of processing with electromagnetic energy by raising the temperature of the input product, may increase the efficiency of the drying process by reducing the particle size, and the like. In an embodiment, the solid fuel may be ground after treatment with electromagnetic energy in a grinding facility 5608. In an embodiment, the solid fuel may be ground to less than ⅛ inch.

After grinding in the grinding facility 5608, the solid fuel product may be briquetted in a briquetting facility 5604, such as a briquetting press, roll-torque briquetter, screw-torque briquetter, or some other type of briquetting machine or apparatus, to form solid briquettes. The briquetting facility adjusts one or more properties selected from the following: roll-torque, screw-torque, roll force, and screw force. In embodiments, the briquettes may be formed by application of pressure. The briquetting parameters may be variable to obtain a briquette of a desired characteristic. The solid fuel product may be passed through a pressure-briquetting press or some other type of briquetting machine to bind solid fuel product particles with pressure. Materials for briquetting may be fed into a briquetting process manually, by filter, by transport system, and the like. In embodiments, a permanent-drive agitator and separate control spiral feeder may transport the material into the pressing mechanism. The material may be pre-compressed in the briquetting press. This may be followed by a main pressing process where the briquette is manufactured. Subsequently, solid briquettes may be formed.

In embodiments, briquette formation and performance may be facilitated by adding binders such as starch, a sugar, molasses, plastic clay, a wheat starch, a corn starch, saw dust, gilsonite, ground asphalt, rosin, plastic, guar gum, lignin, PET, or some other type of binder to the solid fuel product. The binder may be added before treatment with electromagnetic energy, before sizing the solid fuel, after sizing the solid fuel but before treatment, after treatment but before briquetting, and the like. Adding binder to the solid fuel before treatment may increase the temperature of the coal and binder. Also, adding the binder to the solid fuel before treatment allows the solid fuel and binder to enter the briquetter at temperature and with the water in steam or vapor form. In an embodiment, binder may be added after treatment but before briquetting. In an embodiment, the binder may be added before grinding the solid fuel. The grinder may be used to mix the solid fuel with the binder. Any mixer, such as a pug mill, may be used to mix the binder into the solid fuel. The binder may be metered so as to maintain a constant binder percentage. The binder may be a solid binder. The binder may be ground before briquetting. The binder may be a liquid binder. The binder may be saw dust, which may be applied to between 2 and 4%, Gilsonite or ground asphalt, which may be applied to between 2 and 3%, rosin which may be applied to between 0.25 and 2%, plastic and/or PET applied to between 3 and 10%, a fibrous plant material, wheat starch, and the like. A coating may be added to the briquette to protect from the outside environment. The coating may be added while the briquette is still hot from treatment. In an embodiment, both a coating and a binder may be added to the briquettes.

Briquetting may be facilitated by adding additional solid fuel material to the treated solid fuel material. In an embodiment, the additional solid fuel material may be any solid fuel, such as peat, lignite, sub-bituminous coal, bituminous coal, anthracite, a wood-based product, an agro-forestry product, biomass, and the like, either treated or untreated. For example, sub-bituminous coal may be mixed with bituminous coal. Such mixing may improve briquette performance and enable creating a blended coal with a desired property or properties. For example, between 12.5-50% bituminous coal may be used in the mixture. In another embodiment, sub-bituminous coal may be mixed with lignite coal. Such mixing may improve briquette performance and enable creating a blended coal with a desired property or properties. One such property may be a decreased cost of the briquette. For example, between 12.5-50% lignite coal may be used in the mixture. In an embodiment, the additional material may also be treated.

In an embodiment, adding the additional solid fuel material to the treated solid fuel material while it is still hot may facilitate the generation of steam from the untreated solid fuel. Then, briquettes may be formed with the material exposed to steam generated by combining treated solid fuel with untreated solid fuel.

In an embodiment, a release agent may be used on the briquette molds to help the briquette release after briquetting. The release agent may be powdered graphite, sodium borate, an oil, and the like.

In an embodiment, the briquettes may be provided a time for curing. The briquettes may cure in the briquette mold or after release from the briquetter.

In embodiments, the strength and/or water resistance of a briquette may be increased by additional processing of the briquettes after they have been briquetted. In an embodiment, returning the briquettes to equilibrium may increase the strength and/or water resistance of a briquette. In another embodiment, the briquettes may be placed in an outdoor environment or some other environment wherein the briquettes' temperature may decrease and wherein the briquettes are protected from precipitation and moisture. Returning the briquettes to equilibrium may be accomplished by using a humidity chamber after briquetting. In an embodiment, briquetting while the solid fuel is still hot may increase the strength and/or water resistance of a binderless briquette. Alternatively, the internal temperature of the solid fuel may be increased after the electromagnetic energy treatment but prior to briquetting. For example, after treatment with electromagnetic energy, the solid fuel may have an internal temperature of 180 degrees F. The solid fuel internal temperature may be increased to at least 300 degrees F. or more by exposing the solid fuel to additional heat, such as in a heat furnace or electromagnetic energy. Alternatively, electromagnetic energy may be added to the input hopper of the briquetting facility. As with treatment of other solid fuels described herein, in an embodiment, dust and other contaminants may be collected during the heat treating process using a dust collection facility 5610, such as a baghouse. In an embodiment, moisture may be extracted from the exit of the air system, using an air handling facility 5612. In an embodiment, the heat treatment facility may be integrated before a coke oven or coke battery 5614

In an embodiment, adding a heating process after or before briquetting, such as with the additional microwave energy or heat source 5624, may increase the strength and/or water resistance of the briquette, a phenomenon which may also be known as annealing. In an embodiment, heating treating may be a component of the continuous process of treating solid fuel with electromagnetic energy. For example, the solid fuel may be treated with microwave energy to a desired percent moisture, briquetted, then heat treated to a specified internal temperature. The briquettes may be further placed in a vessel for additional self-heating. In another example, the solid fuel may be treated with microwave energy to a desired percent moisture, heat treated to a specified internal temperature, then briquetted. The briquettes may be further placed in a vessel for additional self-heating. In an aspect of the invention, a method of heat treating a solid fuel briquette may include transporting solid fuel to the interior of a microwave chamber, exposing solid fuel within the chamber to microwave energy, wherein an exposure profile of the microwave energy is selected to achieve a desired percent moisture in the solid fuel, briquetting the treated solid fuel to form a solid fuel briquette, transporting the solid fuel briquette to a heat treatment facility, and heating the solid fuel briquette to a specified internal temperature within the heat treatment facility. The solid fuel may be conveyed along a belt in at least one of the microwave chamber and the heat treatment facility. The solid fuel may be conveyed along a belt though the microwave chamber, from the microwave chamber to the heat treatment facility, and through the heat treatment facility.

In an embodiment, the solid fuel or solid fuel briquettes that undergo the heating process may have a structural integrity sufficient to enable obtaining water-resistant solid fuel briquettes after heat treating and, if not already in briquette form, briquetting. Structural integrity of the solid fuel or solid fuel briquettes may relate to porosity, density, compression, crush strength, water resistance, and the like. For example, the solid fuel or solid fuel briquettes may have a pill-shaped piece of solid fuel may have a crush strength of greater than 180 psi prior to heat treating in order to obtain a water-resistant heat-treated solid fuel briquette. The briquettes to be treated may be briquettes with a binder, briquettes without a binder, bituminous briquettes, sub-bituminous briquettes, as well as many other varieties of briquette. For example, a preferred embodiment may be sub-bituminous, binderless briquettes. The heating process may generate a briquette product that may exhibit minimal surface degradation, low moisture after exposure to environment, at least 50% of the original briquette strength after exposure to environment, a crush strength of at least 180 psi, the same structural integrity after exposure to the water as before, and the like.

Heat treating may be enabled by heating the briquettes in a furnace, such as a non-oxidizing furnace, a microwave, an electromagnetic energy source, or other heating facility. Heat treating may comprise reaching a specified internal temperature in the briquettes. The specified internal temperature may be maintained for a period of time. For example, briquettes may be heated to between 60 to 500 degrees Fahrenheit, 200 degrees Fahrenheit to 500 degrees Fahrenheit, and the like. In another example, reaching a temperature of 400 degrees F. or higher may enable heat treating. In an example, sub-bituminous coal briquettes may be heated to at least 400 degrees Fahrenheit internal temperature. Once an elevated internal temperature has been reached, the temperature may be maintained for a period of time. The period of time may be a few seconds, 10 seconds, 30 seconds or longer or any amount of time in between. During heating, a low oxygen environment may be maintained in the oven. For example, steam may be injected to the heat treatment facility, such as to lower the oxygen level. Alternatively, an inert gas may be injected into the oven to lower the oxygen level. The heated briquettes may be cooled in a low oxygen environment. Misting of the briquettes may also be employed to cool them. Heat treating may further include transporting the solid fuel or solid fuel briquette through a cooling station 5628 to cool the solid fuel or solid fuel briquette prior to transporting the solid fuel briquette to an accumulation site or the solid fuel to a briquetting facility. The cooling station may include a facility for applying cooling chemicals to control the solid fuel or briquette temperature. The cooling station may include a facility for applying a cooling gas to control the solid fuel or briquette temperature. The cooling station may include a facility for applying a mist of water to enable evaporative cooling of the solid fuel or briquette. The cooling station may include a low oxygen environment. Briquettes produced by heat treating may be resistant to aqueous degradation. Immersion in water may not significantly change the structural integrity of the briquette. The crush strength of the briquette may be at least 180 psi.

In an embodiment, heat treating may comprise placing the briquettes in a vessel 5620, such as for example, a barrel, a silo, and the like. In this scenario, the briquettes may only need to be heated to about 150 degrees Fahrenheit, but the pre-heat temperature may range anywhere from room temperature or 50 degrees F. to 500 degrees F. The atmosphere of the vessel may be monitored for temperature, oxygen levels, moisture levels, carbon monoxide levels, and the like. The environment may be a non-oxidizing environment. The vessel may be insulated. A nitrogen blanket may be added to the vessel before sealing to prevent combustion or after a period of time, such as when the briquettes have reached a specified internal temperature. Further, the atmosphere may be controlled through the injection of inert gas or oxygen, or the partial or complete removal of oxygen when the briquettes reach the specified internal temperature. The solid fuel briquettes may be exposed to steam by combining the treated solid fuel, while it is still elevated in temperature from treatment, with untreated solid fuel.

In the vessel, a given temperature may be maintained over a minimum time. For example, the briquettes may be maintained under a set of conditions for a period of time, such as seconds, minutes, hours or greater. Under these conditions, the solid fuel may self heat. Self heating may be an exothermic reaction wherein carbon monoxide released by the solid fuel drives the heating process. The self-heat reaction may be terminated by removing the air from the vessel, introduction of an inert gas to the vessel, and the like. Heat may optionally be added to the vessel to facilitate heat treating. The heat treatment may enable making the solid fuel waterproof and stronger. A new product may generated after heat treating. Without limiting the nature of this product, the changes may take place on the level of the carbon lattice. The solid fuel may form a melted char inside that may seal voids. In an embodiment, a sub-bituminous type coal may become more bituminous-like. The transition may occur when the solid fuel has reached a temperature of 400 degrees Fahrenheit. Since bituminous coal is already waterproof, this process may be useful for sub-bituminous coal. In embodiments, heating briquettes in an oven may simulate an annealing environment.

In an embodiment, coating briquettes with a material may provide protection from the outside environment. For example, coating may involve separating the fines from the briquettes so the coating is only applied to the briquettes. This may be accomplished by using a staged process where the first stage removes fines and the second stage applies the coating. Alternatively, the fines may be separated with a screen immediately after the briquetter. In an embodiment, coating the briquettes may be accomplished by means of a dip bath. In an embodiment, briquettes may be coated using a spray. For example, briquettes may be conveyed and be sprayed on the top and bottom of to get full coverage. Spraying on the bottom may be facilitated by conveying the briquettes along a mesh belt conveyor. In an embodiment, briquettes may be coated using pinch rollers to apply the coat. In an embodiment, the coat material may be foamed and the briquettes may be transported through the foam to be coated. In any event, any coating material that does not get absorbed by or deposited onto the briquettes may be recycled in subsequent coating processes.

In an embodiment, the briquette coating material may be a wax. The wax may be applied at 0.1%-2% of the weight of the briquette. Heating the wax may allow less wax to be applied, increase the ability to spray the wax, lover the viscosity of the wax, and the like. In an embodiment, a chemical may be added to the wax to reduce the viscosity or lower the cost.

In an embodiment, solid fuel briquettes may be formed prior to exposure to electromagnetic energy. Treatment with electromagnetic energy may increase briquette performance. Treatment with electromagnetic energy may reduce moisture inside the briquette to increase the energy value of the briquette. In an embodiment, the electromagnetic energy may be RF or microwave energy. The microwave energy may operate at a frequency between 900-930 MHz, between 2400 and 2500 MHz, and the like. The microwave energy may be a high power microwave system, such as over 15 kW. In an embodiment, electromagnetic energy may be applied directly after briquetting. In another embodiment, there may be time in between briquetting and applying electromagnetic energy.

In an embodiment, a material may be added to the solid fuel and prior to exposing the solid fuel mixture to electromagnetic energy to cause agglomeration of the solid fuel. The material may be a starch. The starch may be added to between 0.5-5% by weight. Other materials may include a wheat starch, a corn starch, a starch, a sugar, molasses, gilsonite, ground asphalt, rosin, plastic, PET, guar gum, lignin, and the like. In an embodiment, the material may be mixed with the solid fuel evenly. In an embodiment, the electromagnetic energy may be RF or microwave energy. The microwave energy may operate at a frequency between 900-930 MHz, and the like. The microwave energy may be a high power microwave system, such as over 100 kW. Any solid fuel may be agglomerated. In an embodiment, the solid fuel may be coal. For example, the solid fuel may be sub-bituminous coal, bituminous coal, peat, anthracite, lignite coal, coal fines, and the like.

In an embodiment, the solid fuel may both use a binder and a coating to protect from the elements. In an embodiment, the solid fuel may be coal. The coal may be sub-bituminous coal. For example, coal may be processed to a moisture content between 2 and 9%. The plant material may be saw dust. The saw dust may be used at 2-4% by weight. The coating may be wax. The wax may be used at between 0.1-2%. The wax may be a wax emulsion, such as for instance, an emulsion with the saw dust. The briquette may have an energy value of between 10,500 and 12,000 BTU/lb, and the like. The briquette may have a crush strength of between 100 and 600 lbs. The briquette dimension may be tuned by application of the binder and coating.

There may be a number of different conveyor configurations that may be used to transport solid fuel through the solid fuel treatment facility 132. In embodiments, the conveyor may be a standard type pliable conveyor belt, a multi-layer belt, a set of individual belts for different heating conditions, a slipstick conveyor, a cork screw conveyor, an air cushion conveyor, a coated conveyor belt, an asbestos conveyor belt, a cooled belt, or the like. The type of conveyor used within the solid fuel treatment facility 132 may require the capability to support hot solid fuel and may be microwave transparent with a low loss tangent (e.g. low absorption of microwave energy).

In another embodiment, the conveyor belt 130 may be a disposal material that may be an inexpensive and, once used, conveyor belt 130 that may be taken up on a reel at the end of a treatment section. In an embodiment, the disposable conveyor belt 130 may be used for one treatment run, a limited number of treatment runs, may be checked after each treatment run to determine if it should be used again, or other technique for using a disposable conveyor belt.

In an embodiment, the slipstick conveyor may contain a solid surface to support the solid fuel and may move the solid fuel by using by moving the entire conveyor surface in a slow horizontal advance with a quick return. Using this motion, the slipstick conveyor may move the solid fuel through the solid fuel treatment facility 132 with little impact on the solid fuel.

In an embodiment, the corkscrew conveyor may include an auger type screw to move material through the solid fuel treatment facility 132. The solid fuel may be moved forward through the solid fuel treatment facility 132 as the corkscrew is rotated.

Figure 6:
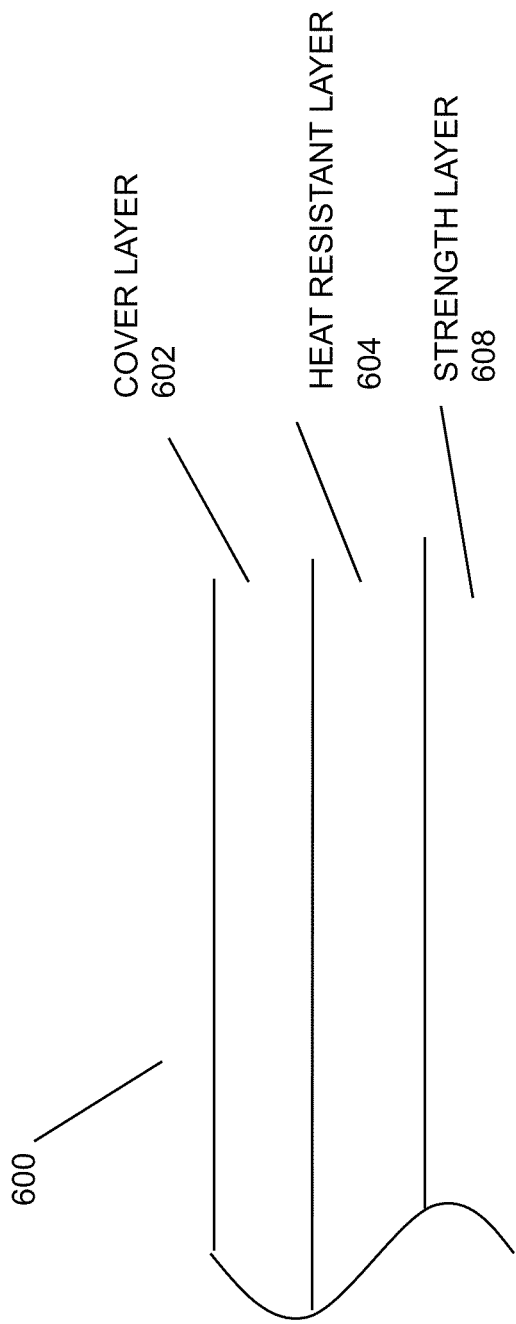
FIG. 6 depicts an embodiment of a conveyor belt incorporating a multiple layer configuration that may include a temperature resistant material.

Referring to FIG. 6, the pliable conveyor belt 600 will now be described in more detail. In an embodiment, the general conveyor belt 600 requirements for the solid fuel treatment facility 132 may be for the conveyor belt 600 to be microwave transparent (e.g. does not absorb microwave energy), support solid fuels with temperatures of 250° F.-300° F. with temperature extremes of 400° F.-600° F., stretch resistant, abrasion resistant, strength to support solid fuel of 50 lbs/ft3, driven by a pulley system, contain side rails to contain the solid fuel within the conveyor area, and the like. The stretch resistance may include not stretching under the load of solid fuel at up to 50 lbs/ft3, to maintain it shape as the belt transitions between hot and cold temperatures and transitions from cold to hot temperatures, to resist stretching as the conveyor belt moves over or around pulleys, or the like. The abrasion resistance may be required to resist the course texture of the solid fuel for both moving the solid fuel within the solid fuel treatment facility 132 and resisting abrasion when the solid fuel is deposited on the conveyor belt 600. The conveyor belt 600 may be a single width across the solid fuel treatment facility, there may be a plurality of belts across the width of the solid fuel treatment facility 132, or the like. The conveyor belt 600 may be used for the entire length of the solid fuel treatment facility 132, there may be a plurality of conveyor belts used for the length of the solid fuel treatment facility 132 with one belt feeding another, or the like. Additionally, throughout the solid fuel treatment facility 132, there may be different conveyor systems used. For example, a slipstick system may be used on one location where the impact to the solid fuel needs to be controlled and a pliable conveyor belt may be used in other locations. It should be understood that there may be many different combinations of conveyor belt systems within the solid fuel treatment facility 132, or there may be a single conveyor system used.

In an embodiment, the conveyor belt 600 may be a single layer belt or may be a multi-layer belt. In embodiments, the multi-layer belt may include a cover layer 602, a heat resistant layer 604, a strength layer 608, and any other layer that may be required to support the solid fuel as it is treated within the solid fuel treatment facility 132. In embodiments, the different layers may be made of different materials that may provide the desired characteristics for each layer. For example, the top layer of the conveyor belt 600 may need to be heat resistant to support the hot solid fuel while the bottom layer may need to be abrasion resistant to provide good wear characteristics while moving over and around pulleys and rollers.

The cover layer 602 may be the top most layer of the conveyor belt 600 and may have characteristics such as non-porous, heat resistant, abrasion resistant, and the like. In an embodiment, the non-porous characteristic may be to prevent solid fuel dust from translating through the conveyor belt 600; the solid fuel dust should be contained within the top layer of the conveyor belt to allow removal where desired. In an embodiment, the heat resistant layer 604 may be required to approximately 800° F. to support the solid fuel as it is heated by the microwave systems 148, air heating systems, radiant heat systems, or the like. In an embodiment, materials such as silicone, aflas (a fluoroelastomer), high temperature polyamide coatings, or the like may be used in the cover layer 602. The cover layer 602 may also be made of a material that allows for ease of repair of holes and pits in the conveyor belt 600, where a solid fuel burn through may be repaired with a compatible patch material.

The heat resistant layer 604 may be another layer of the multi-layer conveyor belt. In an embodiment, the characteristic of the heat resistance layer 604 may be to be an insulator for the strength layer 608 to prevent conveyor belt 600 burn through. A burn through of the heat resistant layer 604 may allow the high temperature solid fuel to compromise the strength layer 608 and shorten the life of the conveyor belt 600. The heat resistant layer 604 may be made of materials such as fiberglass, silica, ceramic, or the like.

The strength layer 608 may be the layer that is in contact with the conveyor belt drive system and therefore must resist breakage under the weight of the solid fuel as it is transported through the solid fuel treatment facility 132, while being bent around the drive system, while moving over various rollers of the conveyor belt facility 130, and the like. In an embodiment, the strength layer 608 may include materials Kevlar, gore material (such as PTFE fiberglass and Teflon), or the like.

As may be understood, there may be additional belt layers, either for separate purposed related to the treatment of solid fuel or multiple layers of the same layer using different materials (e.g. more than one heat resistant layer 604) to provide a complete functionality of the belt layer. For example, one type of belt may be used at the beginning of the solid fuel treatment facility 132 where there may be high microwave energy but the solid fuel may not become very hot because of the presents of water within the solid fuel. The belt used at the end of the treatment process may need to be more heat resistant because more thermally aberrant solid fuel may develop as the solid fuel becomes dryer. Additionally, in sections of the solid fuel treatment facility 132 where there may not be any microwave energy, conveyor belts 600 may be used that are not microwave transparent such as a metal conveyor, metallized coated belt, or the like.

In an embodiment, the conveyor belt 600 may be spliced using methods such as a heat-sealed overlap splice, a heat-sealed butt splice, an alligator splice, a fabric pin splice, or other splicing technology that may join the conveyor belt 600 ends together and support the solid fuel load and treatment temperatures. In an embodiment, as the conveyor belt 600 wears during the treatment of the solid fuel (e.g. burning, pitting, stretching, abrading), the belt may be repaired by applying a splice at the wear areas, wear areas may removed and a new section of belt may be spliced in to repair the belt, or the like. The belt may be spliced while it is within the solid fuel treatment facility 132, may be spliced outside the solid fuel treatment facility 132, may be spliced at a separate facility, or the like. In an embodiment, the conveyor belt 600 may be spliced using any splicing technology that may provide the strength and heat resistance requirements of the solid fuel treatment facility 132. As previously described, different parts of the solid fuel treatment facility 132 may treat the solid fuel in different manners (e.g. different levels of microwave energy), and the splice used on the conveyor belt 600 may be selected by the method of solid fuel treatment in a particular solid fuel treatment section. For example, the splice used in the beginning of the solid fuel treatment facility may be required to support lower temperature solid fuel then that at the end of the solid fuel treatment facility 132 where there may be a greater possibility of thermally aberrant solid fuel.

Materials used for the various belt layers may need to be selected from a group of materials that are substantially microwave transparent. In particular, the cover material may need to prevent dust from being entrapped within the conveyor belt, from being transmitted through the conveyor belt, or the like.

In an embodiment, ceramic material may be used as a cover layer 602 to provide temperature resistance up to 3000° F. A ceramic cover layer may have an additional coating such as aflas or butyl to provide added abrasion resistance and to provide a non-permeable surface to seal the ceramic surface from solid fuel dust.

In another embodiment, ethylene propylene diene monomer rubber (EPDM) may be used as a conveyor belt layer or as a single layer conveyor belt. EPDM may provide heat resistance and may also provide abrasion resistance both of the solid fuel and the conveyor pulleys. Additionally, polyester and/or nylon may be used in conjunction with the EPDM belt to provide additional belt strength.

In an embodiment, another belt combination may be a polyester and butyl multiple layered conveyor belt. The polyester may provide strength to the belt for a strength layer 608 and the butyl may provide heat resistance and a non-permeable surface for a cover layer 602.

In an embodiment, another multiple layer belt combination may be a Kevlar and butyl conveyor belt. The Kevlar may provide strength and high temperature resistance for the belt and the butyl may provide heat resistance and a non-permeable surface.

In an embodiment, another belt combination may be a combination of fiberglass and silicone, the silicone may be coated on the fiberglass belt or may be a separate layer. This belt combination may provide for a thin conveyor belt that provides strength and heat protection to approximately 1600° F.

In an embodiment, asbestos may be used as a conveyor belt 600, a layer within a conveyor belt 600, as part of a conveyor belt layer, or the like to provide heat resistance to the belt, or layer.

In an embodiment, some of the cover layer 602 materials such as silicone and EPDM may be repairable using an RTV material, the RTV repair may provide heat resistance of approximately 500° F. For example, if a cover layer 602 material was to become pitted due to supporting thermally aberrant solid fuel, the local pit or burn-through on the conveyor belt 600 may be repaired using the RTV material. In an embodiment, this repair technique may allow the conveyor belt 600 to be repaired without removing the conveyor belt 600 from the solid fuel treatment facility 132. For example, there may be a length of the conveyor belt 600, either at the beginning or end of the treatment facility 132, that allows for inspection and repair of the conveyor belt 600 with the RTV material. In another example, the conveyor belt 600 may be periodically removed from the treatment facility 132 to inspect and repair the conveyor belt 600. In an embodiment, the treatment facility 132 may have a plurality of conveyor belts 600 that may be interchangeable, allowing one conveyor belt 600 to be repaired while another is being used in the treatment facility 1232.

As indicated herein, the solid fuel treatment facility 132 may utilize a conveyor belt 600 (e.g., elements 600A, 600B, 600C, and 600D, as described in connection with FIGS. 7-10 herein) to transport solid fuel through the belt facility 130. Processing steps within the belt facility 130 may include RF microwave heating, washing, gasification, burning, steaming, recapture, and the like. These solid fuel processing steps may be performed while the solid fuel is on the conveyor belt 600. Processing steps may expose the conveyor belt 600 to conditions such as RF microwave emissions, high temperatures, abrasion, and the like, and may have to withstand these conditions under extended operating time frames. The conveyor belt 600 may be a continuous flexible structure, a hinged plated structure or other conveyor structure, and, in embodiments, require a unique design to survive the environmental conditions of the belt facility 130. Such a conveyor belt may be faced with environmental conditions such as RF microwave emissions, high temperature, abrasion, and the like, In the case of a hinged plated structure there may be issues with environmental conditions such as material becoming jammed in the hinged spaces, microwave absorption, and the like, that may be related to hinged structures. The effect of these conditions on the conveyor belt 600 may be minimized with proper selection of materials and structure for the conveyor belt 600.

The environmental conditions of the belt facility 130 may require the conveyor belt 600 to be associated with a plurality of characteristics, such as low microwave loss, high structural integrity, high strength, abrasion resistance, constant high temperature resistance, localized elevated high temperature resistance, temperature isolation, burn-through resistance, high melting point, non-porousness to particulates and moisture, resistance to thermal run-away, capable of fluid transport, and the like.

The conveyor belt 600 may be required to have low microwave loss. The solid fuel treatment facility 132 may utilize microwaves to heat the solid fuel. The conveyor belt 600 may absorb microwave energy and heat up. If the materials comprising the conveyor belt 600 do not have low microwave loss, the conveyor belt 600 may heat up and break down with use. The RF microwave frequencies that the microwave system 148 of the belt facility 130 may use may be in the range from 600 MHz to 1 GHz, and may represent the RF frequencies the conveyor may have low microwave loss for. Certain operational conditions within the belt facility 130 may cause the amount of microwave energy absorbed by the conveyor belt 600 to be greater. For example, when the solid fuel is dry, or when there is a reduced amount of solid fuel on the conveyor belt 600, there may be little material for the microwave energy to be absorbed into. As a result, the conveyor belt 600 may absorb more microwave energy.

The conveyor belt 600 may be required to sustain constant high temperatures as a result of the operational temperatures of the belt facility 130. These constant temperatures may reach 150° F., 200° F., 250° F., or the like. The conveyor belt 600 may have to withstand these high temperatures over extended operational time frames. In addition, the conveyor belt 600 may be required to sustain localized high temperatures in excess of the constant operational temperatures of the belt facility 130. These localized high temperatures may be due to individual pieces of solid fuel developing temperatures of 500° F., 600° F., 700° F., or the like. These localized hot spots could burn through the conveyor belt 600, which may lead to interruptions of the solid fuel treatment facility 132 operations.

The conveyor belt 600 may be required to sustain constant abrasions from the processing of the solid fuel. For instance, the solid fuel may be dropped onto the conveyor belt 600 from heights of one foot, two feet, three feet, or the like. Another example may be solid fuel abrading the conveyor belt 600 as the solid fuel slides off the conveyor belt 600. The conveyor belt 600 may be required to sustain constant abrasion over extended operational time frames.

The conveyor belt 600 may be required to be non-porous to particulates, moisture, and the like. If particulates of the solid fuel where to fall through the conveyor belt 600, the particulates may degrade the performance of the conveyor belt 600. For instance, if solid fuel where to constantly drop through the conveyor belt 600 into the mechanical portions of the belt system 130, the mechanical portions of the belt system 130 may clog or jam, which may lead to interruptions of the solid fuel treatment facility 132 operations. In addition, moisture absorbed into the conveyor belt 600 may increase the amount of microwave energy that may be absorbed by the conveyor belt 600. The absorption of microwave energy may lead to heating of the conveyor belt 600, and a resulting decrease in the life of the conveyor belt 600.

The conveyor belt 600 configuration may utilize a plurality of materials in order to satisfy the requirements created by the environmental conditions of the belt facility 130. In embodiments, these materials may be used in bulk, in a mixture, in a composite, in layers, in a foam, as a coating, as an additive, or in any other combinations known to the art, in order for the conveyor belt 600 to withstand the environmental conditions of the belt facility 130. Materials may include white butyl rubber, woven polyester, alumina, polyester, fiberglass, Kevlar, Nomex, silicone, polyurethane, multi-ply materials, ceramic, high-temperature plastics, combinations thereof, and the like. In embodiments, the conveyor belt 600 may be constructed in layers, such as a top layer, a structural layer, a middle layer, a ply layer, a woven layer, a mat layer, a bottom layer, a heat resistive layer, a low microwave loss layer, a non-porous layer, or the like. In further embodiments, the layer may be removable in order to facilitate replacement, repair, replenishment, or the like.

Figure 7:
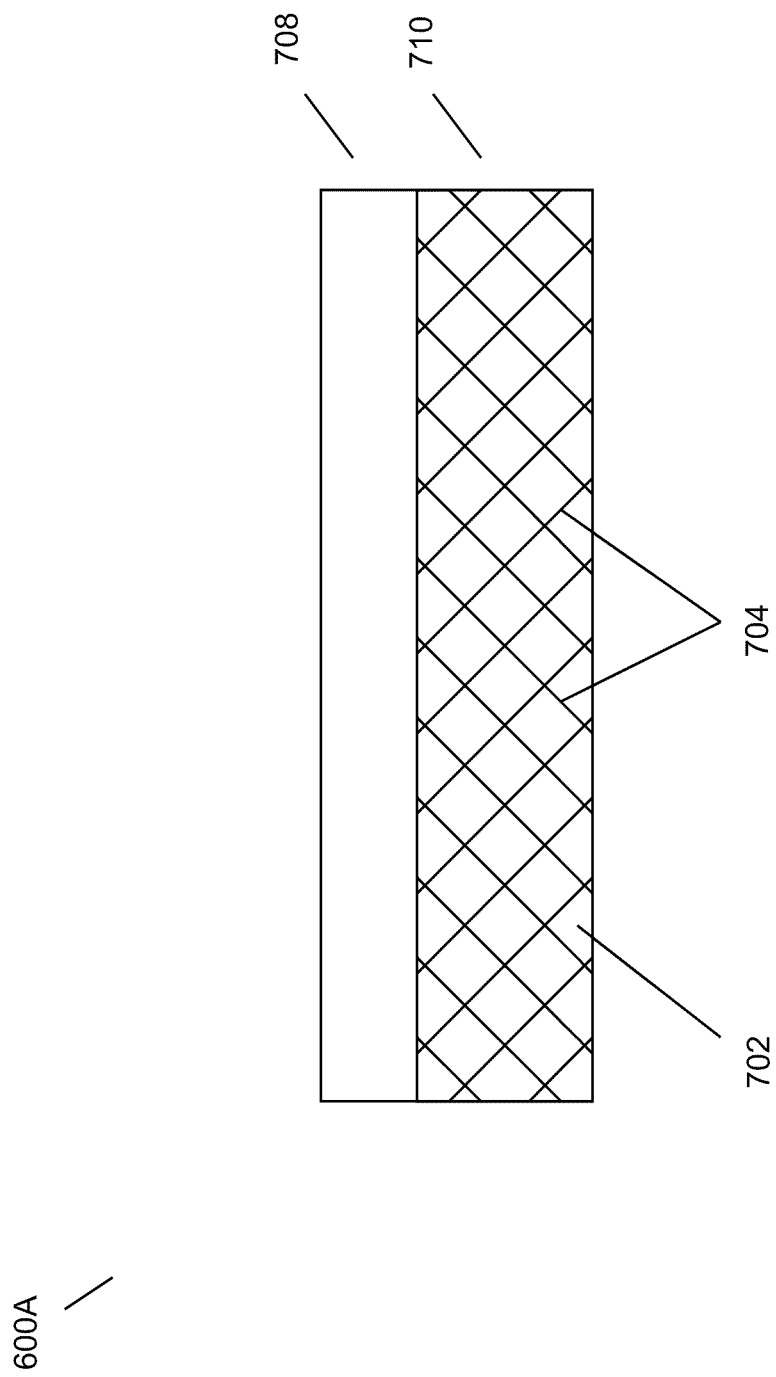
FIG. 7 depicts an embodiment of a conveyor belt with a cover layer.

In embodiments, the conveyor belt 600A may withstand environmental conditions of the belt facility 130 with a multiple layer configuration such as shown in FIG. 7. In this embodiment, the lower layer is a structural layer 710, made up of a matrix material 702 reinforced with structural cords 704 in a ply like structure. This structural layer 710 may satisfy requirements such as high structural integrity, high strength, and the like. An example of a combination of materials that may be combined to make up the structural layer 710 may be a white butyl rubber matrix 702 with woven polyester as the structural cords 704. Other materials that may be used as the matrix 702 material may be natural rubber, synthetic rubber, hydrocarbon polymer, or the like. Other materials that may be used as structural cords 704 may be Kevlar, Nomex, metal, plastic, polycarbonate, polyethylene terephthalate, nylon, and the like. In this embodiment, the upper layer is a cover layer 708 that can withstand very high temperatures. The cover layer 708 may also have thermal insulating properties in order to insolate hot solid fuel from the lower layer. The cover layer 708 may not require strength properties, but may require abrasion resistant properties, have a low microwave loss factor, have thermal properties that prevent thermal runway, or the like. Examples of this upper cover layer 708 may be fiberglass, low loss ceramic such as alumina, optical fiber, corundum, organic fibers, carbon fiber, composite materials, or the like. In embodiments, the cover layer 708 may be implemented as a tightly woven product, or in the form of foam. Another example of a cover layer 708 material may be silicone. Silicone may be able to handle high temperatures, but may not be as abrasion resistant. In this instance, a coating on top of the silicone, such as polyurethane, or an additive into the silicone, may be added to increase abrasion resistance.

In embodiments, the cover layer 708 may be designed so that it is easily removable, which may enable replacement, repair, replenishment, or the like, of the cover layer 708. In this case the requirements for being abrasion resistant and non-porous may be relaxed. In one embodiment, the cover layer 708 may be applied in roll form with a feeding roller on one side of the conveyer belt 600 system, and a take up roller on the exit side.

Figure 8:
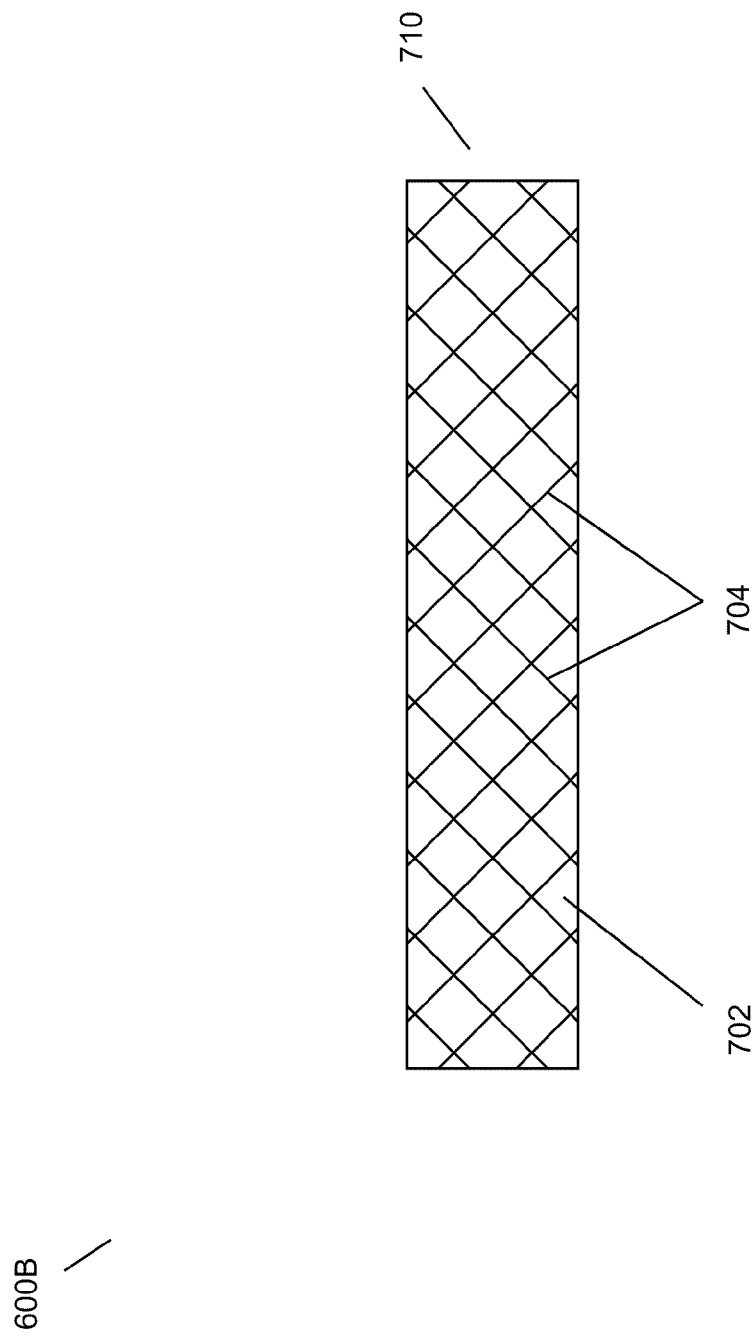
FIG. 8 depicts an embodiment of a conveyor belt without a cover layer.
Figure 9:
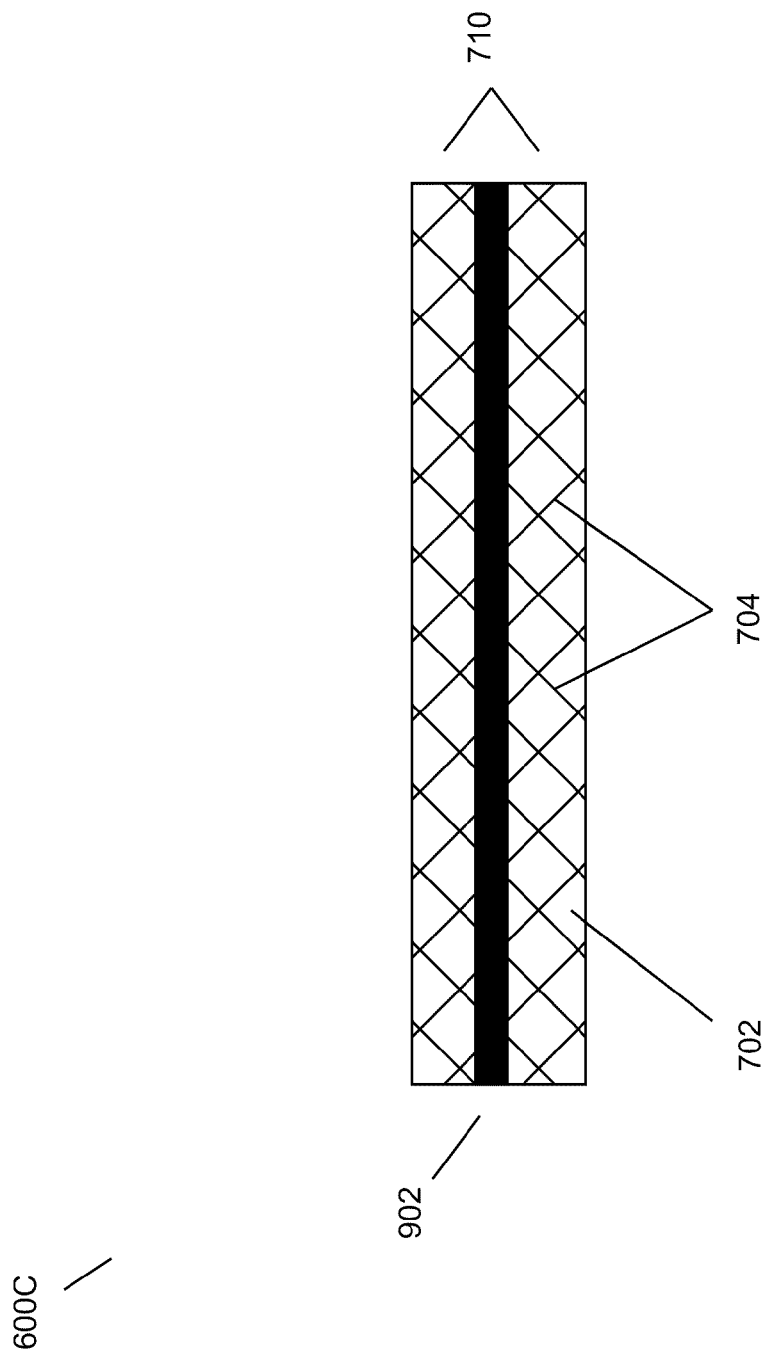
FIG. 9 depicts an embodiment of a conveyor belt with a middle layer of temperature resistant material.

In embodiments, the conveyor belt 600B, as shown in FIG. 8, may withstand environmental conditions of the belt facility 130 without a cover layer 708. This may be done by introducing high temperature material components into the matrix 702 material that will make the matrix 702 material, such as the white butyl rubber, more resistant to the belt facility's 130 high temperature environmental conditions. In embodiments, the structural layer 710 may prevent high temperature solid fuel from burning through the conveyor belt 300C by inserting a middle layer 902 of temperature resistant material, as shown in FIG. 9. An example of such a middle layer 902 may be Kevlar, Nomex, metal, ceramic, fiberglass, or the like. In this configuration, the upper portion of the structural layer 710 may melt, but the conveyor belt 600C may still be usable until repairs to the upper portion of the structural layer 710 can be made.

Figure 10:
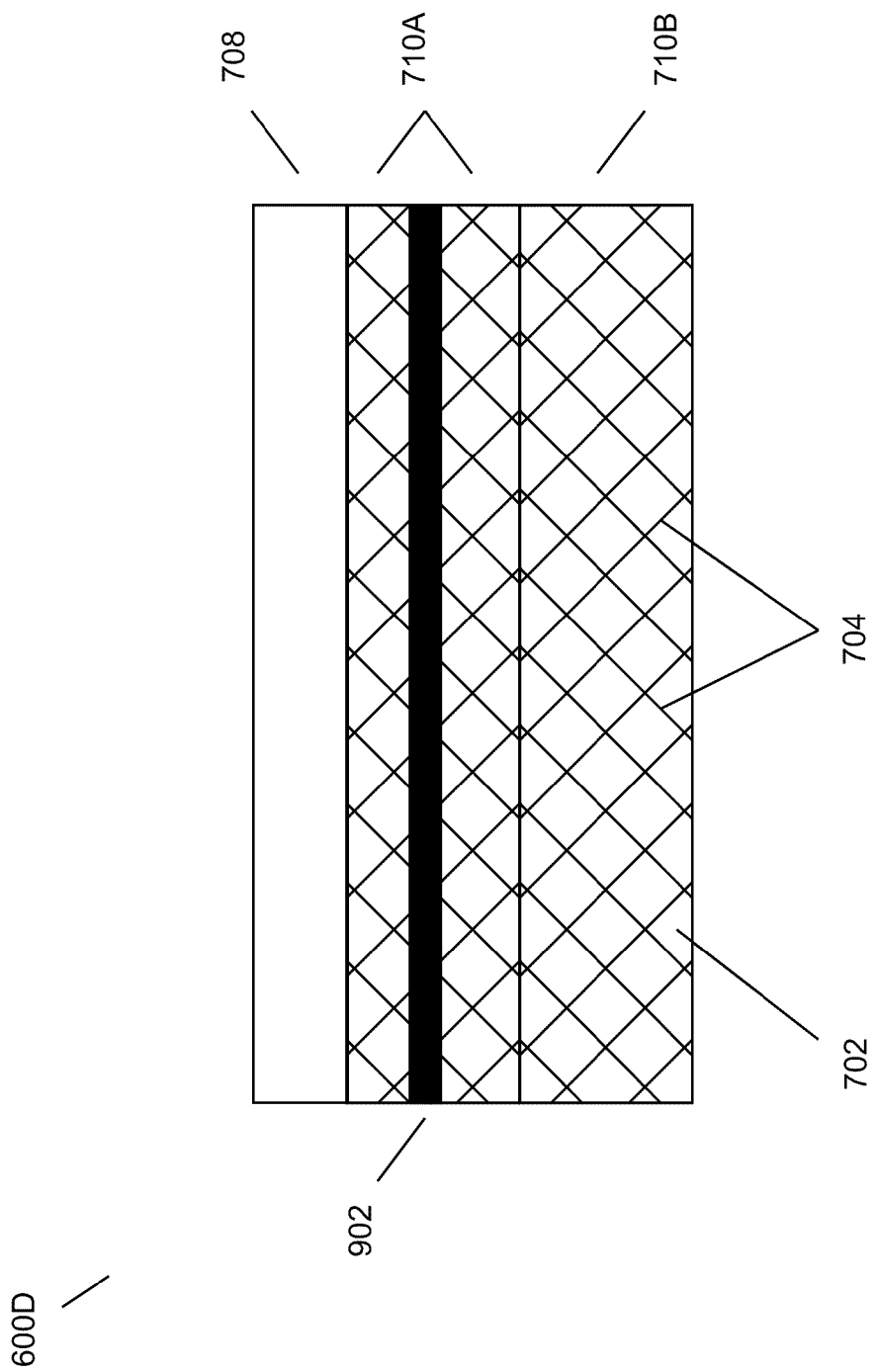
FIG. 10 depicts an embodiment of a conveyor belt with a combination of layers.

In embodiments, the conveyor belt 600D may withstand environmental conditions of the belt facility 130 with the multiple layer configuration as shown in FIG. 10, where a combination of layers, as previously discussed herein, are repeated. The additional layers may add further strength to the conveyor belt 600D, as well as further reducing the possibility of high temperature solid fuel from burning through. There may be a top cover layer 708 that may be heat resistant, abrasive resistant, removable, and the like. There may be a structural layer 710A with a middle layer 902. This composite layer is shown as an intermediate layer in the belt, but may in embodiments be a top layer, an intermediate layer, a bottom layer, and the like. There may be a structural layer 710B. The structural layer 710B is shown as a bottom layer, but may in embodiments be an intermediate layer or a top layer. Other embodiments, consisting of multiple layers, are not limited to the combinations illustrated in FIG. 10. For instance, an embodiment may consist of a combination of layers where the middle layer 902, within structural layer 710A, is absent, or there are a different number of layers in composite layers, or a composite layer is made up of a plurality of sub-layers, and the like. While FIG. 10 illustrates a structure with multiple layers and composite layers, other multiple layer structures will become obvious to anyone skilled in the art, and is incorporated into the invention.

Referring to FIG. 11, an embodiment of a modular interconnected belt 1102 is shown. In an embodiment, the interconnected belt 1102 may allow cooling to be provided from below the solid fuel during the treatment process; this may prevent the development of thermally aberrant solid fuel.

In FIGS. 12-13, in an embodiment, an air cushion conveyor is shown. The air cushion conveyor may be any type of conveyor system that suspends the solid fuel with air 1202. In embodiments, the air 1202 may directly suspend the solid fuel, the solid fuel may be suspended by a belt 1302 supported by an air cushion 1202, or the like. In addition to supporting the solid fuel during treatment, the air cushion 1202 may provide cooling to the conveyor belt 1302 and solid fuel, the cooling may be incorporated into a solid fuel cooling system in the prevention of thermally aberrant solid fuel development. In an embodiment, the interconnected belt 1102 of FIG. 11 may be combined with the air cushion 1202 systems.

Figure 14A:
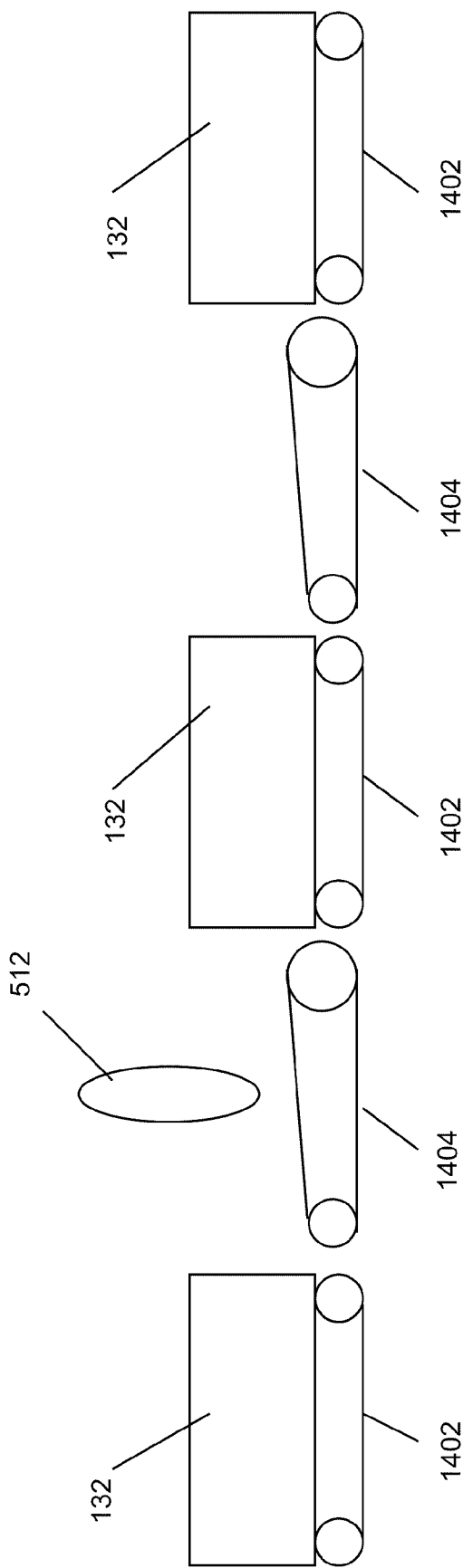
FIG. 14 depicts an embodiment of using different conveyor belts within the solid fuel belt facility.
Figure 14B:
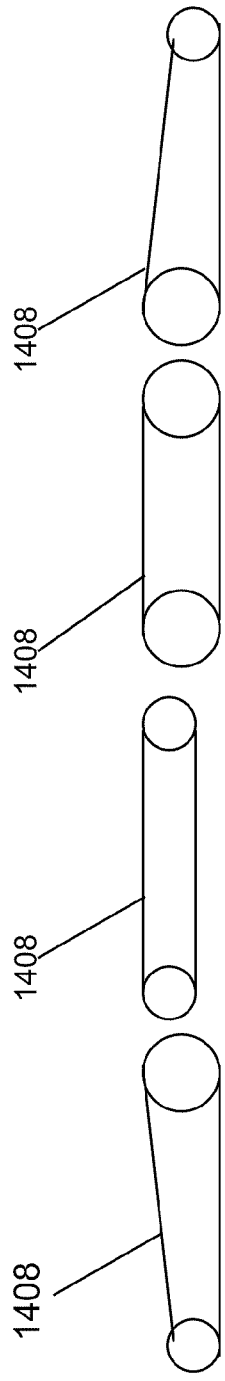

Referring to FIGS. 14A and 14B, embodiments of using different types of conveyor belt 1402, 1404 at different locations within the solid fuel treatment facility 132. As shown in FIG. 14A, there may be one type of belt 1402 used at the solid fuel treatment facility 132 and other types of conveyor belts 1404 between the solid fuel treatment facility 132. The conveyor belts 1404 between the solid fuel treatment facilities 132 may be transport belts, cooling distances 520, or the like. In an embodiment, there may be a pick/place robot 512 placed between the solid fuel treatment facilities 132 at conveyors 1404. As shown, the belts (1402, 1404, 1408) may use different size rollers to provide elevation differences between solid fuel treatment facilities 132, provide improved cooling, provide improved belt grip, or the like.

Figure 15:
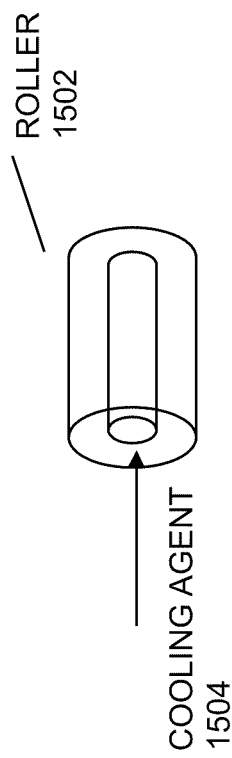
FIG. 15 depicts an embodiment of a conveyor belt cooling system.
Figure 16:
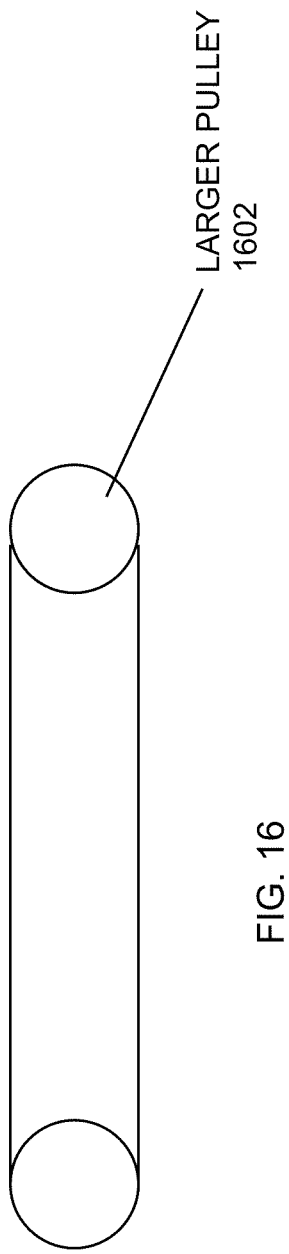
FIG. 16 depicts an embodiment of a large diameter roller.

Referring to FIG. 15 and FIG. 16, in an embodiment, the heat resistance of the conveyor belt may be increased by providing conveyor belt rollers 1502 that provide a thermal sink such as a cooled roller, a large diameter roller 1602 to provide increased surface area, roller materials that provide heat conductivity, or the like. As may be understood, depending on the cooling requirements of the conveyor belt and solid fuel, these cooling methods may be used individually or may be combined to provide the heat removal that is required for a particular section of the conveyor belt. In an embodiment, these thermal sink rollers 1502 may be the drive pulley, support rollers that support the conveyor belt within the solid fuel treatment facility 132, or the like.

In an embodiment, the cooled roller 1502 may have cooling agent 1504 such as a liquid or gas flowing within the roller 1502 to keep the roller 1502 cooler than the conveyor belt and therefore act as a thermal sink. The roller or pulley may contain a double wall or other hollowing design where the liquid or gas may flow into and out of the roller 1502 to provide heat exchange and cooling for the roller 1502 or pulley. In an embodiment, the liquid may be water, water based coolant, oil based coolant, antifreeze, or the like. In an embodiment, the gas may be air, a gas (e.g. nitrogen), an inert gas (e.g. argon), or the like. For example, cool water may flow through the roller to keep the roller cooler than the belt. In another example, the roller may have cooled air or a gas such as argon flowing through it to cool the roller.

In an embodiment, the liquid or gas flowing through the roller 1502 may also be used as part of the thermally aberrant solid fuel extinguishing facility. For example, water may flow through the roller 1502 to provide cooling and then, as previously described, the water may be used for a water spray or water flow to extinguish thermally aberrant solid fuel or prevent thermally aberrant solid fuel from developing.

In an embodiment, large diameter rollers 1602 may be used to provide a large contact surface area for the conveyor belt 130 and provide for cooling for the time the conveyor belt 130 is in contact with the roller. The large diameter roller 1602 may also have a large surface area that is not in contact with the conveyor belt 130 and this non-contact portion of the roller may provide time for the roller 1602 to cool after contact with the roller 1602. In an embodiment, there may be a plurality of large surface area rollers 1602 used on a conveyor belt 130 to provide both support and cooling to the conveyor belt 130.

In an embodiment, heat conductivity rollers may be made of materials that provide thermal conductivity such as copper, steel, aluminum, and the like. The heat conductivity rollers may provide a heat sink for the conveyor belt 130 and the hot solid fuel. In an embodiment, the thermal conductivity rollers may also have large contact surfaces to aid in the removal of heat from the conveyor belt 130. In an embodiment, heat conductivity rollers may not be microwave transparent and may be used outside of the microwave treatment sections, as conveyor belt roll/pulley drivers for example.

In an embodiment, the shape and surface texture characteristics of the pulleys may influence the life of the conveyor belt 130. For example, pulleys may be designed with large diameters that may reduce the friction between the pulley and the conveyor belt 130. The lower friction may increase the life of the conveyor belt 130 by lowering wear on the belt, may allow less expensive belt materials with lower abrasion resistance to be used, may reduce the weight load stress on the pulley to increase the life of the pulley, or the like. In an embodiment, there may be a relationship between the radius of the pulley and the life of the conveyor belt 130.

In another pulley embodiment, the pulley drive surface may be coated with a material that provides additional grip of the conveyor belt 130. The additional grip may reduce the amount of slippage between the pulley and the conveyor belt 130 and may result in reduce amount of conveyor belt 130 wear. As with the larger radius pulley, reduced wear on the conveyor belt 130 may increase the life of the conveyor belt 130 by lowering wear on the belt, may allow less expensive belt materials with lower abrasion resistance to be used, or the like. In one embodiment, the pulley may be coated with a sticky material that may provide a good grip on the conveyor belt 130 while not adding to the abrasion of the conveyor belt 130 as it is wrapped around or moves over the pulley. For example, the pulley may be coated with EPDM rubber that may provide good heat resistance and good abrasion resistance.

In embodiments, other methods of preventing high temperature solid fuel from burning through may be employed. An example of an alternate method may be utilizing a thermographic camera to image the location of high temperature pieces of solid fuel. After determining the location of the high temperature piece of solid fuel, a cooling spray may be used to lower its temperature, or a sweeper may be employed for removing the piece before it has time to damage the conveyor belt 600. Another example of an alternate method may be to measure the dielectric properties of all the pieces of solid fuel as they enter the belt system 130, and remove them if they are determined to be high temperature. Another example of an alternate method may be to transport the solid fuel on a conveyor belt 600 that incorporates a fluidized bed in its configuration, thereby equalizing the temperature of all pieces, and eliminating isolated high temperature pieces of solid fuel from the conveyor belt 600.

Figure 3:
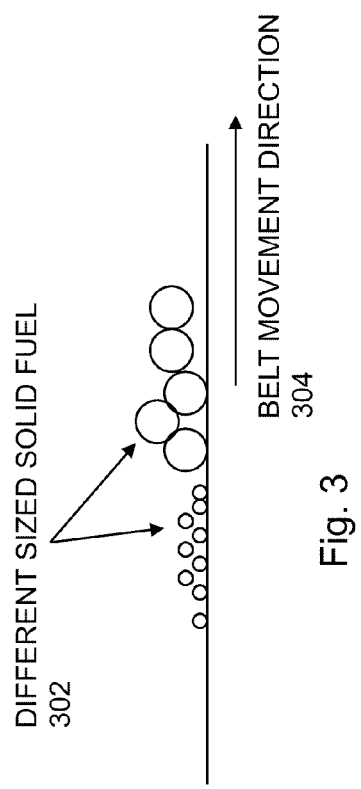
FIG. 3 depicts an embodiment of a conveyor belt with a multiple layer configuration.

As depicted in FIG. 3, within a distribution of solid fuel 302 on a conveyor belt 130 progressing through the solid fuel treatment facility 132, the solid fuel may not consist of a homogeneous combination of materials. The solid fuel may include varying percentages of ash, sulfur, moisture, metals, and the like from one solid fuel batch to another and even within a solid fuel batch. Additionally, as the solid fuel is treated, the percentages of the materials within the whole of the solid fuel may change. For example, during treatment, as moisture and sulfur are removed from the solid fuel, the remaining materials may become a larger percentage of the remaining solid fuel. As the solid fuel composition changes during the treatment process, the solid fuel may react differently to the microwave energy provided by the microwave systems.

Additionally, as shown, the solid fuel 302 may not be distributed in even sizes across the conveyor belt 130. As the solid fuel is processed from raw solid fuel, the solid fuel may be processed into different sizes. The different sizes may be a result of the different type of materials within the solid fuel. In an embodiment, the various sizes and various composition of the solid fuel may provide for uneven heating as the solid fuel moves along the conveyor belt 304 into the solid fuel treatment facility 132. Smaller pieces of solid fuel may be completely treated before the larger pieces and may therefore become hotter during the solid fuel treatment. In an embodiment, an even distribution of solid fuel sizes may be obtained by size exclusion techniques. For example, a load of solid fuel may be separated out into various sizes using a size exclusion filter of a sizing and sorting facility before placing the solid fuel on a belt facility 130. Then, the sized solid fuel may be re-mixed prior to placement on the belt facility 130 in order to obtain an even distribution of solid fuel sizes.

Solid fuel materials may be considered a dielectric material with an associated relative dielectric constant. Higher dielectric constant materials may be more microwave energy absorbent and therefore may absorb microwave energy and heat up during the treatment of the solid fuel. As may be understood, the solid fuel may not have a consistent dielectric constant through out the solid fuel and may vary with the differing material concentrations within the solid fuel. For example, water may have one dielectric constant and sulfur may have another dielectric constant. The combination of the different dielectric constants within the solid fuel may provide the solid fuel with an overall dielectric constant. Additionally, the overall dielectric constant of the solid fuel may change during the treatment as materials are removed. For example, as the high dielectric constant water is removed from the solid fuel, the overall dielectric constant of the solid fuel may change. In an embodiment, a solid fuel with low moisture content may be relatively transparent to microwave energy.

As may be understood, the dielectric constant may be represented by Epsilon prime plus Epsilon double prime with Epsilon prime representing the compression of the electromagnetic wave as it moves from one material interface to another and Epsilon double prime representing the loss of the wave within the material. The ratio of Epsilon double prime to Epsilon prime may be the loss tangent delta of a material.

Figure 4:
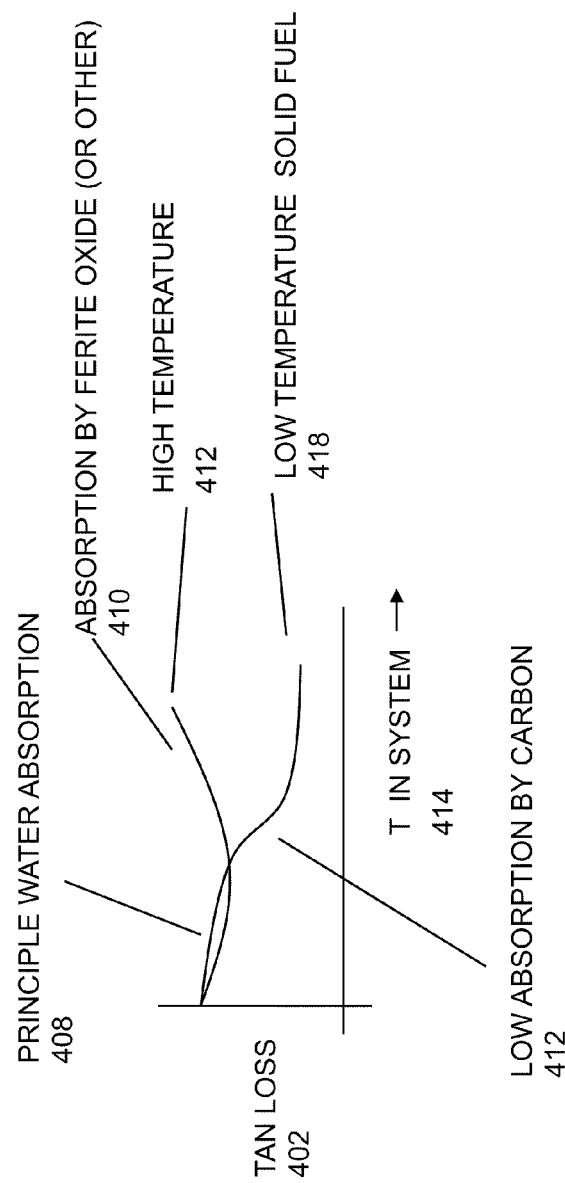
FIG. 4 depicts an embodiment of a conveyor belt without a cover layer.

FIG. 4 depicts a set of curves that plot the reaction of two different types of solid fuel during treatment. If the tangent loss 402 is plotted against the time in the system 414, it may be seen that solid fuels that have low absorption 412 (e.g. carbon) may react over time by having a lower tangent loss 402 and therefore not continue to increase in temperature over time. Conversely, solid fuel that contains materials with higher microwave absorption materials 410 such as ferrite oxide, the tangent loss may increase during the time the solid fuel in being treated 412 and therefore the solid fuel may continue to absorb microwave energy and continue to heat up during the treatment cycle.

As the solid fuel is treated, the higher dielectric constant materials may absorb the microwave energy and heat up. For example, as water within the solid fuel absorbs microwave energy 408 it may heat up and be converted to steam, the steam may escape from the solid fuel resulting in the solid fuel becoming dryer during the treatment of the solid fuel. Additionally, the water within the solid fuel may absorb heat 108 from other materials within the solid fuel during treatment that may be heated by the microwave energy but are not converted to a material state that allows the material to be removed from the solid fuel. For example, as different metals within the solid fuel are heated by the microwave energy, the water within the solid fuel may absorb the heat 408 from the metals. In an embodiment, if treatment of the solid fuel continues after heat absorbing materials, such as water, have escaped from the solid fuel, the other materials may continue to heat up within the solid fuel. In an embodiment, if there is a high enough concentration of these heat absorbing materials 410 within the solid fuel, the solid fuel may become locally hot, 600° F. to 1500° F., beyond the desired controlled temperature for the solid fuel. In an embodiment, the locally hot locations within the solid fuel may initiate an undesired combustion within the solid fuel, the combustion may be low level causing just smoke or may be a higher level causing a flame. Solid fuel that combusts during solid fuel treatment may be termed thermally aberrant solid fuel.

In embodiments, materials such as ferric oxide (Hematite) 410 within the solid fuel may be energy absorbent and may provide the local hot locations and combustion within the solid fuel during treatment of the solid fuel. The ferric oxide may be mixed within other materials such as sulfur or may be self-contained within the solid fuel. In an embodiment, any material with a high dielectric constant, and therefore is energy absorbent, may provide local hot locations within the solid fuel during treatment.

Within the solid fuel treatment facility, thermally aberrant solid fuel may have a number of negative issues relative to the successful treatment of solid fuel such as burning through the conveyor belt 130, causing other closely associated non-thermally aberrant solid fuels to combust, causing a location of finished treated solid fuel to combust, or the like.

Thermally aberrant solid fuel may be able to burn holes into the conveyor belt 130, the holes in the conveyor belt may disrupt the solid fuel treatment by concentrating microwave energy to the localized hole, may weaken the conveyor belt 130, may allow for a concentration of solid fuel within the holes, or the like. In an embodiment, the conveyor belt 130 may not be completely microwave transparent, the belt may be made of several different layers with different layers having different dielectric constants. As one layer is compromised with a burn hole from thermally aberrant solid fuel, the next layer may be more microwave energy absorbent and may concentrate the microwave energy at the conveyor belt hole location and may disrupt the even distribution of microwave energy available to treat the solid fuel.

Figure 5:
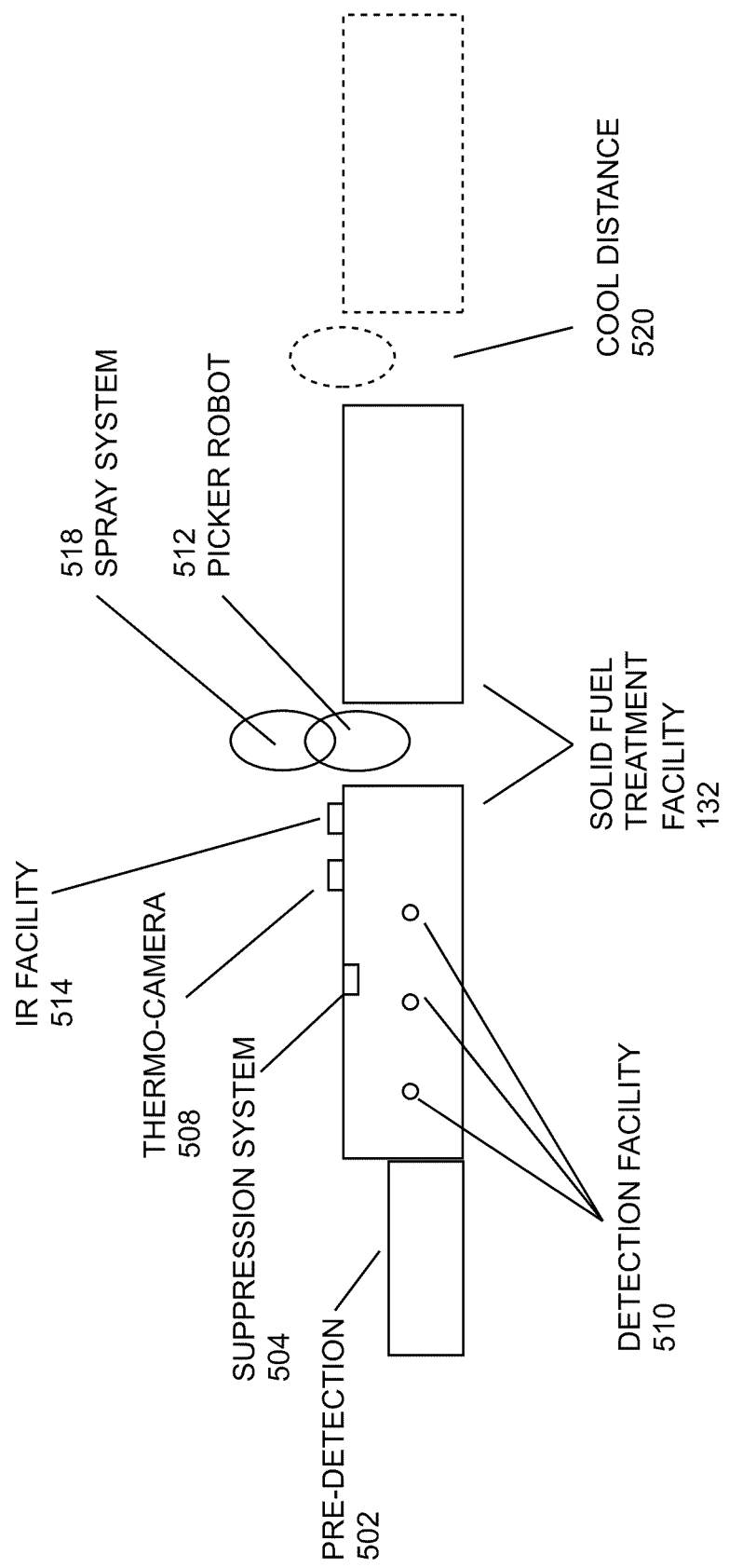
FIG. 5 depicts a conveyor belt incorporating an inserted middle layer of temperature resistant material.

Referring now to FIG. 5, there may be different strategies for detecting thermally aberrant solid fuel or potential thermally aberrant solid fuels, such as pre-detect 502 the potential thermally aberrant solid fuel before entering the microwave energy section of the solid fuel treatment facility, detect the thermally aberrant solid fuel within the microwave energy section as the solid fuel is heating up, provide a microwave energy application that does not produce local hot spots within the solid fuel during treatment, or the like.

Methods of pre-detection 502 may include a pre-microwave station to preheat the solid fuel to identify the thermally aberrant solid fuel, use a magnet to remove the solid fuel that contain concentrations of ferric oxide, use a metal detector to identify and remove the solid fuel that contain concentrations of metals, use mass spectrometry to identify and remove the solid fuel with materials that may cause thermal runaway, magnetize the ferric oxide within the solid fuel and use magnetic detection to identify and remove the solid fuel, use an MRI (Magnetic resonance imaging) to detect materials that may cause thermal runaway, pass the solid fuel through a coil winding and measure the electrical current to detect solid fuel with ferric oxide, or other methods of identifying materials that may result in thermal runaway within the solid fuel treatment facility.

Methods of removing of thermally aberrant solid fuel within the microwave treatment area may include thermographic cameras 508 for thermally aberrant solid fuel detection and removal, infrared (IR) thermally aberrant solid fuel detection 510 and removal, robotically removing the thermally aberrant solid fuel after detection 512, spraying the thermally aberrant solid fuel with water or other liquid after detection, using fire suppression systems 504 (e.g. water, nitrogen, air removal, inert gas), or the like.

Methods of microwave energy application may be pulsing the microwave, providing cooling stations between microwave stations, reduce microwave power when thermally aberrant solid fuel is detected, or the like.

Methods of thermally aberrant solid fuel pre-detection 502 will now be described in more detail. In an embodiment, there may be a pre-treatment microwave station where the solid fuel may be exposed to microwave energy to identify potential thermally aberrant solid fuel. At this pre-detection station 502, the solid fuel may be exposed to high energy microwaves, long duration microwaves, different microwave frequencies, or the like applied either individually or in combination to heat the solid fuel to allow the identification of potential thermally aberrant solid fuel within the solid fuel. The microwave pre-treatment may be in a microwave facility just prior to entering the solid fuel treatment facility, at a separate facility, at a solid fuel origination location, or the like. The microwave pre-treatment may include applying microwave energy to the solid fuel and using heat detection methods such as thermographic cameras 508, IR detection 510, or the like to identify hotter than normal solid fuel that may be potential thermally aberrant solid fuel. Once potential thermally aberrant solid fuel has been identified by the microwave pre-treatment, the potential thermally aberrant solid fuel may be removed by a pick/place robot 508, the potential thermally aberrant solid fuel may be diverted from the conveyor belt 130, or by any removal method that may be able to select and remove an individual or set of potential thermally aberrant solid fuel. In an embodiment, there may be a complete detection and removal system that may include the microwave energy system, identification system (e.g. thermographic camera, IR) and the removal method. Once the potential thermally aberrant solid fuel has been identified and removed, the thermally aberrant solid fuel may be discarded, returned to a solid fuel source that is not receiving treatment, applied to a solid fuel inventory that will receive non-microwave treatment, or the like.

In another pre-determination 502 embodiment, the thermally aberrant solid fuel pre-determination may be a magnet to remove solid fuel that may have concentrations of ferric oxide that may be an indication that a solid fuel is potentially thermally aberrant solid fuel. In an embodiment, the magnet may be a permanent magnet, an electromagnet, a combination of permanent and electro magnets, or the like. The magnet pre-treatment may be in a facility prior to entering the solid fuel treatment facility 132, at a separate facility, at a solid fuel origination location, or the like. In this embodiment, the solid fuel may pass by the magnet and may be picked up by the magnet if the solid fuel contains concentrations of ferric oxide. As the solid fuel passes by the magnet, solid fuels that contain concentrations of ferric oxides may be attracted to the magnet and be removed from the non-ferric oxide solid fuel. In an embodiment, the solid fuel may pass the magnet on a conveyor belt 130, as part of a batch process, while moving through a hopper, or the like. In another embodiment of pre-determination 502 by magnet, instead of attempting to pick up the ferric oxide concentrated solid fuel, the magnet may be applied to the solid fuel as it falls off an edge, such as out of a hopper. As the solid fuel falls from the edge, the magnet may be used to divert the ferric oxide concentrated solid fuel into a separate conveyor, location, collector, or the like. Using either embodiment, once the potential thermally aberrant solid fuel has been identified and removed, the thermally aberrant solid fuel may be discarded, returned to a solid fuel source that is not receiving treatment, applied to a solid fuel inventory that will receive non-microwave treatment, or the like.

In another pre-determination 502 embodiment, the thermally aberrant solid fuel pre-determination may be a metal detector that may be used to detect solid fuel containing concentrations of metals; a concentration of metals may be a source of thermally aberrant solid fuel. The metal detector pre-treatment may be in a facility prior to entering the solid fuel treatment facility 132, at a separate facility, at a solid fuel origination location, or the like. In this embodiment, the solid fuel may pass by the metal detector and may be identified as solid fuel that contains concentrations of metals. Once the metal detector has identified metal concentrated solid fuel, the potential thermally aberrant solid fuel may be removed by a pick/place robot 512, the potential thermally aberrant solid fuel may be diverted from the other solid fuel, or by any removal method that may be able to select and remove an individual or set of potential thermally aberrant solid fuel. In an embodiment, the solid fuel may pass by the metal detector on a conveyor belt, as part of a batch process, while moving through a hopper, or the like.

In a further embodiment, the metal detection may be performed in a series of detection steps. For example, the solid fuel may be on a conveyor belt 130 passing by the metal detector. As the metal detector determines there is metal concentrated solid fuel, the solid fuel in the area of the detection may be diverted from the conveyor belt 130 to second conveyor belt. On the second conveyor belt, there may be a second metal detector to again detect the metal concentrated solid fuel. The solid fuel within the area detected by the metal detector may again be diverted to a third conveyor belt for further refinement of the solid fuel. This selection refinement may continue until an acceptable amount of metal concentrated solid fuel has been removed from the non-metal solid fuel. During the refinement steps, as solid fuel is determined to not contain concentrations of metals, the non-metal solid fuel may be returned to the solid fuel that is being treated by the solid fuel treatment facility.

Using any of these metal detecting embodiments, once the potential thermally aberrant solid fuel has been identified and removed, the thermally aberrant solid fuel may be discarded, returned to a solid fuel source that is not receiving treatment, applied to a solid fuel inventory that will receive non-microwave treatment, or the like.

In another pre-determination 502 embodiment, the thermally aberrant solid fuel pre-determination may be by mass spectrometry that may be used to detect solid fuel that may contain concentrations of materials related to thermally aberrant solid fuel. The mass spectrometry pre-treatment may be in a facility prior to entering the solid fuel treatment facility 132, at a separate facility, at a solid fuel origination location, or the like. In this embodiment, samples may be selected for mass spectrometry analysis. In another embodiment, the mass spectrometry detection may be combined with other detections methods to provide the final analysis of the solid fuel. For example, the mass spectrometry may be combined with the metal detection embodiment, where once a sample of solid fuel has been isolated, the solid fuel can be tested using the mass spectrometry. Once the potential thermally aberrant solid fuel has been identified and removed, the thermally aberrant solid fuel may be discarded, returned to a solid fuel source that is not receiving treatment, applied to a solid fuel inventory that will receive non-microwave treatment, or the like. In an embodiment, the mass spectrometry may be used to detect ferrous oxide or may be used to find other materials that may indicate the presents of ferrous oxide.

In another pre-determination 502 embodiment, a magnet may be used to magnetize the ferric oxide within the solid fuel supply and then the magnetized solid fuel may be detected by a magnetometer. The magnetometer pre-treatment may be in a facility prior to entering the solid fuel treatment facility 132, at a separate facility, at a solid fuel origination location, or the like. In an embodiment, the solid fuel may pass by the magnet to magnetize the ferric oxide that may be in the solid fuel. In an embodiment, the magnet may be a permanent magnet or an electro magnet. Once the solid fuel has been magnetized, the solid fuel may be passed by a magnetometer to detect any solid fuel that may have predefined levels of magnetism. Once the magnetometer has identified magnetized solid fuel, a pick/place robot 512 may remove the potential thermally aberrant solid fuel, the potential thermally aberrant solid fuel may be diverted from the other solid fuel, or by any removal method that may be able to select and remove an individual or set of potential thermally aberrant solid fuel. Once the potential thermally aberrant solid fuel has been identified and removed, the thermally aberrant solid fuel may be discarded, returned to a solid fuel source that is not receiving treatment, applied to a solid fuel inventory that will receive non-microwave treatment, or the like.

In another pre-determination 502 embodiment, a magnetic resonance imaging (MRI) device may be used to determine the interior structure of the solid fuel supply. The MRI pre-treatment may be in a facility prior to entering the solid fuel treatment facility 132, at a separate facility, at a solid fuel origination location, or the like. In an embodiment, the solid fuel may be passed through an MRI device and concentrations of materials may be determined within the solid fuel. Once the MRI device has identified a solid fuel structure of interest, a pick/place robot 512 may remove the potential thermally aberrant solid fuel, the potential thermally aberrant solid fuel may be diverted from the other solid fuel, or by any removal method that may be able to select and remove an individual or set of potential thermally aberrant solid fuel. Once the potential thermally aberrant solid fuel has been identified and removed, the thermally aberrant solid fuel may be discarded, returned to a solid fuel source that is not receiving treatment, applied to a solid fuel inventory that will receive non-microwave treatment, or the like.

In another pre-determination 502 embodiment, the thermally aberrant solid fuel pre-determination may be a current meter that may be used to detect ferric oxide concentrated solid fuel as the solid fuel passes through a coil winding. As the ferric oxide concentrated solid fuel passes through the coil winding, the ferric oxide may induce an electrical current in the winding that may be detected by a current meter. The current meter pre-treatment may be in a facility prior to entering the solid fuel treatment facility 132, at a separate facility, at a solid fuel origination location, or the like. In this embodiment, the solid fuel may be passed through the coil winding and solid fuel that induces a current in the winding may be identified. Once the current meter has identified metal concentrated solid fuel, the potential thermally aberrant solid fuel may be removed by a pick/place robot 512, the potential thermally aberrant solid fuel may be diverted from the other solid fuel, or by any removal method that may be able to select and remove an individual or set of potential thermally aberrant solid fuel. In an embodiment, the solid fuel may pass by the coil winding on a conveyor belt 130, as part of a batch process, while moving through a hopper, or the like.

In a further embodiment, the current meter detection may be performed in a series of detection steps. For example, the solid fuel may be on a conveyor belt 130 passing by the coil winding. As the current meter determines there is ferric oxide concentrated solid fuel, the solid fuel in the area of the detection may be diverted from the conveyor belt 130 to second conveyor belt. On the second conveyor belt, there may be a second coil winding to again detect the ferric oxide concentrated solid fuel. The solid fuel within the area detected by the current meter may again be diverted to a third conveyor belt for further refinement of the solid fuel. This selection refinement may continue until an acceptable amount of ferric oxide concentrated solid fuel has been removed from the solid fuel. During the refinement steps, as solid fuel is determined to not contain concentrations of ferric oxide, the non-metal solid fuel may be returned to the solid fuel that is being treaded by the solid fuel treatment facility.

In addition to or instead of pre-detecting 502 the thermally aberrant solid fuel, the thermally aberrant solid fuel may be detected within the solid fuel treatment facility 132. In embodiments, once detected, the thermally aberrant solid fuel may be removed from the treatment facility or may be extinguished and continue to be treated within the treatment facility.

Within the treatment facility, the thermally aberrant solid fuel may be detected by a thermographic camera facility 508 that may be able to identify hot spots within the solid fuel treatment facility; the hot spots may be an indication of thermally aberrant solid fuel within the solid fuel being treated. In an embodiment, the thermographic camera facility 508 may be able to provide images, data, or the like that contain temperature gradient information, the temperature gradients may be interpreted into actual temperatures or as relative temperatures for a viewing area. For example, as the solid fuel moves along on the conveyor belt 130 and is treated, thermally aberrant solid fuel within the solid fuel may develop. At least one thermographic camera facility 508 may be placed within the solid treatment facility 132 to scan the areas where the solid fuel is treated by the microwave systems 148. In an embodiment, the thermographic camera facility 508 may include more than one thermographic camera 508 to provide a three-dimensional positioning identification of thermally aberrant solid fuel. In an embodiment, there may be a software application, hardware application, firmware application, or the like that may be able to identify hot spot locations within a thermographic image provided by the thermographic camera facility 508; the application may be able to provide the hot spot coordinates to a device that may take an action on the thermally aberrant solid fuel.

In a similar manner, the thermally aberrant solid fuel may be identified by infrared (IR) detection facility 514. The IR detection facility 514 may be able to determine hot spots within the solid fuel being treated within the solid fuel treatment facility. In an embodiment, the IR detection facility 514 may be able to provide images, data, or the like that contain temperature gradient information, the temperature gradients may be interpreted into actual temperatures or as relative temperatures for a viewing area. For example, as the solid fuel moves along on the conveyor belt 130 and is treated, thermally aberrant solid fuel within the solid fuel may develop. At least one IR detection facility 514 may be placed within the solid fuel treatment facility 132 to scan the areas where the solid fuel is treated by the microwave systems. In an embodiment, the IR detection facility 514 may include more than one IR detection device to provide a three-dimensional positioning identification of thermally aberrant solid fuel. In an embodiment, there may be a software application, hardware application, firmware application, or the like that may be able to identify hot spots within an IR image provided by the IR detection facility 514; the application may be able to provide coordinates to a device that may take an action on the thermally aberrant solid fuel.

In an embodiment, a detection facility 510 may be used to detect hot spots within the solid fuel treatment facility by sensing smoke, heat, fire, or the like. In an embodiment, a heat detection facility 510 may be able to provide data that may provide temperature gradient information; the temperature gradients may be interpreted into actual temperatures or as relative temperatures for an area of the solid fuel treatment facility. For example, as the solid fuel moves along on the conveyor belt 130 and is treated, thermally aberrant solid fuel within the solid fuel may develop. At least one heat detection facility 510 may be placed within the solid fuel treatment facility 132 to sense the areas where the solid fuel is treated by the microwave systems 148. In an embodiment, the heat detection facility 510 may include more than one heat detection device 510 to provide a three-dimensional positioning identification of thermally aberrant solid fuel. In an embodiment, there may be a software application, hardware application, firmware application, or the like that may be able to identify hot spots from the heat detector provided information; the application may be able to provide coordinates to another device that may take an action on the thermally aberrant solid fuel.

In an embodiment, the detection facility 510 may be used to detect thermally aberrant solid fuel within the solid fuel treatment facility. In an embodiment, the smoke detection facility 510 may be able to provide data that may indicate the presence of thermally aberrant solid fuel within the solid fuel treatment facility 132. For example, as the solid fuel moves along on the conveyor belt 130 and is treated, thermally aberrant solid fuel within the solid fuel may develop; the thermally aberrant solid fuel may give off smoke that may be detected by the thermally aberrant solid fuel detection facility 510. At least one smoke detection facility 510 may be placed within the solid fuel treatment facility 132 to sense the areas where the solid fuel is treated by the microwave systems 148. In an embodiment, the thermally aberrant solid fuel detection facility 510 may include more than one smoke detection device to provide a three-dimensional positioning identification of thermally aberrant solid fuel. In an embodiment, there may be a software application, hardware application, firmware application, or the like that may be able to identify hot spots from the smoke detector provided information; the application may be able to provide coordinates to another device that may take an action on the thermally aberrant solid fuel.

In embodiments, there may be a number of different methods to take action on either potential thermally aberrant solid fuel or actual thermally aberrant solid fuel such as using pick/place robots 512 to remove the thermally aberrant solid fuel, spray a liquid on the thermally aberrant solid fuel, use a suppressant system 504 to extinguish thermally aberrant solid fuel, reducing microwave power to stop the escalation of the thermally aberrant solid fuel, and the like.

The pick and place robot 512 may receive thermally aberrant solid fuel location information from any of the thermally aberrant solid fuel identification facilities to allow the robot 512 to locate the thermally aberrant solid fuel or potential thermally aberrant solid fuel and remove the thermally aberrant solid fuel from the solid fuel receiving treatment 132. In an embodiment, once the thermally aberrant solid fuel has been picked, the thermally aberrant solid fuel may be placed into a solid fuel inventory that is not receiving treatment, receiving a treatment that does not include microwave energy, or the like. For example, the robot may receive thermally aberrant solid fuel location information from the pre-determination metal detectors, the mass spectrometry device, the magnetic identification, the MRI, the coil winding, thermographic camera 508, IR 514, heat detector 510, smoke detector 510, and the like. In another embodiment, a detection device such as the thermographic camera 508, IR facility 514, or the like may be mounted on the pick and place robot 512; these detection devices may provide thermally aberrant solid fuel information directly to the pick and place robot 512 providing guidance in the picking of the thermally aberrant solid fuel. These devices and facilities may provide location information to allow for accurate determination of the thermally aberrant solid fuel allowing the robot 512 to pick up the individual or set of thermally aberrant solid fuel from the solid fuel and remove the thermally aberrant solid fuel from the solid fuel being treated.

In an embodiment, there may be a plurality of robots 512 placed prior to the solid fuel treatment facility 132 and/or within the solid fuel treatment facility 132 for removing thermally aberrant solid fuel.

In an embodiment, a liquid spray system 518 may be used to spray a liquid on thermally aberrant solid fuel that is being treated in the solid fuel treatment facility. Similar to the pick and place robot 512, the spray system 518 may receive thermally aberrant solid fuel location information from the thermographic camera 508, IR facility 514, heat detector 510, smoke detector 510, and the like. In an embodiment, once thermally aberrant solid fuel has been detected, the position information may be provided to the spray system 518 and the spray system 518 may direct a stream of liquid onto the thermally aberrant solid fuel within the solid fuel treatment facility 132 to extinguish the thermally aberrant solid fuel. In an embodiment, the liquid may be any liquid that may be used to extinguish the hot solid fuel such as water, a water based coolant, an oil based coolant, or the like. In embodiments, once the liquid has been sprayed on the thermally aberrant solid fuel, the thermally aberrant solid fuel may continue the solid fuel treatment, may be picked/placed out of the solid fuel, or the like. In an example of water being used, the thermally aberrant solid fuel may be identified by a detection system 510, the water spray system 518 may be provided with coordinates of the thermally aberrant solid fuel within the treatment area, and the water spray may be directed to the provided coordinates to extinguish the thermally aberrant solid fuel. In this embodiment, the thermally aberrant solid fuel that was sprayed with water may continue on in the solid fuel treatment, the excess water from the spray system may be removed as part of the solid fuel treatment facility 132 processes. In an embodiment, there may be more than one spray system 518 within the solid fuel treatment facility 132 such as at each one of the microwave systems 148.

There may also be a suppression system 504 within the solid fuel treatment facility 132 to extinguish thermally aberrant solid fuel by a broad based system such as dousing large areas with a liquid, filling an area of the or the entire treatment facility with a gas (e.g. nitrogen), pumping air out of an area of the treatment facility, directing the flow of an inert gas (e.g. argon) on an area of the treatment facility, and the like. In an embodiment, use of inert gas, such as nitrogen, in dealing with thermally aberrant solid fuel may produce oxygen as a by-product. In an embodiment, the atmosphere may be less than 100% by volume of inert gas and yet may still be effective in extinguishing thermally aberrant solid fuel. In an embodiment, the broad based systems may be positioned at locations within the treatment facility 132 where thermally aberrant solid fuel tends to develop, such as near the end of the line, and the broad based systems may be reactive by being applied as thermally aberrant solid fuel is detected or may be preventative by being applied as part of the treatment sequence to stop thermally aberrant solid fuel from developing. In an embodiment, the broad based systems may be used to cool non-thermally aberrant solid fuel.

The reactive broad based suppression systems 504 may receive an indication that thermally aberrant solid fuel is within the area covered by the reactive suppressive system 504, and the reactive system may be activated to extinguish the thermally aberrant solid fuel. In an embodiment, after the thermally aberrant solid fuel is extinguished, the thermally aberrant solid fuel may continue to be processed within the solid fuel treatment facility 132, may be removed from the solid fuel treatment facility 132 by a method previously described, or the like.

The preventative broad based suppression systems 504 may be incorporated into the solid fuel treatment facility 132 at locations that it may be anticipated where thermally aberrant solid fuel may develop to prevent the thermally aberrant solid fuel from developing. For example, the preventative system may be associated with the microwave system 148 by being incorporated into the microwave system 148, placed after the microwave system as a separate system, placed before the microwave system 148, or the like.

Additionally, the preventative suppression system 504 may be combined with a reactive system. This combination may provide overall preventative action within the solid fuel treatment facility, but may also provide reactive systems to extinguish thermally aberrant solid fuel that may develop in the preventative suppression areas. For example, at a microwave system 148, there may be a gas preventative system to stop the development of thermally aberrant solid fuel, but there may also be a reactive system of dousing with water to extinguish any thermally aberrant solid fuel that may develop in the preventative suppression areas.

It should be understood that any or all of the suppression systems 504 may be combined into a complete reactive system, a complete preventative system, as a combination reactive and preventative system, or the like. For example, dousing with a liquid and pumping out air may be combined into a suppression system 504. Depending on the location within the solid fuel treatment facility 132, different systems may be applied either individually or in combination to provide an overall thermally aberrant solid fuel suppression system 504. The suppression systems 504 may be coordinated by a single control system, controlled individually, controlled by a combination of single control systems and individual systems, or the like.

The suppression systems 504 will now be described in more detail, these suppression systems 504 described herein may be either preventative or reactive. In an embodiment, the dousing with liquid may provide a steady flow of liquid to cool the solid fuel as it is being treated and may be used to extinguish thermally aberrant solid fuel or to prevent the development of thermally aberrant solid fuel. In an embodiment, the liquid may be water, water based coolant, oil based coolant, liquid nitrogen, or any other liquid that can be used to extinguish or prevent the development of thermally aberrant solid fuel. For example, water may be used to douse the solid fuel immediately after a microwave treatment to maintain the solid fuel below a temperature that may develop into thermally aberrant solid fuel. In an embodiment, the liquid flow rates may be controlled by a control system and the liquid flow rates may be dependent on the sensed temperature of the solid fuel. In embodiments, the solid fuel temperature may be determined by air temperature, thermographic camera 508, IR facility 514, heat detector 510, thermally aberrant solid fuel detector 510, or the like. For example, the dousing system may provide a predetermined flow of liquid at a particular solid fuel treatment facility microwave station, but if an increased temperature is sensed, the control system may increase the liquid flow to either prevent the development of thermally aberrant solid fuel or to extinguish thermally aberrant solid fuel.

In an embodiment, at least one area of the solid fuel treatment facility 132 may be filled with a gas to prevent the development of thermally aberrant solid fuel or to extinguish thermally aberrant solid fuel. In an embodiment, providing a steady flow of the gas may provide an environment within the solid fuel treatment facility 132 that may prevent oxidation and therefore prevent the development of thermally aberrant solid fuel. In an embodiment, the gas may be an inert gas such as argon, non-inert gas such as nitrogen, or any other gas that can be used as an oxidation preventative. In an embodiment, the gas flow rates may be controlled by a control system and the gas flow rates may be dependent on the sensed temperature of the solid fuel. In embodiments, the solid fuel temperature may be determined by air temperature, thermographic camera 508, IR facility 514, heat detector 510, thermally aberrant solid fuel detector 510, or the like. For example, the gas system may provide a predetermined flow of gas at a particular solid fuel treatment facility microwave station, but if an increased temperature is sensed, the control system may increase the gas flow to either prevent the development of thermally aberrant solid fuel or to extinguish thermally aberrant solid fuel.

In an embodiment, at least one area of the solid fuel treatment facility 132 may have air pumped out to prevent the development of thermally aberrant solid fuel or to extinguish thermally aberrant solid fuel. In an embodiment, removing of air within an area may provide a full or partial vacuum within the solid fuel treatment facility and may prevent oxidation and therefore prevent the development of thermally aberrant solid fuel. In an embodiment, the air removal rates may be controlled by a control system and the removal rates may be dependent on the sensed temperature of the solid fuel. In embodiments, the solid fuel temperature may be determined by air temperature, thermographic camera 508, IR facility 514, heat detector 510, thermally aberrant solid fuel detector 510, x-ray, material analysis, electromagnetic scattering to detect eddy currents, magnetic detection, and the like. For example, the air removal system may provide a predetermined vacuum at a particular solid fuel treatment facility 132 microwave station, but if an increased temperature is sensed, the control system may increase the removal of air to increase the vacuum level to either prevent the development of thermally aberrant solid fuel or to extinguish thermally aberrant solid fuel.

Another method of suppression system may be the reduction of microwave power in reaction to thermally aberrant solid fuel being detected. As previously described, thermally aberrant solid fuel may develop from the microwave energy during the solid fuel treatment. During the solid fuel treatment, sensors 142 such as an air thermometer, the thermographic camera 508, the IR facility 514, the heat detector 510, the thermally aberrant solid fuel detector 510, or the like may detect thermally aberrant solid fuel within the microwave system 148 area. In an embodiment, the sensors 142 may provide an indication to the microwave system 148 that thermally aberrant solid fuel has developed and a microwave controller may change the microwave mode by shutting off the microwave, changing power levels, changing frequency, pulsing the microwave, or the like to change the microwave energy applied to the solid fuel. In an embodiment, the microwave mode change may be combined with one of the suppression systems 504 (e.g. douse with liquid, fill with gas, pump out air), one of the action methods (e.g. pick/place robot 512, spray liquid 518), or the like to remove or extinguish the thermally aberrant solid fuel. In an embodiment, if the sensors 142 provide an indication that the thermally aberrant solid fuel has been extinguished, the microwave may return to a standard operation mode.

Different from the reaction process of changing the microwave mode, the microwave system 148 energy may be managed to prevent the development of thermally aberrant solid fuel. In embodiments, the microwave systems 148 may be separated by a distance that allows the thermally aberrant solid fuel to cool before being operated on by another microwave system 148, solid fuel may be fed at a rate that is disruptive to the development of thermally aberrant solid fuel, provide more microwave energy at the beginning of the treatment facility when there is greater moister to prevent the development of thermally aberrant solid fuel, provide different microwave energy levels on different sides of the conveyor belt and along the length of the treatment facility to mange the amount of energy applied to the solid fuel, use different wave guide outlets to produce different microwave energy fields within the solid fuel to provided even energy distribution to reduce hot spots of microwave energy, deliver the microwave energy using a pulsed or duty cycle where the microwave system changes the energy levels during the treatment of the solid fuel, use a plurality of shorter length solid fuel treatment facilities that may allow solid fuel cooling time between the microwave treatment stations, or the like. It may be understood that these preventative methods of managing the application of microwave energy may be applied individually or in combination.

The preventative microwave energy management methods will now be described in more detail. In an embodiment, the solid fuel treatment facility 132 may include a plurality of microwave systems 148. As the solid fuel moves on the conveyor belt 130 the solid fuel may receive microwave energy from the plurality of microwave systems 148. As previously described, if a solid fuel with materials that absorb energy receives too much energy, the solid fuel may become thermally aberrant solid fuel. In an embodiment, the energy applied to the solid fuel may be controlled by providing a cooling distance 520 between the microwave systems 148 to allow the solid fuel to cool between microwave treatments and may prevent thermally aberrant solid fuel from developing. In an embodiment, the cooling distance 520 between the microwave systems may be the same distance, may be a varying distance, or the like. For example, having a shorter cooling distance 520 at the beginning of the solid fuel treatment facility and a longer cooling distance 520 at the end of the treatment facility may create the varied cooling distance 520. In this manner, more microwave energy may be applied to the solid fuel when it contains more moisture and is less susceptible to the development of thermally aberrant solid fuel. As the solid fuel becomes dryer, the cooling distances 520 may be lengthened to allow the solid fuel to cool longer and prevent the development of thermally aberrant solid fuel at the end of the treatment.

Another preventative microwave energy management method may be feeding the solid fuel at a rate that may disrupt the development of thermally aberrant solid fuel. In one embodiment, the solid fuel may be fed at a slow rate to allow cooling of the solid fuel between microwave systems. In another embodiment, the solid fuel may be fed at a faster rate to provide for less microwave energy to be absorbed at each microwave system; this may input less microwave energy into the solid fuel at any one of the microwave systems.

In another embodiment, the solid fuel may be moved at varying rates to control the amount of microwave energy applied to the solid fuel and to provide an adequate cooling time between the microwave systems. An example of this method may be feeding the solid fuel faster at the microwave system 148 and slower between the microwave systems 148. This method of varied solid fuel feed rates may be coupled with an uneven distribution of solid fuel on the conveyor belt 130 where there may be spaces between the solid fuel on the conveyor belt 130. In this manner, the solid fuel may be moved faster while being treated by the microwave system 148 and then move slower at a cool down distance 520 between the microwave systems 148. Another embodiment of varied solid fuel feed rates may be to continually speed up and slow down the solid fuel feed rate to provide a pulsed feed rate of the solid fuel.

Another preventative microwave energy management method may be to provide more microwave energy at the beginning of the solid fuel treatment facility 132 and less energy at the end of the treatment facility. In this manner, when the solid fuel contains more moisture at the beginning of the treatment, it may be able to receive more microwave energy without becoming thermally aberrant solid fuel and when the solid fuel becomes dryer and more susceptible to becoming thermally aberrant solid fuel, less energy may be applied. The microwave energy may be varied by the spacing of the microwave systems 148, by applying more microwave energy at the beginning of the treatment process and lower energy at the end of the process, or the like. In an embodiment, the amount of microwave energy applied to the solid fuel may be varied based on input from moisture sensors placed within the solid fuel treatment facility 132. In an embodiment, the sensors 142 may provide data to the microwave system 148 that may indicate when the rate of moisture removed from the solid fuel is at a reduced rate. From the received sensor data, the microwave systems 148 may determine the amount of microwave energy to apply to the solid fuel based on the moisture removal rate. For example, as the solid fuel moves through the treatment facility 132 it may become dryer and the rate of moisture expelled may be reduced, as the sensors 142 sense less moisture, the microwave systems 148 may reduce the energy levels applied to the solid fuel. Using this method of lessening the microwave energy levels over the length of the solid fuel treatment facility may reduce the development of thermally aberrant solid fuel in the solid fuel treatment facility 132.

Another preventative microwave energy management method may be to provide different microwave energy levels on different sides of the conveyor belt 130 carrying the solid fuel through the solid fuel treatment facility 148. In an embodiment, there may be microwave wave guide outlets positioned at various locations across the solid fuel as the solid fuel moves down the solid fuel treatment facility 132 where one microwave guide outlet is on one side of the solid fuel and a second microwave guide outlet is on a different side of the solid fuel. In this manner, at one point of the solid fuel treatment facility 132, the first side of the solid fuel may receive a greater percentage of the total microwave energy while a second side may receive a lesser percentage of the total microwave energy. At the first location, the first side of the solid fuel may receive the most microwave energy heat and the second side may receive less heat from the microwave energy. In this configuration, the second side may be considered a cool down location within the solid fuel treatment facility 132. In an embodiment, as the solid fuel moves down the treatment facility 132, the higher percentage and lower percentage microwave energy may be alternated and the solid fuel on the conveyor belt may alternate between higher energy locations and lower energy locations. In an embodiment, the solid fuel may become more heated at the high energy location, and while still receiving microwave energy, the solid fuel on the low energy location may be able to cool. This method of alternating high and low energy stations may prevent the development of thermally aberrant solid fuel within the solid fuel treatment facility 132. In an embodiment, over the length of the solid fuel treatment facility 132, different energy levels may be used at different locations so the microwave energy may be alternated from one side to another and the energy levels may be changed along the length of the solid fuel treatment facility 132.

Additionally, the microwave energy may not only be alternated from one side of the solid fuel to the other, but may be moved incrementally across the solid fuel. For example, a first microwave outlet may be positioned at a first edge of the solid fuel. A second microwave outlet at a second location may be positioned away from the first edge of the solid fuel and closer to the center of the solid fuel. A third microwave outlet at a third location may be positioned away from the center and toward the second edge of the solid fuel. A forth microwave outlet at a forth location may be positioned at the second edge of the solid fuel. In an embodiment, this progressive movement of microwave energy across the solid fuel as it moves through the solid fuel treatment facility may continually move the concentration of microwave energy and allow different positions within the solid fuel to become relatively cool while the solid fuel positioned at the concentration of microwave energy becomes hotter. This continual movement of the microwave energy concentration may prevent the development of thermally aberrant solid fuel. It may be understood that the microwave energy progression across the solid fuel may be repeated as many times as desired during the treatment of the solid fuel.

In addition to alternating the microwave energy on different sides of the solid fuel, as the solid fuel moves from one conveyor belt 130 to another, the solid fuel may be rotated or mixed to move the solid fuel from one side of the conveyor belt 130 to the other side of the conveyor belt 130. In an embodiment, this may be realized by using a hopper to receive the solid fuel from the first conveyor belt 130 and the hopper may provide mixing of the solid fuel before depositing the solid fuel on the second conveyor belt 130. In another embodiment, the solid fuel may be rotated or mixed directly from one belt to another. In embodiments, the solid fuel may be rotated or mixed between microwave systems 148, within the microwave systems 148, both between the microwave systems 148 and within the microwave systems 148, or the like.

In embodiments, the treated solid fuel product may be mixed or blended to create customized solid fuel blends. For example, a treated coal product may be blended to create a custom coal blend. In embodiments, blending may be performed in a blending facility. In embodiments, the blending facility may be associated with the solid fuel treatment facility 132. In embodiments, blending of the solid fuel product may be performed between the conveyor belts or as the solid fuel product comes off the conveyor facility 132 or emerges from the microwave system 148. In yet other embodiments, blending may be performed between the microwave systems 148. For example, for the purpose of blending to produce customized coal blends, coal from different sources, such as from different mines, local stockpiles, and coal with different mineral content may be used. For example, blending may be performed between bituminous coal and lignite coal. In another example, coal from different mining pits may be blended together. Similarly, blending may be performed for coal with similar or different type of characteristics.

In embodiments, the solid fuel product may be mixed or blended to reduce the temperature of the solid fuel. In embodiments, the solid fuel may be treated using the microwave energy source. Upon treatment, the solid fuel may be blended. The blending of solid fuel product may lower the solid fuel temperature. Similar or different types of solid fuel may be used for blending. For example, blending may be performed between bituminous coal and lignite coal. In another example, coal from two different mining pits may be blended together. In other embodiments, the same type of coal with different sizes, shape, and some other type of characteristics may be used for blending, to reduce the temperature of coal. In yet other embodiments, pre-treated coal may be used for blending to reduce the temperature of coal.

In other embodiments, the solid fuel product may be mixed or blended to mitigate the effects of dust and fines. In embodiments, the solid fuel product may be treated using the microwave energy source and may be blended or mixed to reduce or eliminate dust and fines. In embodiments, dust suppressants such as humectants, surfactants, emulsions, or some other type of dust suppressants may be used for blending to mitigate the effects of dust. In embodiments, the blending may be performed between the conveyor belts. In other embodiments, the blending may be performed between the microwave systems 148.

In embodiments, the solid fuel product may be treated using the microwave energy source. Further, the treated solid fuel product may be agglomerated to form solid fuel agglomerates. In embodiments, the agglomeration may be a chemical agglomeration. The solid fuel product may be chemically agglomerated by using chemicals such as tertiary amines, cyclic amines, organic amines, or some other type of agglomerant to reduce fines and dust particles. In embodiments, agglomeration may be performed between the microwave systems 148. In embodiments, agglomeration may help in wetting fines and dust present along with the solid fuel, thereby reducing or mitigating the effect of dust during solid fuel treatment. In addition, agglomeration may help in converting the fines and dust into manageable size dust agglomerates. In embodiments, the agglomeration may protect or shield the treated solid fuel product from weathering and the effects of atmospheric moisture.

Agglomeration may comprise application of a solid or liquid agglomerant to the solid fuel after or during treatment. In embodiments, the solid fuel agglomerant may be at least one of pentane, 2-methylbutane, 1,1,2-trichloro-1,2,2-trifluoroethane, and trichlorofluoromethane. For example, the solid fuel may be mixed with an agglomerant to form a slurry or other mixture. A recovery facility, such as a settling tank, centrifuge, and the like, may be used to recover the solid fuel agglomerates from the mixture. In embodiments, the agglomerant may be recycled once recovered from the mixture.

Another preventative microwave energy management method may be to provide different shaped wave guide outlets to produce different microwave energy fields within the solid fuel. In an embodiment, different wave guide configurations may provide different microwave energy distributions. For example, a round wave guide outlet may produce a substantially round energy pattern. In embodiments, wave guide outlets may be shaped as a circle, as an oval, as a square, as a triangle, as a rectangle, or the like and therefore provide shaped microwave energy to the solid fuel. Additionally, the wave guide may be angled relative to the plane of the solid fuel. An angled wave guide may change the microwave energy distribution, from a circle to an oval for example. In an embodiment, the use of different shaped or angled wave guides may provide different energy distributions that may be used to prevent thermally aberrant solid fuel within the solid fuel.

The wave guides may be shaped and angled to provide even distribution of microwave energy and avoid hot spots within the microwave energy. In an embodiment, over the length of the solid fuel treatment facility 132, there may be different wave guide outlets used to provide different microwave energy distributions. The different energy distributions may provide locations within the solid fuel that may be hotter than other locations and therefore provide hotter and cooler locations within the treated solid fuel, similar to the positioned locations of the microwave systems previously described. In an embodiment, the cooler locations may act as a cool station where the solid fuel may become relatively cool and therefore prevent thermally aberrant solid fuel from developing.

In addition to the wave guide shape and angle, the wave guide energy may be polarized to direct the microwave energy. The polarizers may be combined with the wave guide shape to further distribute the microwave energy to control the heating of the solid fuel and prevent the development of thermally aberrant solid fuel within the solid fuel.

Additionally, either or both of the wave guide or polarizer may be rotated to provide an oscillating microwave energy distribution where the microwave energy may be rotated around the solid fuel as it passes the wave guide.

Another preventative microwave energy management method may be to provide microwave systems 148 that provide varied levels of energy to the solid fuel. In an embodiment, the microwave energy system 148 may be pulsed or have a duty cycle where the output energy is changed with time. For example, if the energy levels were to be described as being between 1 and 10 (with 10 being the most energy), the microwave energy may be varied between 5 and 10 over time, or some other combination of high and low energy. This type of energy fluctuation may provide for heating the solid fuel when at the 10 setting and allowing the solid fuel to cool when at the 5 setting. It may be understood that this is only provided as an illustrative example and there are many different duty cycles that may be used to vary the energy levels from the microwave systems. The duty cycling of the microwave energy may prevent the development of thermally aberrant solid fuel by alternating the heating and cooling of the solid fuel such that the total amount of energy required to create thermally aberrant solid fuel may not be applied to the solid fuel before the energy level is lowered and allowing the solid fuel to cool.

In an embodiment, the duty cycle may be related to time, to the speed of the conveyor belt 130, to the volume of solid fuel on the conveyor belt 130, the temperature of the solid fuel, or the like. For example, the power levels of the microwave system may be varied based on the speed of the solid fuel as it moves through the solid fuel treatment facility 132.

Another preventative microwave energy management method may be to provide a plurality of shorter length solid fuel treatment facilities 132 that may allow solid fuel cooling time between the microwave treatment stations. In an embodiment, the shorter length solid fuel treatment facilities may contain a fewer number of microwave stations that may input a reduced amount of energy into the solid fuel within each shorter treatment facility, the reduced energy may prevent thermally aberrant solid fuel by providing less microwave energy than is required to create thermally aberrant solid fuel. For example, if a typical solid fuel treatment facility 132 has ten microwave stations, a shorter length solid fuel treatment facility 132 may only contain five microwave stations. In an embodiment, there may be a plurality of the shorter solid fuel treatment facilities 132 to provide the total amount of microwave energy required to treat the solid fuel as desired. In an embodiment, the distance between the plurality of shorter solid fuel treatment facilities may be a cooling distance 520 or cooling station to allow the solid fuel to cool between the plurality of solid fuel treatment facilities. In the cooling distance 520 or cooling station, there may be cooling facilities that provide an environment to prevent the development of thermally aberrant solid fuel such as a flow of cool air, a partial vacuum, a full vacuum, a flow of inert gas, a flow of gas, an application of a liquid, or the like. Additionally, as previously discussed, there may be individual or combinations of pre-determination and reactive thermally aberrant solid fuel reduction devices in the station between the shorter solid fuel treatment facilities 132.

In an embodiment, the amount of thermally aberrant solid fuel that develops during thermal treatment the may be reduced by treating smaller sized solid fuel. For example, there may be a reduction in the amount of thermally aberrant solid fuel by controlling the size of the solid fuel to approximately one inch in diameter instead of an approximate size of three inches. In an embodiment, there may be a relationship between the size (mass) of the solid fuel and tendency of the solid fuel to become thermally aberrant solid fuel that may be termed thermal inertia, where a smaller solid fuel may not contain a critical mass of ferrous oxide to absorb enough energy to become thermally aberrant solid fuel. Additionally, the smaller solid fuel size may provide for a more even distribution of the solid fuel across the conveyor belt 130 and therefore may provide for a more even distribution of microwave energy to the solid fuel. It may be understood that the smaller solid fuel may be combined with any of the previously described pre-determination, removal system, or suppression system in the prevention and suppression of thermally aberrant solid fuel within the solid fuel treatment facility. In an embodiment, the amount of thermally aberrant solid fuel that develops during thermal treatment the may be reduced by only partially treating larger-sized solid fuel. In embodiments, the amount of thermally aberrant solid fuel that develops during thermal treatment the may be reduced by not treating larger sized solid fuel at all and simply blending larger, untreated solid fuel with smaller, treated solid fuel.

In an embodiment, the amount of thermally aberrant solid fuel that develops may be controlled by the reduction of solid fuel moisture. As previously described, higher solid fuel moisture may prevent the development of thermally aberrant solid fuel within the solid fuel being treated. The amount of thermally aberrant solid fuel may be reduced by only treating the solid fuel to certain moisture levels that may prevent the development of solid fuels. For example, the solid fuel may begin at moisture levels above 28% and treating the solid fuel in the solid fuel treatment facility 132 to moisture percentages below 17% may begin to develop thermally aberrant solid fuel within the treated solid fuel. In an embodiment, the solid fuel treatment facility may treat the solid fuel only to a moisture percentage where thermally aberrant solid fuel typically develop. In an embodiment, once the solid fuel reaches the certain moisture percentage where thermally aberrant solid fuel may develop, the microwave treatment of the solid fuel may be stopped, the microwave treatment may be modified using one of the previously described microwave treatment methods to reduce the thermally aberrant solid fuel development, the solid fuel may be treated using another method of moisture removal (e.g. heat), or the like.

Referring again to FIG. 1, in embodiments, the controller 144 and monitor facility 134 may have a feedback loop system with the controller providing operational parameters to the solid fuel treatment facility 132 and belt facility 130 and the monitoring facility 134 receiving data from the belt facility 130 sensors 142 to determine if the operational parameters require adjustment to produce the required treated coal. During the treatment of the coal, there may be a continual application and adjustment to the operational parameters of the solid fuel treatment facility 132 and the belt facility 130.

Referring again to FIG. 1, the controller 144 may be a computer device that may be a desktop computer, server, web server, laptop computer, or the like. The computer devices may all be located locally to each other or may be distributed over a number of computer devices in remote locations. The computer devices may be connected by a LAN, WAN, Internet, intranet, P2P, or other network type using wired or wireless technology. The controller 144 may be a commercially available machine control that is designed for the controlling of various devices or may be a custom designed controller 144. The controller 144 may be fully automatic, may have operational parameter override, may be manually controllable, may be locally controlled, may be remotely controlled, or the like. The controller 144 is shown as part of the belt facility 130 but may not have a required location relative to the belt facility 130; the controller 144 may be located at the beginning or end of the belt facility 130 or anywhere in between. The controller 144 may be located remotely from the belt facility 130. The controller 144 may have a user interface; the user interface may be viewable at the controller 144 and may be viewable remotely to a computer device connected to the controller 144 network.

The controller 144 may provide the operational parameters to the belt facility 130 and solid fuel treatment facility 132 systems that may include the intake 124, preheat 138, parameter control 140, sensor control 142, removal system 150, microwave system 148, cooling facility 164, out-take facility 168, and the like. There may be a duplex communication system with the controller 144 transmitting operational parameters and the various systems and facilities transmitting actual operation values. The controller 144 may provide a user interface to display both the operational parameters and the actual operational values. The controller 144 may not be able to provided automated adjustments to the operational parameters, operational parameter adjustment may be provided by the monitoring facility 134.

The monitoring facility 134 may be a computer device that may be a desktop computer, server, web server, laptop computer, or the like. The computer devices may all be located locally to each other or may be distributed over a number of computer devices in remote locations. The computer devices may be connected by a LAN, WAN, Internet, intranet, P2P, or other network type using wired or wireless technology. The monitoring facility 134 may have the same operational parameters as the controller 144 and may receive the same actual operational parameters from the various facilities and systems. The monitoring facility 134 may have algorithms to compare the required sensor parameters provided by the parameter generation facility 128 and the actual operational values provided by the sensors 142 and determine if a change in the operational parameters are required. For example, the monitoring facility 134 may compare the actual vapor sensor values at a particular location of the belt facility 130 with the required sensor values and determine if the microwave power needs to be increased or decreased. If a change in an operational parameter requires adjustment, the adjusted parameter may be transmitted to the controller 144 to be applied to the appropriate device or devices. The monitoring facility 134 may continually monitor the solid fuel treatment facility 132 and belt facility 130 systems for parameter adjustments.

As a more complete example, the controller 144 may provide operational parameters to the belt facility parameter control 140 for the operation of the various belt facility 130 systems. As the coal treatment progresses, the monitor facility 134 may monitor the sensors 142 to determine if the treated coal is meeting the sensor requirements for the desired treated coal. If there is a delta between the required sensor readings and the actual sensor readings beyond the acceptable limits, the monitoring facility 134 may adjust one or more of the operational parameters and transmit the new operational parameters to the controller 144. The controller 144 may receive the new operational parameters and transmit new parameters to parameter control 140 to control the various belt facility 130 systems.

The monitoring facility 134 may also receive feedback information from the end of the coal treatment process from the feedback facility 174 and the coal output parameters facility 172. These two facilities may receive the final characteristics of the process coal and transmit the information to the monitoring facility 134. The monitoring facility 134 may compare the final treated coal characteristics to the coal desired characteristics 122 to determine if an operational parameter requires adjustment. In an embodiment, the monitoring facility 134 may use an algorithm to combine the actual operational values and the final treated coal characteristics for the determination of adjustments to the operational parameters. The adjustments may then be transmitted to the controller 144 for the revised operation of the solid fuel treatment facility 132 systems.

The functions and interactions of the various coal treatment facilities 132 systems and facilities shown in FIG. 1 may be illustrated through an example of coal being treated by the solid fuel treatment facility 132.

In this example, the operators of the solid fuel treatment facility 132 may select a raw coal to process within the solid fuel treatment facility 132 for the delivery of a particular treated coal to a customer. The solid fuel treatment facility 132 may select the starting coal and the coal desired characteristics 122 for the final treated coal. As described previously, the parameter generation facility 128 may generate the operations parameters for the treatment of the selected coal. The parameters may include the volume rate of coal to treat, air environment, belt speed, coal temperatures, microwave power, microwave frequency, inert gases required, required sensor readings, preheat temperatures, cool down temperatures, and the like. The parameter generation facility 128 may transmit the operational and sensor parameters to the monitoring facility 134 and the controller 144; the controller 144 may transmit the operational and sensor parameters to the parameter control 140 and sensor system 142.

Continuing with this example, the intake facility 124 may receive raw coal from one of the coal mines 102 or coal storage facilities 112 that may supply coal to the solid fuel treatment facility 132. The raw coal may be supplied from a stored area located at the solid fuel treatment facility 132. The intake facility 124 may have an input section, a transition section, and adapter section that may receive and control the flow and volume of coal that may enter the solid fuel treatment facility 132. The intake facility 124 may have an intake system such as a conveyor belt 300, auger, or the like that may feed the raw coal to the belt facility 130.

In the exemplary embodiment, the intake facility may control the volume rate of raw coal input into the belt facility based on the operational parameters provided by the controller 144. The intake facility may be capable of varying the speed of the intake system based on the controller 144 supplied parameters. In an embodiment, the intake facility 124 may be able to supply raw coal to the belt facility 130 at a continuous rate or may be able to supply the raw coal at a variable or pulsed rate that may apply the raw coal to the belt facility 130 in coal batches; the coal batches may have a predefined gap between the coal batches.

In this example, the belt facility 130 may receive the raw coal from the intake facility 124 for transporting the raw coal through the coal treatment processes. The coal treatment processes may include a preheat 138 process, microwave system 148 process, cooling process 164, and the like. The belt facility 130 may have a transportation system that may be enclosed to create a chamber where the coal may be treated and the process may be preformed.

In embodiments, the transportation system may be a conveyor belt 300, a series of individual containers, or other transportation method that may be used to move the coal through the treatment process. The transportation system may be made of materials that may be capable of holding high temperature treated coal (e.g. metal or high temperature plastics). The transportation system may allow the non-coal products to release from the coal either as a gas or as a liquid; the released non-coal products may need to be collected by the belt facility 130. The transportation system speed may be variably controlled by the controller 144 operational parameters. The belt facility 130 transportation system may run at the same speeds as the intake facility 124 to keep the coal input volumes balanced.

Within the belt facility 130 chamber, an air environment may be maintained that may be used to aid in the release of the non-coal products, prevent premature coal ignition, provide a flow of gases to move the non-coal product gases to the proper removal system 150. The air environment may be dry air (low or no humidity) to aid in the removal of moisture from the coal or may be used to direct any condensed moisture that forms on the chamber walls to a liquid collection area.

The belt facility 130 chamber may have an inert or partially inert atmosphere; the inert atmospheres may prevent the ignition of the coal during high temperatures that may be needed to remove some of the non-coal product (e.g. sulfur).

The inert gases may be supplied by an anti ignition facility 154 that may store inert gases for supply to the belt facility 130 chamber. Inert gases include nitrogen, argon, helium, neon, krypton, xenon, and radon. Nitrogen and argon may be the most common inert gases used for providing non-combustion gas atmospheres. The anti-ignition facility 154 may have gas supply tanks that may hold the inert gases for the chamber. The input of the inert gas to create the proper gas environment may be controlled by the controller 144 operational parameters. The controller 144 may adjust the inert gas flow using feedback from sensors within the chamber that may measure the actual inert gas mixtures. Based on the sensors 142, the controller 144 may increase or decrease the inert gas flow to maintain the atmosphere operational parameters provided by the controller 144 and the parameter generation facility 128.

If the belt facility 130 chamber uses nitrogen as the inert gas, the nitrogen may be generated on-site at a gas generation facility 152. For example, the gas generation facility 152 may use a pressure swing absorption (PSA) process to supply the nitrogen required by the belt facility 130 chamber. The gas generation facility 152 may supply the nitrogen to the anti-ignition facility for insertion into the chamber. The flow of the nitrogen into the chamber may be controlled by the controller 144 as previously discussed.

Any of the supplied gas environments may be applied using positive or negative pressures to provide flow of the atmosphere within the chamber. The gases may be input to the chamber with a positive pressure to flow over the belt facility 130 coal and flow out exit areas with in the chamber. In a similar fashion, a negative pressure may be supplied to draw the gases into the chamber and over the coal. Either process may be used for the collection of non-coal product released gases into the removal system 150.

In the exemplary embodiment, the controller 144 may control the flow of the gases in the chamber by measuring gas velocity, gas direction, input pressures, output pressures, and the like. The controller 144 may provide the control and adjustment to the flow of the gases by varying fans and blowers within the belt facility.

Within the belt facility 130 chamber a vacuum or partial vacuum may be maintained for the processing of coal. A vacuum environment may provide an additional aid in removing non-coal products out of the coal and may also prevent the ignition of the coal by removing an environment that is favorable to coal ignition.

Continuing with the processing of coal within the belt facility 130, the coal may first enter a preheat facility 138. The preheat facility 138 may be heat the coal to a temperature specified by the operational parameters; the operational parameters may be provided by the controller 144. The coal may be preheated to remove surface moisture and moisture that may be just below the surface from the coal. The removal of this excess moisture may allow the microwave systems 148 that will be used later, to be more effective because there may be a minimum of surface moisture to absorb the microwave energy.

The preheat facility 138 may contain the same atmosphere as the rest of the belt facility 130 or may maintain a different atmosphere.

The preheat facility 138 may use the same transportation facility as the rest of the belt facility 130 or may have its own transportation facility. If the preheat facility has its own transportation facility, it may be controlled by the controller 144 and vary its speed to assure that the proper moisture is removed during the preheat. The moisture removal may be sensed by a water vapor sensor or may use a before and after weight of the coal to determine the volume of moisture that has been removed by the preheat facility 138. In an embodiment, the sensors 142 may measure the coal weight with in-process scales before the preheat and after the preheat process. There may be a feedback to the controller 144 as to the effective amount of moisture removed from the coal and the controller 144 may adjust the preheat facility 138 transportation system speed to compensate as needed.

After the preheat facility 138 the coal may continue on into the belt facility 130 coal treatment process with at least one microwave/radio wave system (microwave system) 148 used to treat the coal. The microwave system 148 electromagnetic energy may be created by devices such as a magnetron, klystron, gyrotron, or the like. The microwave system 148 may input microwave energy into the coal to heat the non-coal products and release the non-coal products from the coal. Because of the heating of the non-coal products in the coal, the coal may be heated. The release of the non-coal products may occur when there is a material phase change from a solid to a liquid, liquid to a gas, solid to gas, or other phase change that may allow the non-coal product to be released from the coal.

In belt facilities 130, where there may be more than one microwave system 148, the microwave systems 148 may be in a parallel orientation, a serial orientation, or a parallel and serial combination orientation to the transportation system.

As discussed in more detail below, the microwave systems 148 may be in parallel where there may be more than one microwave system 148 grouped together to form a single microwave systems 148 process station. This single station may allow the use of several smaller microwave systems 148, allow different frequencies to be used at a single station, allow different power to be used at different stations, allow different duty cycles to be used at a single station, or the like.

The microwave systems 148 may also be setup in serial where there may be more than one microwave system 148 station set up along the belt facility 130. The serial microwave system 148 stations either may be individual microwave systems 148 or may be a group of parallel microwave systems 148. The serial microwave system 148 stations may allow the coal to be treated differently at the different serial microwave system 148 stations along the belt facility 130. For example, at a first station the microwave system 148 may attempt to remove water moisture from the coal that may require certain power, frequency, and duty cycles. At a second station, the microwave system 148 may attempt to remove sulfur from the coal that may require different power, frequency, and duty cycles. For example, a belt facility 130 may include ten or more microwave systems 148 disposed throughout the belt facility 130 in a configuration that may be parallel, serial, staggered, and the like and in increasing or decreasing numbers along the belt facility 130 in any of the configurations. In this example, the belt facility 130 may be 40 feet long. It will be appreciated by one skilled in the art that any number of microwave systems 148 may be disposed along a belt facility 130, that the belt facility 130 may be of any length, and that any number of belt facilities 130 may be included in the solid fuel treatment facility 132.

Using a series of microwave systems may also allow other process stations between the microwave systems 148 such as wait stations to allow the complete release of a non-coal product, non-coal product removal system 150 station, a sensor system 142 to record non-coal product release, or the like.

The series of microwave system 148 stations may allow different non-coal products to be released and removed at different stages of the belt facility 130. This may make it easier to keep the removed non-coal products separated and collected by the appropriate removal system 150. This may also allow mapping one microwave system 148 to a process step or set of process steps, so that a particular microwave system 148 may be used to carry out a particular process step or set of process steps. Thus, for example, microwave systems 148 are activated only for those process steps that need to be carried out. In this example, if a process step need not be performed, the correlative microwave system 148 need not be activated; if a process step needs to be repeated, the correlative microwave system 148 can be activated again, for example to remove a non-coal product that was not completely removed after the first activation.

In the exemplary embodiment, the control of the microwave system 148 may include a series of control steps, such as sensing, monitoring the state of the coal treatment process, adjusting the operational parameters, and applying the new operational parameters to at least one microwave system 148. As will be discussed further, the control, adjustment, and feedback process for providing operational parameters to the microwave system 148 may be applicable to one or more microwave systems at substantially the same time.

At least one of the microwave systems 148 may be controlled by the controller 144. In embodiments the controller 144 may provide operational parameters that control the microwave frequency, microwave power, microwave duty cycle (e.g. pulsed or continuous). The controller 144 may have received the initial operational parameters from the parameter generation facility 128. The control of the microwave system 148 may take place in real time, with, for example, operational parameters being applied to the microwave system 148, with the sensors 142 providing process values, with the monitoring facility 134 receiving and adjusting the operational parameters, with feedback of the operational parameters being provided to the controller 144, and then with the control cycle being repeated as necessary.

The controller 144 may apply operational parameters to one or more microwave systems 148. The microwave systems 148 may respond by applying the power, frequency, and duty cycle that the controller 144 commands, thereby treating the coal in accordance with the controller 144 commands at a particular station.

The microwave systems may require a significant amount of power to treat the coal. For certain embodiments of microwave systems 148 of the solid fuel treatment facility 132 the microwave power required may be at least 15 kW at a frequency of 928 MHz or lower; in other embodiments, the microwave power required may be at least 75 kW at a frequency of 902 MHz. The power for the microwave systems 148 may be supplied by a high voltage input transmission facility 182. This facility 182 may be able to step up or down the voltage from a source to meet the requirements of the microwave system 148. In embodiments, the microwave system 148 may have more than one microwave generator. A power-in system 180 may provide the connection for the high voltage input transmission facility 182 for the voltage requirements. If the solid fuel treatment facility 132 is located at a power generation facility 204 the power-in 180 may be taken directly from the power supplied from the power generation facility 204. In other embodiments, the power-in 180 may be taken from a local power grid.

Figure 18:
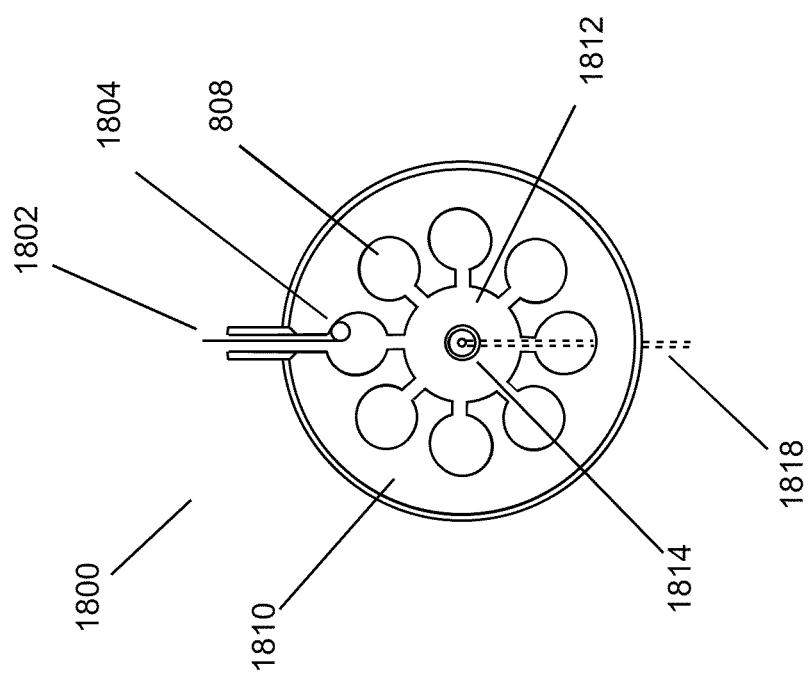
FIG. 18 depicts an embodiment of a magnetron that may be used as a part of the microwave system of the solid fuel treatment facility.

As indicated herein, the solid fuel treatment facility 132 may utilize magnetrons 1800 to generate microwaves to treat the solid fuel (e.g. coal). FIG. 18 illustrates a magnetron that may be used as a part of the microwave system 148 of the solid fuel treatment facility 132. In embodiments, the magnetron 1800 may be a high-powered vacuum tube that generates coherent microwaves. A cavity magnetron 1800 may consist of a hot filament that acts as the cathode 1814. A large current, such as 110 amps, may be put across the filament. The magnetron 700 may be kept at a high negative potential, such as 20,000 V, by a high-voltage direct-current (DC) 1902 power source. The cathode 1814 may be built into the center of an evacuated, lobed, circular chamber. The outer, lobed portion of the chamber may act as the anode 1810, attracting the electrons that are emitted form the cathode. A magnetic field may be imposed by a magnet or electromagnet in such a way as to cause the electrons emitted from the cathode 1814 to spiral outward in a circular path. The lobed cavities 1808 are open along their length and so connect to the common cavity 1812 space. As electrons sweep past these openings they may induce a resonant high frequency radio field in the common cavity 1812, which in turn may cause the electrons to bunch into groups. The resonant frequency may be 915 MHz. The radio field may keep the electrons inside the electromagnet. A portion of this field may be extracted with a short antenna 1802 that is connected to a waveguide. The waveguide may direct and/or launch the extracted RF energy out of the magnetron to the solid fuel, thereby heating and treating the solid fuel as described herein. Alternatively, the energy from the magnetron may be delivered directly to the solid fuel from the antenna, without the use of a waveguide.

In an embodiment, the magnetron tube, which may comprise an anode, a filament/cathode, an antenna, and a magnet, may be 100 kW or greater, such as 125 kW. In any embodiment of the magnetron tube, the high power of the microwave generator may generate excessive heat. The higher power of the magnetron tube may be enabled by improved water cooling facilities. Improved water cooling may comprise veins of water flowing through, around, or within the magnetron. In an embodiment, the higher power of the magnetron may also be enabled by improved structures surrounding the filament to control emitted microwave energy. In an embodiment, the higher power may be enabled by improved air cooling facilities. For example, an air handler may draw air from the atmosphere to cool the generator housing and then exhaust the air back into the atmosphere. Air entering the generator may be pre-cooled. Air entering the generator may be filtered, such as HEPA-filtered. In an alternative embodiment, a fan may draw hot air from the generators and exhaust from the heat exchanger into the generator housing.

In an embodiment, the large potential applied to the magnetron 1800 may result in a DC voltage gap. The closer the voltage may be to DC, the better performance obtained from the magnetron. The potential difference may be large enough such that the electrons will jump the voltage gap as they burn the filament. In order to control this phenomenon, the magnetron may include a filament transformer or a PWM modulator controller as a means of magnetron control.

In an embodiment, the magnetron 1800 may have a ceramic dome which may enable air cooling of the magnetron.

In an embodiment, microwave energy launched from the magnetron may radiate directly to the chamber without use of a waveguide. The magnetron may be situated with respect to the chamber such that launch of the energy may be directed into the chamber without any intervening structure. For example, the magnetron may be located on the roof of the chamber and the antenna may be located adjacent to an opening in the roof or a microwave transparent material in the roof.

The energy launched from the magnetron by the antenna may enter a waveguide. Since microwave energy cannot travel through a solid conductor, the antenna radiates the RF power into a waveguide which may transport the microwave energy from its source into the chamber. The waveguide may be a hollow structure that may allow energy to propagate through it and reflect off the interior portion of the waveguide. In embodiments, the antenna may launch microwave energy into a waveguide which may be rectangular, circular, cylindrical, oval, square, elliptical, triangular, parabolic, conical, or any other shape or geometry. The shape of the waveguide may alter the energy propagation characteristics of the waveguide or affect the energy distribution pattern of energy propagated through the waveguide. Depending on the frequency of the microwave, the waveguide may be constructed from either conductive or dielectric materials, such as brass, aluminum, and the like.

In an embodiment, the dimensions of the waveguide may be variable. For example, the waveguide may be curved, bent, straight, and the like. The waveguide may be of any length. For example, a magnetron located on a flat surface adjacent to a chamber may have a waveguide running vertically from the magnetron, may curve towards the chamber and may curve again before entering the chamber at a top portion of the chamber.

Referring to FIG. 25, a rectangular waveguide facilitates propagation of microwave energy through this section of the waveguide. In an embodiment, microwave energy is radiated into the rectangular waveguide, through which the waves of energy travel by reflecting from side to side in a zigzag pattern off of the interior walls of the waveguide. The zigzag pattern in the rectangular waveguide may be determined by a width of the waveguide. For example, the waveguide shown in FIG. 25A is narrower than that in FIG. 25B. As energy travels through the narrower waveguide, the angle of incidence may be smaller than that of the wider waveguide. In embodiments, microwave energy may continue to propagate through waveguides such as those shown in FIG. 25 until it gets launched into another section of waveguide, into a polarizer assembly, into the chamber, and the like. In an embodiment, the microwave energy radiating through the rectangular waveguide, such as a TE10 waveguide, may be linearly polarized.

In embodiments, the waveguide receiving launched energy from the antenna may connect to another waveguide, where polarization may remain the same or may be altered. Polarization useful in the invention may be linear polarization, circular polarization, elliptical polarization, and the like. In linear polarization, the two orthogonal (perpendicular) components of the electric field vector are in phase. In the case of linear polarization, the ratio of the strengths of the two components is constant, so the direction of the electric field vector (the vector sum of these two components) is constant. Since the tip of the vector traces out a single line in the plane, this special case is called linear polarization. The direction of this line depends on the relative amplitudes of the two components of the electric field vector. In circular polarization, the two orthogonal components of the electric field vector have exactly the same amplitude and are exactly ninety degrees out of phase. In this case one component is zero when the other component is at maximum or minimum amplitude. There are two possible phase relationships that satisfy this requirement: the x component can be ninety degrees ahead of the y component or it can be ninety degrees behind the y component. In this special case, the electric vector traces out a circle in the plane, so this special case is called circular polarization. The direction the field rotates in depends on which of the two phase relationships exists. These cases are called right-hand circular polarization and left-hand circular polarization, depending on which way the electric vector rotates. All other cases, that is where the two components of the electric field vector are not in phase and either do not have the same amplitude and/or are not ninety degrees out of phase are called elliptical polarization because the electric vector traces out an ellipse in the plane (the polarization ellipse). In embodiments, one type of polarization may provide benefits to the invention over another type of polarization. For example, circularly polarized microwave energy may be useful in obtaining balanced components of the electric field in both vertical and horizontal directions and enabling improved energy distribution over the coal.

Figure 26:
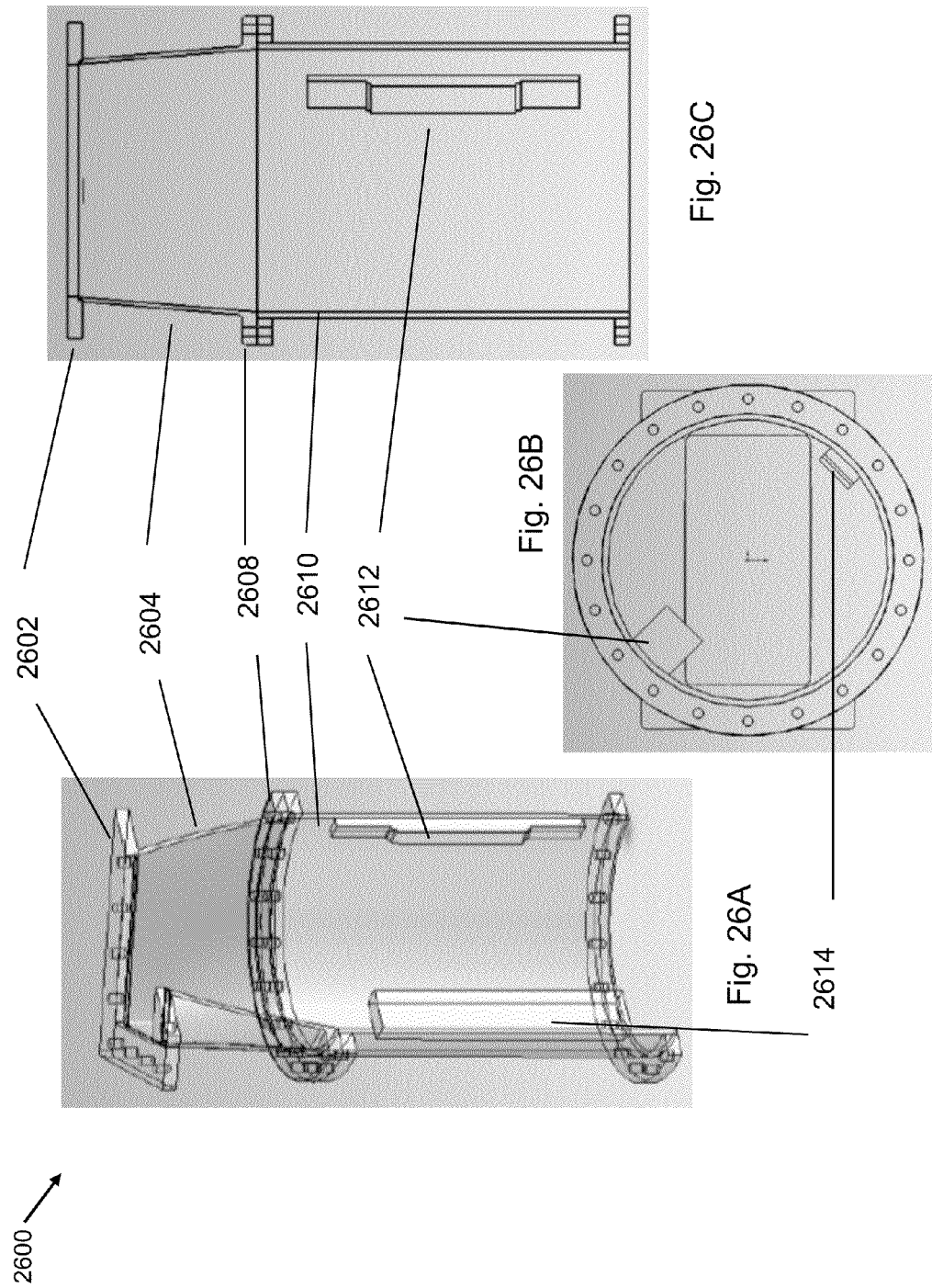
FIGS. 26A, B, and C depict a cross section, end view, and plan view of a circular polarizer.
Figure 27:
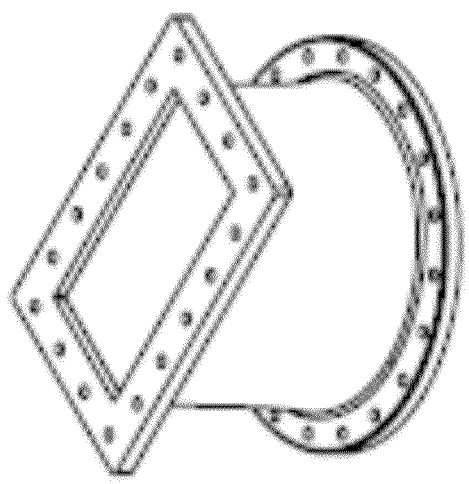
FIG. 27 depicts a rectangular-to-round transformer.

Referring to FIG. 26, cross-sectional views (FIGS. 26A &B) and a bottom view (FIG. 26C) of a circular polarizer are shown. In this example, a transition is made from a rectangular waveguide to a circular waveguide. The coupling 2604, or rectangular-to-round transformer, comprises a rectangular flange 2602 to connect to the rectangular waveguide and a portion creating a smooth transition from the rectangular flange 2602 to a round flange 2608. In embodiments, the coupling 2604 matches an input waveguide, such as provided by a rectangular waveguide, to a circular waveguide section. The flange may be important for impedance matching. Referring to FIG. 27, an embodiment of a coupling 2604 is disclosed.

After radiating through the coupling 2604, microwave energy may enter the polarization waveguide 2610. In embodiments, there may not be a flange connecting the coupling 2604 to the polarization waveguide 2610, and instead, the polarization waveguide 2610 and coupling may be formed continuously as one piece. In any event, the coupling 2604 and polarization waveguide 2610 taken together may be termed a polarizer assembly 2600. Referring to FIG. 26B, a bottom view demonstrates the placement of the polarizing elements 2612, 2614 within the polarization waveguide 2610 as viewed from an end of the polarizer assembly 2600.

Figure 28:
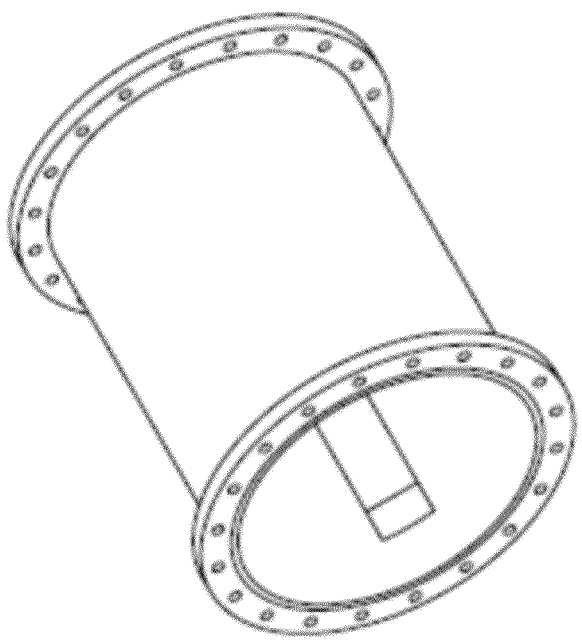
FIG. 28 depicts a cylindrical section of a circular polarizer.

In an embodiment, the polarization waveguide 2610 may be dimensioned to facilitate operation at a particular frequency, such as 915 MHz. For example, the sectional length, the cylindrical sectional length, the transformer length, and flange thickness may all be modified to facilitate operation of the polarizer assembly at a particular radio frequency. Referring to FIG. 28, an embodiment of a circular polarization waveguide 2610 is disclosed.

In an embodiment, the polarization waveguide 2610 may modify the polarization of incoming microwave energy. Continuing to refer to FIG. 26, polarizing elements 2612, 2614 may be disposed within or integral with the polarization waveguide 2610. For example, the polarizing elements 2612, 2614 may be shaped to present an obstacle to the path taken by microwave energy as it radiates through the waveguide 2610. When the microwave energy encounters the polarizing elements 2612, 2614, the reflection of the energy may be altered such that the microwave energy becomes circularly polarized. In embodiments, there may be only one polarizing element 2612 in the waveguide or there may be multiple elements within the waveguide. In embodiments, the polarizing elements 2612, 2614 may be identical or may be shaped differently. For example, the height of one polarizing element 2612 may be greater than a second polarizing element 2614.

In an embodiment, the polarizing element 2612, 2614 may have a shape which is symmetrical about a plane running through its center. In an embodiment, the polarizing element 2612, 2614 may have no asymmetry at all. In another example, the polarizing element may be asymmetrical, such as by having a bump or raised portion. The polarizing element 2612, 2614 may be shaped for operation at a particular frequency, such as 915 MHz. For example, the overall length, end spacing, and middle section length may be dimensioned to facilitate operation at a particular frequency. The polarizing element 2612, 2614 may comprise a flange or some other attachment means for permitting it to be attached to the waveguide. In an embodiment, the polarization waveguide 2610 may be extruded so that the polarizing element 2612, 2614 is formed integrally with the waveguide.

Referring to FIG. 54, an embodiment of a circular polarization waveguide with polarizing elements 2612, 1614 is depicted in detail. FIG. 54A depicts a top view of a circular polarization waveguide where the polarizing elements 2612, 2614 are disposed such that their plane of symmetry 5402 is at a 45° angle with respect to the orientation of the incoming microwave energy field. FIG. 54B depicts a perspective view of the rods, depicting the dimensions of the square rod 2614 in particular. In an embodiment, the polarizing element 2614 may have a length of 2 inches, a width of two inches, and a height of 11.5 inches. The rod 2614 may be placed at 2.1 inches from the end of the cylindrical section. FIG. 54C depicts a perspective view of the rods, depicting the dimensions of the square rod 2612 in particular. In an embodiment, the overall length of polarizing element 2612 is 11.5 inches and the overall width is 1.72 inches. Polarizing element 2612 has a raised, stepped bump centered on the rod. The bump is 6.5 inches long when measured end-to-end from the first step and 6.125 inches long when measured end-to-end from the end of the second step. Referring to FIG. 54D, the thickness of the rod along the length including both steps is 0.75 inches, the thickness of the rod along the length including only the first step is 0.56 inches, and the thickness of the rod without steps is 0.43 inches. The rod 2612 may be placed at 2.1 inches from the end of the cylindrical section.

Figure 46:
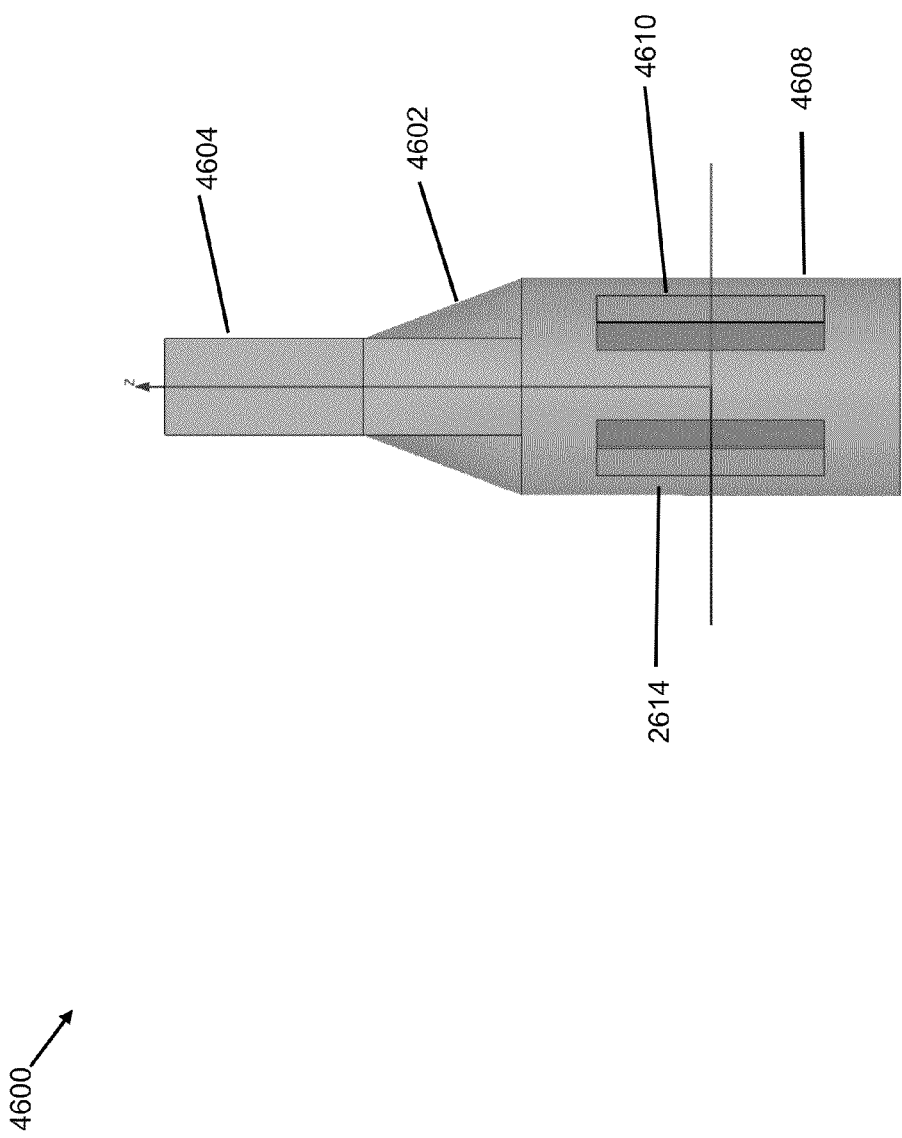
FIG. 46 depicts a waveguide with square rods.

In an embodiment, referring to FIG. 46 a waveguide 4600 may be formed by a coupling rectangular-to-round transformer 4602, comprising a rectangular flange 4604 on one side and a cylindrical waveguide section 4608 on the other. In an embodiment the cylindrical section 4608 has a diameter of 11 inches. This configuration may produce a smooth transition from a rectangular waveguide to a circular waveguide. The cylindrical section 4608 may comprise at least two square rods 2614 and 4610 symmetrically placed from the centre of the cylindrical section 4608. The square rods 2614 and 4610 may act as polarization elements. When microwave energy meets the polarization elements 2614 and 4610, the microwave energy may become circularly polarized. In an embodiment, the waveguide may be termed as "circularly polarized waveguide". In an embodiment, the length of the coupling transformer 4602 and the rectangular flange 4604 may be modified to facilitate operation at particular radio frequencies. In embodiments, the dimensions of the rods 2614 and 4610 may be fixed or variable. In an embodiment, the two rods 2614 and 4610 may be asymmetrically placed in a circular polarization waveguide. In an embodiment, the rods 2614 and 4610 may be placed at a 45 degree angle with respect to the orientation of the input field.

In an embodiment, one of or both the square rods 2614 and 4610 may have a width and height of 1.5×1.5 or 2.25×2.25 inches. Moreover, the length of the square rods may be 13.43 inches, 17.37 inches, or some other length. The square rods 2614 and 4610 with such dimensions induce circular polarization in the waveguide.

In an embodiment, a circularly polarized wave may provide an effective method of heating the moisture content present in the coal fissures. The moisture content inside coal fissure is water. Water is an electric dipole formed by a positive charge at one end and a negative charge at the other end. When an alternating electric field such as one formed by a circularly polarized radio frequency wave is applied to a water dipole, it tries to align itself with the electric field. However, due to the alternating field, water molecules undergo a random motion. Further, random motion generates heat and therefore the moisture content inside the coal fissures is also heated. Circularly polarized energy inside the waveguide 4600 may heat up the moisture content of coal fissures. Moisture content may be heated even when the radio frequency wave is not circularly polarized, but such heating may be of reduced efficiency. Therefore, for maximum heating of coal fissures, circular polarization may be used. Circular polarization produces a constantly changing electric field that describes a circle with respect to time.

Figure 47:
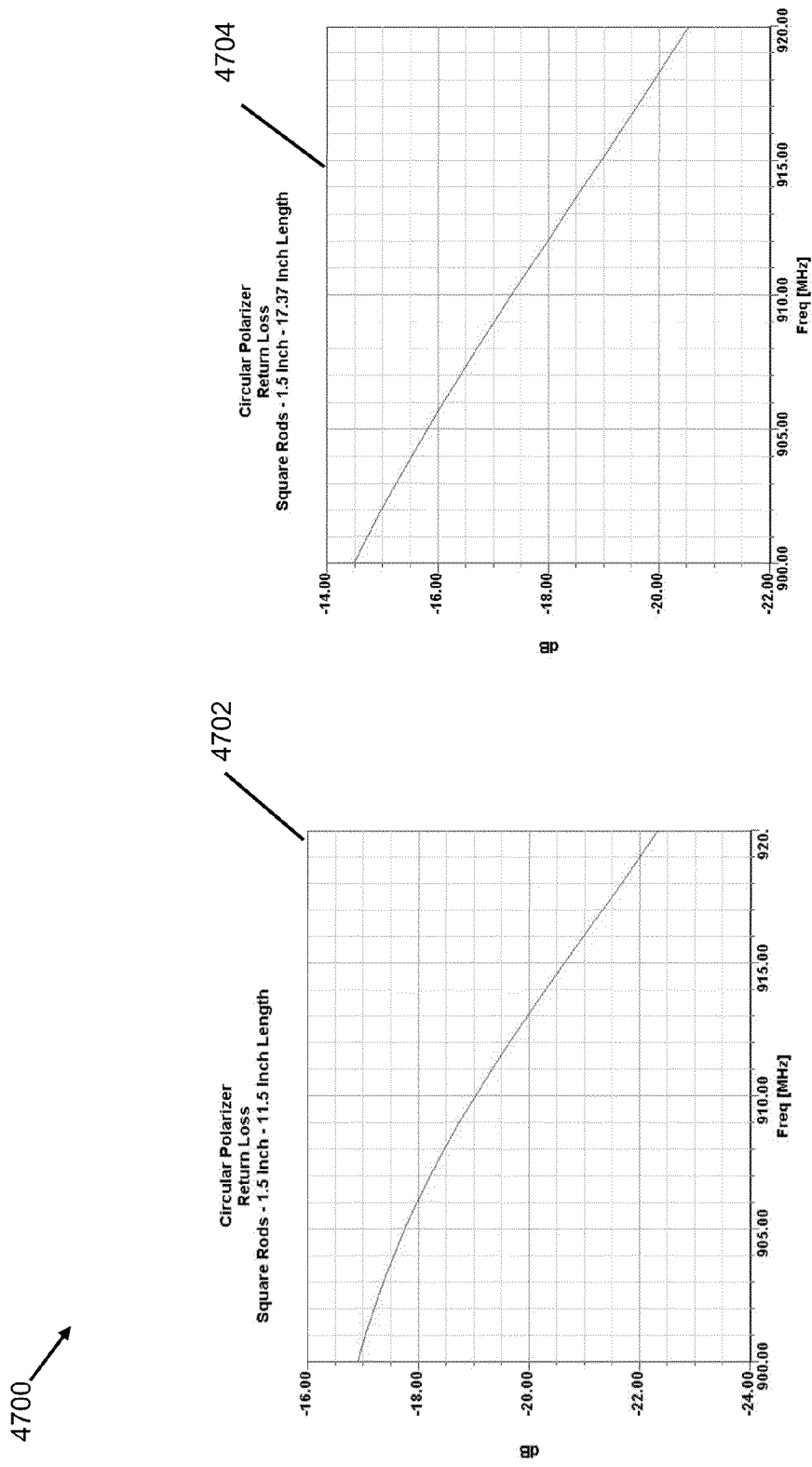
FIG. 47 depicts return loss plots for waveguides with two different kinds of square rods.

Referring to FIG. 47, graphs 4702 and 4704 illustrate the return loss. Return loss is the energy reflected back by the material being treated. Reflected energy is wasted, since it cannot be used for heating. The reflected energy may be absorbed by some mechanism, such as a circulator. Graphs 4702 and 4704 depict the return loss at different radio frequencies for two sets of square rods 2614 and 4610, respectively. The square rods 2614 and 4610 have a width and height of 1.5×1.5 inches. However, the lengths are different. The length of the first set is 11.5 inches and corresponds to graph 4702. The length of the second set is 17.37 inches and corresponds to graph 4704. The longer length rods exhibits return loss worse than that with the 11.5 inch rods.

Figure 48:
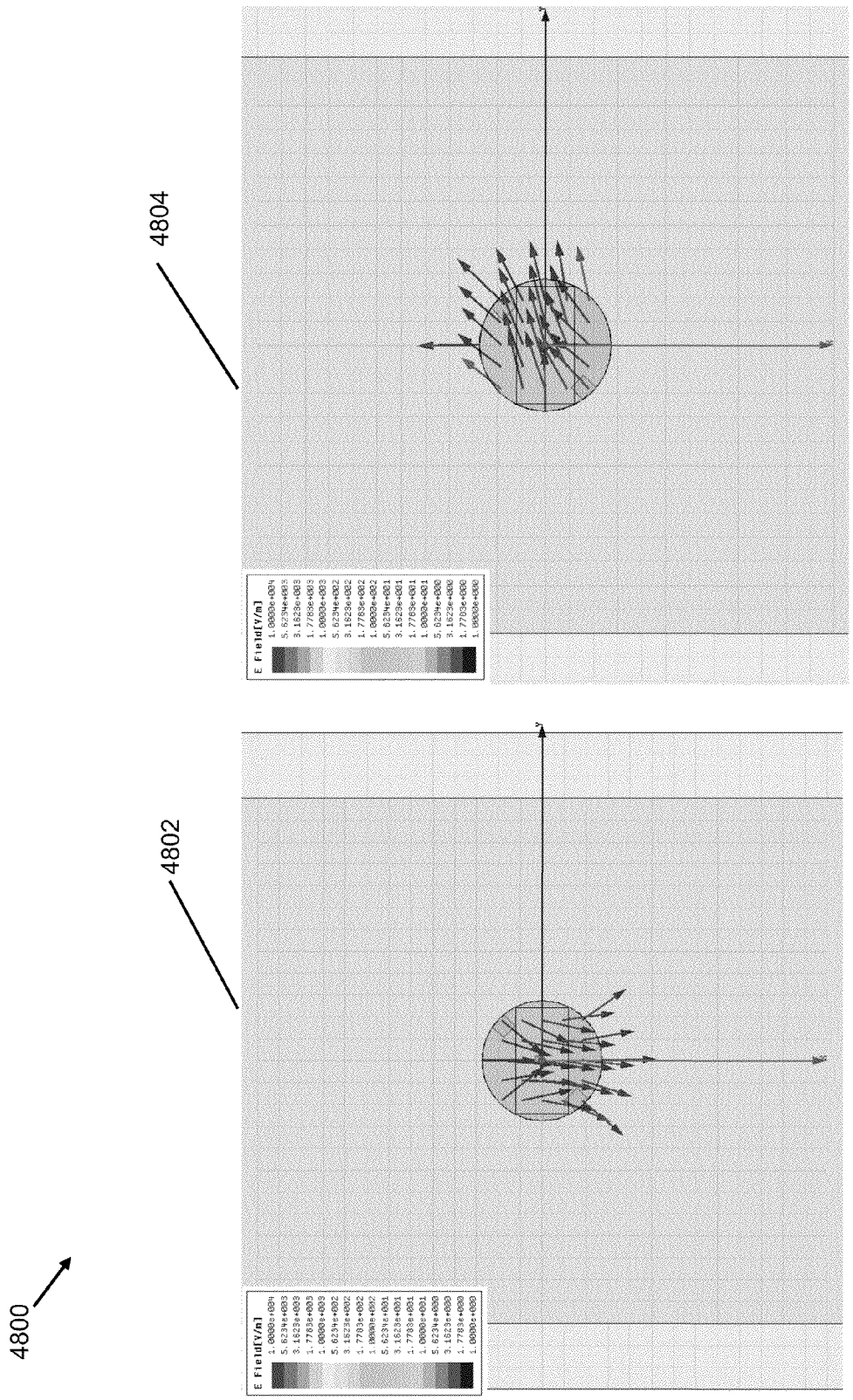
FIG. 48 depicts field polarization plots for waveguides with two different kinds of square rods.

Referring to FIG. 48, graphs 4802 and 4804 illustrate the effect of rod length on polarization. The graph 4802 illustrates in an embodiment the square rods 2614 and 4610 with dimensions 1.5×1.5×11.5 inches do not induce complete circular polarization. However, the graph 4804 illustrates that square rods 2614 and 4610 with dimensions 2.25×2.25×17.37 inches induces circular polarization in the waveguide.

Figure 49:
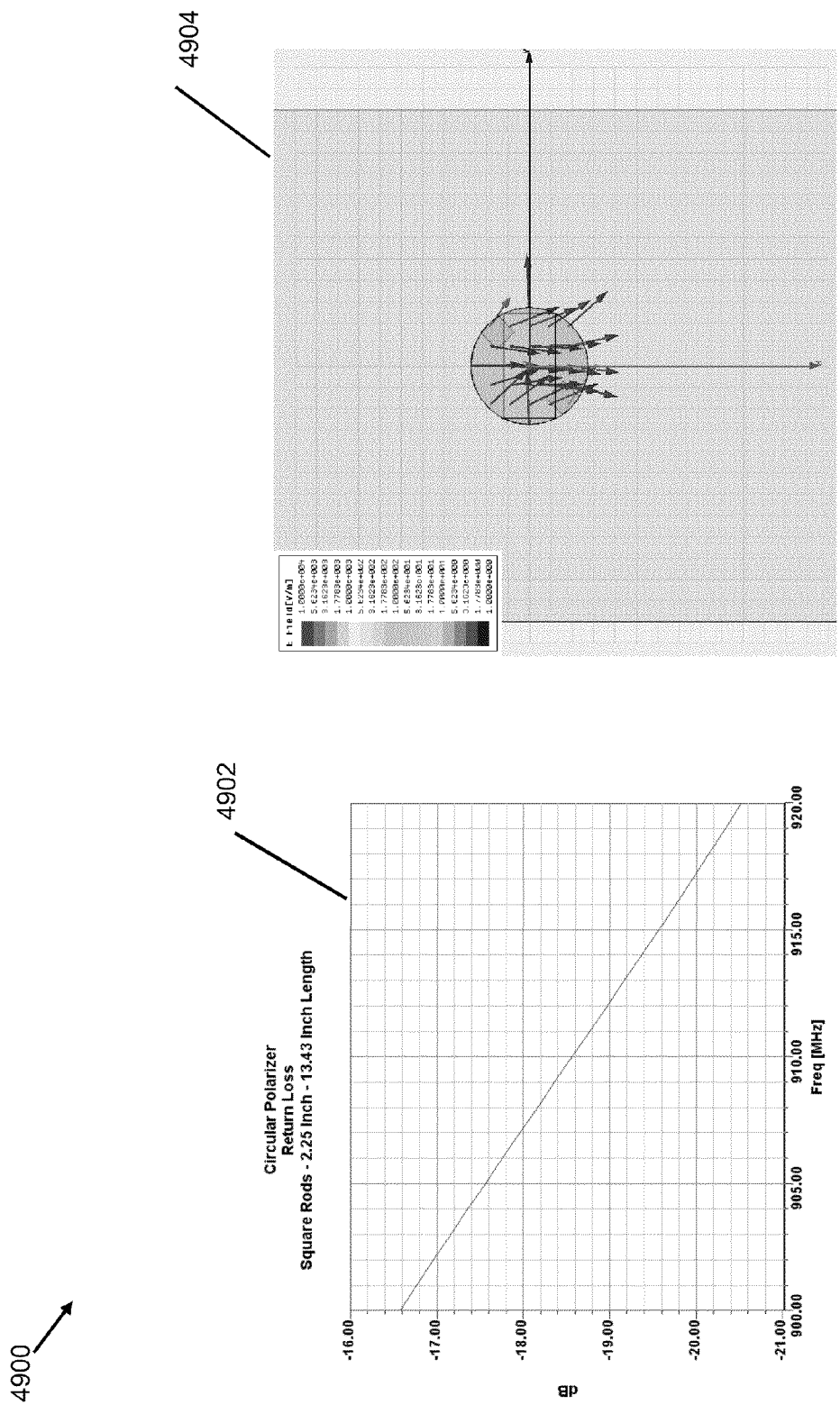
FIG. 49 depicts return loss and field polarization for a waveguide with square rods.

In an embodiment, FIG. 49 illustrates in graphs 4902 and 4904 the return loss and the circular polarization, respectively, when dimensions of the square rods 2614 and 4610 are 2.25×2.25×13.43 inches. The graph 4902 illustrates the return loss at different frequencies and demonstrates an improvement in return loss for rods of these dimensions over either of the square rods with 1.5 inch length and width. The graph 4904 illustrates induction of circular polarization in the waveguide.

Figure 50:
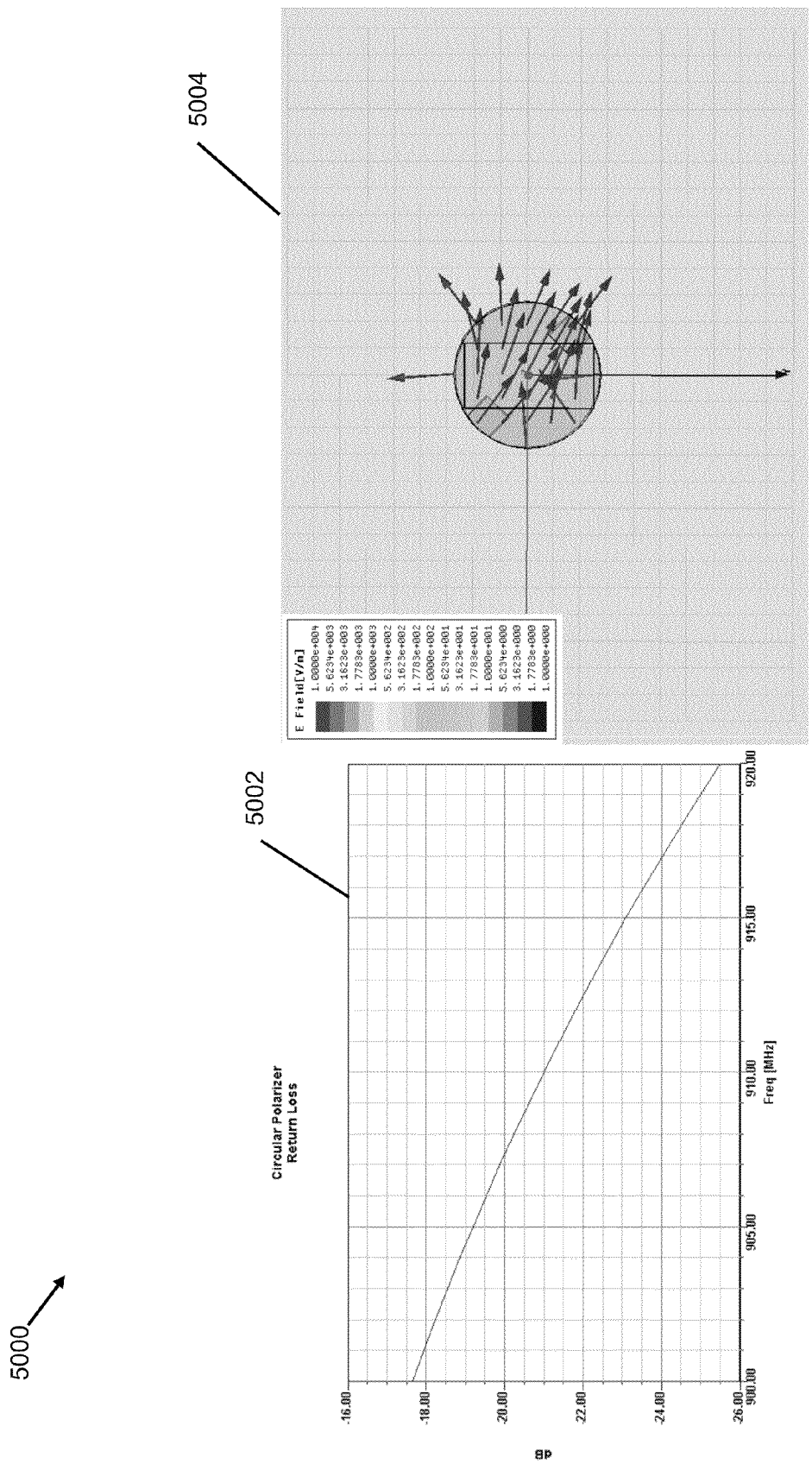
FIG. 50 depicts return loss and field polarization for a waveguide with square rods.
Figure 55:
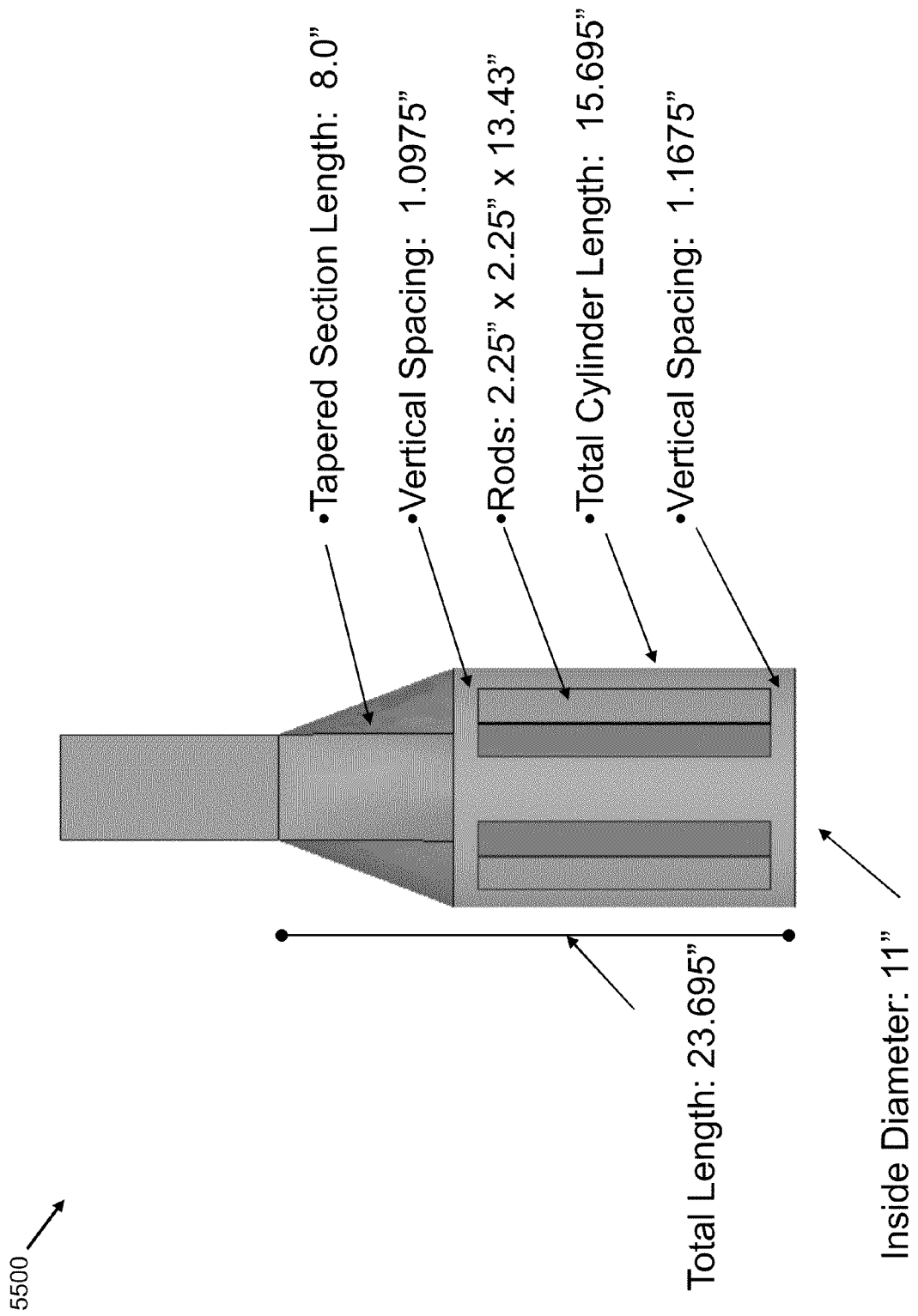
FIG. 55 depicts the dimensions of an optimized circular polarizer.

In another embodiment, FIG. 50 illustrates in graphs 5002 and 5004 the return loss and the circular polarization, respectively, for optimized square rods when the dimension of the square rods are 2.25×2.25×13.43 inches. FIG. 55 depicts the dimensions of an embodiment of an optimized waveguide with square rods, where optimization relates to the placement of the square rods within the cylindrical section. The overall length of the circular polarizer and the rectangular-to-round transformer is 23.695 inches, the rectangular-to-round transformer, or tapered section, length is 8 inches, and the total cylinder length is 15.695 inches. The dimensions of the rods are 2.25×2.25×13.43 inches. The vertical spacing of the rod near the rectangular-to-round transformer segment is 1.0975 inches and the vertical spacing of the rod on the other end of the cylindrical section is 1.1675 inches. The graph 5002 illustrates that the return loss is less than −25 dB when the square rods of dimension 2.25×2.25×13.43 are optimized. The graph 5004 illustrates the circular polarization induced by the square rods 2614 and 4610, when optimized.

Figure 51:
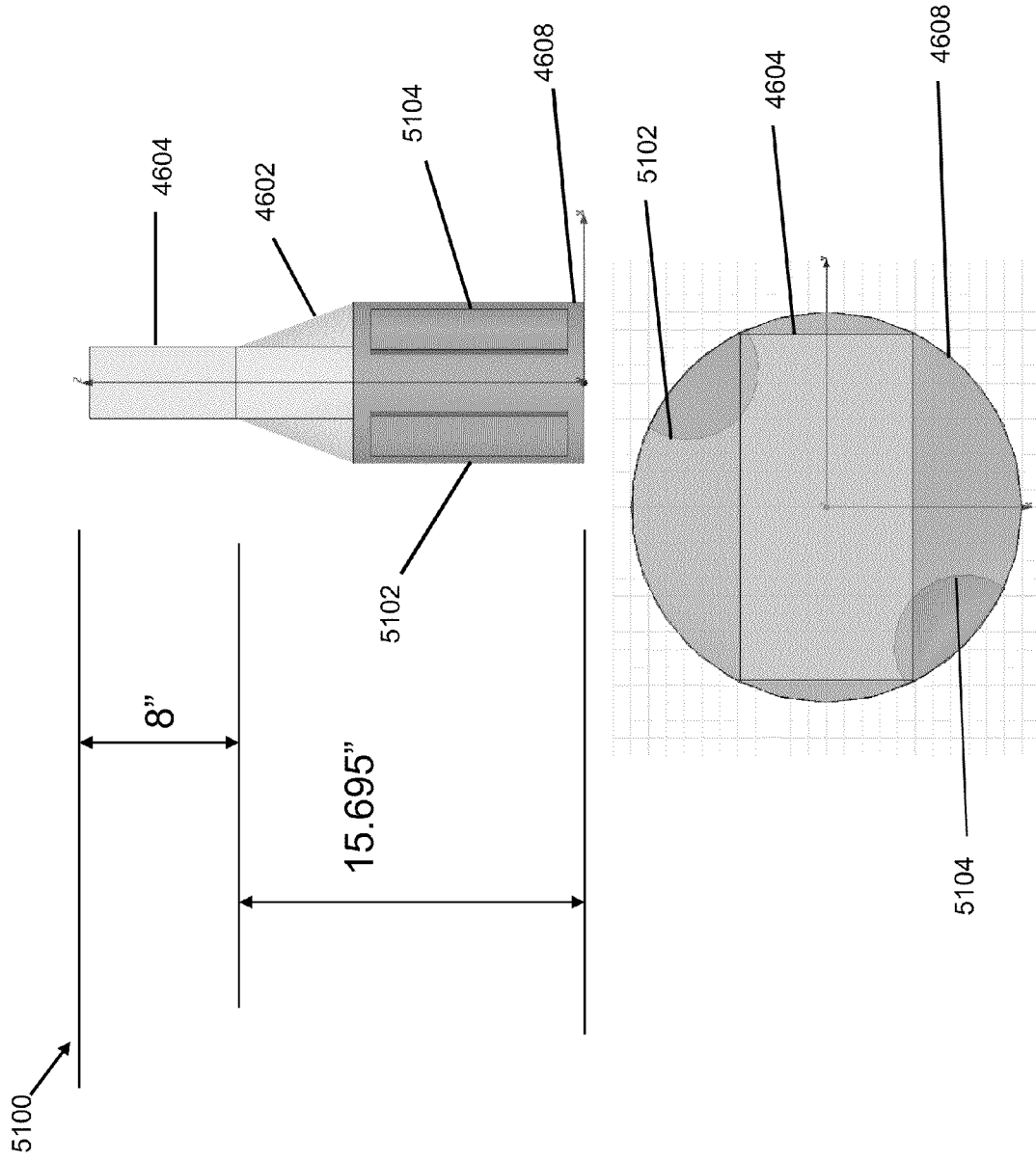
FIG. 51 depicts a side view and top down view of a waveguide with half-round rods.

In an embodiment, the polarization elements 2614 and 4610 may be two round or half-round rods, instead of square rods, placed symmetrically from the centre of the circularly polarized waveguide. FIG. 51 illustrates an embodiment of a circular polarizer 5100 where rods 5102 and 5104 each with a radius of 2 inches are positioned inside a circular polarization waveguide 4600.

In an embodiment, referring to FIG. 51 the cylinder 4608 of waveguide may have a diameter of 11 inches. In an embodiment, the combined length of the coupling transformer 4602 and the cylinder 4608 may be 15.695 inches. Further, the length of the rectangular flange 4604 may be 8 inches. Therefore, in an embodiment, the total length of the waveguide may be 23.695 inches.

Figure 52:
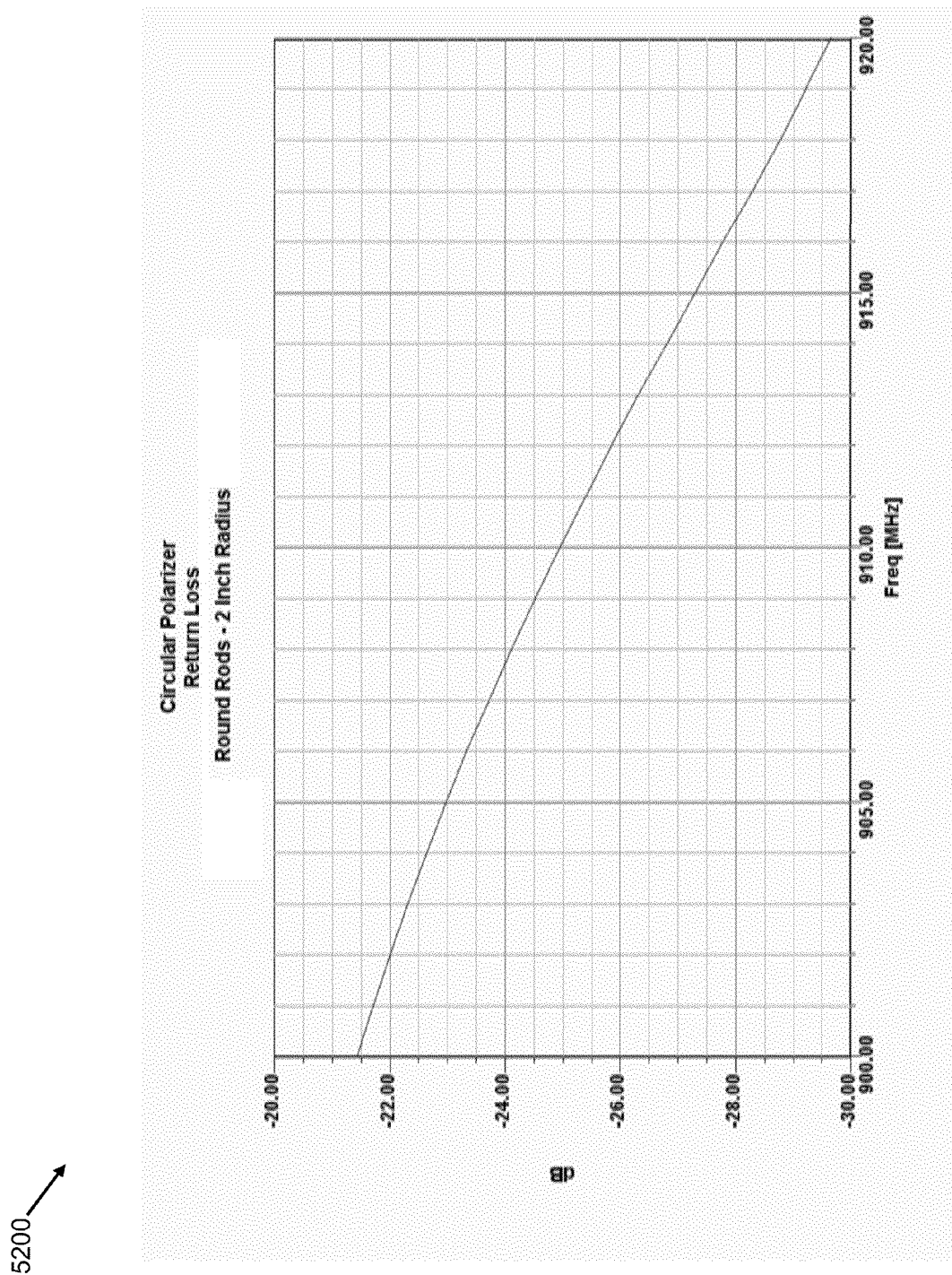
FIG. 52 depicts a return loss plot for a waveguide with half-round rods.
Figure 53:
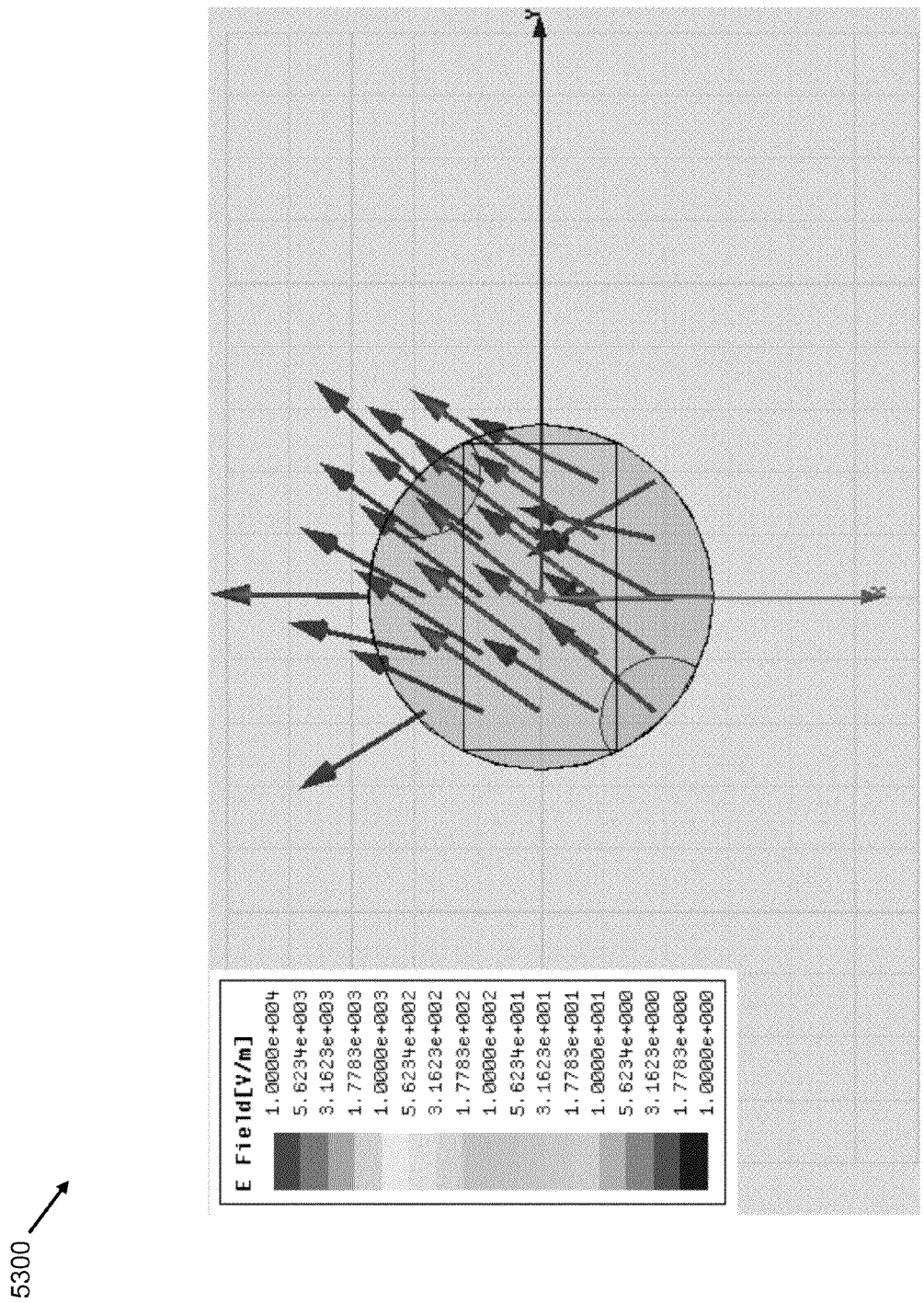
FIG. 53 depicts a field polarization plot for a waveguide with half-round rods.

FIG. 52 is a graph 5200 for illustrating return loss by the waveguide formed by two rods 5102 and 5104. The return loss graph shows −21.5 db of energy is reflected by the material when the radio frequency is 900 MHz. This is approximately less than 1% loss. Thus, the waveguide formed by using the rods 5102 and 5104 as polarization elements may be efficient in heating the moisture content inside coal. As shown in the graph 5200, efficiency of the waveguide 4600 increases as the radio frequency is increased. The graph 5200 shows a return loss of −29.5 db at an operating frequency of 920 MHz. In an embodiment, FIG. 53 is a graph illustrating the circular polarization induced by introduction of the rods 5102 and 5104. The graph 5300 illustrates the electric field vector is at fixed point in space and describes a circle with respect to time. The magnitude of the vector is fixed with respect to time. Further, circular polarization may be left or right depending upon the rotation of the electric vector.

Figure 29:
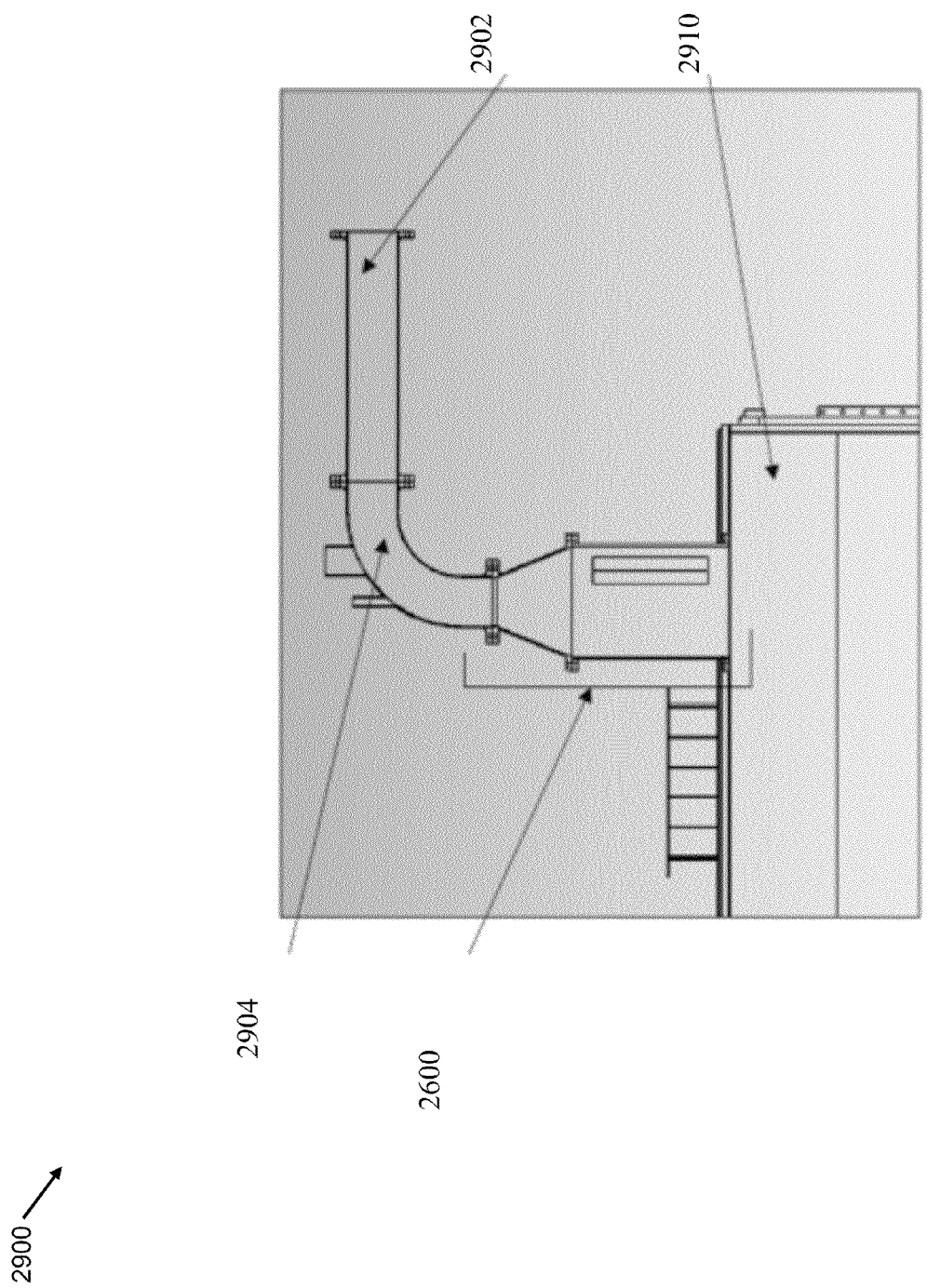
FIG. 29 depicts a curved waveguide.

The microwave energy may propagate from the magnetron 1800 to a chamber 2900 containing the solid fuel by way of a plurality of waveguides, such as shown in FIG. 29. In this embodiment, the microwave energy may first propagate through waveguides to a straight section of rectangular waveguide 2902, and change direction by way of a bent section of rectangular waveguide 2904. The bent section of rectangular waveguide 2904 may then interface with the polarizing assembly 2600, as described herein. The microwave energy may then enter the chamber through an opening, where it may emerge in the chamber 2910 as circularly polarized microwave energy. In this instance, the circularly polarized microwave energy may then present microwave energy to the solid fuel that is constantly changing its polarization orientation. This may help increase the effectiveness of the microwave energy for heating the solid fuel, as the impinging microwave energy upon the solid fuel is now circulating through all polarization orientations, thus allowing a heating of the solid fuel independent of the solid fuel's orientation. In embodiments, the microwave energy entering the chamber 2910 may be of any polarization orientation, such as linear, circular, elliptical, or the like.

Microwave energy entering the chamber 2910 may be absorbed by the solid fuel, or reflected from it, where it is only the absorbed energy that contributes to heating the solid fuel. So reflected energy, which is sometimes also referred to as returned energy, may represent energy that is 'lost', and as such may contribute to energy inefficiency in the solid fuel treatment facility 132. Thus, the percent of energy that is returned may be referred to as return loss. Return loss may be specified as either a percentage, as in a 10% return loss, which is to say that 90% of the energy radiated into the chamber 2910 is absorbed by the solid fuel and 10% is reflected. Another way that return loss may be specified is by converting the percent ratio into decibels. For example, decibels, in this instance, are equal to ten times the log(base 10) of the ratio of the percent returned. That is, a 10% return loss would be equivalent to ten times the log of 0.1, which equals −10 dB. In the like, 1% return loss is equivalent to −20 dB, 2% return loss is equivalent to −17 dB, and the like. Alternately, decibels may be converted back to percent return loss by dividing by ten and performing the inverse log, resulting in such as −15 dB being approximately equivalent to 3.2% return loss. In embodiments, return loss may be used to compare a plurality of different configurations for presenting microwave energy from the magnetron 1800, into the chamber 2910, and absorbed/reflected by the solid fuel.

In embodiments, return loss may be energy that is not absorbed by the solid fuel, and may need to be absorbed by other means to help minimize the microwave energy from being reflected back up into the exit waveguide, which may then channel the energy back to the magnetron 1800. In an embodiment, the reflected energy may be absorbed by a water circulator, or the like. In addition, there may be configuration characteristics of the waveguide, chamber 2910, and solid fuel, which may help minimize return loss, such as the pattern of the chamber 2910, the pattern of the solid fuel in the chamber 2910, the shape of the exit opening from the waveguide that presents the microwave energy into the chamber 2910, impedance matching between the exit waveguide and the chamber 2910, and the like.

In embodiments, the minimization of return loss may be of primary concern when determining the optimum physical configuration for the waveguide and chamber, and the interface between the waveguide and the chamber. The waveguides may be of a plurality of shapes, such as elliptical, conical, circular, cylindrical, parabolic, and the like, where the shape of the waveguide may affect the propagation efficiency and polarization orientation of the microwave energy from the magnetron to the chamber. Waveguides may also have a plurality of inserts that may also effect the propagation efficiency and polarization orientation of the microwave energy, where inserts may be specifically for changes in polarization patterns, impedance matching, test points, and the like. Inserts may be any of a plurality of shapes, such as rectangular, oval, symmetrical, asymmetrical, and the like. In addition, the shape of the exit aperture from the waveguides to the chamber 2910 may be of a plurality of forms and shapes, such as in the shape of an ellipse, a circle, a parabola, a horseshoe, a slit, a cross slit, and the like, as well as in the three dimensional shape of a sphere, an ellipsoid, a paraboloid, or the like.

In embodiments, the shape of the waveguides, polarizing elements in the waveguides, exits from the waveguides into the chamber 2910, the chamber 2910, and the like, may provide different energy efficiencies for energy delivered to the solid fuel, and further, may be characterized in terms of return loss. In addition, the shape of waveguides, inserts in waveguides, exits from the waveguides into the chamber 2910, the chamber 2910, and the like, may provide different spatial coverage patterns across the solid fuel within the chamber 2910, which may include varying power intensities across the coverage pattern. In embodiments, both power efficiency, to maximize the power delivered to the chamber 2910, and spatial coverage patterns, to maximize the power delivered across samples of solid fuel within the chamber 2910, may be important considerations in the selected waveguide-exit-chamber configuration.

Figure 30:
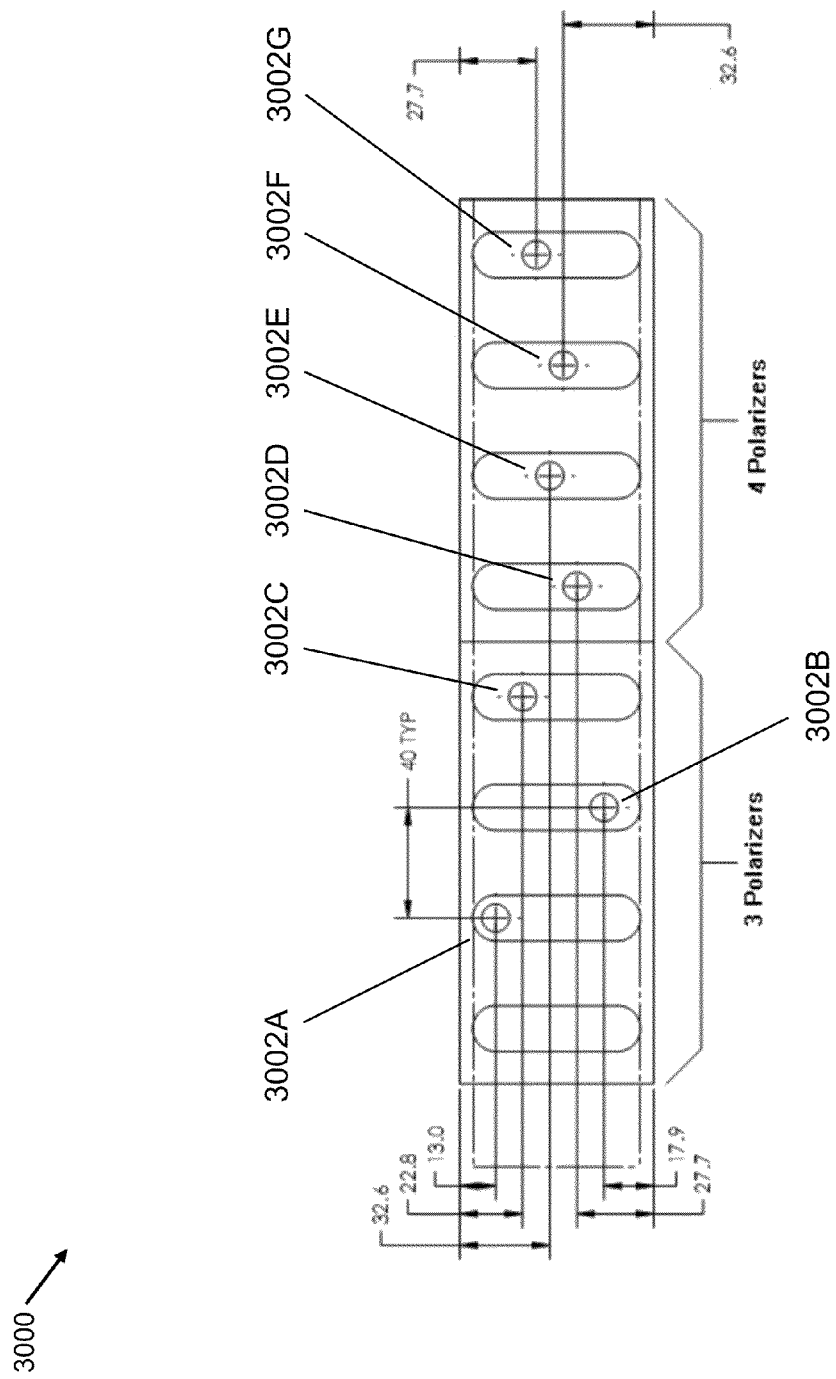
FIG. 30 depicts an arrangement of polarizers at a belt facility.

In embodiments, different spatial coverage patterns may meet the needs of the solid fuel treatment facility 132, such as providing a broad even coverage across an area of samples of solid fuel, providing a narrow strip of coverage across the belt 600 as samples of solid fuel are conveyed under the exit aperture, providing an array of exit apertures along the conveyor belt to maximize the overall coverage, and the like. For example, FIG. 30 shows an array 3000 of exit apertures 3002 along the belt 600 that would convey the solid fuel. In this instance, the solid fuel is brought in from the left, riding on the belt 600 through the chamber 2910. The first exit aperture 3002A of the array 3000 is near the top of the belt, and may provide microwave radiation to samples of solid fuel that travel along that portion of the belt. However, samples in the center, and towards the bottom of the belt, may not be provided with the maximum power intensity available from the first exit aperture 3002A. But as the conveyor belt 600 progresses to the right through the chamber, microwave radiation from other exit apertures 3002 may provide greater power intensity to those samples in the middle and bottom. For example, the second exit aperture 3002B may provide radiation to samples on the bottom of the belt in the figure, exit aperture 3002E may provide radiation to samples toward the middle of the belt in the figure, and so on, with other exit apertures placed in such a way that they may provide a total coverage area in the aggregate, so that by the time samples of solid fuel have reached the far right in the figure, that it has been provided sufficient radiation to satisfy the requirements of the solid fuel treatment facility 132.

In embodiments, exit apertures, whether a part of an array 3000 or placed to act individually, may produce different radiation patterns as per their different physical configurations, such as patterns produced by a circular polarizer, horned antenna, elliptical horned antenna, parabolic reflectors, and the like. In addition, these configuration patterns may be combined, such as in an array 3000, in any of a plurality of ways to produce an overall coverage of the solid fuel being conveyed through the chamber 2910.

Figure 31:
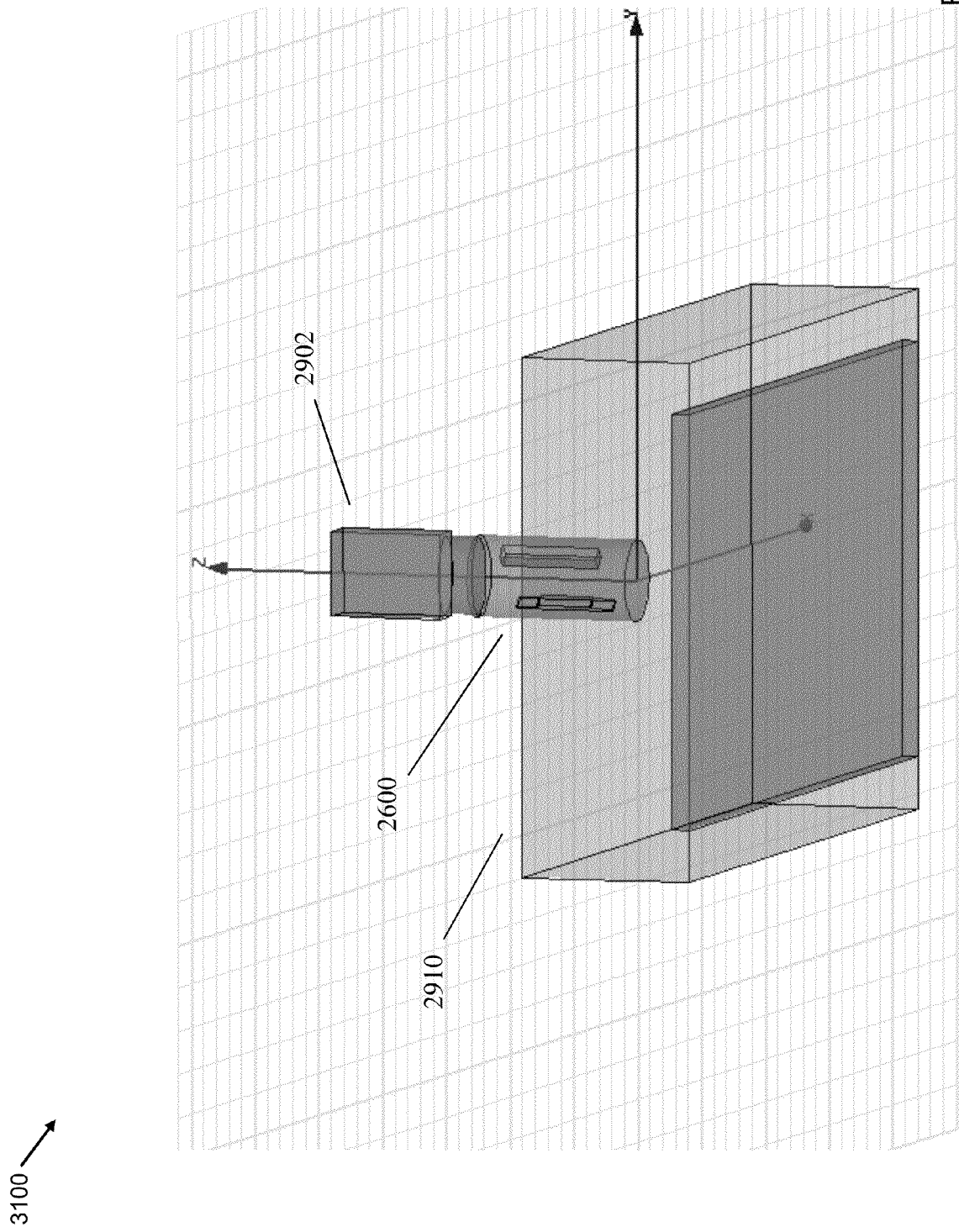
FIG. 31 depicts a circular polarizer assembly.
Figure 32:
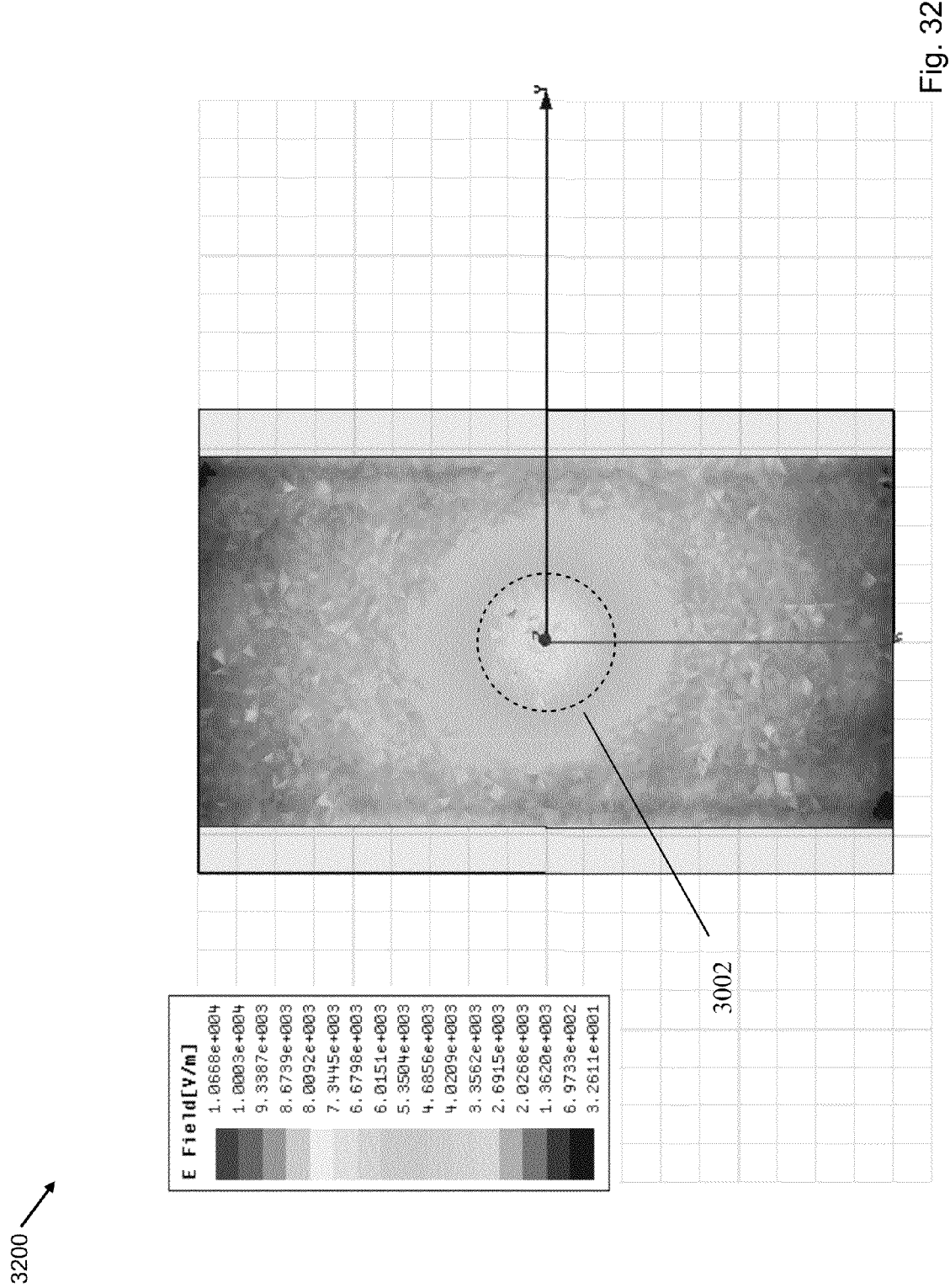
FIG. 32 depicts a radiation pattern of a circular polarizer assembly.
Figure 33:
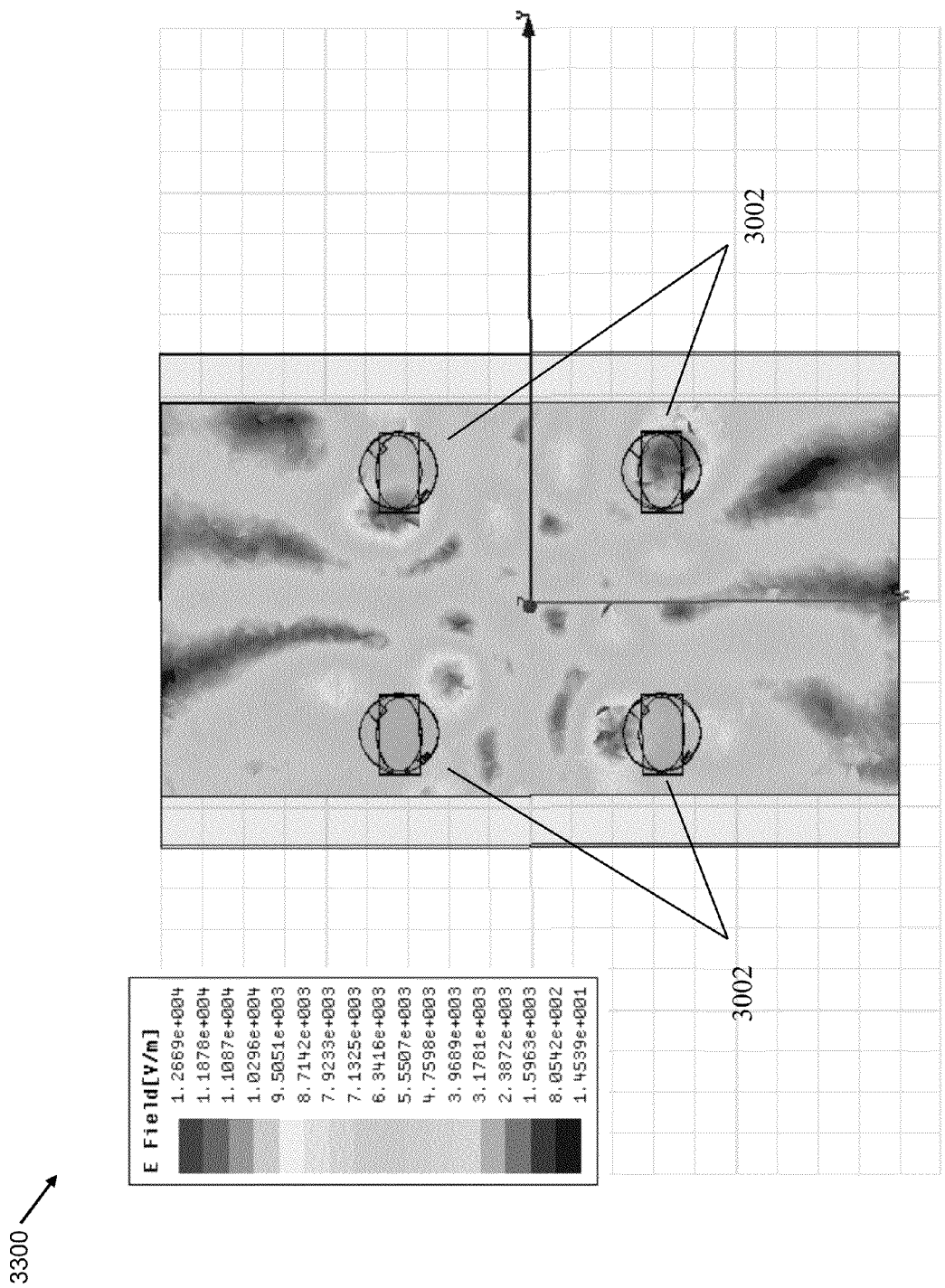
FIG. 33 depicts a radiation pattern of an array of circular polarizer assemblies.

In embodiments, one configuration in association with the exit aperture 3002 may be a circular polarizer assembly 2600, as described herein. FIG. 31 shows one such circular polarizer assembly 2600 configuration, being fed by a rectangular section of waveguide 2902, and exiting radiation axially into the chamber 2910. FIG. 32 shows one possible radiation pattern, as may impinge upon the belt in the chamber from the exit aperture 3002, which may result from such a circular polarization assembly 2600. FIG. 33 shows one possible resulting radiation pattern from an array of circular polarizer assembly 2600 exit apertures 3002. Note that this is only one of a plurality of possible array configurations, which may involve different numbers of exit apertures, different orientations of the circular polarizer, different sizes of exit aperture, different types of radiator configurations, and the like.

Figure 34:
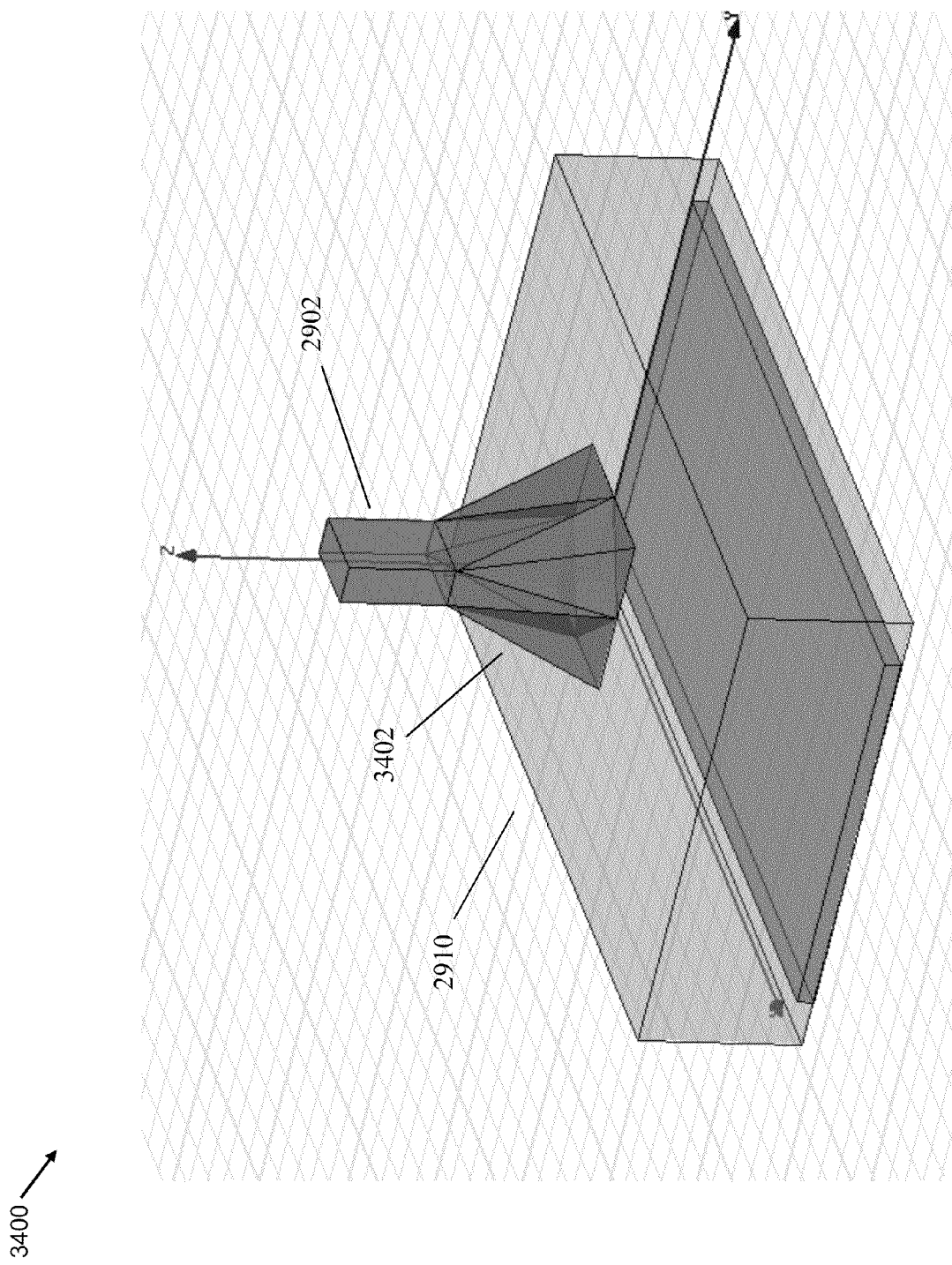
FIG. 34 depicts a tapered horn antenna assembly.
Figure 35:
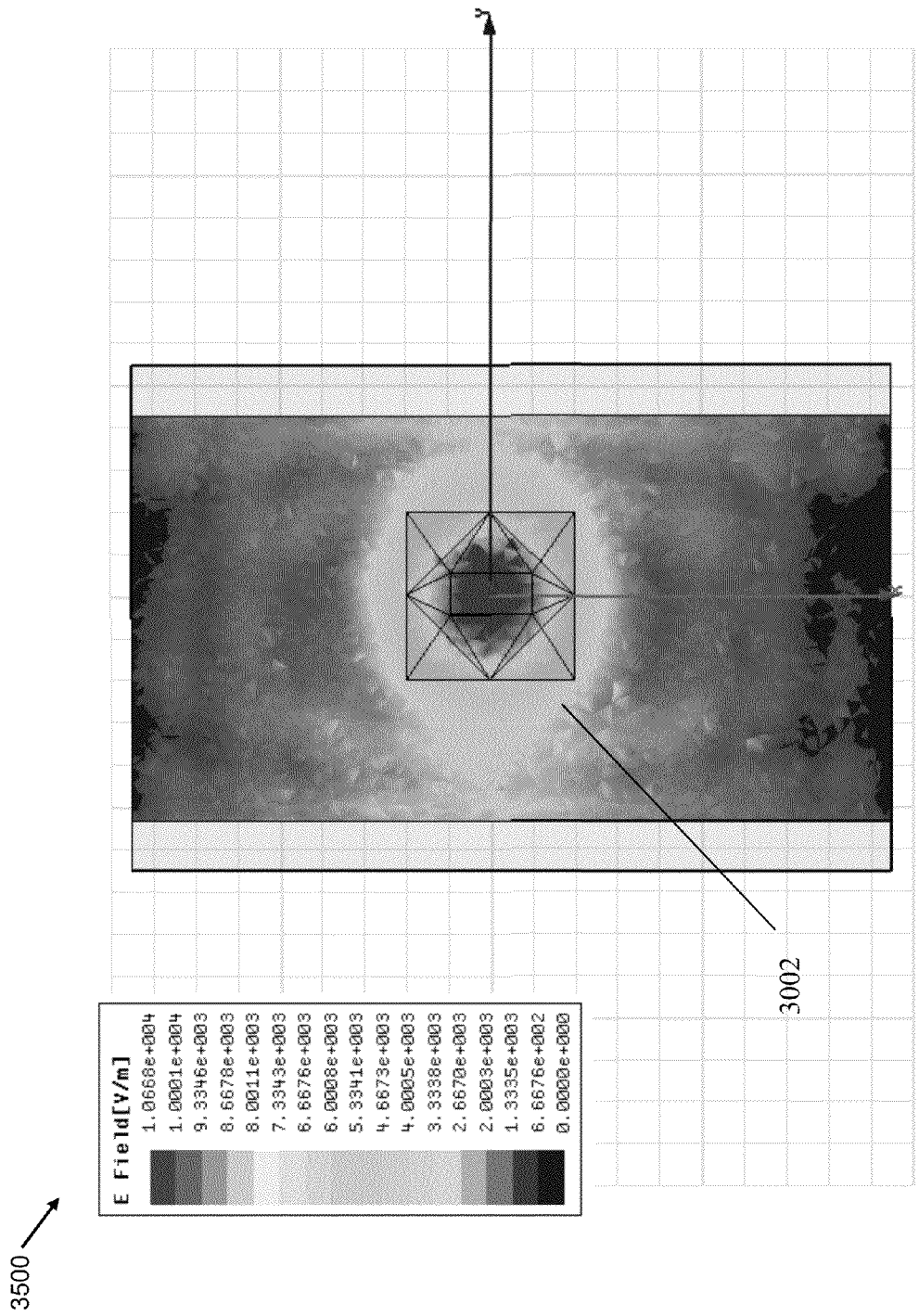
FIG. 35 depicts a radiation pattern of a tapered horn assembly.
Figure 36:
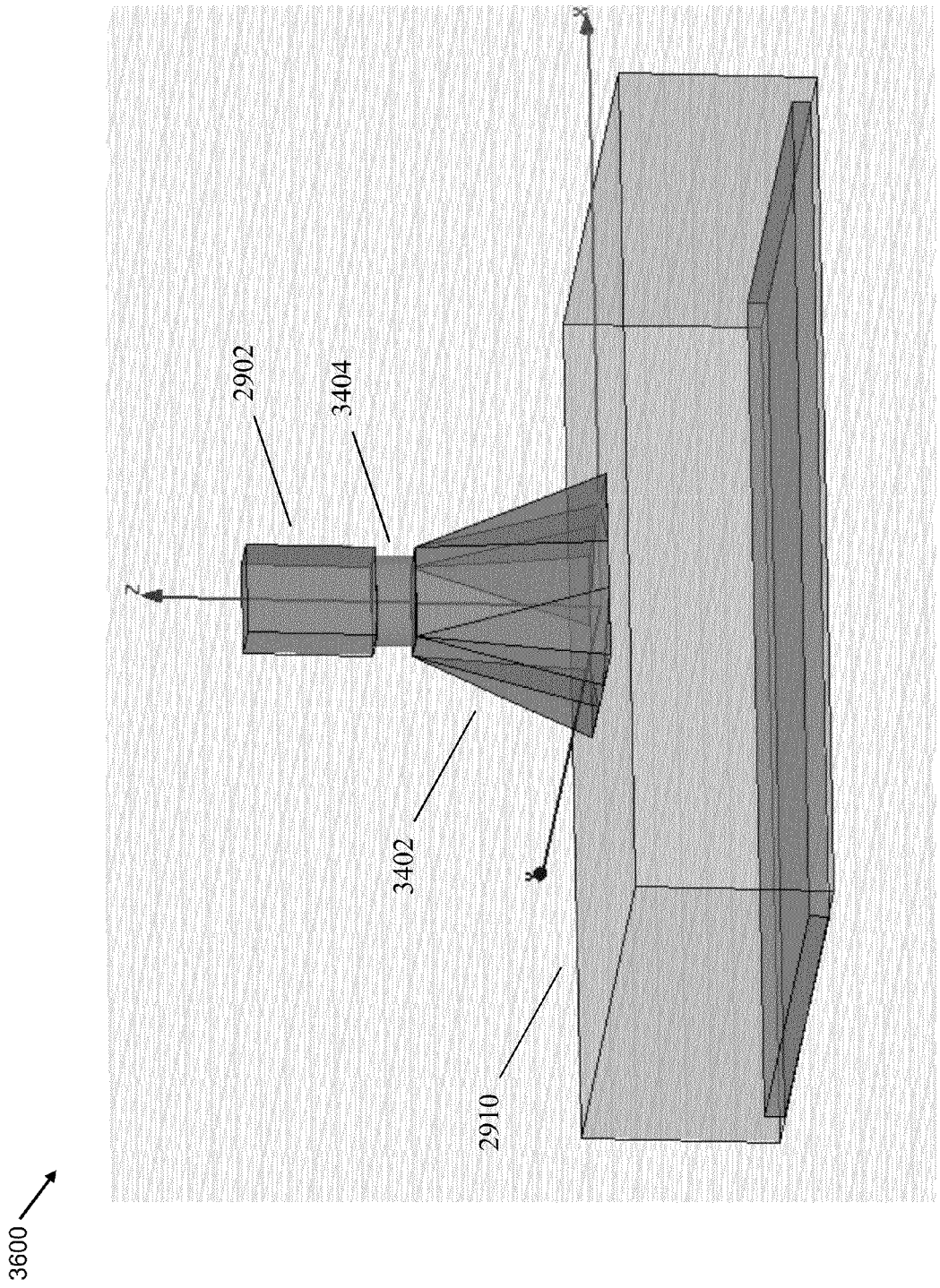
FIG. 36 depicts an alternate configuration of a tapered horn assembly.
Figure 37:
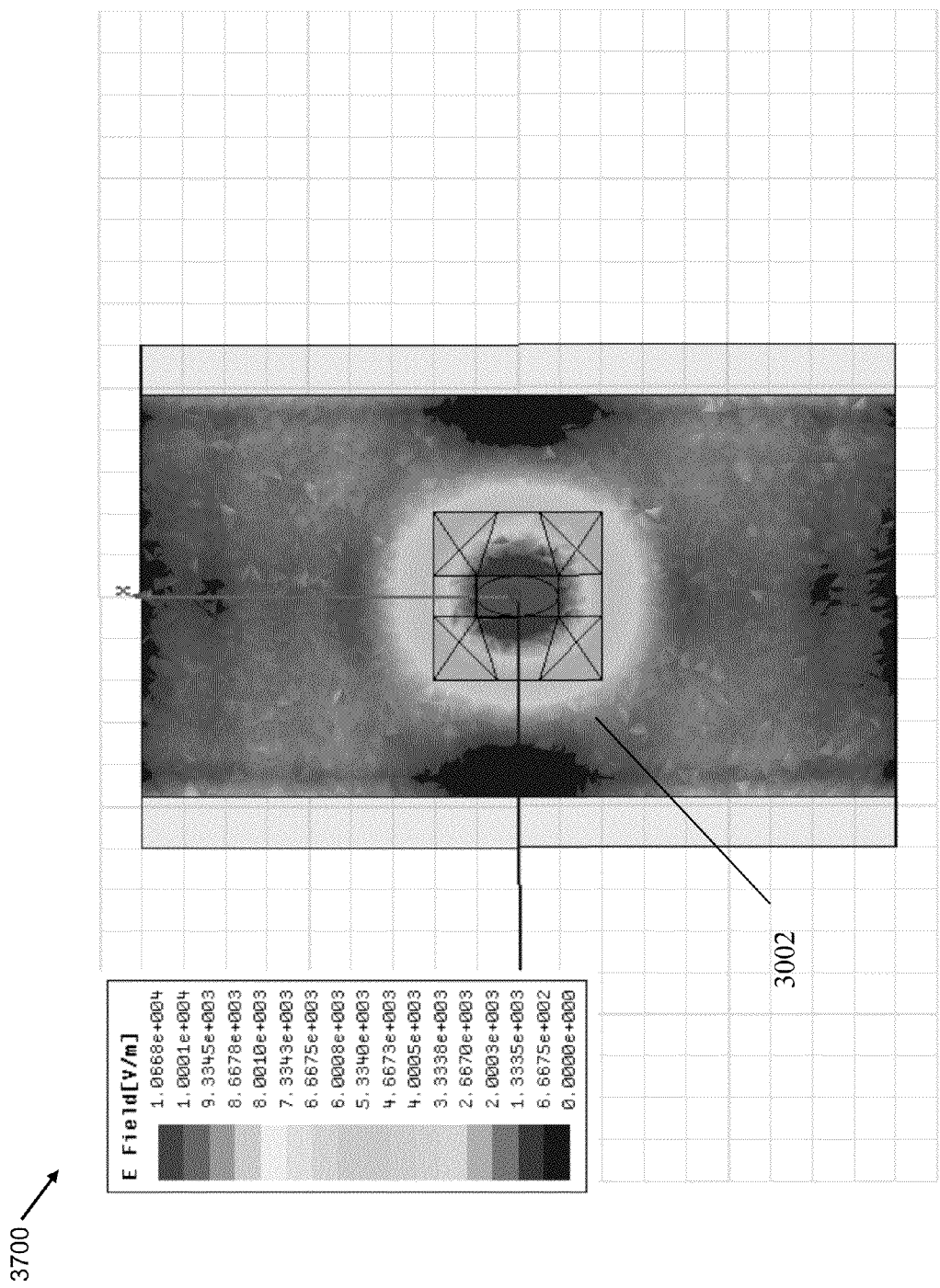
FIG. 37 depicts a radiation pattern of a tapered horn assembly.

In embodiments, one configuration in association with the exit aperture 3002 may be a horn antenna 3402, as shown in FIG. 34. In this case, the horn antenna 3402 is shown tapered, and as such, may make the impinging radiation field more uniform. FIG. 35 shows one possible radiation pattern, as may impinge upon the belt in the chamber 2910 from the exit aperture 3002, which may result from such a tapered horn antenna 3402. FIG. 36 shows an alternate configuration utilizing a tapered horn antenna, where there is an elliptical septum 3404 between the tapered horn antenna 3402 and the rectangular waveguide 2902. FIG. 37 shows one possible radiation pattern, as may impinge upon the belt in the chamber 2910 from the exit aperture 3002 from such an alternate configuration.

Figure 38:
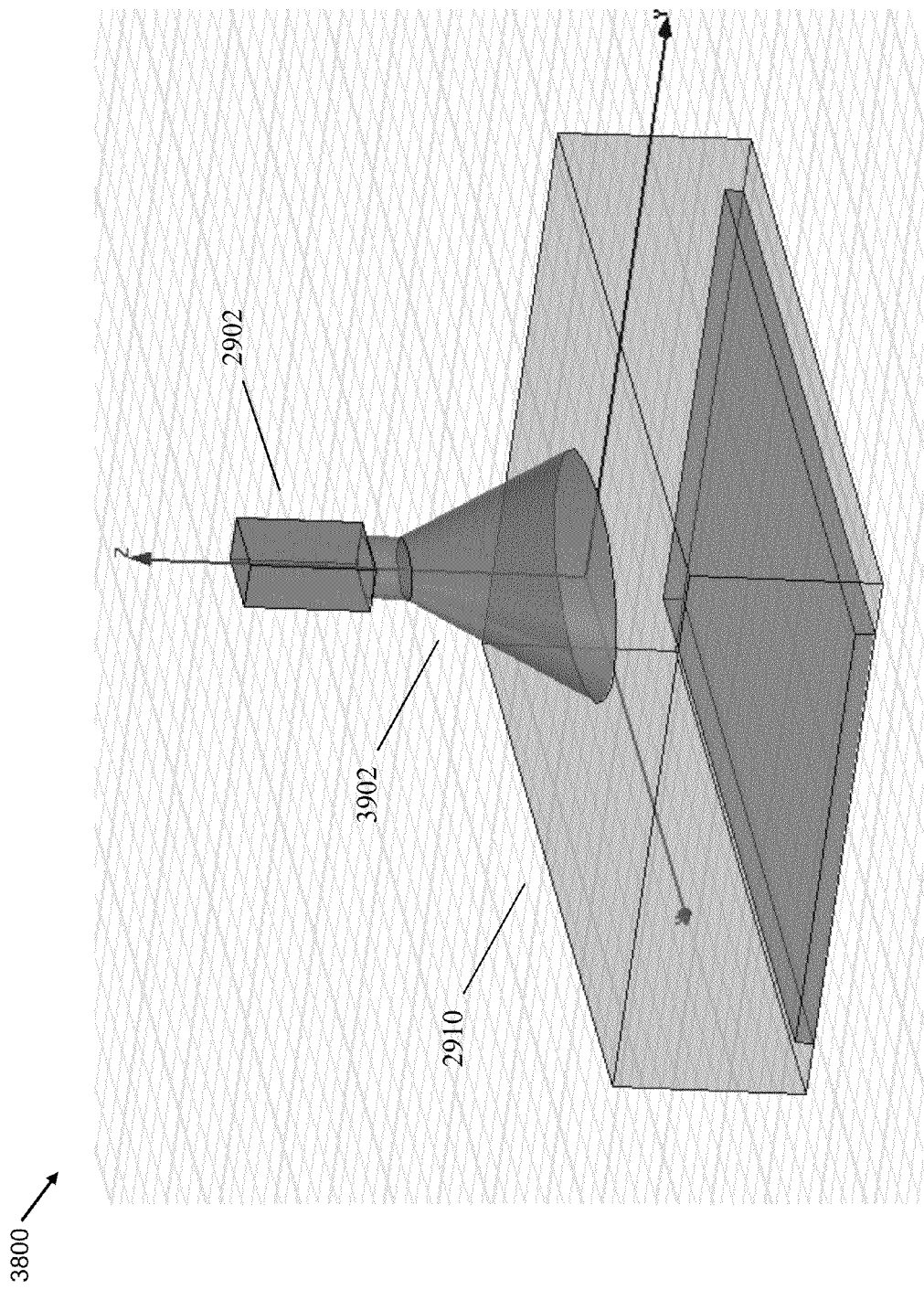
FIG. 38 depicts an elliptical horn antenna assembly.
Figure 39:
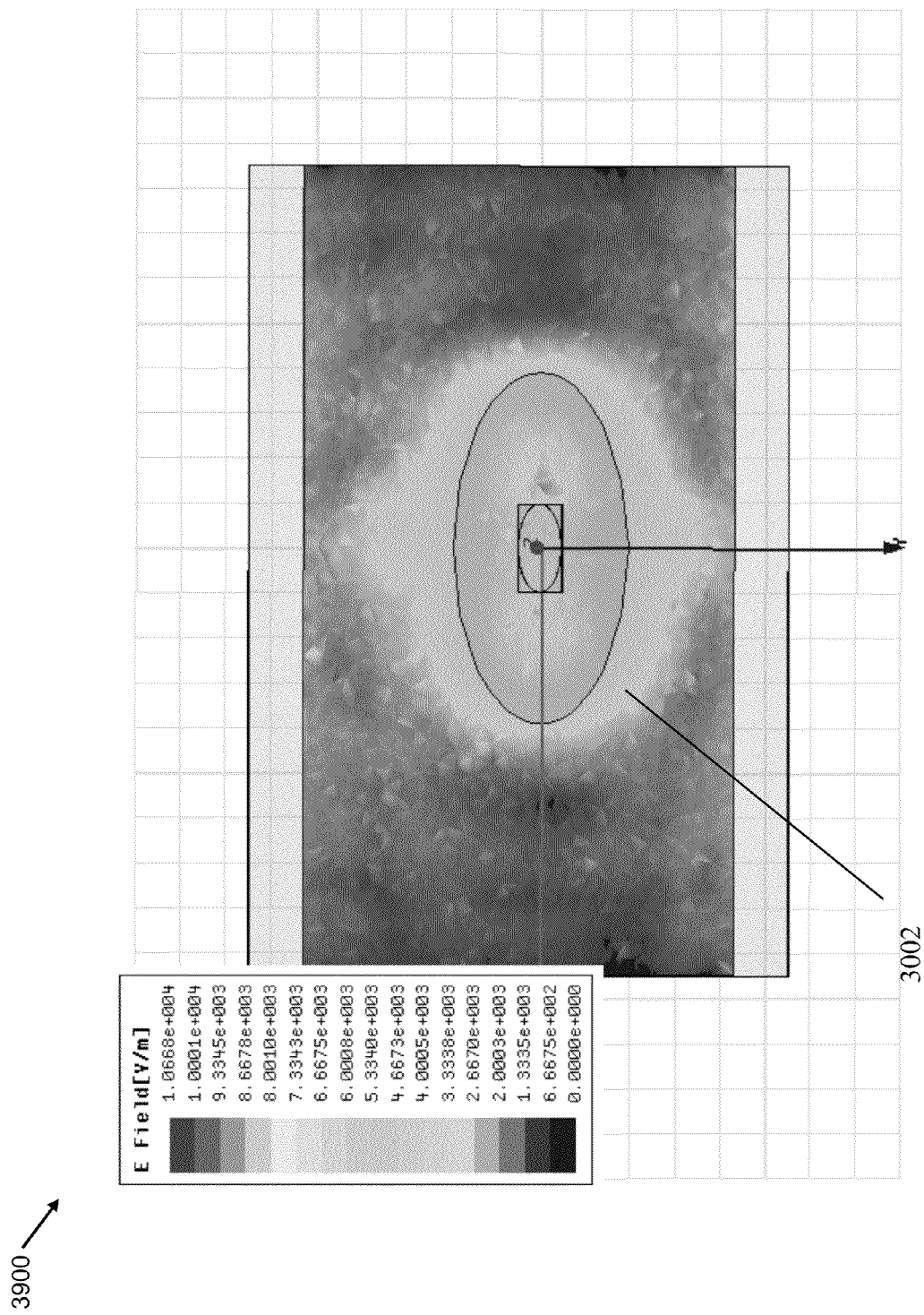
FIG. 39 depicts a radiation pattern of an elliptical horn antenna assembly.
Figure 40:
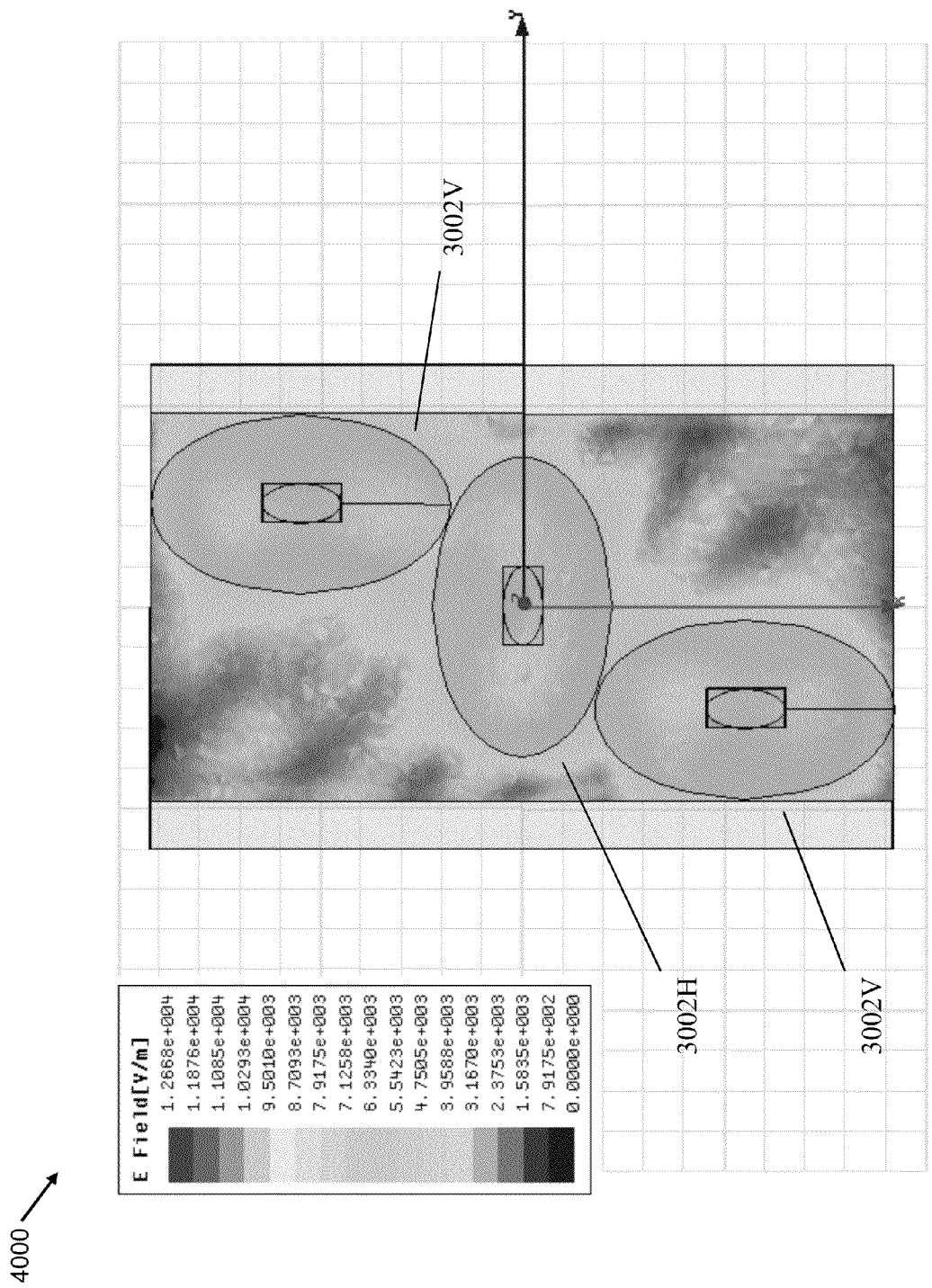
FIG. 40 depicts a radiation pattern of multiple elliptical horn antenna assemblies.
Figure 41:
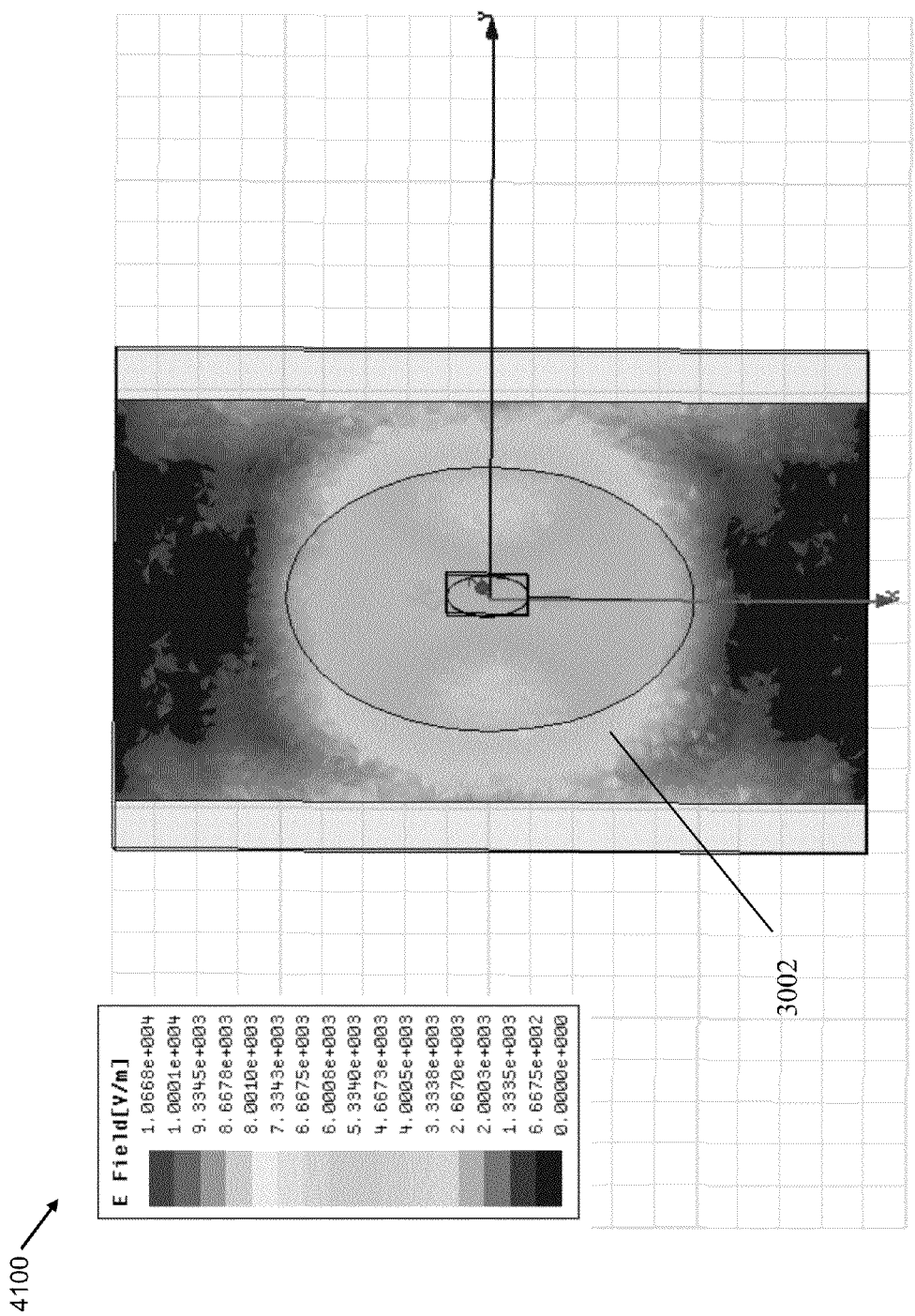
FIG. 41 depicts a radiation pattern of an elliptical horn antenna assembly.

In embodiments, one configuration in association with the exit aperture 3002 may be an elliptical horn antenna 3902, as shown in FIG. 38. In this case the elliptical horn antenna 3902 may have a width-to-height ratio of 2:1. FIG. 39 shows one possible radiation pattern, as may impinge upon the belt in the chamber 2910 from the exit aperture 3002, which may result from such an elliptical horn antenna 3902. FIG. 40 shows one possible resulting radiation pattern from an array of elliptical horn antenna exit apertures 3002, where two exit apertures 3002V are oriented vertically in the figure, and a third exit aperture 3002H is oriented horizontally. Note that this is only one of a plurality of possible array configurations, which may involve different numbers of exit apertures, different orientations of the elliptical horn antenna, different sizes of exit aperture, different types of radiator configurations, and the like. As one example of how the dimensions of the radiator may alter the radiation pattern, FIG. 41 shows the radiation pattern for an elliptical horn antenna with a width-to-height ratio of 1.5:1. Note the difference between the patterns of FIG. 39 and FIG. 41, where the field regions in FIG. 41 begin to show separation.

Figure 42:
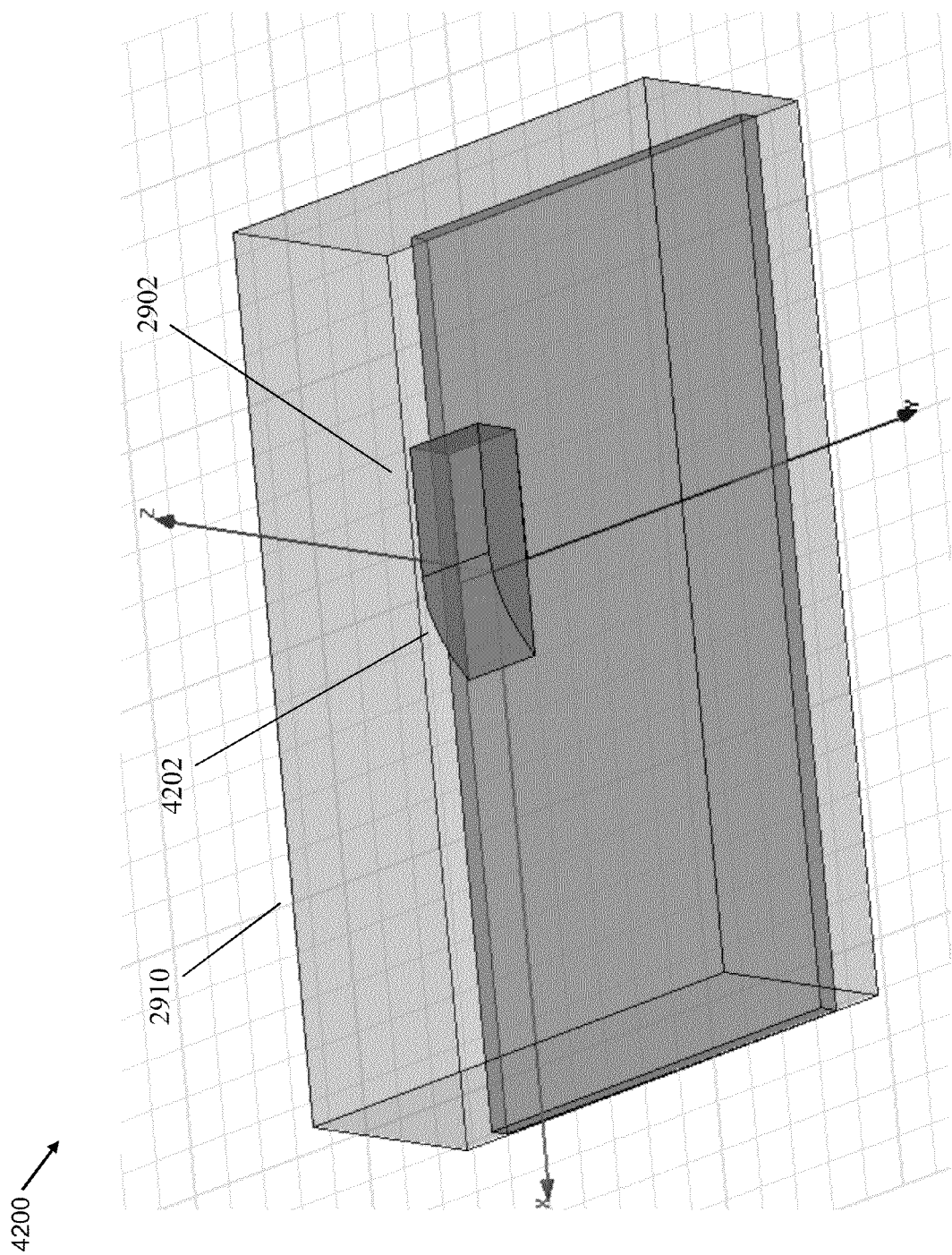
FIG. 42 depicts a parabolic reflector assembly.
Figure 43:
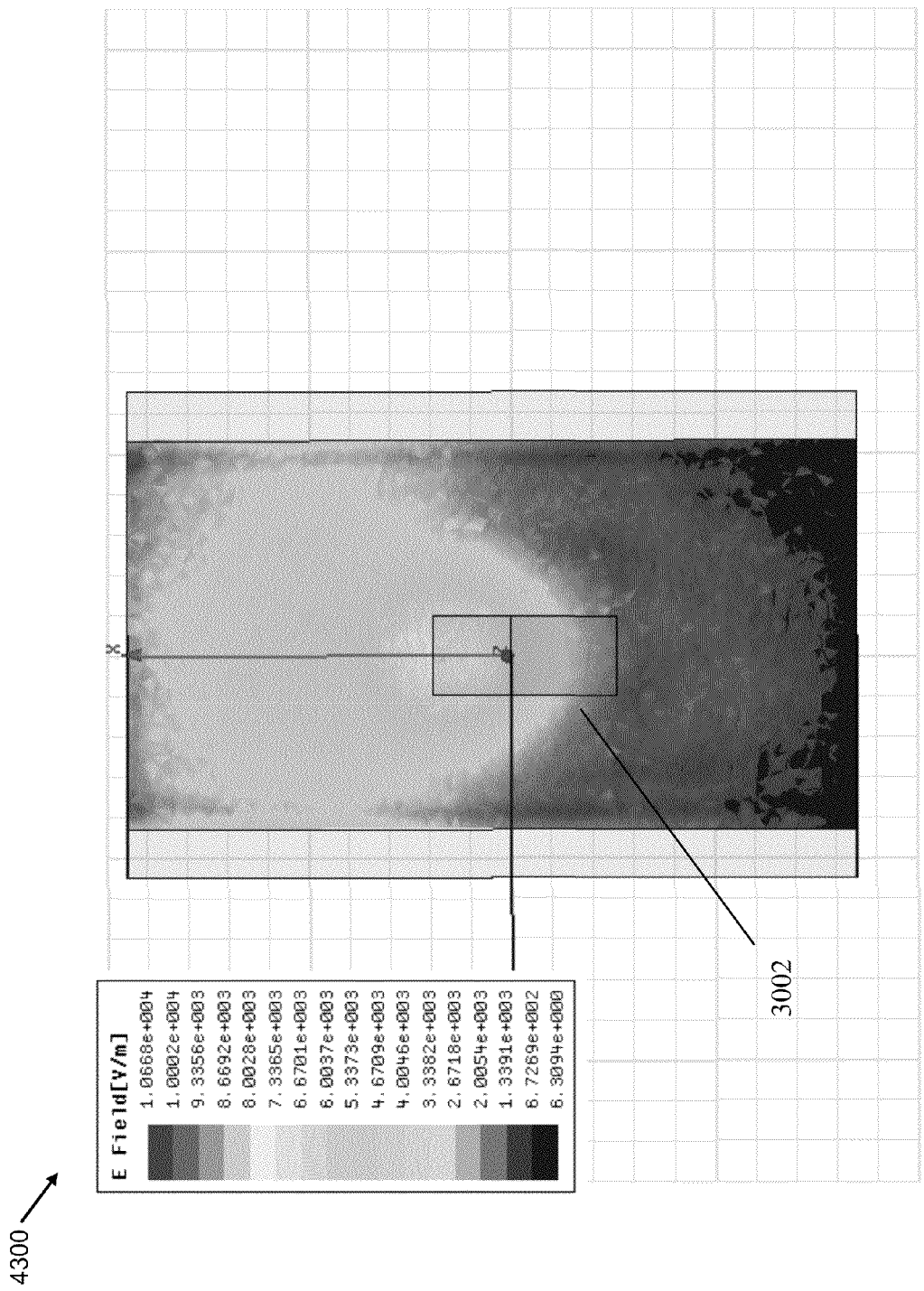
FIG. 43 depicts a radiation pattern of a parabolic reflector assembly.

In embodiments, one configuration in association with the exit aperture 3002 may be a parabolic antenna 4202, as shown in FIG. 42. In this case, the rectangular waveguide is shown oriented along the plane of the chamber 2910, and terminating at a parabolic shaped reflecting surface, under which is the opening of the exit aperture 3002. In this configuration, the radiation traveling down the rectangular waveguide 2902 may exit into the chamber upon reaching the opening of the exit aperture 3002. In addition, radiation may be reflected off the surface of the parabolic antenna 4202 and into the chamber 2910. FIG. 43 shows one possible resulting radiation pattern, as may impinge upon the belt in the chamber 2910 from the exit aperture 3002, which may result from such a parabolic antenna 4202. Note how the radiation pattern is flared out in the direction of propagation, reaching areas beyond the immediate area of the exit aperture 3002.

Figure 44:
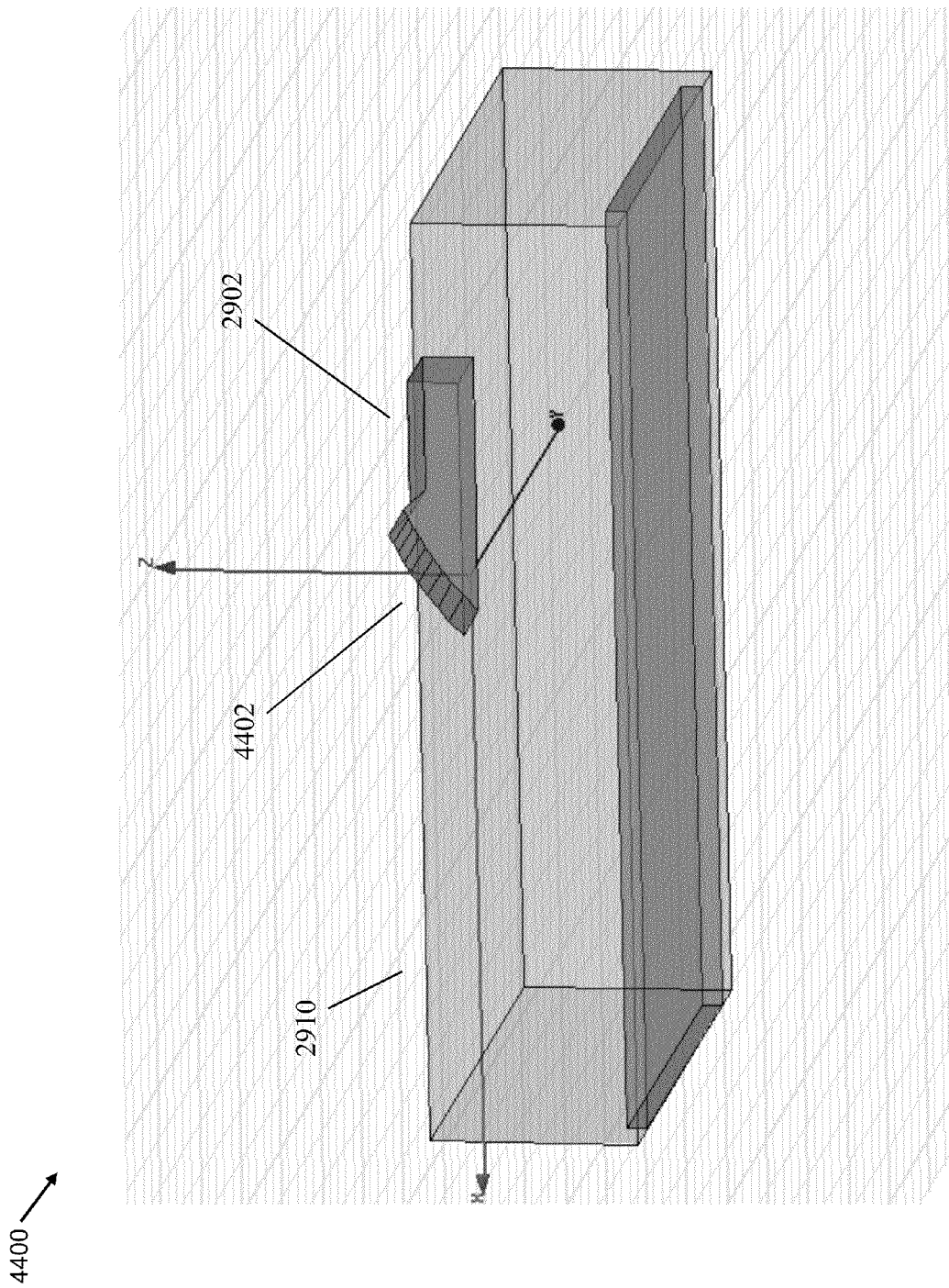
FIG. 44 depicts a parabolic reflector assembly with an extended parabolic surface.
Figure 45:
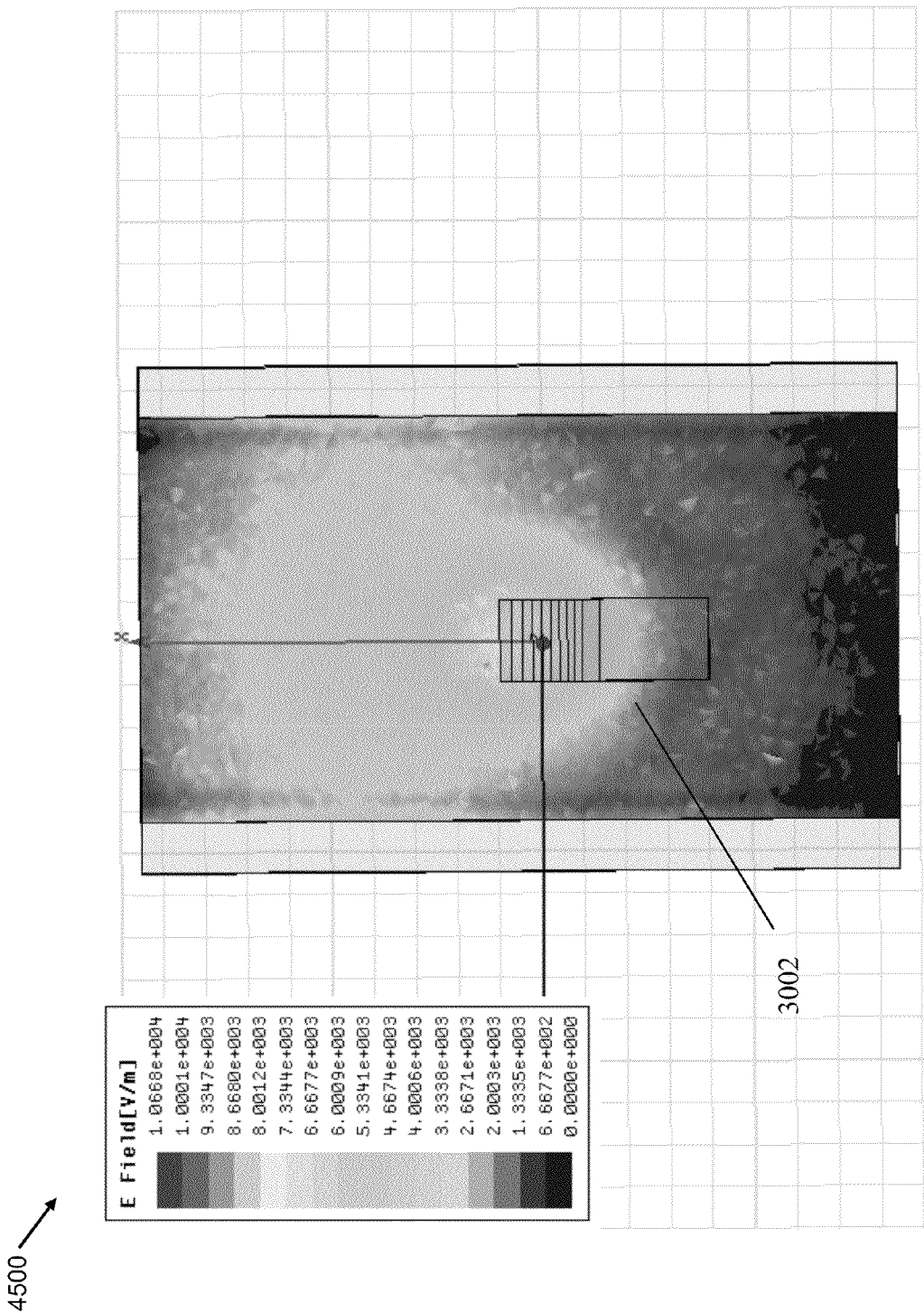
FIG. 45 depicts a radiation pattern for a parabolic reflector assembly with an extended parabolic surface.

In embodiments, one configuration in association with the exit aperture 3002 may be a parabolic antenna with an extended parabolic surface 4202, as shown in FIG. 44. In this case, the rectangular waveguide is shown oriented along the plane of the chamber 2910, and terminating at extended parabolic shaped reflecting surface, under which is the opening of the exit aperture 3002. In this configuration, the radiation traveling down the rectangular waveguide 2902 may exit into the chamber upon reaching the opening of the exit aperture 3002. In addition, radiation may be reflected off the surface of the extended parabolic antenna 4202 and into the chamber 2910. FIG. 45 shows one possible resulting radiation pattern, as may impinge upon the belt in the chamber 2910 from the exit aperture 3002, which may result from such an extended parabolic antenna 4202.

Although certain embodiments have been used to illustrate possible patterns of radiation upon the solid fuel that may result, it should be understood that any of a plurality of configurations, including arrays 3000 of radiators in a plurality of shapes, may be used to help establish the radiation pattern impingent upon the solid fuel. It should also be understood that although varying power levels may affect the power density of a radiator configuration, the shape of the distribution may remain the same. In addition, the energy distribution within the solid fuel may vary as a function of the shape of the solid fuel distribution, the composite shape of the radiation beamed to the solid fuel, the modes that are coupled, and the like.

In embodiments, the effectiveness and efficiency of the system may be monitored, such as monitoring of the temperature of the solid fuel, the input voltage to the magnetrons 1800, the loss of energy through the waveguide assembly, transmitted radiation intensity as measured through a power coupler in the waveguide, reflected radiation intensity as measured through a power coupler in the waveguide near the exit aperture, and the like. In addition, the distribution of solid fuel on the belt 600 may affect absorbed radiation, such as the thickness of the solid fuel, the density of the solid fuel, the filter or grate used, the particle sized and spatial distribution of the solid fuel, and the like. As a result, the input power to the system may be regulated as a function of the distribution of the solid coal on the belt 600.

Figure 19:
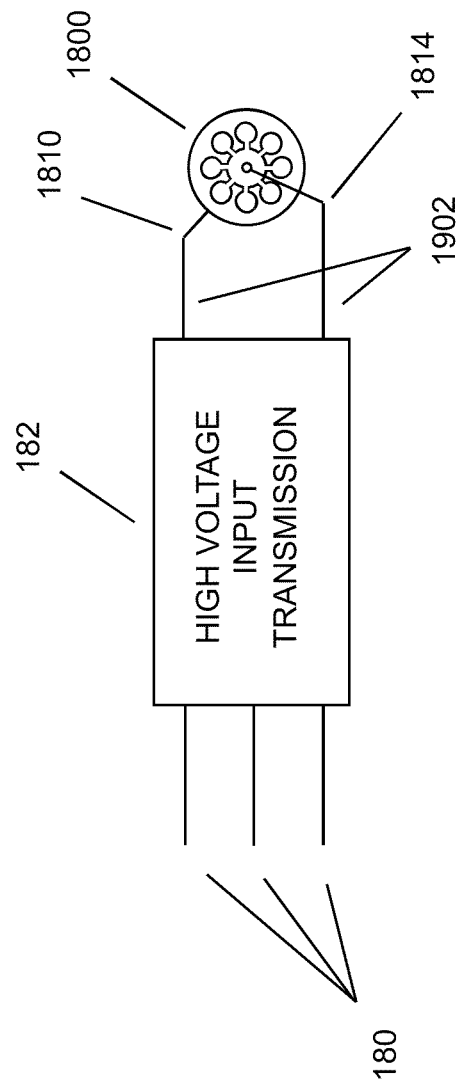
FIG. 19 depicts an embodiment of a high voltage supply facility for a magnetron.

FIG. 19 illustrates a high voltage supply facility for the magnetron 1800. High-voltage DC 1902 supplied through leads 1818 to the cavity magnetron 1800 for treatment of the solid fuel may be a high voltage such as 5,000 VDC, 10,000 VDC, 20,000 VDC, 50,000 VDC, or the like. In embodiments, a typical range for the high voltage may be 20,000-30,000 VDC. This high-voltage DC 1902 may be derived from an electric power utility in the form of a voltage that is single or multi-phase alternating current (AC) power in 180, and converted to high voltage DC 1902 through the high voltage input transmission 182 facility. The electric power utility supplying the AC voltage power in 180 may be a publicly operated facility or a privately operated facility for example. The AC voltage power in 180 supplied by the electric power utility may be 120 VAC, 240 VAC, 480 VAC, 1000 VAC, 14,600 VAC, 25,000 VAC, or the like. In embodiments, a typical voltage used on site may be 160 kV AC, and may be typically three-phase. Since it may be necessary to convert the utility AC voltage power in 180 to the high voltage DC 1902 used by the magnetron, some electrical power losses may result from the electrical inefficiencies of the high voltage input transmission 182 facility. It may be desirable to reduce these electrical power losses associated with the high voltage input transmission 182 facility in order to minimize the operational costs of the facility associated with the solid fuel treatment facility 132. A number of embodiments may be utilized in the configuration of the high voltage input transmission 182 facility.

Figure 20:
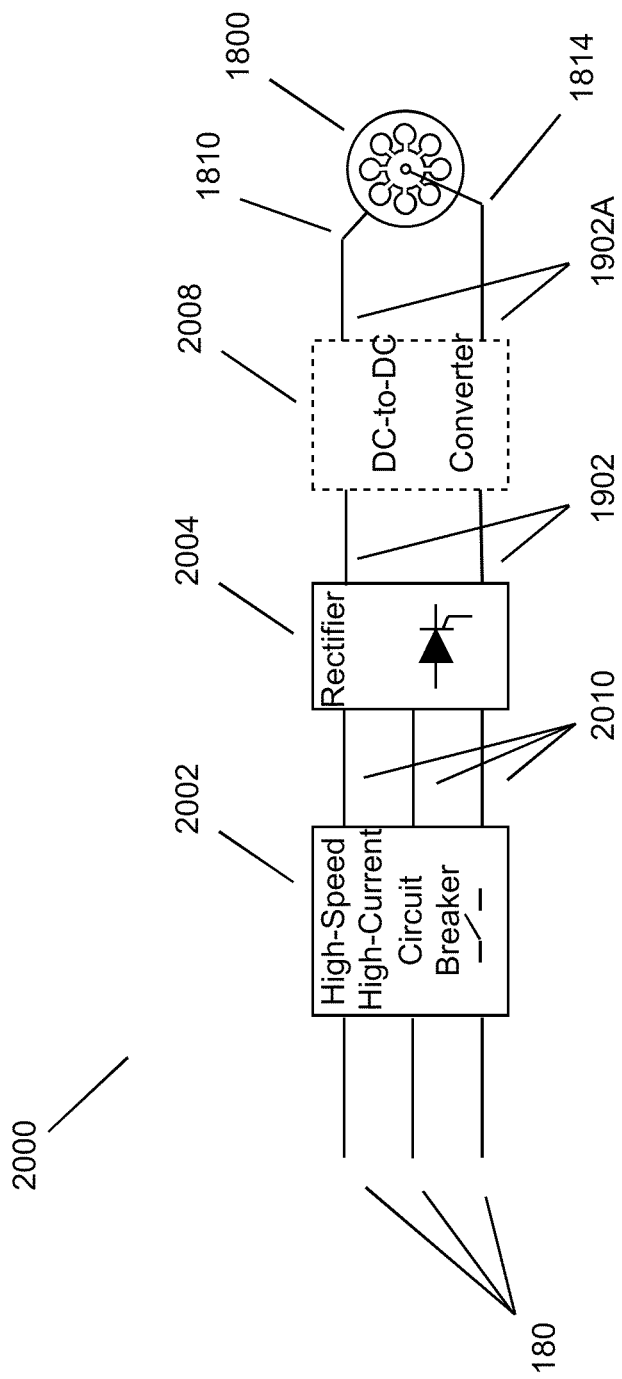
FIG. 20 depicts an embodiment of a transformerless high voltage input transmission facility.

FIG. 20 illustrates a transformerless high voltage input transmission facility 2000, which is one embodiment of the high voltage input transmission 182 facility. The transformerless high voltage input transmission facility 2000 may convert high voltage AC power in 180, in embodiments this may be 14,600 VAC, directly into the high voltage DC 1902 required by the magnetron 1800, in embodiments this may be 20,000 VDC. By converting directly from high-voltage AC power in 180 to high-voltage DC 1902, some intermediate steps may be eliminated which may allow for improved power efficiency and thus reduced operating costs of the solid fuel treatment facility 132. In embodiments, the eliminated steps may include the process of stepping down the utility high voltage AC power in 180 to a low-voltage AC, with say a transformer, rectifying to create low-voltage DC, and then stepping the DC back up again with a boost converter to the high voltage DC 1902A required by the magnetron. By eliminating these intermediate stages within the high voltage input transmission 182 facility both efficiency and reliability may be improved, as well as reducing capital and maintenance costs.

The first stage of the transformerless high voltage input transmission facility 2000 takes the high voltage AC power in 180 and passes it through a high-speed, high-current circuit breaker 2002, sometimes referred to as an interrupter. A circuit breaker is an automatically operated electrical switch that is designed to protect an electrical circuit from damage caused by overload or short-circuit. There is one high-speed, high-current circuit breaker 2002 for each phase of the input high-voltage AC power in 180 from the utility. The high-speed, high-current circuit breaker 2002 should be fast enough to open circuit in the event of a short-circuit condition within the transformerless high voltage input transmission facility 2000, to protect the utility's electrical distribution system. The high-speed, high current circuit breaker may provide electrical isolation and protection to the utility's electrical distribution system that would otherwise be provided by other components, such as a transformer 2102. The use of the high-speed, high-current circuit breaker 2002 in place of a transformer 2102 may allow greater electrical power efficiency, as the transformer 2102 has electrical power losses due to inefficiency, and the high-speed, high current circuit breaker may not. The high-speed, high-current circuit breaker 2002 may also serve to protect the magnetrons 1800 in the system. A surge, or spike of voltage, may collapse the field of the magnetrons 1800. This may cause the system to lose microwave power delivered to the solid fuel, and possibly cause damage to the magnetrons.

The second stage of the transformerless high voltage input transmission facility 2000 takes the high voltage AC 2010 output from the high speed, high current circuit breaker and sends it through a rectifier stage 2004, where it is converted to high-voltage DC 1902. A rectifier 2004 is an electrical device comprising one or more semiconductor devices, such as diodes, thyristors, SCRs, IGBTs, and the like, arranged for converting AC voltage to DC voltage. The output of a very simple rectifier 2004 may be described as a half-AC current, which is then filtered into DC. Practical rectifiers 2004 may be half-wave, full-wave, single-phase bridge, three-phase 3-pulse, three-phase 6-pulse, and the like, which when combined with filtering produce various reduced amounts of residual AC ripple. The resulting output high voltage DC 1902 of a rectifier 2004 may also be adjustable, for instance by changing the firing angle of the SCRs. This output high voltage DC 1902 may be adjusted up to a theoretical maximum of the peak value of the input AC voltage power in 180. As an example, an input AC voltage power in 180 of 14,600 VAC may theoretically produce a DC voltage that meets the required 20,000 VDC. If the high voltage DC 1902 meets the requirements of the input high voltage DC 1902A to the magnetron 1800, than the final DC-to-DC converter 2008 stage, shown as dashed in FIG. 20, may not be needed. Since DC-to-DC converters 2008 may have efficiencies of 80%, 85%, 95% and the like, by eliminating the need for them, further electrical power efficiencies for the solid fuel treatment facility 132 may be gained.

The third stage, if needed, of the transformerless high voltage input transmission facility 2000 is the DC-to-DC converter 2008. In this embodiment, there may still be a need for a DC-to-DC converter 2008 between the rectifier 2004 stage and the magnetron 1800 if the output high voltage DC 1902 from the rectifier is not high enough to meet the requirements of the high voltage DC 1902A inputs of the magnetron 1800. A DC-to-DC converter 2008 is a circuit, which converts a source of DC from one voltage to another. Generally, DC-to-DC converters perform the conversion by applying a DC voltage across an inductor or transformer for a period of time, for instance, in the 100 kHz to 5 MHz range, which causes current to flow through it and store energy magnetically. Then this voltage may be switched off, causing the stored energy to be transferred to the voltage output in a controlled manner. By adjusting the ratio of on-to-off time, the output voltage may be regulated even as the current demand changes. In this embodiment, the need for the DC-to-DC converter may be dependent upon the voltage level of the supplied high voltage AC power in 180. For example, in the case of a 12,740 VAC utility distribution voltage power in 180, the rectifier 2004 may provide a maximum high voltage DC 1902 that is less than 18,000 VDC. If the high voltage DC 1902A required by the magnetron 1800 is 20,000 VDC, then, in this case, the DC-to-DC converter 2008 stage may be required to boost the voltage to a higher voltage DC 802A in order to meet the requirements of the magnetron 1800.

The inclusion of a high-speed, high-current circuit breaker in the transformerless power conversion facility 2000 may also protect the power utility's electrical system from a non-electrical fault within the solid fuel treatment facility 132. Aside from electrical shorts due to equipment failure, the magnetron 1800 could arc-off due to a collapse of the field within the magnetron 1800. This arc-off condition may cause a large in-rush of current from the utility's electrical system. In embodiments, the high-speed, high current circuit breaker may protect the utility's electrical system from these high fault currents. An example of a condition that could lead to the magnetron 1800 arcing-off is excessive reflected power back into the magnetron 1800. There may typically be reflections back into the magnetron 1800 during operations, and the magnetron's 1800 circulator (isolator) is designed to protect the magnetron 1800 from damage due to this reflected power by absorbing the reflected power into water circulating in the circulator. In some embodiment, the belt facility 130 is equipped with a beam splitter to split any microwave energy that may escape from the applicator into the circulator. A circulator may be a passive, non-reciprocal device with three or more ports used to transmit microwave energy in a specific direction. Additionally, circulators may be used to prevent reflected microwave energy from the magnetron preventing excessive magnetron heating or moding. An isolator may be a circulator with an absorbing load attached to the port used to transmit the reflected energy that is generated from the magnetron and is transmitted to the load port and absorbed.

However, failure of the circulator may result in the magnetron 1800 arcing-off. So although the system is designed to tolerate reflected power, failures within the system may still produce the large rush of current associated with the magnetron 1800 arcing-off. This is only one example of a condition that could lead to high in-rush currents from the utility's electrical system. Under any high current condition that lasts more than a couple of cycles of 60 Hz, the power distribution system feeding the facility may experience a failure that could potentially cause the tripping of breakers back through the utility's distribution and transmission system, possibly all the way back to the utility's generation faculty. Even variations in the product stream within the solid fuel treatment facility 132 may cause large reflections and lead to arc-off. Other fault conditions that could result in high in-rush currents will be obvious to one skilled in the art. This, and all other high current fault conditions, may be eliminated by the presence of the high-speed, high-current circuit breaker. The transformerless high voltage input transmission facility 2000 may provide the greatest electrical power efficiency and fault protection due to the elimination or reduction of inefficiencies within the high voltage input transmission 182 facility.

Figure 21:
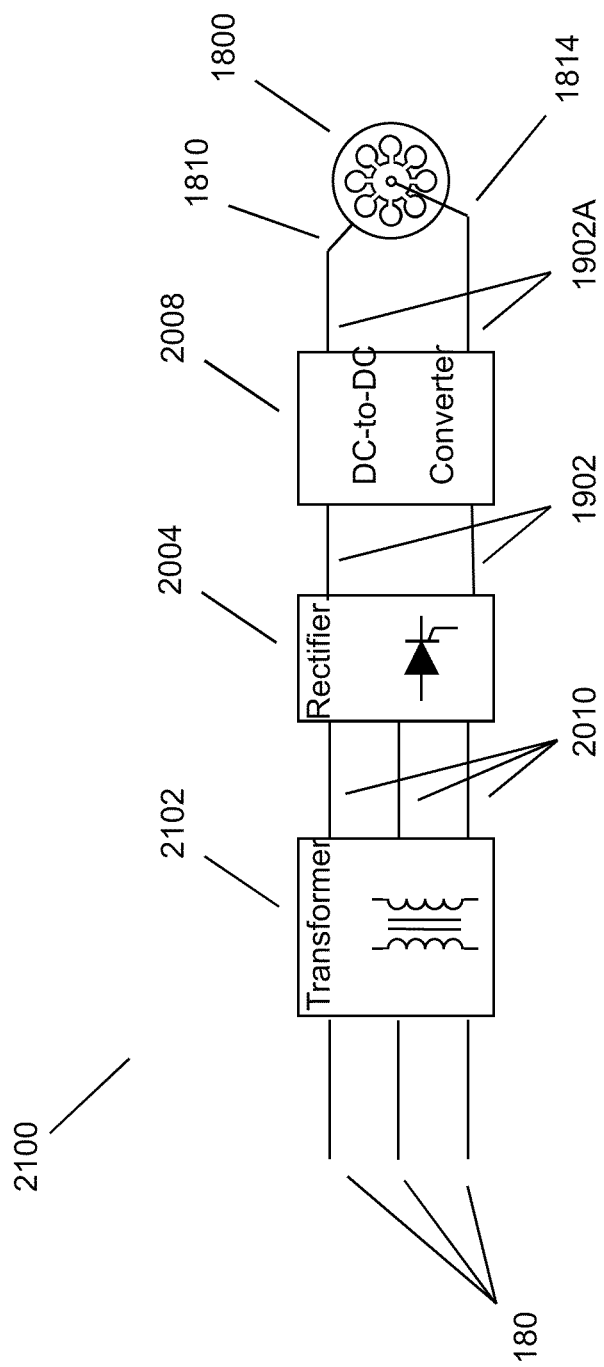
FIG. 21 depicts an embodiment of a high voltage input transmission facility with a transformer.

FIG. 21 illustrates a high voltage input transmission facility with a transformer 2100, which is one embodiment of the high voltage input transmission 182 facility. This power conversion configuration for delivering high voltage DC to the magnetron 1800 is performed in three steps. In the first step, high voltage AC power in 180 is transformed into low voltage AC 2010 with a transformer 2102. A transformer 2102 may be an electrical device that transfers energy from one electrical circuit to another by magnetic coupling. A transformer 2102 comprises two or more coupled windings, and may also have a magnetic core to concentrate the magnetic flux. In FIG. 21, the input AC voltage power in 180 applied to one winding, referred to as the primary, creates a time-varying magnetic flux in the core, which induces an AC voltage 2010 in the other winding, referred to as the secondary. Transformers 2102 are used to convert between voltages, to change impedance, and to provide electrical isolation between circuits. For example, the high voltage AC power in 180 input in FIG. 21 may be 14,600 VAC, and the low voltage AC 2010 output may be 480 VAC. In addition to these AC voltages being different, they may also be electrically isolated from one another. The transformer 2102 may be a single-phase transformer, multiple single-phase transformers, a banked set of transformers, a multi-phase transformer, or the like. Further, the transformer may be provided by the electric power utility. The transformer may have electrical power inefficiency associated with the conversion from one voltage to another, and this inefficiency may be associated with voltage and current of the input and output of the transformer 2102.

In the second step of the high voltage input transmission facility with a transformer 2100 configuration, the low voltage AC 2010 is passed through a rectifier 2004 stage to produce an equivalent low voltage DC 1902. As an example, an input AC voltage 2010 of 480 VAC may theoretically produce an output DC voltage 1902 as high as 677 VDC. The voltage of 677 VDC may not be sufficient to supply the high voltage DC needs of the magnetron. In this event a third DC-to-DC converter 2008 stage may be required, where the low voltage DC 1902 from the rectifier 2004 is stepped up to the required high voltage DC 1902A, say 20,000 VDC, using a DC-to-DC converter 2008.

The high voltage input transmission facility with a transformer 2100 embodiment may take advantage of standard three-phase, low voltage, transformer arrangements available from the utility. One example of such an arrangement is the three-phase, 4-wire, 480/277 V transformer that typically delivers power to large buildings and commercial centers. The 480 V is utilized to run motors, while the 277 V is used to operate the florescent lights of the facility. For 120 V convenience outlets, separate transformers may be required, which may feed from the 480V line. Other examples of standard three-phase voltages may utilize 575-600 V, rather than 480 V, which may reduce the need for the third DC-to-DC converter 2008 stage. These examples are not meant to be limiting, and other configurations will be obvious to one skilled in the art. Utilization of a standard utility transformer may eliminate the need for special equipment from the utility, and may therefore reduce the initial cost of this embodiment. However, the operating power losses associated with transforming the AC voltages down, and then the converting the DC voltages back up again, may be undesirable, as it may increase the operational costs of the solid fuel processing facility.

Figure 22:
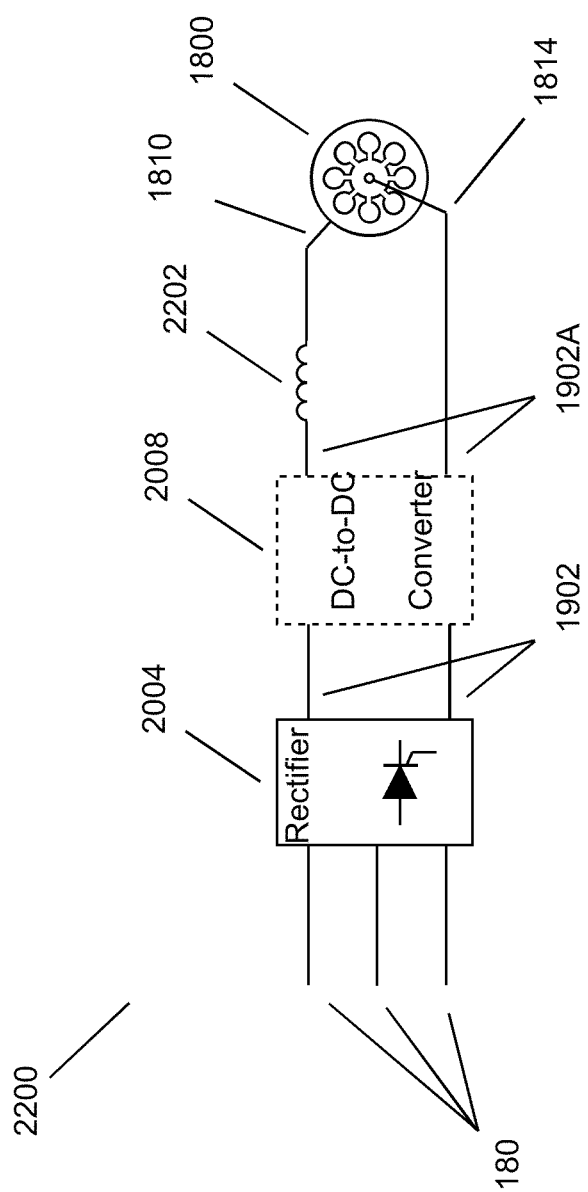
FIG. 22 depicts an embodiment of a transformerless high voltage input transmission facility with inductor.

FIG. 22 illustrates a transformerless high voltage input transmission facility with inductor 2200, which is a variation of the previously discussed transformerless power conversion facility 2000, and is one embodiment of the high voltage input transmission 182 facility. This embodiment is similar to the transformerless high voltage input transmission facility 2000 in that it has no transformer 2102, but rather than feeding the high voltage AC power in 180 through a high speed, high current circuit breaker for protection, the high voltage AC power in 180 is fed directly into the rectifier 2004. As was the case in the transformerless power conversion facility 2000, the rectifier 2004 output high voltage DC 1902 may be sufficient so that a DC-to-DC converter 2008 may not be required. A purpose of the high speed, high current circuit breaker 2002 in the transformerless high voltage input transmission facility 2000 was to provide protection to the utility's electrical distribution system in the event of a short-circuit within the solid fuel treatment facility 132. The high speed, high current circuit breaker 2002 may have provided a faster response circuit breaker than the electric power utility normally provides. This faster speed may be needed because of the absence of an isolating transformer. The transformerless high voltage input transmission facility with inductor 2200 provides an alternative short-circuit protection component, a high current inductor 2202 in series with the magnetron 1800. The inductor 2202 slows the short-circuit response time, providing standard utility low speed utility circuit breakers enough time to respond, open, and protect the utility's electrical power distribution system. The inductor, under DC conditions, doesn't affect the circuit, and acts as a virtual short in the line. But if a short-circuit condition occurred within the solid fuel treatment facility 132, the inductor would react to slow the current response, delaying the effect of the short-circuit. This delay may allow enough time so that standard utility circuit breakers may be utilized, which may eliminate the need for the high-speed, circuit breaker 2002.

Figure 23:
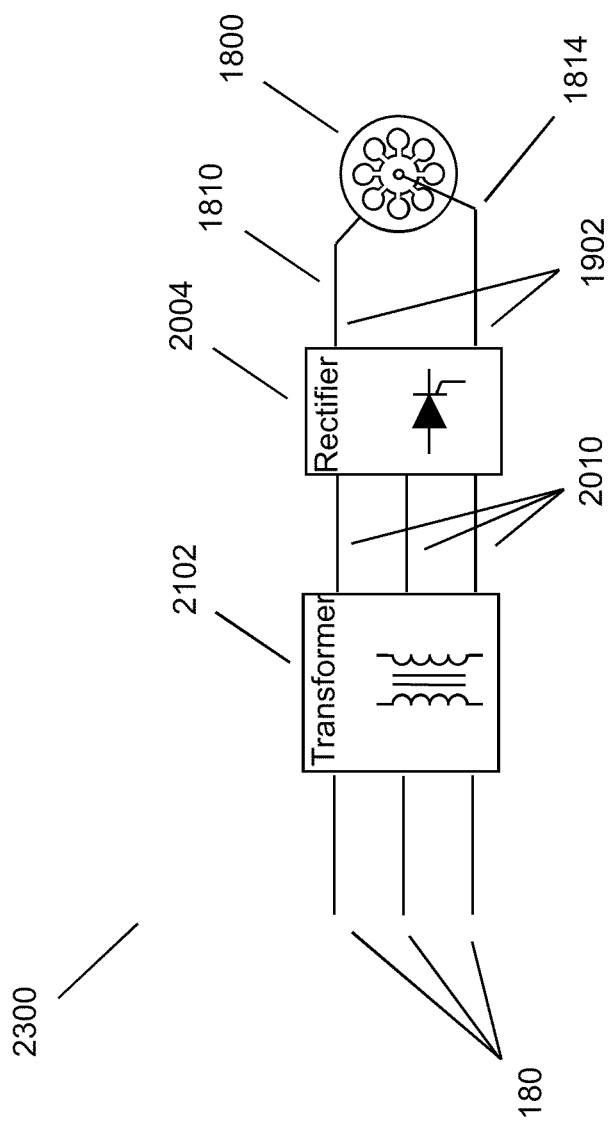
FIG. 23 depicts an embodiment of a direct DC high voltage input transmission facility with a transformer.
Figure 24:
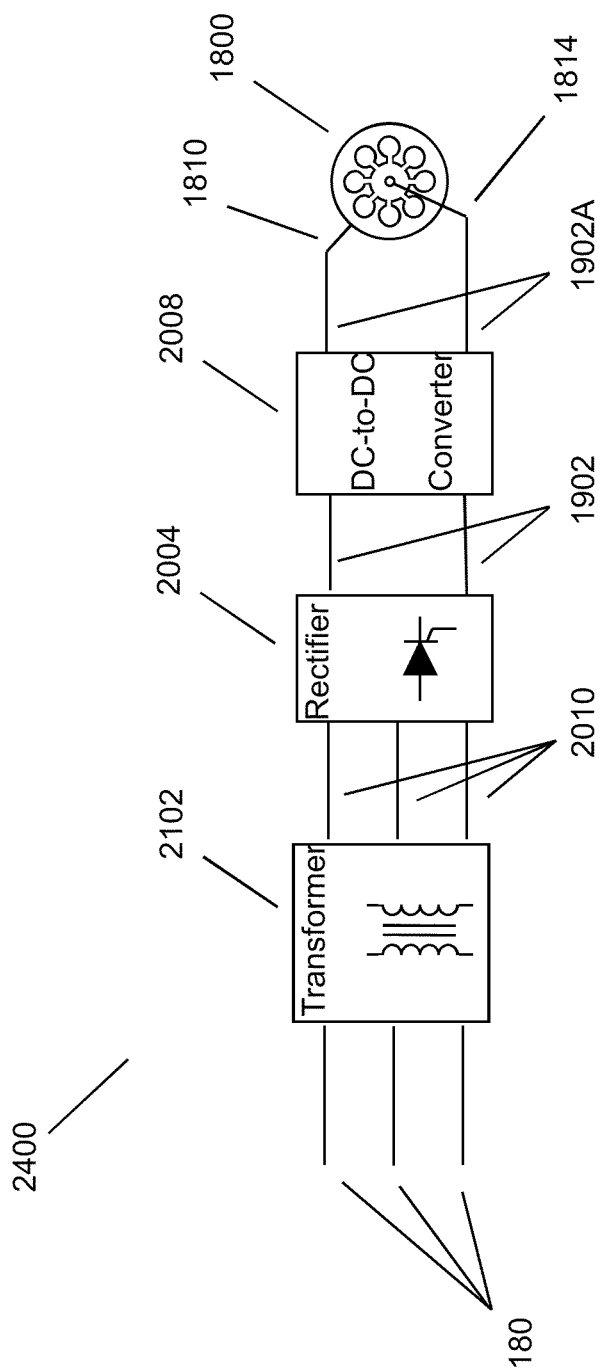
FIG. 24 depicts an embodiment of a high voltage input transmission facility with transformer isolation.

FIG. 23 illustrates a direct DC high voltage input transmission facility with a transformer 2300, which is one embodiment of the high voltage input transmission 182 facility. This power conversion configuration for delivering high voltage DC 1902 to the magnetron 1800 is performed in two steps. In the first step, high voltage AC power in 180 may be stepped up or down, as required, using a transformer 2102. The transformer's input-to-output voltage ratio may be determined by the available input high voltage AC power in 180 and the required output high voltage DC 1902 used by the magnetron 1800. In the second step, the high voltage AC 2010 from the output of the transformer 2102 is sent through a rectifier 2004 stage. The rectifier 2004 converts the input high voltage AC 2010 into the high voltage DC 1902 required by the magnetron 1800. The voltage ratio of the transformer 2102, and the output adjustment of the rectifier 2004, may both be selected based on the input high voltage AC power in 180 and the requirements for the output high voltage DC 1902 to the magnetron 1800. For example, the solid fuel treatment facility 132 may be located in a geographic region where a utility-supplied high voltage AC power in 180 distribution voltage of 80,000 VAC is available. If the magnetron 1800 required a high voltage DC 1902 of 20,000 VDC, then the high voltage DC 2010 input to the rectifier 2004 may be selected to be a voltage level that would, say, produce the smallest output voltage ripple, or greatest conversion efficiency for the rectifier 2004. This selected input high voltage DC 2010 may be for example 16,000 VDC. In this case, the voltage ratio for the transformer may be 5:1, which represents the ratio of the primary windings to secondary windings of the transformer 2102. The 80,000 VAC high voltage AC power in 180 input would then be stepped down to a high voltage AC 2010 of 16,000 VAC. The 16,000 VAC high voltage AC 910 would then be converted to the high voltage DC 1902 by the rectifier 2004, and supplied to the magnetron 1800 of the solid fuel treatment facility 132. This embodiment may allow for a higher efficiency associated with a high voltage input transmission 182 facility that keeps high voltage throughout, while maintaining the fault isolation afforded to by the transformer 2102. These are several illustrative embodiments, but that one skilled in the art would appreciate variations, and such variations are intended to be encompassed by the present invention.

FIG. 23 illustrates a high voltage input transmission facility with transformer isolation, which is one embodiment of the high voltage input transmission 182 facility. This power conversion configuration for delivering high voltage DC 1902A to the magnetron 1800 utilizes the transformer 2102 to electrically isolate the high voltage input transmission 182 facility from the utility's high voltage AC power in 180 distribution system. In this configuration the transformer 2102 may only be acting as an electrical isolator, and not performing a change in voltage function. The input high voltage AC power in 180 to the transformer 2102 may be the same voltage as the output high voltage AC 2010 output from the transformer. With the high voltage AC 2010 unchanged as a result of the transformer 2102, the function of changing the voltage level to the high voltage DC 1902A required by the magnetron 1800 may be accomplished primarily by the DC-to-DC Converter 2008. The high voltage AC 2010 at the output of the transformer is sent through the rectifier 2004, where the high voltage AC 2010 is converted to high voltage DC 1902. As a result of rectification, the voltage level of the high voltage DC 1902 may be somewhat higher than the high voltage AC 2010 at the input of the rectifier, but may be limited to a small percentage increase. If the high voltage DC 1902 does not meet the high voltage DC 1902A required by the magnetron 1800, than the DC-to-DC converter 2008 may act as the component in the high voltage input transmission 182 facility that provides most of the voltage changing function. In embodiments, this configuration may provide a way for the high voltage input transmission 182 facility to provide high voltage DC 1902A to the magnetron 1800 with electrical isolation to the utility's high voltage AC power in 180. A decrease in the electrical power inefficiencies due to the transformer may be realized with this configuration.

In embodiments, the power requirements for the solid fuel treatment facility 132 may be high, and may require high voltage lines, for example, 160 kV power transmission lines. The power requirements may be high enough to justify the design and construction of power substations on site with the solid fuel treatment facility 132. These power substations may be uniquely designed for the solid fuel treatment facility 132, and as such, may allow for the selection of high voltage levels that are best suited to the voltage requirements of the magnetrons. In this case, the requirement for a DC-to-DC converter 2008 may be eliminated.

In embodiments, when a transformer 2102 is used in any of the high voltage systems, there may be associated electrical safety and power management circuitry.

Referring again to FIG. 1, as the microwave systems 148 apply power, frequency, and duty cycles to a particular coal process station, non-coal products may be released from the coal. A sensor system may be used to determine the rate of non-coal product removal, complete non-coal product removal, environmental settings, actual microwave system 148 output, and the like. The sensor system 142 may include sensors for water vapor, ash, sulfur, volatile matter or other substances released from the coal. In addition, the sensor system 142 may include sensors for microwave power, microwave frequency, gas environment, coal temperature, chamber temperature, belt speed, inert gas, and the like. The sensors may be grouped together or may be spaced along the belt facility 130 as required to properly sense the processes of the coal treatment. There may be multiple sensors for the same measurement value. For example, a water moisture sensor may be positioned at a microwave system 148 station and another water moisture sensor may be positioned after the microwave system 148 station. In this example, the sensor arrangement may allow the sensing of the amount of water vapor being removed at the microwave station 148 itself and the amount of residual water vapor removed as the coal leaves the microwave system station 148. In a setup such as this, the first sensor may be used to determine if the proper power level, frequency, and duty cycle is being used and the second sensor may determine if a redundant microwave system 148 process should be executed to remove water adequately from the coal. Similar methods may be used with any of the other sensors of the sensor system 142.

The sensor readings may be received by a parameter control facility 140 that may have a sensor interface for each type of sensor used by the sensor system 142. The parameter control facility 140 may be able to read both digital and analog sensor readings. The parameter control facility 140 may use an analog to digital converter (ADC) to convert any analog readings to a digital format. After receiving the sensor data, the parameter control facility 140 may transmit the sensor readings to both the controller 144 and the monitoring facility 134. The controller 144 may use the sensor readings to display the actual coal process data on its user interface where a user may be able view the data versus the actual settings and carry out manual overrides to the operational parameters as appropriate.

In the exemplary embodiment, the monitor facility 134 may receive the actual coal process data and compare them to the required coal process parameters to determine if the coal treatment process is producing the coal desired characteristics 122. The monitoring facility 134 may maintain at least two sets of coal treatment parameters, the target parameters that may have been provided by the parameter generation facility 128, and the actual coal process data provided by the parameter control 140. The monitoring facility 134 may compare the required parameters and the actual parameters to determine if the coal treatment operational parameters are producing the coal desired characteristics 122. The parameter generation facility 128 may have also provided the monitoring facility 134 with a set of tolerances that must be maintained by the coal treatment process in order to produce the coal desired characteristics 122. The monitoring facility 134 may use a set of algorithms to determine if any operational parameter adjustments need to be made. The algorithms may compare the actual sensor 142 data with the basic operational parameters and operational parameter tolerances in determining any adjustments to the operational parameters.

Additionally, the monitoring facility 134 may receive final treated coal data from a feedback facility 174 that may contain data from a coal output parameters 172 facility and a testing facility 170. The monitoring facility 134 algorithms may use the data received from the feedback facility 174 along with the in-process data received from the sensor system 142 to adjust the coal treatment operational parameters.

The monitoring facility 134 may be able to adjust one or all of the operational parameters of the belt facility 130 in real time.

After the monitoring facility 134 adjusts the operational parameters, the monitoring facility 134 may store the adjusted operational parameters as the new operational parameters and then transmit the new operational parameters to the controller 144.

The controller 144 may determine that at least one new operational parameter has been received from the monitoring facility 134 and may transmit the new operational parameters to the various belt facility 130 devices that may include the microwave system 148.

Using the above described process of providing operational parameters, sensing the actual process values, interpreting the actual process values, adjusting the operational parameters as required, and transmitting the adjusted operational parameters to the belt facility 130, certain embodiments may provide a real time feedback system that may continually adjust for changing conditions within the coal treatment process.

It would be understood by someone knowledgeable in the art that the above feedback system may be applied to any of the systems and facilities of the belt facility 130.

In the exemplary coal treatment process, non-coal products may be released from the coal in the form of gas or liquids. The removal system 150 may be responsible for removing the non-coal products from the belt facility 130; the removal system 150 may remove non-coal products such as water, ash, sulfur, hydrogen, hydroxyls volatile matter and the like. The removal system 150 and the controller 144 may receive sensor information from the sensor system 142 as to the volume of non-coal products that may be released from the coal treatment process.

There may be more than one removal system 150 in the belt facility 130 to remove gas and/or liquids. For example, there may be a water vapor removal system 150 at a microwave system 148 station with another removal system 150 after the microwave system 148 station to collect the residual water vapor that may continue to be released after the microwave system 148 station. Or, as another example, one removal system 150 may remove water vapor while another removal system 150 may remove ash, sulfur, or other materials.

The controller 144 may provide operational parameters to the removal system 150 to control fan speeds, pump speeds, and the like. The removal system 150 may utilize a feedback system similar to the microwave system 148 feedback system previously described. In such a feedback system, sensors may provide information to the parameter control 140 and the monitoring facility 134 to provide real time feedback to the removal system 150 for efficient removal of non-coal products.

The removal system 150 may collect the coal treatment released gases and liquids from the belt facility 130 and transfer the collected non-coal products to a containment facility 162. The containment facility 162 may collect the non-coal products from the belt facility 130 in at least one containment tank or container. The monitoring facility 134 may monitor the containment facility 162 to determine the level of non-coal product and may provide this information to a user interface viewable by a computer device accessing the solid fuel treatment facility 132. The monitoring facility 134 may also determine when the containment facility 162 is sufficiently full that the contents of the tank or container should be transferred to a treatment facility 160.

Figure 17:
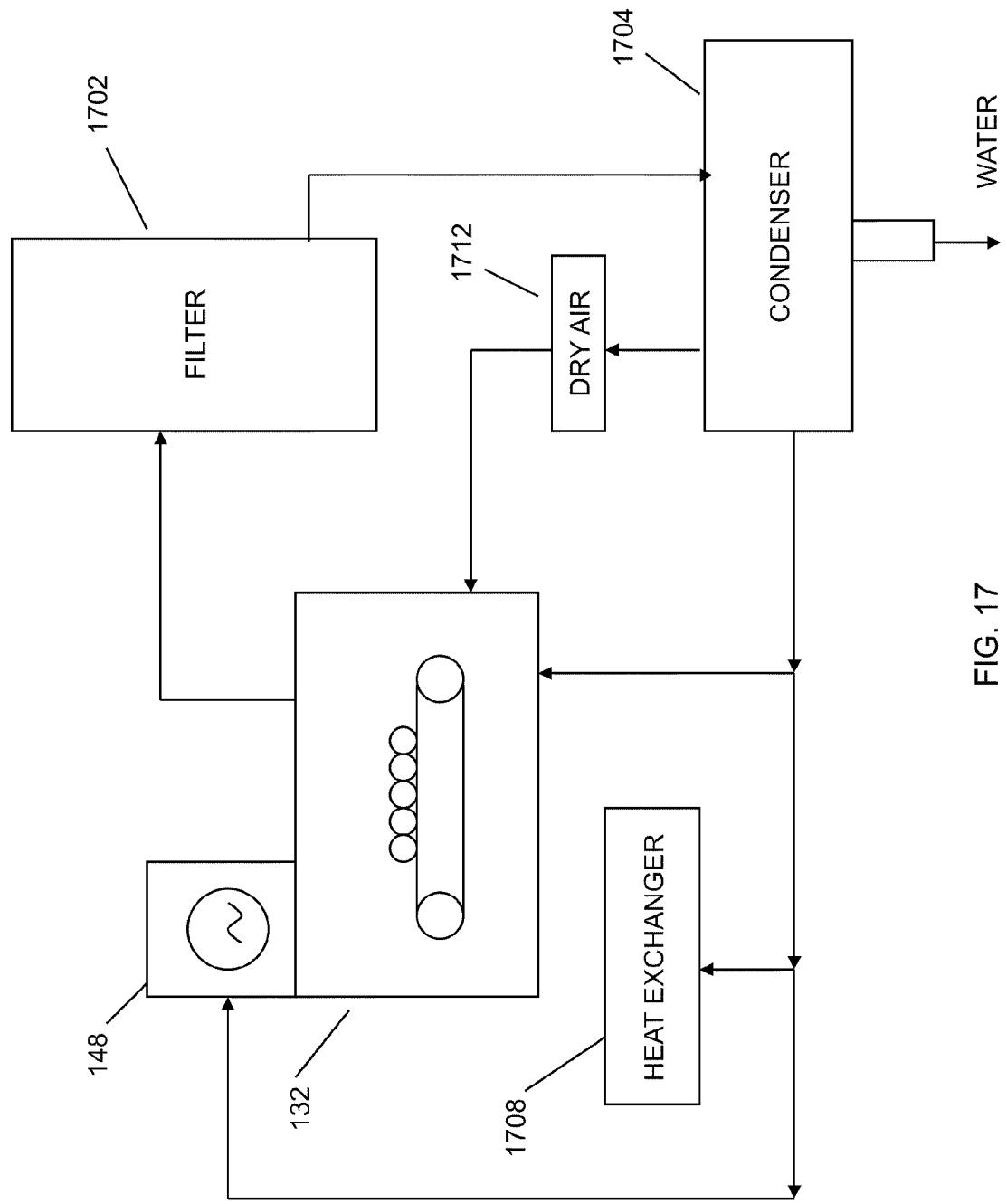
FIG. 17 depicts an embodiment of a heat exchange and condenser system.

Referring to FIG. 17, one result of treating the solid fuel within the solid fuel treatment facility 132 may be the release of water as a vapor and/or liquid from the solid fuel. While there may be some surface water on the solid fuel, there may also be water trapped within the solid fuel structure that may release as the solid fuel is heated by the microwave energy. The water trapped within the solid fuel may have been in place as the solid fuel was forming millions of years ago. As the water is released, passing through the various cavities of the solid fuel may naturally filter the released water vapor. In an embodiment, the released moisture may be portable and therefore may be used as drinking water, released into the environment, used as cooling water within the solid treatment facility 132, or the like.

Regardless of the final purpose for the released portable water, the released water may need to be captured, condensed, and treated (e.g. filtered) before being reused for some other purpose. In an embodiment, water vapor may be captured by circulating the air containing the released water vapor air into an intake and removed from the solid fuel treatment area. In an embodiment, the water vapor may be circulated to a condensing facility 1704 where the water vapor may be cooled and condensed into liquid water.

Before and/or after the condensing of the water vapor there may be a filtering facility 1702 to remove residual solid fuel materials (e.g. solid fuel particles, sulfur, metals) that may have been carried by the water vapor during the release from the solid fuel. In an embodiment, the condensation facility 1704 may include the filtering facility 1702 or the filtering facility 1702 may be separate facilities. In an embodiment, as the water vapor is transported to the condensing facility 1704 there may be air filters that may remove larger particles from the water vapor air. The air filters may be made of foam, pleated paper, spun fiberglass, fibers, elements with a static electric charge, paper, cotton, or other material that will remove the particles and allow the water vapor to continue onto the condenser facility 1704.

In an embodiment, the condensing facility 1704 may receive the water vapor and remove the water from the air by using a water condenser; the condenser may be by absorption of water vapor by a liquid solution, using adsorbent materials (e.g. silica gel or activated alumina), shell and tube convection, or other method of removing water from the air. The water condenser may feed the condensed water to another filtering facility 1702 where the liquid water may be further filtered. The type of filter used may be determined by the final use of the water. For example, if the water is to be used as drinking water 1710, the filter may include activated carbon to remove fine particles and other contaminates. If the water is to be used for the solid fuel treatment facility 132 as a cooling liquid, the water may only receive filtration to remove particles that may damage the cooling system.

In an embodiment, the resulting dry air 1712 from the condensing facility may be circulated back to the solid fuel treatment facility and used as drying air to absorb more water vapor. In this manner, air may be circulated in a closed loop system where the air is used to absorb solid fuel released water vapor, transport the water vapor to the filter facility 1702 and condenser facility 1704, and then be circulated back to absorb more water moisture.

Along with water vapor, the solid fuel may release liquid water, or liquid water may condense on the surface of the solid fuel treatment facility 132 walls, floor, and ceiling. In an embodiment, the liquid water may be collected into a tank facility. From the tank facility, the liquid water may be transported to the water filtering facility previously described.

In an embodiment, after complete water treatment, water that is to be used as drinking water 1710 may be bottled, used within the solid fuel treatment facility, transported (e.g. piped) to a local water supply system (e.g. town drinking water system), or the like.

In an embodiment, after complete water treatment, water that is to be used for solid fuel treatment facility 132 cooling may be used for thermally aberrant solid fuel extinguishing, thermally aberrant solid fuel development control, circulated to cooling rollers/pulleys 1502, used to cool the microwave systems 148, or the like. In this embodiment, the water may be continuously circulated in the solid fuel treatment facility, used for cooling and then cooled in a heat exchange facility 1708 to then be circulated back into the solid fuel treatment facility cooling system.

In an embodiment, after complete water treatment, the water may be released to the environment into a stream, river, lake, ocean, sea, local waste water, or the like.

Referring again to FIG. 1, the treatment facility 160 may be responsible for the separation of the various collected non-coal products that may coexist within the containment facility 162 tanks and containers. In an embodiment, more than one non-coal product may be collected in a containment facility tank or container during the coal treatment process. For example, ash may be released with both water and sulfur during one of the microwave system 148 processes, so that the collected product would comprise ash mixed with water and/or sulfur.

The treatment facility 160 may receive non-coal product from the containment facility 162 for separation into single products. The treatment facility 160 may use a plurality of filtering and separation processes that may include sedimentation, flocculation, centrifugation, filtration, distillation, chromatography, electrophoresis, extraction, liquid-liquid extraction, precipitation, fractional freezing, sieving, winnowing, or the like.

The monitoring facility 134 may monitor the treatment facility 160 processes for proper operation and separation. The treatment facility 160 may have its own sensors for sending data to the monitoring facility 134 or the treatment facility 160 may use the sensor system 142 to monitor the treatment processes.

Once the treatment facility 160 has separated the non-coal products into individual products they may be transferred to a disposal facility 158 for removal from the solid fuel treatment facility 132. The monitoring facility 132 may monitor the disposal facility 158 product levels to determine when the products should be disposed. The monitoring facility 134 may provide the information from the disposal facility to a user interface within the solid fuel treatment facility 132. Disposal from the disposal facility 158 may include releasing non-harmful products (e.g. water and water vapor), land file transfer (e.g. ash), sale of products, or commercial fee-based disposal. In an embodiment, a non-coal product collected at the disposal facility 158 may be useful to other enterprises (e.g. sulfur).

After the coal has finished being treated in the belt facility 130 it may proceed to a cooling facility 164 where the cooling of the coal from the treatment temperatures to ambient temperatures may be controlled. Cooling the treated solid fuel after it exits the belt facility 130 may maximize the stability of the treated solid fuel on the piles and prevent hot spots from occurring. Similar to the belt facility 130, the cooling facility 164 may use a control atmosphere, a transport system, sensors, and the like to control the cooling of the coal. The cooling of the coal may be controlled, for example, to prevent re-absorption of moisture and/or to prevent other chemical reactions that may occur during the cooling process. The controller 144 may be used to maintain the cooling facility 164 systems and facilities such as transportation speed, atmosphere, cooling rate, air flow, and the like. The cooling facility 164 may use the same previously described real time feedback system used by the belt facility 130 to control the operational parameters. In an embodiment, cooling of treated solid fuel may be by transport over a cooling conveyor, exposure to forced air, exposure to chemicals applied to surface of the solid fuel which reduces its temperature, passage through a cooling gas, and the like. For example, the cooling conveyor may have a cooler surface to pull heat away from the treated solid fuel.

An out-take facility 168 may receive final treated coal from cooling facility 164 and belt facility 130. The out-take facility 168 may have an input section, a transition section, and adapter section that may receive and control the flow and volume of coal that may exit the solid fuel treatment facility 132. The final treated coal may exit the solid fuel treatment facility 132 to a coal combustion facility 200, coal conversion facility 210, coal byproduct facility 212, shipping facility 214, coal storage facility 218, or the like. The out-take facility 168 may have an intake system such as a conveyor belt 300, auger, or the like that may feed the finished treated coal to an external location from the solid fuel treatment facility 132.

Based on the operational parameters provided by the controller 144 the out-take facility 168 may control the volume rate of the finished treated coal output from the belt facility 130. The out-take facility 168 may be capable of varying the speed of the out-take facility based on controller 144 supplied parameters.

Additionally, the out-take facility 168 may provide test samples to a testing facility 170 for testing the final treated coal. The selection of coal samples may automatically or manually selected; the coal selection may be made a predetermined times, randomly selected, statistically selected, or the like.

The coal testing facility 170 may test the final treated coal characteristics to be compared to the coal desired characteristics 122 as a final quality test of the treated coal. The test facility may be local to the solid fuel treatment facility 132, remotely located, or may be a standard commercial coal testing lab. In FIG. 1 the testing facility is shown as local to the solid fuel treatment facility. The test of the final treated coal may provide coal characteristics that may include percent moisture, percent ash, percentage of volatiles, fixed-carbon percentage, BTU/lb, BTU/lb M-A Free, forms of sulfur, Hardgrove grindability index (HGI), total mercury, ash fusion temperatures, ash mineral analysis, electromagnetic absorption/reflection, dielectric properties, and the like. The final treated coal may be tested using standard test such as the ASTM Standards D 388 (Classification of Coals by Rank), the ASTM Standards D 2013 (Method of Preparing Coal Samples for Analysis), the ASTM Standards D 3180 (Standard Practice for Calculating Coal and Coke Analyses from As-Determined to Different Bases), the US Geological Survey Bulletin 1823 (Methods for Sampling and Inorganic Analysis of Coal), and the like.

Once the final treated coal characteristics have been determined by the testing facility 170, the characteristics may be transmitted to a coal output parameters facility 172 and/or may be supplied with the shipments of the final treated coal. Supplying the test characteristics with the shipment may allow the coal use facility to know the coal characteristics and adjust the coal use characteristics to match the final treated coal characteristics.

Similar to the coal desired-characteristics facility 122, the coal output parameters facility 170 may store characteristic data coal, in this case the final treated coal characteristics. The coal output parameters facility 172 may be an individual computer device or a set of computer devices to store the final desired coal characteristics for an identified coal. The computer devices may be a desktop computer, server, web server, laptop computer, CD device, DVD device, hard drive system, or the like. The computer devices may all be located locally to each other or may be distributed over a number of computer devices in remote locations. The computer devices may be connected by a LAN, WAN, Internet, intranet, P2P, or other network type using wired or wireless technology.

The coal output parameters facility 172 may include a collection of data that may be a database, relational database, XML, RSS, ASCII file, flat file, text file, or the like. In an embodiment, the coal output parameter facility 172 may be searchable for the retrieval of the desired data characteristics for a coal.

There may be a plurality of coal output parameter records stored in the coal output parameter facility 172, based on the number of test samples supplied by the out-take facility 168 and the testing facility 170.

With every coal characteristic data record received from the testing facility 170, the coal output parameters facility 172 may store the received data and/or transmit the received coal characteristic data record to the feedback facility 174. The coal output parameters facility 172 may transmit only the new received coal characteristics data record, transmit all of the data records for the identified coal (e.g. multiple test results), transmit an average of all the data records for the identified coal, transmit statistical data of the identified coal, or the like. The coal output parameters facility 172 may transfer any combination of the data records to the feedback facility 174.

The feedback facility 174 may receive coal output parameter data from the coal output parameter facility 172. The feedback facility 174 may be an individual computer device or a set of computer devices to store the final desired coal characteristics for an identified coal. The computer devices may be a desktop computer, server, web server, laptop computer, CD device, DVD device, hard drive system, or the like. The computer devices may all be located locally to each other or may be distributed over a number of computer devices in remote locations. The computer devices may be connected by a LAN, WAN, Internet, intranet, P2P, or other network type using wired or wireless technology.

The feedback facility 174 may query the coal output parameters facility 172 for data on an identified coal that is being treated in the solid fuel treatment facility 132. In embodiments, the feedback facility 174 may query the coal output parameters facility 172 periodically at set time periods, when data is requested by the monitoring facility 134, when the coal output parameters facility 172 sends a new record, or the like.

The feedback facility 174 may receive only the new received coal characteristics data record, receive all of the data records for the identified coal (e.g. multiple test results), receive an average of all the data records for the identified coal, receive statistical data of the identified coal, or the like. The feedback facility 174 may have algorithms for aggregating the received final treated coal characteristics as a feed forward to the monitoring facility 134. The feedback facility 174 may feed forward to the monitoring facility 134 the last coal characteristics data record, all of the data records for the identified coal (e.g. multiple test results), an average of all the data records for the identified coal, statistical data of the identified coal, or the like.

The coal output parameter facility 172 may transfer the coal characteristics to a pricing transactional facility 178. The pricing transactional facility 178 may determine the price and cost of the coal treatment from the as-received raw coal to the final treated coal. The pricing transactional facility 178 may retrieve as-received coal data from the coal sample data facility 120; this facility may store the cost of the received coal (e.g. cost/ton of coal). The pricing transactional facility 178 may retrieve data from the coal output parameters facility 172 that may contain data related to the cost of treating the coal. The pricing transactional facility 178 may have application software that may determine the final price of the treated coal based on the cost data retrieved and derived from the coal sample data facility 120 and the coal output parameters facility 172.

As depicted in FIG. 2, certain aspects of coal usage are consistent with treatment of coal in the solid fuel treatment facility 132. As described above, the solid fuel treatment facility 132 may improve coal quality to render the coal more suitable for a variety of uses. In embodiments, the solid fuel treatment facility 132 may include an outtake facility 168 through which coal treated in accordance with the systems and methods described herein may be transferred to usage facilities such as those illustrated in FIG. 2. In embodiments, the solid fuel treatment facility 132 may include a testing facility 170 as described in more detail above. As described previously, results of coal tested in the testing facility 170 may be transferred to usage facilities such as those illustrated in FIG. 2, so that the usage facility may better take advantage of the particular properties of coal treated in accordance with the systems and methods described herein.

FIG. 2 illustrates exemplary facilities that may use coal treated by the systems and methods described herein, including but not limited to a coal combustion facility 200 and coal storage facility 202 for combustible coal, a coal conversion facility 210, a coal byproduct facility 212, a coal shipping facility 214 and a coal storage facility 218 for coal shipments in transit. In embodiments, coal is shipped or transported from the out-take facility 168 to a facility for coal use. It is understood that the solid fuel treatment facility 132 may be in proximity to the coal use facility, or the two may be remote from each other.

Referring to FIG. 2, combustion of coal treated by the systems and methods described herein may take place in a coal combustion facility 200. Coal combustion 200 involves burning coal at high temperatures in the presence of oxygen to produce light and heat. Coal must be heated to its ignition temperature before combustion occurs. The ignition temperature of coal is that of its fixed carbon content. The ignition temperatures of the volatile constituents of coal are higher than the ignition temperature of the fixed carbon. Gaseous products thus are distilled off during combustion. When combustion starts, the heat produced by the oxidation of the combustible carbon may, under proper conditions, maintain a high enough temperature to sustain the combustion. Coal to be used in a coal combustion 200 facility may be transported directly to the facility for usage, or it may be stored in a storage facility 202 related to the coal combustion 200 facility.

As depicted in FIG. 2, coal combustion 200 may provide for power generation 204. Systems for power generation include fixed bed combustion systems 220, pulverized coal combustion systems 222, fluidized bed combustion systems 224 and combination combustion systems 228 that use renewable energy sources in combination with coal combustion.

In embodiments, fixed bed 220 systems may be used with coal treated in accordance with the systems and methods described herein. Fixed bed 220 systems may use a lump-coal feed, with particle size ranging from about 1-5 cm. In a fixed bed 220 system, the coal is heated as it enters the furnace, so that moisture and volatile material are driven off. As the coal moves into the region where it will be ignited, the temperature rises in the coal bed. There are a number of different types of fixed bed 220 systems, including static grates, underfeed stokers, chain grates, traveling grates and spreader stoker systems. Chain and traveling grate furnaces have similar characteristics. Coal lumps are fed onto a moving grate or chain, while air is drawn through the grate and through the bed of coal on top of it. In a spreader stoker, a high-speed rotor throws the coal into the furnace over a moving grate to distribute the fuel more evenly. Stoker furnaces are generally characterized by a flame temperature between 1200-1300 degrees C. and a fairly long residence time.

Combustion in a fixed bed 220 system is relatively uneven, so that there can be intermittent emissions of carbon monoxide, nitrous oxides ("NOx") and volatiles during the combustion process. Combustion chemistry and temperatures may vary substantially across the combustion grate. The emission of SO2 will depend on the sulfur content of the feed coal. Residual ash may have a high carbon content (4-5%) because of the relatively inefficient combustion and because of the restricted access of oxygen to the carbon content of the coal. It will be understood by skilled artisans that particular properties allow coal to be burned advantageously in a fixed bed 220 system. Hence, coal treated in accordance with the systems and methods described herein may be more particularly designed for combustion in a fixed bed 220 system.

In embodiments, pulverized coal combustion ("PCC") 222 may be used as a combustion 200 method for power generation 204. As depicted in FIG. 2, PCC 222 may be used with coal treated in accordance with the systems and methods described herein. For PCC, the coal may be ground (pulverized) to a fine powder. The pulverized coal is blown with part of the air for combustion into the boiler through a series of burner nozzles. Secondary or tertiary air may also be added. Units operate at close to atmospheric pressure. Combustion takes place at temperatures between 1300-1700 degrees C., depending on coal rank. For bituminous coal, combustion temperatures are held between 1500-1700 degrees C. For lower rank coals, the range is 1300-1600 degrees C. The particle size of coal used in pulverized coal processes ranges from about 10-100 microns. Particle residence time is typically 1-5 seconds, and the particles must be sized so that they are completely burned during this time. Steam is generated by the process that may drive a steam generator and turbine for power generation 204.

Pulverized coal combustors 222 may be supplied with wall-fired or tangentially fired burners. Wall-fired burners are mounted on the walls of the combustor, while the tangentially fired burners are mounted on the corner, with the flame directed towards the center of the boiler, thereby imparting a swirling motion to the gases during combustion so that the air and fuel is mixed more effectively. Boilers may be termed either wet-bottom or dry-bottom, depending on whether the ash falls to the bottom as molten slag or is removed as a dry solid. Advantageously, PCC 222 produces a fine fly ash. In general, PCC 222 may result in 65%-85% fly ash, with the remainder of the ash taking the form of coarser bottom ash (in dry bottom boilers) or boiler slag (wet bottom boilers).

In embodiments, PCC 222 boilers using anthracite coal as a fuel may employ a downshot burner arrangement, whereby the coal-air mixture is sent down into a cone at the base of the boiler. This arrangement allows longer residence time that ensures more complete carbon burn. Another arrangement is called the cell burner, involving two or three circular burners combined into a single, vertical assembly that yields a compact, intense flame. The high temperature flame from this burner may result in more NOx formation, though, rendering this arrangement less advantageous.

In embodiments, cyclone-fired boilers may be employed for coals with a low ash fusion temperature that would be otherwise difficult to use with PCC 222. A cyclone furnace has combustion chambers mounted outside the tapered main boiler. Primary combustion air carries the coal particles into the furnace, while secondary air is injected tangentially into the cyclone, creating a strong swirl that throws the larger coal particles towards the furnace walls. Tertiary air enters directly into the central vortex of the cyclone to control the central vacuum and the position of the combustion zone within the furnace. Larger coal particles are trapped in the molten layer that covers the cyclone interior surface and then are recirculated for more complete burning. The smaller coal particles pass into the center of the vortex for burning. This system results in intense heat formation within the furnace, so that the coal is burned at extremely high temperatures. Combustion gases, residual char and fly ash pass into a boiler chamber for more complete burning. Molten ash flows by gravity to the bottom of the furnace for removal.

In a cyclone boiler, 80-90% of the ash leaves the bottom of the boiler as a molten slag, so that less fly ash passes through the heat transfer sections of the boiler to be emitted. These boilers run at high temperatures (from 1650 to over 2000 degrees C.), and employ near-atmospheric pressure. The high temperatures result in high production of NOx, a major disadvantage to this boiler type. Cyclone-fired boilers may use coals with certain key characteristics: volatile matter greater than 15% (dry basis), ash contents between 6-25% for bituminous coals or 4-25% for subbituminous coals, and a moisture content of less than 20% for bituminous and 30% for subbituminous coals. The ash must have particular slag viscosity characteristics; ash slag behavior is especially important to the functioning of this boiler type. High moisture fuels may be burned in this type of boiler, but design variations are required.

It will be understood by skilled artisans that particular properties allow coal to be burned advantageously in a PCC 222 system. Hence, coal treated in accordance with the systems and methods described herein may be more particularly designed for combustion in a PCC 222 system.

PCC may be used in combination with subcritical or supercritical steam cycling. A supercritical steam cycle is one that operates above the water critical temperature (374 degrees F.) and critical pressure (22.1 mPa), where the gas and liquid phases of water cease to exist. Subcritical systems typically achieve thermal efficiencies of 33-34%. Supercritical systems may achieve thermal efficiencies 3 to 5 percent higher than subcritical systems.

It will be appreciated by skilled artisans that increasing the thermal efficiency of coal combustion 200 results in lower costs for power generation 204 because less fuel is needed. Increased thermal efficiency also reduces other emissions generated during combustion, such as those of SO2 and NOx. Older, smaller units burning lower rank coals have thermal efficiencies that may be as low as 30%. For larger plants, with subcritical steam boilers that burn higher quality coals, thermal efficiencies may be in the region of 35-36%. Facilities using supercritical steam may achieve overall thermal efficiencies in the 43-45% range. Maximum efficiencies achievable with lower grade coals and lower rank coals may be less than what would be achieved with higher grade and higher rank coals. For example, maximum efficiencies expected in new lignite-fired plants (found, for example, in Europe) may be around 42%, while equivalent new bituminous coal plants may achieve about 45% maximum thermal efficiency. Supercritical steam plants using bituminous coals and other optimal construction materials may yield net thermal efficiencies of 45-47%. Hence, coal treated in accordance with the systems and methods described herein may be advantageously designed for optimizing thermal efficiencies.

In embodiments, fluidized bed combustion ("FBC") 224 systems may be used with coal treated in accordance with the systems and methods described herein. FBC 224 systems operate on the principle of fluidization, a condition in which solid materials are given free-flowing fluid-like behavior. As a gas is passed upward through a bed of solid particles, the flow of gas produces forces that tend to separate the particles from one another. In a FBC 224 system, coal is burned in a bed of hot incombustible particles suspended by an upward flow of fluidizing gas. The coal in a FBC 224 system may be mixed with a sorbent such as limestone, with the mixture being fluidized during the combustion process to allow complete combustion and removal of sulfur gases. It will be understood by skilled artisans that particular properties allow coal to be burned advantageously in a FBC 224 system. Hence, coal treated in accordance with the systems and methods described herein may be more particularly designed for combustion in a FBC 224 system. Exemplary embodiments of FBC 224 systems are described below in more detail.

For power generation 204, FBC 224 systems are used mainly with subcritical steam turbines. Atmospheric pressure FBC 224 systems may be bubbling or circulating. Pressurized FBC 224 systems, presently in earlier stages of development, mainly use bubbling beds and may produce power in a combined cycle with a gas and steam turbine. Relatively coarse coal particles, around 3 mm in size, may be used. FBC 224 at atmospheric pressures may be useful with high-ash coals and/or those with variable characteristics. Combustion takes place at temperatures between 800-900 degrees C., substantially below the threshold for forming NOx, so that these systems result in lower NOx emissions than PCC 222 systems.

Bubbling beds have a low fluidizing velocity, so that the coal particles are held in a bed that is about 1 mm deep with an identifiable surface. As the coal particles are burned away and become smaller, they ultimately are carried off with the coal gases to be removed as fly ash. Circulating beds use a higher fluidizing velocity, so that coal particles are suspended in the flue gases and pass through the main combustion chamber into a cyclone. The larger coal particles are extracted from the gases and are recycled into the combustion chamber.

Individual particles may recycle between 10-50 times, depending on their combustion characteristics. Combustion conditions are relatively uniform throughout the combustor and there is a great deal of particle mixing. Even though the coal solids are distributed throughout the unit, a dense bed is required in the lower furnace to mix the fuel during combustion. For a bed burning bituminous coal, the carbon content of the bed is around 1%, with the rest made of ash and other minerals.

Circulating FBC 224 systems may be designed for a particular type of coal. In embodiments, these systems are particularly useful for low grade, high ash coals which are difficult to pulverize finely and which may have variable combustion characteristics. In embodiments, these systems are also useful for co-firing coal with other fuels such as biomass or waste in a combination combustion 228 system. Once a FBC 224 unit is built, it may operate most efficiently with the fuel for which it has been designed. A variety of designs may be employed. Thermal efficiency for a circulating FBC 224 is generally somewhat lower than for equivalent PCC systems. Use of a low grade coal with variable characteristics may lower the thermal efficiency even more.

FBC 224 in pressurized systems may be useful for low grade coals and for those with variable combustion characteristics. In a pressurized system, the combustor and the gas cyclones are all enclosed in a pressure vessel, with the coal and sorbent fed into the system across the pressure boundary and the ash removed across the pressure boundary. When hard coal is used, the coal and the limestone may be mixed together with 25% water and fed into the system as a paste. The system may operate at pressures of 1-1.5 MPa with combustion temperatures between 800-900 degrees C. The combustion heats steam, like a conventional boiler, and also may produce hot gas to drive a gas turbine. Pressurized units are designed to have a thermal efficiency of over 40%, with low emissions. Future generations of pressurized FBC systems may include improvements that would produce thermal efficiencies greater than 50%.

As depicted in FIG. 2, coal combustion 200 may be employed for metallurgical purposes 208 such as smelting iron and steel. In certain embodiments, bituminous coals with certain properties may be suitable for smelting without prior coking. As an example, those coals having properties such as fusibility, and a combination of other factors including a high fixed carbon content, low ash (<5%), low sulfur, and low calcite ($CaCO_3$) content may be suitable for metallurgical purposes 208. Coals having properties suitable for metallurgical purposes 208 may be worth 15-50% more than coal used for power generation 204. It will be understood by skilled artisans that particular properties allow coal to be burned advantageously in a metallurgical 208 system. Hence, coal treated in accordance with the systems and methods described herein may be more particularly designed for combustion in a metallurgical 208 system.

Referring to FIG. 2, coal treated by the systems and methods described herein may be used in a coal conversion facility 210. As depicted in FIG. 2, a coal conversion facility 210 may convert the complex hydrocarbons of coal into other products, using, for example, systems for gasification 230, syngas production and conversion 234, coke and purified carbon formation 238 and hydrocarbon formation 240. It will be understood by skilled artisans that particular properties allow coal to be used advantageously in a coal conversion facility 210. Hence, coal treated in accordance with the systems and methods described herein may be more particularly designed for use in a coal conversion facility 210.

In embodiments, coal treated by the systems and methods described herein may be used for gasification 230. Gasification 230 involves the conversion of coal to a combustible gas, volatile materials, char and mineral residues (ash/slag). A gasification 230 system converts a hydrocarbon fuel material like coal into its gaseous components by applying heat under pressure, generally in the presence of steam. The device that carries out this process is called a gasifier. Gasification 230 differs from combustion because it takes place with limited air or oxygen available. Thus, only a small portion of the fuel burns completely. The fuel that burns provides the heat for the rest of the gasification 230 process.

During gasification 230, most of the hydrocarbon feedstock (e.g., coal) is chemically broken down into a variety of other substances collectively termed "syngas." Syngas is primarily hydrogen, carbon monoxide and other gaseous compounds. The components of syngas vary, however, based on the type of feedstock used and the gasification conditions employed. Leftover minerals in the feedstock do not gasify like the carbonaceous materials, so that they may be separated out and removed. Sulfur impurities in the coal may form hydrogen sulfide, from which sulfur or sulfuric acid may be produced. Because gasification takes place under reducing conditions, NOx typically does not form and ammonia forms instead. If oxygen is used instead of air during gasification 230, carbon dioxide is produced in a concentrated gas stream that may be sequestered and prevented from entering the atmosphere as a pollutant.

Gasification 230 may be able to use coals that would be difficult to use in combustion 200 facilities, such as coals with high sulfur content or high ash content. Ash characteristics of coal used in a gasifier affect the efficiency of the process, both because they affect the formation of slag and they affect the deposition of solids within the syngas cooler or heat exchanger. At lower temperatures, such as those found in fixed-bed and fluidized gasifiers, tar formation may cause problems. It will be understood by skilled artisans that particular properties allow coal to be used advantageously in a gasification 230 facility. Hence, coal treated in accordance with the systems and methods described herein may be more particularly designed for use in a gasification 230 facility.

In embodiments, three types of gasifier systems may be available: fixed beds, fluidized beds, and entrained flow. Fixed bed units, not normally used for power generation, use lump coal. Fluidized beds use 3-6 mm size coal. Entrained flow units use pulverized coal. Entrained flow units run at higher operating temperatures (around 1600 degrees C.) than fluidized bed systems (around 900 degrees C.).

In embodiments, gasifiers may run at atmospheric pressure or may be pressurized. With pressurized gasification, the feedstock coal may be inserted across a pressure barrier. Bulky and expensive lock hopper systems may be used to insert the coal, or the coal may be fed in as a water-based slurry. Byproduct streams then are depressurized to be removed across the pressure barrier. Internally, the heat exchangers and gas-cleaning units for the syngas are also pressurized.

Although it is understood that gasification 230 facilities may not involve combustion, gasification 230 may nonetheless be used for power generation in certain embodiments. For example, a gasification 230 facility in which power is generated may utilize an integrated gasification combined cycle ("IGCC") 232 system. In an IGCC system 232, the syngas produced during gasification may be cleaned of impurities (hydrogen sulfide, ammonia, particulate matter, and the like) and burned to drive a gas turbine. In an IGCC system 232, the exhaust gases from gasification may also be heat-exchanged with water to generate superheated steam that drives a steam turbine. Because an IGCC system 232 uses two turbines in combination (a gas combustion turbine and a steam turbine), such a system is called "combined cycle." Generally, the majority of the power (60-70%) comes from the gas turbine in this system. IGCC systems 232 generate power at greater thermal efficiency than coal combustion systems. It will be understood by skilled artisans that particular properties allow coal to be used advantageously in an IGCC 232 facility. Hence, coal treated in accordance with the systems and methods described herein may be more particularly designed for use in a, IGCC 232 facility.

In embodiments, coal treated by the systems and methods described herein may be used for the production of syngas 234 or its conversion into a variety of other products. For example, its components like carbon monoxide and hydrogen may be used to produce a broad range of liquid or gaseous fuels or chemicals, using processes familiar to practitioners in the art. As another example, the hydrogen produced during gasification may be used as fuel for fuel cells, or potentially for hydrogen turbines or hybrid fuel cell-turbine systems. The hydrogen that is separated from the gas stream may be also be used as a feedstock for refineries that use the hydrogen for producing upgraded petroleum products.

Syngas 234 may also be converted into a variety of hydrocarbons that may be used for fuels or for further processing. Syngas 234 may be condensed into light hydrocarbons using, for example, Fischer-Tropsch catalysts. The light hydrocarbons may then be further converted into gasoline or diesel fuel. Syngas 234 may also be converted into methanol, which may be used as a fuel, a fuel additive, or a building block for gasoline production. It will be understood by skilled artisans that particular properties allow coal to be used advantageously in a syngas production or conversion 234 facility. Hence, coal treated in accordance with the systems and methods described herein may be more particularly designed for use in a syngas production or conversion 234 facility.

In embodiments, coal treated by the systems and methods described herein may be converted 238 into coke or purified carbon. Coke 238 is a solid carbonaceous residue derived from coal whose volatile components have been driven off by baking in an oven at high temperatures (as high as 1000 degrees C.). At these temperatures, the fixed carbon and residual ash are fused together. Feedstock for forming coke is typically low-ash, low-sulfur bituminous coal. Coke may be used as a fuel during, for example, smelting iron in a blast furnace. Coke is also useful as a reducing agent during such processes. Converting coal to coke may also yield byproducts such as coal tar, ammonia, light oils and coal gas. Since the volatile components of coal are driven off during the coking process 238, coke is a desirable fuel for furnaces where conditions may not be suitable for burning coal itself. For example, coke may be burned with little or no smoke under combustion conditions that would cause a large amount of emissions if bituminous coal itself were used.

Coal must desirably meet certain stringent criteria regarding moisture content, ash content, sulfur content, volatile content, tar and plasticity before it can be used as coking coal. It will be understood by skilled artisans that particular properties allow coal to be used advantageously in a coke production facility 238. Hence, coal treated in accordance with the systems and methods described herein may be more particularly designed for use for producing coke 238.

In embodiments, amorphous pure carbon 238 may be obtained by heating coal to a temperature of about 650-980 degrees C. in a limited-air environment so that complete combustion does not occur. Amorphous carbon 238 is a form of the carbon allotrope graphite consisting of microscopic carbon crystals. Amorphous carbon 238 thus obtained has a number of industrial uses. For example, graphite may be used for electrochemistry components, activated carbons are used for water and air purification, and carbon black may be used to reinforce tires. It will be understood by skilled artisans that particular properties allow coal to be used advantageously in a purified carbon production facility 238. Hence, coal treated in accordance with the systems and methods described herein may be more particularly designed for use for producing purified carbon 238.

In embodiments, the basic process of coke production 238 may be used to manufacture a hydrocarbon-containing 240 gas mixture that may be used as fuel ("town gas"). Town gas may include, for example, about 51% hydrogen, 15% carbon monoxide, 21% methane, 10% carbon dioxide and nitrogen, and about 3% other alkanes. Other processes, for example the Lurgi process and the Sabatier synthesis use lower quality coal to produce methane.

In embodiments, coal treated with the systems and methods described herein may be converted to hydrocarbon products 240. For example, liquefaction converts coal into liquid hydrocarbon 240 products that can be used as fuel. Coal may be liquefied using direct or indirect processes. Any process that converts coal to a hydrocarbon 240 fuel must add hydrogen to the hydrocarbons comprising coal. Four types of liquefaction methods are available: (1) pyrolysis and hydrocarbonization, wherein coal is heated in the absence of air or in the presence of hydrogen; (2) solvent extraction, wherein coal hydrocarbons are selectively dissolved from the coal mass and hydrogen is added; (3) catalytic liquefaction, wherein a catalyst effects the hydrogenation of the coal hydrocarbons; and (4) indirect liquefaction, wherein carbon monoxide and hydrogen are combined in the presence of a catalyst. As an example, the Fischer-Tropsch process is a catalyzed chemical reaction in which carbon monoxide and hydrogen are converted to various forms of liquid hydrocarbons 240. Substances produced by this process may include synthetic petroleum substitutes usable as lubrication oils or fuels.

As another example, low temperature carbonization may be used for manufacturing liquid hydrocarbons 240 from coal. In this process, coal is coked 238 at temperatures between 450 and 700° C. (compared to 800 to 1000° C. for metallurgical coke). These temperatures optimize the production of coal tars richer in lighter hydrocarbons 240 than normal coal tar. The coal tar is then further processed into fuels. It will be understood by skilled artisans that particular properties allow coal to be used advantageously in the formation 240 of hydrocarbon products. Hence, coal treated in accordance with the systems and methods described herein may be more particularly designed for use for producing hydrocarbons 240. For example, a metallurgical or submetallurgical grade coal may be treated with electromagnetic energy according to the systems and methods described herein to yield a treated metallurgical coal. The treated metallurgical coal may be of at least one of a consistent composition, such as of alkali, volatiles, moisture, and the like, a consistent density and friability, a consistent moisture, and the like. As with treatment of other solid fuels described herein, treatment of metallurgical coal may serve to reduce the moisture content of the coal and reduces other contaminants, such as volatiles, for example, in a continuous or batch mode. In an embodiment, the metallurgical coal moisture content may be changed with little or no change in the metallurgical coal properties. Some parameters of either the continuous or batch mode method of processing the metallurgical coal may comprise bed depth, residence time, degree of microwave penetration, average particle size distribution, exit temperature, exit moisture, energy intensity such as energy per sq. ft., energy per ton of coal, and the like. For example, the temperature of the metallurgical coal may be maintained at or below 100 degrees Celsius throughout treatment. Treatment of metallurgical coal with electromagnetic energy as described herein may enable lower moisture levels entering a coking oven and more precise control of coking oven operations, thus further enabling increased throughput due to higher, more consistent packing densities and lower entrained water content. Treating the metallurgical coal includes improving at least one aspect of the coking oven selected from the group consisting of yield throughput, cycle time and energy efficiency. Lower entrained water may be due to at least one of higher packing densities, more uniform consistent composition, elimination or mitigation of water as a reactant in the pyroplastic phase of the coking operation further contributing to lower yield losses (higher yields), and the like. Enabling more precise control of coking oven operations may further enable better production consistency and packing densities in subsequent smelting and alloying operations, particularly of steel and the various grades of carbon steel. Also, the energy needed to initially heat the solid fuel may be reduced. In an embodiment, the metallurgical coal may be processed continuously or in batch mode at scale. As with treatment of other solid fuels described herein, in an embodiment, the treated metallurgical coal may be delivered to a coking oven. In an embodiment, the treatment facility for metallurgical coal may be integrated before a coke oven or coke battery 5614.

As with treatment of other solid fuels described herein, in an embodiment, exposing metallurgical coal to electromagnetic energy may improve consistency from a wash plant. Metallurgical coal may be exposed to electromagnetic energy at the end of a wash plant process, which may remove moisture from the coal while retaining or improving other metallurgical coal properties. In an embodiment, the treatment facility for metallurgical coal may be integrated as part of a wash plant operation. A wash plant 5618 may wash the coal, either metallurgical grade or not, of soil and rock. The washed coal may be transported to the solid fuel treatment facility 132 for exposure to electromagnetic energy systems 5602. In embodiments, the coal may then be briquetted on a briquetting facility 5604, transferred to a vessel 5620, and the like. In embodiments, the washed coal may be ground before treatment, briquetted prior to electromagnetic exposure, a binder may be added, and the like.

As with treatment of other solid fuels described herein, in an embodiment, systems and methods for processing metallurgical coal with electromagnetic energy may involve measuring the moisture content and petrological properties of the metallurgical coal before processing. The properties measured may include moisture, sulfur, mercury, alkalines, BTU, strength, oxidation status, micrographic properties, and the like. The metallurgical coal may be transported through a solid fuel treatment facility along a conveyor facility. Metallurgical coal may be exposed to electromagnetic energy on a continuous basis at a pre-determined power level and belt speed to achieve a pre-determined outcome for the properties of the metallurgical coal exiting the system. Optionally, the treated metallurgical coal may be delivered to a coking oven. The process may be capable of working at scale. The electromagnetic energy may be high power. The electromagnetic energy may be radio frequency or microwave. For example, the frequency of electromagnetic energy may be between about 890 MHz and 940 MHz.

As with treatment of other solid fuels described herein, in an embodiment, treatment of metallurgical coal may involve removing moisture while maintaining or improving the other coal properties, such as sulfur, mercury, alkalines, BTU, strength, and the like. For example, the system may include Moisture range reduction capabilities.

As with treatment of other solid fuels described herein, in an embodiment, the metallurgical coal may be maintained at a low temperature as it exits the system. This may be accomplished by transporting the metallurgical coal through a cooling facility, such as described herein.

As with treatment of other solid fuels described herein, in an embodiment, control feedback may be used to measure desired properties at the end of process and adjust process parameters to achieve desired results. For example, adjustments may be made to the level of electromagnetic energy, belt speed, air temperature, and the like to achieve desired results. Adjustment may deliver consistent end product by continually adjusting for changes in the input product.

As with treatment of other solid fuels described herein, in an embodiment, the air system may be used to remove moisture and other contaminants from the process. For example, pre-heated air may be injected into the air system.

As with treatment of other solid fuels described herein, in an embodiment, waste heat from the process may be used to increase the efficiency of the process. Waste heat may be used to pre-heat the metallurgical coal. Waste heat may be used for the air system input air.

As with treatment of other solid fuels described herein, in an embodiment, dust and other contaminants may be collected during the metallurgical coal treatment process using a dust collection facility 5610, such as a baghouse. In an embodiment, moisture may be extracted from the exit of the air system, using an air handling facility 5612, during the metallurgical coal treatment process. In an embodiment, the impact of thermally aberrant metallurgical coal flowing through the system may be mitigated by various systems and methods, as described herein. In an embodiment, metallurgical coal may be briquetted before treatment or after treatment, as depicted in FIG. 56, as it exits the system.

Referring to FIG. 2, coal treated by the systems and methods described herein may be used in a coal byproduct facility 212. As depicted in FIG. 2, a coal byproduct facility 210 may convert coal into coal combustion byproducts 242 and coal distillation byproducts 244.

In embodiments, a variety of coal combustion byproducts 242 may be obtained. As examples, coal combustion byproducts 242 may include volatile hydrocarbons, ash, sulfur, carbon dioxide, water and the like. Further processing of these byproducts may be carried out, with economic benefit. It will be understood by skilled artisans that particular properties allow coal to be used advantageously to produce economically beneficial combustion byproducts. Hence, coal treated in accordance with the systems and methods described herein may be more particularly designed for use in producing useful combustion byproducts.

As an example, volatile matter is a coal combustion byproduct 242. Volatile matter includes those products, exclusive of moisture, that are given off as a gas or a vapor during heating. For coal, the percent volatile matter is determined by first heating the coal to 105 C degrees to drive off the moisture, then heating the coal to 950 degrees C. and measuring the weight loss. Volatile matter may include a mixture of short and long chain hydrocarbons plus other gases, including sulfur. Volatile matter thus may be comprised of a mixture of gases, low boiling point organic compounds that condense into oils upon cooling, and tars. Volatile matter in coal increases with decreasing rank. Moreover, coals with high volatile matter content are highly reactive during combustion and ignite easily.

As another example, coal ash is a coal combustion byproduct 242. Coal ash is made of fly ash (the waste removed from smoke stacks) and bottom ash (from boilers and combustion chambers). Coarse particles (bottom ash and/or boiler slag) settle to the bottom of the combustion chamber, and the fine portion (fly ash) escapes through the flue and is reclaimed and recycled. Coal ash may contain concentrations of many trace elements and heavy metals, including Al, As, Cd, Cr, Cu, Hg, Ni, Pb, Se, Sr, V, and Zn. Ash that is retrieved after coal combustion may be useful as an additive to cement products, as a fill for excavation or civil engineering projects, as a soil amelioration agent, and as a component of other products, including paints, plastics, coatings and adhesives.

As another example, sulfur is a coal combustion byproduct 242. Sulfur in coal may be released during combustion as a sulfur oxide, or it may be retained in the coal ash by reacting with base oxides contained in the mineral impurities (a process known as sulfur self-retention). The most important base oxide for sulfur self-retention is CaO, formed as a result of $CaCO_3$ decomposition and combustion of calcium-containing organic groups. Coal combustion takes place in two successive steps: devolatilization and char combustion. During devolatilization, combustible sulfur is converted to $SO_2$. During char combustion, the process of $SO_2$ formation, sulfation and $CaSO_4$ decomposition take place simultaneously.

In embodiments, a variety of coal distillation products 244 may be obtained. Destructive distillation 244 of coal yields coal tar and coal gas, in addition to metallurgical coke. Uses for metallurgical coke and coal gas have been discussed previously, as products of coal transformation. Coal tar, the third byproduct, has a variety of other commercial uses. It will be understood by skilled artisans that particular properties allow coal to be used advantageously to produce economically beneficial distillation byproducts 244. Hence, coal treated in accordance with the systems and methods described herein may be more particularly designed for use in producing useful distillation byproducts 244.

Coal tar is an example of a coal distillation byproduct 244. Coal tar is a complex mixture of hydrocarbon substances. The majority of its components are aromatic hydrocarbons of differing compositions and volatilities, from the simplest and most volatile (benzene) to multiple-ringed non-volatile substances of large molecular weights. The hydrocarbons in coal tar are in large part benzene-based, naphthalene-based, or anthracene- or phenanthrene-based. There may also be variable quantities of aliphatic hydrocarbons, paraffins and olefins. In addition, coal tar contains a small amount of simple phenols, such as carbolic acid and cumarone. Sulfur compounds and nitrogenated organic compounds may also be found. Most of the nitrogen compounds in coal tar are basic in character and belong to the pyridine and the quinoline families, for example, aniline.

In embodiments, coal tar may be further subjected to fractional distillation to yield a number of useful organic chemicals, including benzene, toluene, xylene, naphthalene, anthracene and phenanthrene. These substances may be termed coal-tar crudes. They form the basis for synthesis of a number of products, such as dyes, drugs, flavorings, perfumes, synthetic resins, paints, preservatives, and explosives. Following the fractional distillation of coal-tar crudes, a residue of pitch is left over. This substance may be used for purposes like roofing, paving, insulation, and waterproofing.

In embodiments, coal tar may also be used in its native state without submitting it to fractional distillation. For example, it may be heated to a certain extent to remove its volatile components before using it. Coal tar in its native state may be employed as a paint, a weatherproofing agent, or as a protection against corrosion. Coal tar has also been used as a roofing material. Coal tar may be combusted as a fuel, though it yields noxious gases during combustion. Burning tar creates a large quantity of soot called lampblack. If the soot is collected, it may be used for the manufacture of carbon for electrochemistry, printing, dyes, etc.

Referring to FIG. 2, coal treated by the systems and methods described herein may be transported in a shipping facility 214 or stored in a storage facility 218. It will be understood by skilled artisans that particular properties allow coal to be safely and efficiently transported and stored. Hence, coal treated in accordance with the systems and methods described herein may be advantageously designed to facilitate its shipping and storage.

In embodiments, coal may be transported from where it is mined to where it is used. Coal transportation may be effected in a shipping facility 214. Before it is transported, coal may be cleaned, sorted and/or crushed to a particular size. In certain cases, power plants may be located on-site or close to the mine that provides the coal to the plant. For these facilities, coal may be transported by conveyors and the like. In most cases, though, power plants and other facilities using coal are located remotely. The main transportation method from mine to remote facility is the railway. Barges and other seagoing vessels may also be used. Highway transportation in trucks is feasible, but may not be cost-effective, especially for trips over fifty miles. Coal slurry pipelines transport powdered coal suspended in water. It will be understood by skilled artisans that particular handling properties facilitate coal transportation in a shipping facility 214. Hence, coal treated in accordance with the systems and methods described herein may be more particularly designed to facilitate its transport.

In embodiments, coal may be stored in a storage facility 218, either at the site where it will be used or at a remote site from which it may be transported to the point of use. In embodiments such as coal combustion facilities 200 and other coal utilization plants, coal may be stored on-site. As an example, for a power generation plant 204, 10% or more of the annual coal requirement may be stored. Overstocking of stored coal may cause problems, however, related to risks of spontaneous combustion, losses of volatile material and losses of calorific value. Anthracite coal may present fewer risks than other coal ranks. Anthracite, for example, may not be subject to spontaneous ignition, so may be stored in unlimited amounts per coal pile. A bituminous coal, by contrast, may ignite spontaneously if placed in a large enough pile, and it may suffer disintegration.

Two types of changes may occur in stored coal. Inorganic material such as pyrites may oxidize, and organic material in the coal itself may oxidize. When the inorganic material oxidizes, the volume and/or weight of the coal may increase, and it may disintegrate. If the coal substances themselves oxidize, the changes may not be immediately appreciable. Oxidation of organic material in coal involves oxidation of the carbon and hydrogen in the coal, and the absorption of oxygen by unsaturated hydrocarbons, changes that may cause a loss of calorific value. These changes may also cause spontaneous combustion. It will be understood by skilled artisans that particular properties of coal minimize the deleterious changes that may occur in coal stored in a storage facility 218. Hence, coal treated in accordance with the systems and methods described herein may be more particularly designed to permit its safe storage in a storage facility 218.

Now a more detailed description is presented for the individual components of the solid fuel treatment facility, its inputs, outputs, and related methods and systems.

Coal is formed from plant matter that decomposes without access to air under the influence of moisture, elevated pressure and elevated temperature. There are two steps to the formation of coal. The first step is a biological one, wherein cellulose is turned into peat. The second step is a physico-chemical one, wherein peat is turned into coal. The geological process that forms coal is termed coalification. As coalification progresses, the chemical composition of the coal gradually changes to compounds of higher carbon content and lower hydrogen content, as may be found in aromatic ring structures.

The type of coal, or coal rank, indicates the degree of coalification that has occurred. The ranks of coal, ranging from highest to lowest, include anthracite, bituminous, sub-bituminous, and brown coal/lignite. With an increase in degree of coalification, the percentage of volatile matter decreases and the calorific value increases. Thus, higher-ranked coals have less volatile matter and more calorific value. In general, too, with increasing rank, a coal has less moisture, less oxygen, and more fixed carbon, more sulfur and more ash. The term "grade" distinguishes between two coals with respect to ash and sulfur content.

All coal contains minerals. These minerals are inorganic substances found in the coal. A mineral constituent that is integrated into the coal substance itself is termed an included mineral. A mineral constituent that is separate from the coal matrix is termed an excluded mineral. Excluded minerals may be dispersed among the coal particles, or may be present inadvertently because of mining techniques that draw from adjacent mineral strata. The inorganic material in coal becomes ash following coal combustion or coal transformation.

The uncombined carbon of coal is termed its fixed carbon content. A certain amount of the total carbon is combined with hydrogen so that it burns as a hydrocarbon. This, together with other gases that form when coal is heated, forms the volatile matter in the coal. Fixed carbon and volatile matter form the combustible. The oxygen and nitrogen contained in the volatile matter are included as part of the combustible, which is understood to be the amount of coal free from moisture and ash. In addition to the combustible, coal contains moisture and a variety of minerals that form the ash. The ash content of U.S. coal may vary from approximately 3% to 30%. The moisture may vary from 0.75% to 45% of the total weight of coal.

A large ash content is undesirable in coal because it reduces the calorific value of the coal and because it interferes with combustion by choking the air passages in the furnace. If the coal also has a high sulfur content, the sulfur may combine with the ash to form a fusible slag that can further impede effective combustion in a furnace. Moisture in coal may cause difficulties during combustion because it absorbs heat when it evaporates, thus reducing furnace temperatures.

While the technologies discussed herein are applied for illustrative purposes to using coal as a single fuel, it is understood that they may also be applied to using coal in combination with other fuels, for example with biomass or waste products, using techniques familiar to those of ordinary skill in the art.

There may be two basic methods of mining coal 102, surface mining and underground mining. Surface mining methods may include surface mining, contour mining, and open pit mining.

Surface coal mines may be covered by non-coal materials called overburden, the overburden may be removed before mining the coal. Surface mining may be found on flat terrain, contour mining may follow a coal seam along a hill or mountain, and open pit mining may be where a coal seam is thick and may be several hundred feet deep. Equipment used in surface mines may include draglines, shovels, bulldozers, front-end loaders, bucket wheel excavators and trucks.

There three basic methods of extracting coal from underground coal mines 102, room-and-pillar, long wall, and standard blasting and removal of coal. Room-and-pillar mining may consist of a continuous breaking up of the coal by a mining machine and shuttling the coal to a belt for removal. After a specified distance, the ceiling is supported and the process is repeated. Long wall mining may consist of moving a mining machine over a long continuous wall of coal with the coal being removed by a belt system. The roof may be supported by steel beams that are part of the long wall mining machine. A standard blasting and removal mining method may blast the coal with explosives and then removing the coal using standard equipment (e.g. belt system, rail, tractor).

A coal mine 102 may consist of more that one coal seam, the coal seam may be a continuous line of coal. A coal mine 102 may contain a plurality of different coal types with known characteristics 110 within a coal mine and/or a coal seam. Some of the defined coal types may include peat, brown coal, lignite, subbituminous, bituminous, and anthracite coal. A coal mine 102 may test the characteristics 110 of the coal within a mine and/or seam. The characteristic 110 testing may be by sampling, periodic, continuous, or the like. A coal mine may test the coal on site for the coal characteristic 110 determination or may send samples of the coal to an external testing facility. A mining operation may survey a mine to classify the types of coal contain in the mine to determine where and what types of coal are within a mine. The different coal types may have standard classifications 110 by the moisture content, minerals, and materials such as sulfur, ash, metals, and the like. The percentage of moisture and other materials within a type of coal may affect the burning characteristics and the heating capability (BTU/lb) of the coal. A coal mine 102 operator may selectively mine coal from the coal mine in order to maintain a consistent type of coal for supply to customers, to mine a type of coal that is better accepted on a market, to provide the most common coal to a market or customers, or the like. In an embodiment, coals with less moisture, such as bituminous and anthracite, may provide better burning and heating characteristics.

In an embodiment, coal mining 102 facilities may contain coal sizing, storage 104 and shipping 108 facilities for the handling of the mined coal.

The coal sizing facility may be used to make the raw mined coal into a more desirable shaped and sized coal. The coal may be sized within a facility on the surface of the mine by a pulverizer, coal crusher, ball mill, grinder, or the like. The coal may be provided to the coal sizing facility by the belt system from the mine, by truck, or the like. The coal sizing may be on a continuous feed process or may use a batch process to resize the coal.

The storage facility 104 may be used to temporarily store the raw or resized coal from the coal sizing facility prior to shipping the coal to a customer. The storage facility 104 may contain additional sorting facilities where the raw or resized coal may be further classified by coal size. The storage facility 104 may be a building, shed, rail cars, open area, or the like.

The storage facility 104 may be associated with the shipping facility 108 by being close to a coal transportation method. The shipping facility 108 may use rail, truck, or the like to move the coal from the coal mine 102 to customers. The shipping facility 108 may use conveyor belts 300, trucks, loaders, or the like, either individually or in combination, to move the coal to the coal transportation method. Depending on the coal mine volume, the shipping facility 108 may be a continuous loading operation or may ship coal on an on-demand process.

A coal storage facility 112 may be a coal reseller for at least one remotely located coal source and may purchase, store and resell different coal types to various customers. A coal source for the coal storage facility 112 may be a coal mine 102 or another coal storage facility 112. The coal storage facility 112 may receive and store a plurality of coal types from a plurality remotely located coal sources. In an embodiment, the coal storage facility 112 may store the coal by coal type. Coal types may include, but are not limited to, peat, brown coal, lignite, subbituminous, bituminous, and anthracite coal. The coal storage facility may include a storage facility 114, a shipping facility 118, or other facilities for handling, storing, and shipping coal. In an embodiment, the coal storage facility 112 may purchase coal on spec from remotely located mines for later resale.

The coal storage facility 112 may receive coal from remotely located coal sources; coal type and characteristics 110 may be provided by the coal source. The storage facility 112 may also perform additional coal testing to either verify the received coal characteristics or to further classify the coal; the coal storage facility 112 may store sub-coal types for different coal customers. Sub-coal types may be a further classification of the coal by the coal characteristics 110. The storage facility 112 may have on-site coal testing facilities or may use a standard coal testing lab.

The storage facility 114 may be used to store the coal from the remotely located coal source prior to shipping the coal to a customer. The storage facility 114 may contain additional sorting facilities where the coal may be further classified by coal size or coal characteristic 110. The additional sorting facility may further size the coal by using a pulverizer, a coal crusher, a ball mill, a grinder, or the like. The storage facility 114 may be a building, shed, rail cars, open area, or the like.

The storage facility 114 may be associated with the shipping facility 118 by being close to a coal transportation method. The shipping facility 118 may use rail, truck, or the like to move the coal from the storage facility 114 to coal customers. The shipping facility 118 may use conveyor belts 300, trucks, loaders, or the like, either individually or in combination, to move the coal to the coal transportation method. Depending on the storage facility 112 volume, the shipping facility 118 may be a continuous loading operation or may ship coal on an on-demand process.

The coal sample data 120 may be a storage location for the classification 110 data of coal. The coal sample data 120 may be a database, relational database, table, text file, XML file, RSS, flat file, or the like that may store the characteristics 110 of the coal. The data may be stored on a computer device that may include a server, web server, desktop computer, laptop computer, handheld computer, PDA, flash memory, or the like. In an embodiment, the coal characteristics 110 data may be shipped with the coal shipment on a paper hardcopy, electronic format, database, or the like. If the coal characteristics are shipped with paper hardcopy, the characteristic data may be input into the appropriate coal sample data format on the computer device. In an embodiment, the coal characteristics 110 data may be sent by email, FTP, Internet connection, WAN, LAN, P2P, or the like from a coal mine 102, coal storage facility 112, or the like. The coal sample data 120 may be maintained by the coal mine 102, coal storage facility 112, the receiving facility, or the like. The coal sample data 120 may be accessible over a network that may include the Internet.

The coal sample data 120 may include the sending coal mine name, storage facility name, final use for the coal, desired properties, possible final properties, coal characteristics (e.g. moisture), the coal testing facility used, coal test date, tested as received or dry, electromagnetic absorption/reflection, verification test facility, verification test date, and the like. In an embodiment, there may be at least one coal characteristic test data and test date per coal sample.

In an embodiment, coal characteristics stored in the coal sample data 120 may be provided by a standard laboratory such as Standard Laboratories of South Charleston, W.V., USA. The standard laboratory may provide coal characteristics that may include percent moisture, percent ash, percentage of volatiles, fixed-carbon percentage, BTU/lb, BTU/lb M-A Free, forms of sulfur, Hardgrove grindability index (HGI), total mercury, ash fusion temperatures, ash mineral analysis, electromagnetic absorption/reflection, dielectric properties, and the like. In an embodiment, the standard laboratory may test the coal as received or dry. In an embodiment, as received test may be as the raw coal is received without any treatment. In an embodiment, dry test may be the coal after processing to remove residual water. The standard laboratory may classify the coal using standards such as the ASTM Standards D 388 (Classification of Coals by Rank), the ASTM Standards D 2013 (Method of Preparing Coal Samples for Analysis), the ASTM Standards D 3180 (Standard Practice for Calculating Coal and Coke Analyses from As-Determined to Different Bases), the US Geological Survey Bulletin 1823 (Methods for Sampling and Inorganic Analysis of Coal), and the like.

In an embodiment, there may be at least one data record stored in the coal sample data for each coal shipment. There may be more than one data record if the coal shipment was subject to random or periodic checks during the mining, storage, or shipping process. In an embodiment, each test performed on a coal shipment may have the coal characteristics stored in the coal sample data 120. The coal characteristic test may be performed at the request of the coal mine 102, storage facility 112, the receiving facility, or the like.

The coal desired characteristics 122 may be a database of treated coal burn characteristics required by a certain coal use facility. The coal desired characteristics 122 may be a database, relational database, table, text file, XML file, RSS, flat file, or the like that may store the required burn characteristics of the coal for a particular coal use facility. The coal desired characteristic 122 data may be stored on a computer device that may include a server, web server, desktop computer, laptop computer, handheld computer, PDA, flash memory, or the like.

In an embodiment, there may be at least one coal desired characteristic 122 data for a particular coal use facility. There may be coal desired characteristic 122 data for each type of coal received or stored by the solid fuel treatment facility 132. In an embodiment, the solid fuel treatment facility 132 may receive or store a plurality of coal types that may include peat, brown coal, lignite, subbituminous, bituminous, and anthracite coal. Each type of coal may have different desired characteristics 122 for the coal use facility and the desired characteristics 122 may be based on the ability to modify the received or stored coal characteristics 110. In an embodiment, the received or stored coal characteristics may be stored in the coal sample data 120.

The coal desired characteristics 122 may be based on the capability parameters of the solid fuel treatment facility 132 such as system capacity, coal size, type of process chamber, conveyor system size, conveyor system flow rate, electromagnetic frequency, electromagnetic power level, electromagnetic power duration, power penetration depth into coal, and the like. These parameters types and values may vary depending on the input coal characteristics. In an embodiment, the solid fuel treatment facility 132 may know which coal type may be used by the coal use facility and the proper parameters may be selected from the coal desired characteristics 122 to produce a treated coal for the coal use facility.

In an embodiment, a coal use facility, in order to meet efficiency or environmental requirements, may require certain coal operational parameters such as BTU/lb, sulfur percent, ash percent, metals percent, and the like. The coal desired characteristics 112 may be based on these parameters; maintaining these parameters may allow the coal use facility to meet the coal burning emission requirements.

In an embodiment, the coal desired characteristics 122 may target specific coal combustion properties such as BTU/lb, moisture, sulfur, sulfate, sulfide, ash, chlorine, mercury, and the like. In an embodiment, the specific coal combustion properties may only be limited by the coal treatment facilities ability to measure the coal treatment properties. For example, if the solid fuel treatment facility 132 is only able to measure the moisture and sulfur emissions then the target specific coal combustion properties may only contain moisture and sulfur targets.

A solid fuel treatment facility 132 (facility) may be used to modify the grade of coal by removing non-coal products such as moisture, sulfur, sulfate, sulfide, ash, chlorine, mercury, water, hydrogen, hydroxyls, and the like that may be part of the coal. The solid fuel treatment facility 132 may use microwave energy and/or other means to remove the non-coal products from the coal. The solid fuel treatment facility 132 may include a plurality of devices, modules, facilities, computer devices, and the like for the handling, movement, treatment of the coal. The solid fuel treatment facility 132 may be modular, scalable, portable, fixed, or the like.

In an embodiment, the solid fuel treatment facility 132 may be a modular facility with devices, modules, facilities, computer devices, and the like designed to be complete individual units that may be associated to each other in a predetermined manner or non-predetermined manner.

In an embodiment, the solid fuel treatment facility 132 may be scalable for both continuous flow and batch processes. For continuous flow, the solid fuel treatment facility 132 may scale inputs, treatment chambers, outputs, and the like to match the volume required for a particular installation. For example, an electric generation facility may require a higher volume of treated coal than a metallurgic facility and therefore the solid fuel treatment facility 132 may be scaled to process the required volume of coal. The continuous flow processing of coal may include a chamber with a belt for moving the coal through certain processes. The chamber and belt systems may be scaled to provide the required volume per time for the installation.

In an embodiment, the solid fuel treatment facility 132 may use a batch process and the batch treatment chamber, inputs, outputs, and the like may be scaled for the volume of coal that is required to be treated. The batch processing of coal may include an enclosed chamber that may treat a certain amount of coal in each cycle.

In an embodiment, the chamber may be sized to facilitate optimal energy distribution over the solid fuel belt facility 130. By increasing the width of the chamber, there may be improvements in the distribution of energy over the coal and a better chance of getting an average energy exposure based on size. For example, an increase in the width of the chamber from 62 inches to 70 inches may result in improved energy distribution, such as fields with polarization diversity to the entire volume of coal, more uniform distribution of power and fewer hotspots, and the like. For example, a chamber with three polarizers, as in FIG. 30, may provide few hotspots. In another example, a chamber with four polarizers, as in FIG. 30, may provide uniform overall field distribution.

In an embodiment, the chamber may be constructed so that energy does not escape. In an embodiment, the chamber may be sized to accommodate numerous microwave generators. The chamber may also be able to accommodate the electrical distribution and cooling systems necessary to enable the microwave generators.

In an embodiment, the chamber may comprise a water to air heat exchanger. Heat exchange may allow for waste energy recapture. Recaptured energy may be used to pre-dry the surface moisture off of the solid fuel.

In an embodiment, the chamber may comprise a distiller to remove moisture from the air in the chamber.

The solid fuel treatment facility 132 may be portable with the ability to be moved between a plurality of installations or to a plurality of locations within an installation. For example, a single enterprise may have a plurality of installations that may need treated coal and may own a single solid fuel treatment facility 132 to treat the coal. The solid fuel treatment facility 132 may spend a certain amount of time at each enterprise installation to provide a stockpile of treated coal before moving to the next enterprise installation. In another example, a storage facility 112 may have a single solid fuel treatment facility 132 that is moved between a plurality of locations within a storage facility 112 to treat a plurality of coal types that may be stored at the storage facility 112. In an embodiment, by being portable, the solid fuel treatment facility 132 may also be modular to allow for the facility 132 to be easily relocated.

The solid fuel treatment facility 132 may be a fixed structure that remains in place at a certain installation. In an embodiment, the installation may require a volume of treated coal that requires the solid fuel treatment facility 132 to produce a continuous flow of treated coal. For example, a power generation facility may require a continuous volume of treated coal that may require a dedicated solid fuel treatment facility 132.

In an embodiment, the solid fuel treatment facility 132 may be in-line or off-line to an installation. A solid fuel treatment facility 132 may be in-line with an installation to provide a continuous flow of treated coal to a process within the coal use facility. For example, a power generation installation may have a solid fuel treatment facility 132 directly feeding the boilers to produce steam. A solid fuel treatment facility 132 may be off-line from an installation by treating coal with the output to at least one storage location. For example, a power generation installation may have a solid fuel treatment facility 132 stockpiling different types of coal as it is treated. The treated coal may then be fed onto a conveyor belt 300 system to the power generation installation as needed.

The solid fuel treatment facility 132 may include a plurality of devices, modules, facilities, computer devices, and the like such as a parameter generation facility 128, an intake facility 124, a monitoring facility 134, a gas generation facility 152, an anti ignition facility 154, a disposal facility 158, a treatment facility 160, a containment facility 162, a belt facility 130, a cooling facility 164, an out-take facility 168, and a testing facility 170.

The parameter generation facility 128 may be a computer device such as a server, web server, desktop computer, laptop computer, handheld computer, PDA, flash memory, or the like. The parameter generation facility 128 may generate and provide the operational parameters to the solid fuel treatment facility 132 for the treatment of the received or stored coal. The parameter generation facility 128 may be able to calculate and store the operational parameters for the facility. In an embodiment, the parameter generation facility 128 may use data from both the coal sample data 120 and coal desired characteristics 122 to generate the operational parameters. In an embodiment, the coal sample data 120 and coal desired characteristic 122 information may be available by a LAN, WAN, P2P, CD, DVD, flash memory, or the like.

In an embodiment, the coal to be treated by the facility 132 may be identified by the solid fuel treatment facility 132 operator. In an embodiment, the coal may be identified by type, batch number, test number, identification number, or the like. The parameter generation facility 128 may have access to the coal test information stored in the coal sample data 120 and the coal desired characteristics 122 data for the identified coal. In an embodiment, the parameter generation facility 128 may retrieve the received or stored test data of the coal from the coal sample data 120. In an embodiment, parameter generation facility 128 may retrieve the desired treated coal characteristics from the coal desired characteristics 122. In an embodiment, there may be at least one set of desired treated coal characteristics for each received or stored coal test data. In a case where there may be more than one set of data available for the coal test data and the desired coal characteristics, the parameter generation facility may average the data, use the latest data, use the first data, use a statistical value of the data, or the like.

In an embodiment, based on the coal test information and the desired treated coal characteristics, the parameter generation facility may determine the starting operational parameters for the facility. The operational parameters may be used to set the parameters of the various devices and facilities of the solid fuel treatment facility 132 to produce the desired coal characteristics. The parameter generation facility 128 determined parameters may include belt speed, volume of coal per time period, microwave frequency, microwave power, coal surface temperature, sensor basic readings, air flow rates, inert gas use, intake rates, outtake rates, preheat temperatures, preheat time, cool down rates, and the like. In an embodiment, all parameters that may be required by the facility to treat the desired coal may be determined by the parameter generation facility.

In an embodiment, the microwave frequency parameters may have a plurality of settings that may include a single frequency, a phased frequency (e.g. transitioning from one frequency to a second frequency), frequencies for a plurality of microwaves, continuous frequency, pulsed frequency, pulsed frequency duty cycle, and the like.

In an embodiment, the microwave power parameters may have a plurality of settings that may include continuous power, pulsed power, phased power (e.g. transitioning from one power to a second power), power for a plurality of microwaves, and the like.

In an embodiment, depending on the coal type and the non-coal products to be removed from the coal, the coal surface temperature may be monitored. The parameter generation facility 128 may determine the coal surface temperature that is to be monitored during the coal treatment. In an embodiment, different coal surface temperatures may be required at different times in the coal treatment process to remove the non-coal products. For example, one temperature may be required to remove moisture from the coal where a second temperature may be required to remove the sulfur from the coal. Therefore, the parameter generation facility may determine a plurality of coal surface temperatures to be monitored during the coal treatment process. In an embodiment, the various coal surface temperature parameters may be provided to a sensor facility, the sensed temperatures may range from ambient to 250 degrees C. In an embodiment, the coal may be heated to certain interior and surface temperatures because of the heating of the non-coal products by the microwave energy of the microwave system 148.

The intake facility 124 may receive coal into the solid fuel treatment facility 132 from a coal mine 102 or coal storage facility 112, the coal storage facility 112 may be on the same site as the solid fuel treatment facility 132 or may be a remote coal storage facility 112. The intake facility 124 may include a dust collection facility, a sizing and sorting facility, an input section, a transition section, and adapter section, and the like. In an embodiment, the intake facility may control the coal volume that enters the belt 130 for treatment. For example, the intake facility may be able to control the volume of coal passing through it by restricting or opening a door, the speed of an input auger, or the like.

Coal may be provided to the intake facility 124 by a conveyor belt 300 system, truck, front loader, back loader, and the like.

In an embodiment, the action of inputting the coal into the intake facility 124 may create an unacceptable amount of coal dust, therefore a dust collection facility may be provided. In an embodiment, the coal dust may be collected into containers and removed from the intake facility. In an embodiment, the collected dust may be re-injected to the solid fuel microwave process.

The solid fuel treatment facility 132 may treat coal more efficiently if a consistent sized coal is provided to the belt 130; a consistent coal size may optimize the microwave heating of the coal. The intake facility 124 may sort or size the incoming coal into a plurality of sizes. In an embodiment, there may a plurality of belts to process coal of different sizes. The coal may be sorted using a sorting grate, different height doors to divert coal to another belt, or the like.

In an embodiment, the intake facility 124 may move coal from the input source to the belt 130 using a plurality of sections that may include an input section, a transition section, an adapter section, and the like. In an embodiment, the input section may receive the raw coal into the intake facility; this section may be large enough to provide a buffer of coal to prevent coal overflow or running out of coal. In an embodiment, the transition section may be a channel or duct to move the coal from the input section to the adapter section; this section may be tapered to properly fit differing sizes of the input and adapter sections. In an embodiment, the adapter section may move the coal from the transition section to the processing belt 130; the exit of this section may be the same size as the belt.

In an embodiment, a corkscrew conveyor may move coal from the input source to the conveyor belt. As the coal moves along the corkscrew conveyor, dry air is blown over it to pre-warm and pre-dry the coal.

In an embodiment, if there is coal sorting or sizing, there may be more than one input section, transition section, and adapter section.

The monitoring facility 134 may monitor a plurality of facilities, systems, and sensors of the solid fuel treatment facility 132. The monitoring facility 134 may receive and provide information to sensors, controllers, treatment facilities, and the like. In an embodiment, the monitor facility may make in-process adjustments to the coal treatment process based on the input from various sensors and facilities. For example, the monitor may receive information from a moisture sensor and a weight sensor to determine if the correct amount of moisture is being removed from the coal; an operation parameter may be adjusted based on the information.

In an embodiment, the monitoring facility 134 may change the facility operational parameters to adjust the treating of the coal in the solid fuel treatment facility 132. In an embodiment, the changes to the operational parameters may be provided to other facilities that may include a belt controller 144, a treatment facility 160, a containment facility 162, a feedback facility 174, an anti-ignition facility 154, or the like.

In an embodiment, the monitoring facility 134 may contain a computer device such as a server, web server, desktop computer, laptop computer, handheld computer, PDA, flash memory, or the like. In an embodiment, the monitoring facility 134 may communicate with the various facilities and sensors using a LAN, WAN, P2P, CD, DVD, flash memory, or the like. In an embodiment, the monitoring facility may use an algorithm to determine the changes in the operational parameters of the solid fuel treatment facility 132.

An anti-ignition facility 154 may be a source of gases to prevent the ignition of the coal during the coal treatment process. Because of the heating of the non-coal products, the coal treatment process may heat the coal to temperatures close to the coal ignition temperatures in order to remove non-coal products. To prevent the premature ignition of the coal during the coal treatment process, inert gases may be used to supply an inert gas atmosphere into the coal treatment chamber. Inert gases include nitrogen, argon, helium, neon, krypton, xenon, and radon. Nitrogen and argon may be the most common inert gases used for providing non-combustion gas atmospheres.

The inert gases may be supplied to the anti-ignition facility 154 by pipeline, truck/tanker, on-site gas generation, or the like. In and embodiment, if a truck/tanker supply system is used, the gas supply may be provided by the truck/tanker into an on-site gas storage tank or the truck may leave the tanker trailer to be used as a temporary gas storage tank.

In an embodiment, the inert gas from the anti-ignition facility 154 may be used in conjunction with an air atmosphere or may be the entire atmosphere in the coal treatment chamber.

To supply the anti-ignition facility 154 with nitrogen, the solid fuel treatment facility 132 may use an on-site nitrogen generation facility 152 to generate the required nitrogen for the coal treatment chamber. In an embodiment, nitrogen may be generated using a commercially available pressure swing absorption (PSA) process. The gas generation facility may be properly sized to generate the required volume of nitrogen for the solid fuel treatment facility 132.

The power-in 180 may be an electrical power connection to a power grid that may be used to power the solid fuel treatment facility 132; the solid fuel treatment facility 132 power requirements may include the microwave system 148. The power-in may be from a power grid that is external to the installation or may be from a power grid internal to the installation if the installation is a power generation facility.

A high voltage input transmission facility 182 may provide the proper power stepping to supply the proper power levels required by the solid fuel treatment facility 132. The high voltage input transmission facility may receive power in 180 at a very high voltage that needs to be stepped down to be used in the facility 182. In an embodiment, the high voltage input transmission facility 182 may include the required components and devices to step the supplied power to the proper power level for the solid fuel treatment facility 132. The high voltage input transmission facility may provide the transmission lines into the solid fuel treatment facility 132 to connect the solid fuel treatment facility 132 to the power-in 180.

A belt facility 130 may transport the coal through the coal treatment process for the removal of non-coal products; the transport of the coal may be a continuous feed. The belt facility 130 may receive the coal from the intake facility 124, transport the coal through at least one coal treatment process, and deliver the treated coal to a cooling facility 164. In an embodiment, the belt facility 130 may include a transportation facility such as a conveyor, a plurality of individual coal holding buckets, or other holding device to move coal through the at least one coal treatment process. The transportation facility may be made of a material that is designed for the temperatures of the treated coal such as metal, high temperature plastic, or the like.

The belt facility 130 may contain a plurality of facilities and systems that may include a preheat facility 138, parameter control system 140, sensor system 142, removal system 150, controller 144, microwave/radio wave system 148, and the like. All of the individual facilities and systems may be coordinated to process the coal during the treatment process by using the operational parameters of the parameter generation facility 128 and/or monitoring facility 134. The belt facility 130 may be able to adjust operational parameters during the coal treatment process; the adjustment of operational parameters may be done manually by an operator that is monitoring the process or automatically in real time by a controller 144.

In an embodiment, the belt facility 130 may be an enclosure around the transportation facility; the enclosure may be considered a chamber. In an embodiment, the chamber may contain the coal treatment processes, chamber gas environment, sensors, non-coal product removal systems 150, dust containment, and the like. The chamber may support all of the inputs and outputs of the coal treatment process such as gas environment inputs, non-coal product outputs, coal dust output, coal input, coal output, and the like.

In an embodiment, the transportation facility may be capable of variable speeds in response to operational parameters. For example, the transportation facility may run at a slower speed if a large volume of coal is processed at once or if the coal is a lesser type of coal (e.g. peat) that contains large percentages of non-coal products. The transportation facility may run slower to allow more time under the microwave generators. The transportation facility may move at a constant speed or may vary the speed at different locations of the process. For example, the transportation facility may move slowly at the microwave generators but quickly between the microwave generators. Coal may be place on the transportation facility such that there are spaces between the coal, this may allow for the transportation facility to move the coal through the coal treatment processes in coordinated stages. For example, the coal may be spaced at the same distance as the microwave generators, this may allow the coal to be staged under each of the microwave generators during the process.

In an embodiment, the transportation facility movement and speed may be coordinated to the operation of the microwave generators. The transportation facility may speed up or slow down depending on the operation of the microwave generators.

In an embodiment, the transportation facility operation may be controlled by the operational parameters determined by the parameter generation facility 128 and the monitored or revised operational parameters of the monitoring facility 134.

A controller 144 may be a computer device that may apply the operational parameters from the parameter generation facility 128 and monitoring facility 134 to the coal treatment processes. In an embodiment, the controller 144 may contain a computer device such as a server, web server, desktop computer, laptop computer, handheld computer, PDA, flash memory, or the like. In an embodiment, the controller 144 may communicate with the various facilities and sensors using a LAN, WAN, P2P, CD, DVD, flash memory, or the like. In an embodiment, the location of the controller 144 in relation to the coal treatment chamber may not be important; the controller 144 may be placed at the input, output, or anywhere along the coal treatment chamber. If the controller 144 is to be supervised or controlled by an operator, the controller may be placed at a location to allow the operator to view a critical part of the coal treatment process or the coal treatment process sensors.

In an embodiment, the controller 144 may apply the operational parameters to at least the transportation facility, airflow control, inert gas, microwave frequency, microwave power, preheat temperatures, and the like.

In an embodiment, the controller 144 may control the frequency of at least one microwave system 148. The microwave system 148 may be controlled to provide a single frequency or a pulsed frequency. If there are more than one microwave systems 148 in the belt facility 130, the controller 144 may provide operational parameters to the more than one microwave facility 148; the more than one microwave facility may operate at different frequencies.

In an embodiment, the controller 144 may control the power of at least one microwave system 148. The microwave system 148 may be controlled to provide a single power or a pulsed power. If there are more than one microwave systems 148 in the belt facility 130, the controller 144 may provide operational parameters to the more than one microwave facility 148; the more than one microwave facility may operate at different power.

In an embodiment, the controller 144 may control the belt facility 130 processing environment that may include airflow, inert gas flow, hydrogen flow, positive pressure, negative pressure, vacuum levels, and the like. The air flow in the belt facility 130 may include providing drying air, inert gases, hydrogen, and pressure changes to control released gases from the coal. In an embodiment, dry air may be used to aid in the moisture reduction of the coal in the belt facility. In an embodiment, inert gas may be used to inhibit coal ignition during high coal temperatures; inert gases may also be used to prevent other oxidation processes. In an embodiment, hydrogen may be used during the sulfur reduction process. In an embodiment, pressures in the belt facility 130 may be used to remove non-coal products as they are released as gases from the coal.

In an embodiment, the controller 144 may be a commercially available machine controller or may be a custom designed controller for the belt facility 130. In an embodiment, the controller may receive operational status feedback from the systems and facilities of the belt facility 130. The feedback may be the current settings, the actual running parameters, percentage of capacity, and the like; the feedback may be viewable on the controller 144 or any computer device associated with the controller 144.

In an embodiment, the controller may have override controls that may allow an operator to manually change the operational parameters of at least one coal treatment process. The manual changing of the operational parameters may be considered an override or complete manual control of the coal treatment processes.

In embodiments, the processing time (over the course of which the coal may be subject to the microwaves) is typically between 5 seconds to 45 minutes, depending on the size and configuration of the belt facility 130, the microwave system 148 power available, and the volume of coal to be treated. Small volumes may require shorter processing times.

A preheat facility 138 may heat the coal prior to the coal reaching the microwave system 148. The preheat may be to heat the coal to remove external moisture from the coal. The removal of excess external moisture may make it easier for the microwave systems 148 to remove the internal non-coal products by removing moisture that may absorb microwave energy.

In an embodiment, the coal may be preheated using thermal radiation, infrared radiation, or the like that may be powered by electricity, gas, oil, or the like.

In an embodiment, the preheat facility 138 may be internal to the belt facility 130 or may be external and prior to the belt facility 130.

In an embodiment, the preheat facility may use an air environment that may aid in the removal of moisture such as dry air. The air environment may flow through the preheat facility to aid in the drying of the coal.

In an embodiment, the preheat facility 138 may have a collection facility to collect the removed moisture.

A microwave/radio wave system (microwave system) 148 may provide electromagnetic wave energy to the coal in the belt facility 130 for the removal of non-coal products. Non-coal products may be water moisture, sulfur, sulfate, sulfide, ash, chlorine, mercury, metals, water, hydrogen, hydroxyls, and the like. The non-coal products may be removed from the coal by heating the non-coal products using microwave energy to temperatures that release the non-coal products from the coal. The release may occur when there is a material phase change from a solid to a liquid, liquid to a gas, solid to gas, or other phase change that may allow the non-coal product to be released from the coal.

In an embodiment, different non-coal products may be released from the coal at different temperatures; the coal temperatures surface temperatures may range between 70 and 250 degrees C. In an embodiment, water moisture may release at the lower end of this scale while sulfur may release between 130 and 240 degrees C.; ash may release between the water and sulfur temperatures and may be released with the water and/or the sulfur. In an embodiment, the coal may be heated to certain interior and surface temperatures because of the heating of the non-coal products by the microwave energy of the microwave system 148.

In an embodiment, the microwave system 148 electromagnetic energy may be created by devices such as a magnetron, klystron, gyrotron, or the like. In an embodiment, there may be at least one microwave system 148 in the belt facility 130. In an embodiment, there may be more than one microwave systems 148 in the belt facility 130.

In belt facilities 130 where there are more than one microwave system 148, the microwave systems 148 may be in a parallel orientation, a serial orientation, or a parallel and serial combination orientation to the transportation system.

The parallel microwave system 148 orientation may have more than one microwave system 148 setup side-by-side on one side or both sides of the belt facility 130. In an embodiment, the more than one microwave system 148 may be grouped together and setup on both sides of the belt facility 130. For example, at a certain location along the belt facility 130 there may be N microwave systems 148 with N/2 on either side of the belt facility 130. This configuration may allow for more microwave power to be applied at a certain location on the belt facility, allow for applying microwave power at different levels within the certain location, allow the use of more than one smaller microwave systems to create the required power, allow the ramping up or down of microwave power at a certain location, allow for pulse microwave power, allow for continuous microwave power, allow for a combination of pulse and continuous microwave power, or the like. In an embodiment, the more than one parallel microwave systems 148 may be controlled independently or as a single unit.

It would be obvious to one skilled in the art that the parallel microwave systems 148 may be controlled to provide microwave energy in a number of powers, frequencies, combination of powers, or combinations of frequencies to meet the requirement of treating coal.

The serial microwave system 148 orientation may have more than one microwave system 148 set up along the length of the belt facility 130. In an embodiment, each individual microwave system 148 setup may be considered a station or process element of the total coal treatment process. In an embodiment, there may be more than one single or group of microwave systems 148 at more than one location along the length of the belt facility 130. There may be a distance between the serial microwave systems 148 that may allow other processes to be performed between the serial microwave systems 148. The serial microwave systems 148 may allow for different microwave frequencies to be applied at different locations, different microwave power to be applied at different locations, different microwave duty cycles (pulsed or continuous) to be applied at different locations, or the like.

In an embodiment, the distance between microwave systems 148 may allow other processes to be preformed such as non-coal product removal, coal cooling, a location for non-coal products to complete the release process, coal treatment, coal weighting, non-coal product release sensing, or the like.

In an embodiment, the more than one serial microwave system 148 may have redundant single or group microwave systems that may be able to repeat a particular treatment process if required. For example, one microwave station may apply microwave power to remove water moisture from the coal followed by a coal weigh station to determine the amount of water moisture removed. Depending on the coal weight, it may be determined that there is still water moisture remaining in the coal, a redundant microwave system 148 may be the next location to reapply microwave power to remove the remaining water moisture. In an embodiment, the redundant microwave system 148 may or may not be used to further process the coal. In an embodiment, the redundant microwave system 148 may repeat the same process as the previous microwave system 148 or may be used for a different process then the previous microwave system 148.

In another example, water moisture sensors may determine that water moisture is still being released from the coal and a second redundant microwave process may be applied to the coal. In an embodiment, the controller may make the determination if the microwave process is to be repeated.

In an embodiment, the microwave system 148 power may be pulsed or continuous. To regulate the microwave energy applied to the coal, the microwave energy output may be pulsed at a regular time interval at a constant frequency. In an embodiment, the microwave power per source may be at least 15 kW at a frequency of 928 MHz or lower and in other embodiments may be at least 75 kW at a frequency of 902 MHz or more.

In an embodiment, lower frequencies of microwave energy may penetrate deeper into the coal than do higher frequencies. A microwave system 148 may generate a frequency output between 100 MHz and 20 GHz. Other frequencies of wave energy may be used in accordance with embodiments of the invention.

As previously discussed, the microwave systems 148 may be setup as coordinated stages. For example, the coal on the belt facility 130 may be spaced at the same distance as the microwave systems 148, this may allow the coal to be staged under each of the microwave generators during the coal treatment process. In an embodiment, there may be coal treatment processing advantages to varying the speed of the belt at each microwave system 148 station for the processing of the coal. In an embodiment, this may be a method of batch processing on a continuous belt facility 130.

In embodiments, the processing time (over the course of which the coal may be subject to the microwaves) is typically between 5 seconds to 45 minutes, depending on the size and configuration of the belt facility 130, the microwave system 148 power available, and the volume of coal to be treated. Small volumes may require shorter processing times.

In an embodiment, at 100% efficiency, 1 kW of electromagnetic energy can evaporate 3.05 lbs of water per hour at ambient temperature. For well-designed electromagnetic-radiation systems, 98% of that energy may be absorbed and converted to heat. For example, 1 kW of applied electromagnetic energy requires approximately 1.15 kW of electricity and evaporates 2.989 lbs of water; this may require 61.6 kW of electricity per 160 pounds of moisture removed.

A parameter control facility 140 may receive sensor information and provide the sensor information as a feedback to the controller 144. In an embodiment, the parameter control facility 140 may contain a computer device such as a server, web server, desktop computer, laptop computer, handheld computer, PDA, flash memory, or the like. In an embodiment, the parameter control facility 140 may communicate with the various facilities and sensors using a LAN, WAN, P2P, CD, DVD, flash memory, or the like. In an embodiment, the parameter control facility 140 may contain an interface to receive the signals from the various solid fuel treatment facility 132 sensors. The interface may be able to receive either analog or digital signal data from the sensors. For analog data, the parameter control facility 140 interface may use an analog to digital converter (ADC) to convert the analog signal to digital data for data storage.

In an embodiment, the parameter control facility 140 may interface with sensors that may include belt facility 130 air flow, belt speed, temperature, microwave power, microwave frequency, inert gas levels, moisture levels, ash levels, sulfur levels, or the like. The temperatures measured may be both coal temperatures during processing or the chamber temperature; the chamber temperature may be an indication if there is a fire in the chamber.

In an embodiment, the parameter control facility 140 may contain internal memory such as RAM, CD, DVD, flash memory, and the like that may store the sensor readings. The parameter control facility 140 may store the sensor information, provide real time feedback to the controller 144, store sensor information and provide real time feedback to the controller, or other storing/feedback method. In an embodiment, the parameter control facility 140 may collect sensor readings and provide stored data feedback to the controller 144. The collected sensor readings may be used to provide the controller 144 historic average sensor readings, time period sensor readings, histograms of sensor readings over time, real time sensor readings, and the like.

In an embodiment, sensor data collected by the parameter control facility 140 may be viewable on the parameter control facility 140 or any computer device associated with the parameter control facility 144.

The belt facility 130 sensors 142 may provide coal treatment process data to the parameter control facility 140 and the controller 144. The data for the coal treatment process from sensors may include water vapor, ash, sulfur, microwave power, microwave frequency, coal surface temperature, coal weight, microwave emissions, airflow measurement, belt facility temperature, and the like. In an embodiment, the sensors may be analog or digital measurement devices.

In an embodiment, the water vapor of the belt facility 130 may be measured by a moisture analyzer. The moisture analyzer may be placed in relation to the microwave system 148 to measure the water vapor being released from the process coal. In an embodiment, the coal processing may continue until the measured level of water vapor has reached a predefined level. The water vapor levels may be measured as percent moisture, parts per million, parts per billion, or other vapor measuring scale.

In an embodiment, both ash and sulfur may be measured by a chemical signature level analyzer. There may be separate chemical signature level analyzers for the ash and the sulfur. In an embodiment, the coal processing may continue until the measured level of ash and sulfur have reached a predetermined level.

In an embodiment, the microwave system 148 power and frequency output may be measured as an actual level to be compared to the set levels.

In an embodiment, the coal surface temperature may be measured by sensors such as infrared temperature sensors or thermometers. The temperature sensors may be place in relation to a coal treatment process to measure the coal surface temperature during and after coal treatment: the coal treatment process may be either heating or cooling. In an embodiment, the coal processing may continue until the measured coal surface temperature has reached a predefined level. In an embodiment, the coal may be heated to certain interior and surface temperatures because of the heating of the non-coal products by the microwave energy of the microwave system 148.

In an embodiment, the coal weight may be measured using commercially available scales. The coal weight may be used to determine the removal of non-coal products from the coal. In an embodiment, the coal may be measured before and after a treatment station to determine the reduced weight of the coal. The coal weight delta may be an indicator of the percentage of non-coal products that have been released from the coal. In an embodiment, the weights may be made in real time as the coal passes over the weight scale.

In an embodiment, microwave emissions from the belt facility 130 may be measured as a safety indicator. The microwave emissions sensor may be a standard available sensor. In an embodiment, there may be a safety or environmental reason to assure that microwave emissions beyond a predetermined level are not measured outside of the belt facility 130.

In an embodiment, the belt facility 130 actual air flow may be measured for comparison to the required air flow. Air flow may be measured as velocity, direction, pressure in, pressure out, and the like.

In an embodiment, the belt facility 130 chamber temperature may be measured with a standard temperature sensor. The chamber temperature may be measured as a safety feature to detect for a chamber file.

The removal system 150 may remove non-coal products from the belt facility 130 as the non-coal products are released from the treated coal. The non-coal products may be released from the coal as a gas or as a liquid. The removal system 150 may remove gases by air movement toward a collection duct where the gases may be collected and processed. The removal system 150 may use positive or negative air pressures to remove gases from the belt facility 130. The positive pressure system may blow the gases to a collection area where the negative pressure system may pull the gases into a collection area. The removal system 150 may collect liquids at the bottom of the belt facility 130 in collecting areas.

In an embodiment, some non-coal products may be collected as both a gas and a liquid (e.g. water). In an embodiment, as the water vapor is released from the coal, some of the vapor may be captured by a gas removal system. Depending on the amount and rate of the water vapor removal from the coal, the water vapor may condense as liquid water on the walls of the belt facility 130. In an embodiment, the condensed water may be forced down the walls with a flow of air into the liquid collection areas. It may be critical to remove this water so as to avoid an electrical storm within the chamber.

In an embodiment, depending on the coal temperatures, sulfur may act similar to water moisture by being released as a gas or as a liquid.

In an embodiment, ash may be removed with either the water moisture or the sulfur.

In an embodiment, the gas collection may collect a single type gas or may collect a plurality of gases being released from the treated coal. Depending on the location within the belt facility and the process temperature of the coal, at least one gas may be released from the coal. Depending on the coal temperatures, the gases release in a certain location of the belt facility may be a particular type of gas. For example, at a location where the coal has a temperature between 70 and 100 degrees C. the gases may be substantially water vapor where coal temperatures between 160 and 240 degrees C. the gases may be substantially sulfur vapor.

In an embodiment, the liquid collection may collect a single type liquid or may collect a plurality of liquids being released from the treated coal. Depending on the location within the belt facility and the process temperature of the coal, at least one liquid may be released from the coal.

The containment facility 162 may receive the gas and liquid non-coal products from the belt facility 130 removal system 150. The removed non-coal products may include water, sulfur, coal dust, ash, hydrogen, hydroxyls, and the like.

In an embodiment, the containment facility 162 may have liquid containment tanks for holding liquids removed from the belt facility 130; there may be a plurality of liquid containment tanks. In an embodiment, a liquid containment tank may contain more than one type of liquid depending on where the liquid was removed from the belt facility. In an embodiment, there may be different liquid containment tanks located at different locations of the belt facility 130 for collection of liquids.

In an embodiment, the containment facility 162 may have gas containment tanks for holding gases removed from the belt facility 130; there may be a plurality of gas containment tanks. In an embodiment, a gas containment tank may contain more than one type of gas depending on where the gas was removed from the belt facility. In an embodiment, there may be different gas containment tanks located at different locations of the belt facility 130 for collection of gases.

In an embodiment, the containment facility may also include the shielding to contain the microwave energy in the belt facility 130.

The treatment facility 160 may receive the gas and liquids of the containment facility 162 to separate the gases and liquids into individual gases and liquids for disposal.

In an embodiment, the non-coal products may be separated using process that may include sedimentation, flocculation, centrifugation, filtration, distillation, chromatography, electrophoresis, extraction, liquid-liquid extraction, precipitation, fractional freezing, sieving, winnowing, or the like.

In an embodiment, after the gases and liquids have been separated, the gases and liquids may be stored in individual containers or tanks.

The disposal facility 158 may receive individualized gases and liquids from the treatment facility 160 for disposal. In an embodiment, disposal of the gases and liquids may include disposing in a landfill, selling gases and liquids to other enterprises, release of non-harmful gases (e.g. water vapor), or the like. In an embodiment, the other enterprises may be companies that may use the individualized gases or liquids directly or may be an enterprise that may further refine the gases or liquids for resale.

The disposal facility 158 may be associated with a shipping facility for removal of the individualized gases and liquids by rail, truck, pipeline, or the like.

The disposal facility 158 may include temporary storage tanks that may permit the temporary storage of gases and liquids until there is a volume that is commercially economical to ship. In an embodiment, the temporary storage tanks may be local or remotely located.

A cooling facility 164 may be located after the belt facility 130 and may provide a controlled atmosphere for the controlled cooling of the treated coal. In an embodiment, the cooling facility may be incorporated into the belt facility 130 or may be a separate facility at the exit of the belt facility; FIG. 1 shows the cooling facility as a separate facility.

In an embodiment, the cooling facility 164 may control the cooling rate of the coal and to control the atmosphere to prevent re-absorption of moisture as the coal cools from the treatment process. In an embodiment, the cooling facility 164 may have a transportation system that may consist of a conveyor belt 300, a plurality of individual containers, or the like surrounded by an enclosure that may create a cooling chamber.

In an embodiment the controlled cooling process may include progressive cooler air to ambient temperature, natural cooling in a controlled atmosphere, cooling with forced dry air, cooling with forced inert gases, or the like. In an embodiment, the transportation system may be able to vary speed to maintain the proper cooling rate. In an embodiment, there may be a sensor system to monitor the gases, coal temperature, belt speed, and the like. The sensor data may be received at a cooling facility 164 controller or may use the belt 130 controller 144; the controller may provide the operational parameters of the cooling facility 164.

In an embodiment, the controlled atmosphere may be dry air or an inert gas.

An out-take facility 168 may move the final cooled treated coal to a location away from the belt facility 130. In an embodiment, the out-take facility 168 may include a transportation system, a dust collection facility, an input section, a transition section, and adapter section, and the like. In an embodiment, the out-take facility may provide finished coal to a bin, rail car, storage location, directly to a processing facility, or the like.

In an embodiment, the input section may receive the treated coal from the cooling facility and the input end may be sized to fit the incoming cooling facility 164 transportation system and the exit end may be sized to fit the transition section.

In an embodiment, the transition section may be a channel to guide the treated coal to the adapter; the transition section may contain a transportation system.

In an embodiment, the adapter section may be sized to fit the transition section and the required shape for the output location (e.g. rail car, storage, direct to a facility).

In an embodiment, the out-take facility 168 may output to at least one location. In an embodiment, there may be more than one out-take facility 168 per belt facility 130 to feed more than one output location.

A testing facility 170 may take samples of the final treated coal and perform standard test on the coal sample to determine if the final treated coal characteristics match the coal desired characteristics 122. In an embodiment, the testing facility may be local or remote to the facility 132.

In an embodiment, the standard test may be standards such as the ASTM Standards D 388 (Classification of Coals by Rank), the ASTM Standards D 2013 (Method of Preparing Coal Samples for Analysis), the ASTM Standards D 3180 (Standard Practice for Calculating Coal and Coke Analyses from As-Determined to Different Bases), the US Geological Survey Bulletin 1823 (Methods for Sampling and Inorganic Analysis of Coal), and the like. The standard test may provide coal characteristics that may include percent moisture, percent ash, percentage of volatiles, fixed-carbon percentage, BTU/lb, BTU/lb M-A Free, forms of sulfur, Hardgrove grindability index (HGI), total mercury, ash fusion temperatures, ash mineral analysis, electromagnetic absorption/reflection, dielectric properties, and the like.

In an embodiment, there may be periodic samples taken from the final treated coal, there may be a first sample and a last sample, there may be one sample, or the like. In an embodiment, all of the selected samples may not be tested, a statistic sample rate may be used of all the samples from the final treated coal with additional tests based on the results of the statistic samples. A person knowledgeable in the art of statistical sampling would understand the different parameters of how many samples to test and back tracking to other samples depending on the test outcome.

In an embodiment, the final treated coal may not be used until a coal sample test indicates acceptable properties of the final treated coal.

The coal output parameters 172 may be a storage location for the classification 110 information for the final treated coal. The coal output parameters 172 may be a database, relational database, table, text file, XML file, RSS, flat file, or the like that may store the characteristics of the final treated coal. The data may be stored on a computer device that may include a server, web server, desktop computer, laptop computer, handheld computer, PDA, flash memory, or the like. In an embodiment, the final treated coal characteristics data may be transmitted to the coal output parameters 172 on a paper hardcopy, electronic format, database, or the like. If the final treated coal characteristics are shipped with paper hardcopy, the characteristic data may be input into the appropriate coal output parameters 172 format on the computer device. In an embodiment, the final treated coal characteristics data may be sent by email, FTP, Internet connection, WAN, LAN, P2P, or the like from a testing facility 170. The coal output parameters 172 may be accessible over a network that may include the Internet.

The testing facility 170 may provide coal characteristics that may include percent moisture, percent ash, percentage of volatiles, fixed-carbon percentage, BTU/lb, BTU/lb M-A Free, forms of sulfur, Hardgrove grindability index (HGI), total mercury, ash fusion temperatures, ash mineral analysis, electromagnetic absorption/reflection, dielectric properties, and the like.

In an embodiment, there may be at least one data record stored in the coal output parameters 172 for each final treated coal. There may be more than one data record if the final treated coal was subject to random or periodic checks during the treatment process. In an embodiment, each test performed on a final treated coal may have the coal characteristics stored in the coal output parameters 172.

The feedback facility 174 may compare the final treated coal characteristics with the coal desired characteristics 122 to determine if the final treated coal is within tolerance of the desired characteristics. The feedback facility may be a computer device that may include a server, web server, desktop computer, laptop computer, handheld computer, PDA, flash memory, or the like.

In an embodiment, the feedback facility 174 may maintain tolerances of coal characteristics that may be considered acceptable final treated coal. The tolerances may be stored a database, relational database, table, text file, XML file, RSS, flat file, or the like that may store the characteristics of the final treated coal. In an embodiment, the feedback facility 174 may be connected to a network that may include an Internet connection, a WAN, a LAN, a P2P, or the like. In an embodiment, the feedback facility 174 may compare the final treated coal characteristics with the desired coal characteristics 122 to determine acceptability of the final treated coal.

In an embodiment, if the final treated coal is outside of the acceptable tolerances a modification may be made to the operational parameters by the monitoring facility 134.

In an embodiment, if the final treated coal is outside of the acceptable tolerances a report may be generated; the report may be available to any computer device associated with the feedback facility network.

The pricing/transactional facility (transactional facility) 178 may determine the final price of the final treated coal. The transactional facility 178 may be a computer device that may include a server, web server, desktop computer, laptop computer, handheld computer, PDA, flash memory, or the like. In an embodiment, the transactional facility 178 may be connected to a network that may include an Internet connection, a WAN, a LAN, a P2P, or the like.

In an embodiment, the transactional facility may receive the income raw coal cost and operational cost of the facility 132 to determine the final coast of the treated coal. Operational cost of the facility 132 may be collected during the processing of the treated coal; the coal may be identified by type, batch number, test number, identification number, or the like. In an embodiment, the operational cost of the facility 132 may be recorded for all processing of the coal identification. The operational cost may include electricity cost, inert gases used, coal used, disposal fees, testing costs, and the like.

In an embodiment, a transactional report may be available to any computer device associated with the feedback facility network.

Coal combustion 200 involves burning coal at high temperatures in the presence of oxygen to produce light and heat. Coal must be heated to its ignition temperature before combustion occurs. The ignition temperature of coal is that of its fixed carbon content. The ignition temperatures of the volatile constituents of coal are higher than the ignition temperature of the fixed carbon. Gaseous products thus are distilled off during combustion. When combustion starts, the heat produced by the oxidation of the combustible carbon may, under proper conditions, maintain a high enough temperature to sustain the combustion. Direct coal combustion may be performed, for example, with fixed bed 220 or stoker combusters, pulverized coal combusters 222, fluidized bed combusters 224 and the like.

Fixed bed 220 systems have been used on small coal combustion boilers for over a century. They use a lump-coal feed, with particle size ranging from about 1-5 cm. The coal is heated as it enters the furnace, so that moisture and volatile material are driven off. As the coal moves into the region where it will be ignited, the temperature rises in the coal bed. There are a number of different types, including static grates, underfeed stokers, chain grates, traveling grates and spreader stoker systems. Chain and traveling grate furnaces have similar characteristics. Coal lumps are fed onto a moving grate or chain, while air is drawn through the grate and through the bed of coal on top of it. In a spreader stoker, a high-speed rotor throws the coal into the furnace over a moving grate to distribute the fuel more evenly. Stoker furnaces are generally characterized by a flame temperature between 1200-1300 degrees C. and a fairly long residence time.

Combustion in a fixed bed 220 system is relatively uneven, so that there can be intermittent emissions of CO, NOx and volatiles during the combustion process. Combustion chemistry and temperatures may vary substantially across the combustion grate. The emission of SO2 will depend on the sulfur content of the feed coal. Residual ash may have a high carbon content (4-5%) because of the relatively inefficient combustion, and the restricted access of oxygen to the carbon content of the coal.

Pulverized coal combustion ("PCC") 222 is the most commonly used combustion method for coal-fired power plants 204. Before use, the coal is ground (pulverized) to a fine powder. The pulverized coal is blown with part of the air for combustion into the boiler through a series of burner nozzles. Secondary or tertiary air may also be added. Units operate at close to atmospheric pressure. Combustion takes place at temperatures between 1300-1700 degrees C., depending on coal rank. For bituminous coal, combustion temperatures are held between 1500-1700 degrees C. For lower rank coals, the range is 1300-1600 degrees C. The particle size of coal used in pulverized coal processes ranges from about 10-100 microns. Particle residence time is typically 1-5 seconds, and the particles must be sized so that they are completely burned during this time. Steam is generated by the process that may drive a steam generator and turbine for power generation 204.

Pulverized coal combustors 222 may be supplied with wall-fired or tangentially fired burners. Wall-fired burners are mounted on the walls of the combustor, while the tangentially fired burners are mounted on the corner, with the flame directed towards the center of the boiler, thereby imparting a swirling motion to the gases during combustion so that the air and fuel is mixed more effectively. Boilers may be termed either wet-bottom or dry-bottom, depending on whether the ash falls to the bottom as molten slag or is removed as a dry solid. A primary advantage of pulverized coal combustion 222 is the fine nature of the fly ash produced. In general, PCC 222 results in 65%-85% fly ash, with the remainder in coarser bottom ash (in dry bottom boilers) or boiler slag (wet bottom boilers).

Boilers using anthracite coal as a fuel may employ a downshot burner arrangement, whereby the coal-air mixture is sent down into a cone at the base of the boiler. This arrangement allows longer residence time that ensures more complete carbon burn. Another arrangement is called the cell burner, involving two or three circular burners combined into a single, vertical assembly that yields a compact, intense flame.

The high temperature flame from this burner may result in more NOx formation, though, rendering this arrangement less advantageous.

Cyclone-fired boilers have been employed for coals with a low ash fusion temperature that would be otherwise difficult to use with PCC 222. A cyclone furnace has combustion chambers mounted outside the tapered main boiler. Primary combustion air carries the coal particles into the furnace, while secondary air is injected tangentially into the cyclone, creating a strong swirl that throws the larger coal particles towards the furnace walls. Tertiary air enters directly into the central vortex of the cyclone to control the central vacuum and the position of the combustion zone within the furnace. Larger coal particles are trapped in the molten layer that covers the cyclone interior surface and then are recirculated for more complete burning. The smaller coal particles pass into the center of the vortex for burning. This system results in intense heat formation within the furnace, so that the coal is burned at extremely high temperatures. Combustion gases, residual char and fly ash pass into a boiler chamber for more complete burning. Molten ash flows by gravity to the bottom of the furnace for removal.

In a cyclone boiler, 80-90% of the ash leaves the bottom of the boiler as a molten slag, so that less fly ash passes through the heat transfer sections of the boiler to be emitted. These boilers run at high temperatures (from 1650 to over 2000 degrees C.), and employ near-atmospheric pressure. The high temperatures result in high production of NOx, a major disadvantage to this boiler type. Cyclone-fired boilers use coals with certain key characteristics: volatile matter greater than 15% (dry basis), ash contents between 6-25% for bituminous coals or 4-25% for subbituminous coals, and a moisture content of less than 20% for bituminous and 30% for subbituminous coals. The ash must have particular slag viscosity characteristics; ash slag behavior is critical to the functioning of this boiler type. High moisture fuels may be burned in this type of boiler, but design variations are required.

Pulverized coal boilers 222 in the U.S. use subcritical or supercritical steam cycling. A supercritical steam cycle is one that operates above the water critical temperature (374 degrees F.) and critical pressure (22.1 mPa), where the gas and liquid phases of water cease to exist. Subcritical systems typically achieve thermal efficiencies of 33-34%. Supercritical systems may achieve thermal efficiencies 3 to 5 percent higher than subcritical systems.

Increasing the thermal efficiency of coal combustion results in lower costs for power generation 204, because less fuel is needed. Increased thermal efficiency also reduces other emissions generated during combustion, such as those of SO2 and NOx. Older, smaller units burning lower rank coals have thermal efficiencies that may be as low as 30%. For larger plants, with subcritical steam boilers that burn higher quality coals, thermal efficiencies may be in the region of 35-36%. Facilities using supercritical steam may achieve overall thermal efficiencies in the 43-45% range. Maximum efficiencies achievable with lower grade coals and lower rank coals may be less than what would be achieved with higher grade and higher rank coals. For example, maximum efficiencies expected in new lignite-fired plants (found, for example, in Europe) may be around 42%, while equivalent new bituminous coal plants may achieve about 45% maximum thermal efficiency. Supercritical steam plants using bituminous coals and other optimal construction materials may yield net thermal efficiencies of 45-47%.

Fluidized bed combustion ("FBC") 224 mixes coal with a sorbent such as limestone and fluidizes the mixture during the combustion process to allow complete combustion and removal of sulfur gases. "Fluidization" refers to the condition in which solid materials are given free-flowing fluid-like behavior. As a gas is passed upward through a bed of solid particles, the flow of gas produces forces which tend to separate the particles from one another. In fluidized bed combustion, coal is burned in a bed of hot incombustible particles suspended by an upward flow of fluidizing gas.

FBC 224 systems are used mainly with subcritical steam turbines. Atmospheric pressure FBC 224 systems may be bubbling or circulating. Pressurized FBC 224 systems, presently in earlier stages of development, mainly use bubbling beds and may produce power in a combined cycle with a gas and steam turbine. FBC 224 at atmospheric pressures may be useful with high-ash coals and/or those with variable characteristics. Relatively coarse coal particles, around 3 mm in size, may be used. Combustion takes place at temperatures between 800-900 degrees C., substantially below the threshold for forming NOx, so that these systems result in lower NOx emissions than PCC 222 systems.

Bubbling beds have a low fluidizing velocity, so that the coal particles are held in a bed that is about 1 mm deep with an identifiable surface. As the coal particles are burned away and become smaller, they ultimately are carried off with the coal gases to be removed as fly ash. Circulating beds use a higher fluidizing velocity, so that coal particles are suspended in the flue gases and pass through the main combustion chamber into a cyclone. The larger coal particles are extracted from the gases and are recycled into the combustion chamber. Individual particles may recycle between 10-50 times, depending on their combustion characteristics. Combustion conditions are relatively uniform throughout the combustor and there is a great deal of particle mixing. Even though the coal solids are distributed throughout the unit, a dense bed is required in the lower furnace to mix the fuel during combustion. For a bed burning bituminous coal, the carbon content of the bed is around 1%, with the rest made of ash and other minerals.

Circulating FBC 224 systems may be designed for a particular type of coal. These systems are particularly useful for low grade, high ash coals which are difficult to pulverize finely and which may have variable combustion characteristics. These systems are also useful for co-firing coal with other fuels such as biomass or waste. Once a unit is built, it will operate most efficiently with the fuel it was designed for. A variety of designs may be employed. Thermal efficiency is generally somewhat lower than for equivalent PCC systems. Use of a low grade coal with variable characteristics may lower the thermal efficiency even more.

FBC 224 in pressurized systems may be useful for low grade coals and for those with variable characteristics. In a pressurized system, the combustor and the gas cyclones are all enclosed in a pressure vessel, with the coal and sorbent fed into the system across the pressure boundary and the ash removed across the pressure boundary. When hard coal is used, the coal and the limestone can be mixed together with 25% water and fed into the system as a paste. The system operates at pressures of 1-1.5 MPa with combustion temperatures between 800-900 degrees C. The combustion heats steam, like a conventional boiler, and also may produce hot gas to drive a gas turbine. Pressurized units are designed to have a thermal efficiency of over 40%, with low emissions. Future generations of pressurized FBC systems may include improvements that would produce thermal efficiencies greater than 50%.

Some bituminous coals are themselves suitable for smelting iron and steel without prior coking. Their suitability for this purpose depends on certain properties of the coal, including fusibility, and a combination of other factors including a high fixed carbon content, low ash (<5%), low sulfur, and low calcite (CaCO3) content. Metallurgical coal may be worth 15-50% more than thermal coal.

Gasification 230 involves the conversion of coal to a combustible gas, volatile materials, char and mineral residues (ash/slag). A gasification 230 system converts a hydrocarbon fuel material like coal into its gaseous components by applying heat under pressure, generally in the presence of steam. The device that carries out this process is called a gasifier. Gasification 230 differs from combustion because it takes place with limited air or oxygen available. Hence, only a small portion of the fuel burns completely. The fuel that burns provides the heat for the rest of the gasification 230 process. Instead of burning, most of the hydrocarbon feedstock (e.g., coal) is chemically broken down into a variety of other substances collectively termed "syngas." Syngas is primarily hydrogen, carbon monoxide and other gaseous compounds. The components of syngas vary, however, based on the type of feedstock used and the gasification conditions employed.

Leftover minerals in the feedstock do not gasify like the carbonaceous materials. The leftover minerals may be separated out and removed. Sulfur impurities in the coal may form hydrogen sulfide, from which sulfur or sulfuric acid may be produced. Because gasification takes place under reducing conditions, NOx typically does not form and ammonia forms instead. If oxygen is used instead of air during gasification 230, carbon dioxide is produced in a concentrated gas stream that may be sequestered and prevented from entering the atmosphere as a pollutant. Gasification 230 may be able to use coals that would be difficult to use in combustion facilities, such as those with high sulfur content or high ash content. Ash characteristics of coal used in a gasifier affect the efficiency of the process, both because they affect the formation of slag and they affect the deposition of solids within the syngas cooler or heat exchanger. At lower temperatures, such as those found in fixed-bed and fluidized gasifiers, tar formation can cause problems.

Three types of gasifier systems are available: fixed beds, fluidized beds and entrained flow. Fixed bed units, not normally used for power generation, use lump coal. Fluidized beds use 3-6 mm size coal. Entrained flow units use pulverized coal. Entrained flow units run at higher operating temperatures (around 1600 degrees C.) than fluidized bed systems (around 900 degrees C.).

Gasifiers may run at atmospheric pressure or may be pressurized. With pressurized gasification, the feedstock coal must be inserted across a pressure barrier. Bulky and expensive lock hopper systems may be used to insert the coal, or the coal may be fed in as a water-based slurry. Byproduct streams must be depressurized to be removed across the pressure barrier. Internally, the heat exchangers and gas-cleaning units for the syngas must also be pressurized.

Integrated gasification combined cycle (IGCC) 232 systems allow gasification processes to be used for power generation. In an IGCC system 232, the syngas produced during gasification is cleaned of impurities (hydrogen sulfide, ammonia, particulate matter, and the like) and is burned to drive a gas turbine. The exhaust gases from gasification are heat-exchanged with water to generate superheated steam that drives a steam turbine. Because two turbines are used in combination (a gas combustion turbine and a steam turbine), the system is called "combined cycle." Generally, the majority of the power (60-70%) comes from the gas turbine in this system. IGCC systems 232 generate power at greater thermal efficiency than coal combustion systems.

Syngas 234 may be transformed into a variety of other products. For example, its components like carbon monoxide and hydrogen may be used to produce a broad range of liquid or gaseous fuels or chemicals, using processes familiar in the art. As another example, the hydrogen produced during gasification may be used as fuel for fuel cells, or potentially for hydrogen turbines or hybrid fuel cell-turbine systems. The hydrogen that is separated from the gas stream may be also be used as a feedstock for refineries that use the hydrogen for producing upgraded petroleum products.

Syngas 234 may also be converted into a variety of hydrocarbons that may be used for fuels or for further processing. Syngas 234 may be condensed into light hydrocarbons using, for example, Fischer-Tropsch catalysts. The light hydrocarbons may then be further converted into gasoline or diesel fuel. Syngas 234 may also be converted into methanol, which may be used as a fuel, a fuel additive, or a building block for gasoline production.

Coke 238 is a solid carbonaceous residue derived from coal whose volatile components have been driven off by baking in an oven at high temperatures (as high as 1000 degrees C.). At these temperatures, the fixed carbon and residual ash are fused together. Feedstock for forming coke is typically low-ash, low-sulfur bituminous coal. Coke may be used as a fuel during, for example, smelting iron in a blast furnace. Coke is also useful as a reducing agent during such processes. As byproducts of converting coal to coke, coal tar, ammonia, light oils and coal gas may be formed. Since the volatile components of coal are driven off during the coking process 238, coke is a desirable fuel for furnaces where conditions may not be suitable for burning coal itself. For example, coke may be burned with little or no smoke under combustion conditions that would cause a large amount of emissions if bituminous coal itself were used. The coal must meet certain stringent criteria regarding moisture content, ash content, sulfur content, volatile content, tar and plasticity, before it can be used as coking coal.

Amorphous pure carbon 238 may be obtained by heating coal to a temperature of about 650-980 degrees C. in a limited-air environment so that complete combustion does not occur. Amorphous carbon 238 is a form of the carbon allotrope graphite consisting of microscopic carbon crystals. Amorphous carbon 238 thus obtained has a number of industrial uses. For example, graphite may be used for electrochemistry components, activated carbons are used for water and air purification, and carbon black may be used to reinforce tires.

The basic process of coke production 238 may be used to manufacture a hydrocarbon-containing 240 gas mixture that may be used as fuel ("town gas"). Town gas may include, for example, about 51% hydrogen, 15% carbon monoxide, 21% methane, 10% carbon dioxide and nitrogen, and about 3% other alkanes. Other processes, for example the Lurgi process and the Sabatier synthesis use lower quality coal to produce methane.

Liquefaction converts coal into liquid hydrocarbon 240 products that can be used as fuel. Coal may be liquefied using direct or indirect processes. Any process that converts coal to a hydrocarbon 240 fuel must add hydrogen to the hydrocarbons comprising coal. Four types of liquefaction methods are available: (1) pyrolysis and hydrocarbonization, wherein coal is heated in the absence of air or in the presence of hydrogen; (2) solvent extraction, wherein coal hydrocarbons are selectively dissolved from the coal mass and hydrogen is added; (3) catalytic liquefaction, wherein a catalyst effects the hydrogenation of the coal hydrocarbons; and (4) indirect liquefaction, wherein carbon monoxide and hydrogen are combined in the presence of a catalyst. As an example, the Fischer-Tropsch process is a catalyzed chemical reaction in which carbon monoxide and hydrogen are converted to various forms of liquid hydrocarbons 240. Substances produced by this process may include synthetic petroleum substitutes usable as lubrication oils or fuels.

As another example, low temperature carbonization may be used for manufacturing liquid hydrocarbons 240 from coal. In this process, coal is coked 238 at temperatures between 450 and 700° C. (compared to 800 to 1000° C. for metallurgical coke). These temperatures optimize the production of coal tars richer in lighter hydrocarbons 240 than normal coal tar. The coal tar is then further processed into fuels.

Coal combustion yields a variety of byproducts 242, including volatile hydrocarbons, ash, sulfur, carbon dioxide and water. Further processing of these byproducts may be carried out, with economic benefit.

Volatile matter includes those products, exclusive of moisture, that are given off as a gas or a vapor during heating. For coal, the percent volatile matter is determined by first heating the coal to 105 degrees to drive off the moisture, then heating the coal to 950 degrees C. and measuring the weight loss. These substances include a mixture of short and long chain hydrocarbons plus other gases, including sulfur. Volatile matter thus is comprised of a mixture of gases, low boiling point organic compounds that condense into oils upon cooling, and tars. Volatile matter in coal increases with decreasing rank. Moreover, coals with high volatile matter content are highly reactive during combustion and ignite easily.

Coal ash, a waste product of coal combustion, is comprised of fly ash (the waste removed from smoke stacks) and bottom ash (from boilers and combustion chambers). Coarse particles (bottom ash and/or boiler slag) settle to the bottom of the combustion chamber, and the fine portion (fly ash) escapes through the flue and is reclaimed and recycled. Coal ash contains concentrations of many trace elements and heavy metals, including Al, As, Cd, Cr, Cu, Hg, Ni, Pb, Se, Sr, V, and Zn. Ash that is retrieved after coal combustion may be useful as an additive to cement products, as a fill for excavation or civil engineering projects, as a soil amelioration agent, and as a component of other products, including paints, plastics, coatings and adhesives.

Sulfur in coal may be released during combustion as a sulfur oxide, or it may be retained in the coal ash by reacting with base oxides contained in the mineral impurities (a process known as sulfur self-retention). The most important base oxide for sulfur self-retention is CaO, formed as a result of CaCO3 decomposition and combustion of calcium-containing organic groups. Coal combustion takes place in two successive steps: devolatilization and char combustion. During devolatilization, combustible sulfur is converted to SO2. During char combustion, the process of SO2 formation, sulfation and CaSO4 decomposition take place simultaneously.

Destructive distillation 244 of coal yields coal tar and coal gas, in addition to metallurgical coke. Uses for metallurgical coke and coal gas have been discussed previously, as products of coal transformation. Coal tar, the third byproduct, has a variety of other commercial uses.

Coal tar is a complex mixture of hydrocarbon substances. The majority of its components are aromatic hydrocarbons of differing compositions and volatilities, from the simplest and most volatile (benzene) to multiple-ringed non-volatile substances of large molecular weights. The hydrocarbons in coal tar are in large part benzene-based, naphthalene-based, or anthracene- or phenanthrene-based. There may also be variable quantities of aliphatic hydrocarbons, paraffins and olefins. In addition, coal tar contains a small amount of simple phenols, such as carbolic acid and cumarone. Sulfur compounds and nitrogenated compounds may also be found. Most of the nitrogen compounds in coal tar are basic in character and belong to the pyridine and the quinoline families, for example, aniline.

Coal tar may be fractionally distilled 244 to yield a number of useful organic chemicals, including benzene, toluene, xylene, naphthalene, anthracene and phenanthrene. These substances may be termed coal-tar crudes. They form the basis for synthesis of a number of products, such as dyes, drugs, flavorings, perfumes, synthetic resins, paints, preservatives and explosives. Following the fractional distillation of coal-tar crudes, a residue of pitch is left over. This substance may be used for purposes like roofing, paving, insulation and waterproofing.

Coal tar may also be used in its native state without submitting it to distillation 244. It may be heated to a certain extent to remove its volatile components before using it. Coal tar is also employed as a paint, a weatherproofing agent, or as a protection against corrosion. Coal tar has also been used as a roofing material. Coal tar may be combusted as a fuel, though it yields noxious gases during combustion. Burning tar creates a large quantity of soot called lampblack. If the soot is collected, it may be used for the manufacture of carbon for electrochemistry, printing, dyes, etc.

It is customary for coal combustion facilities 200 and other coal utilization plants to store coal on-site. For a power generation plant 204, 10% or more of the annual coal requirement may be stored. Overstocking of stored coal may present problems, however, related to risks of spontaneous combustion, losses of volatile material and losses of calorific value. Anthracite coal generally presents fewer risks than other coal ranks. Anthracite, for example, is not subject to spontaneous ignition, so may be stored in unlimited amounts per coal pile. A bituminous coal, by contrast, will ignite spontaneously if placed in a large enough pile, and it may suffer disintegration.

Two types of changes occur in stored coal. Inorganic material such as pyrites may oxidize, and organic material in the coal itself may oxidize. When the inorganic material oxidizes, the volume and/or weight of the coal may increase, and it may disintegrate. If the coal substances themselves oxidize, the changes may not be immediately appreciable. Oxidation of organic material in coal involves oxidation of the carbon and hydrogen in the coal, and the absorption of oxygen by unsaturated hydrocarbons, changes that may cause a loss of calorific value. These changes may also cause spontaneous combustion.

Coal must be transported from where it is mined to where it will be used. Before it is transported, coal may be cleaned, sorted and/or crushed to a particular size. In certain cases, power plants may be located on-site or close to the mine that provides the coal to the plant. For these facilities, coal may be transported by conveyors and the like. In most cases, though, power plants and other facilities using coal are located remotely. The main transportation method from mine to remote facility is the railway. Barges and other seagoing vessels may also be used. Highway transportation in trucks is feasible, but may not be cost-effective, especially for trips over fifty miles. Coal slurry pipelines transport powdered coal suspended in water.

In an embodiment, solid fuel treatment parameters for the solid fuel continuous process, batch process, or other process may be generated by the parameter generation facility 128 based on the solid fuel desired characteristics and the solid fuel treatment facility 132 treatment capability. As inputs to the parameter generation facility 128, the coal sample data 120 may provide the starting characteristics of the solid fuel and the coal desired characteristics 122 may provide the desired final characteristics of the solid fuel.

In an embodiment, a first step in determining the solid fuel processing parameters may be to determine the characteristic delta between the actual raw solid fuel characteristics and the desired final processed characteristics.

As previously described, the solid fuel information stored in the coal sample data 120 may include information such as percent moisture, percent ash, percentage of volatiles, fixed-carbon percentage, BTU/lb, BTU/lb M-A Free, forms of sulfur, Hardgrove grindability index (HGI), total mercury, ash fusion temperatures, ash mineral analysis, electromagnetic absorption/reflection, dielectric properties, and the like. The solid fuel characteristics may be supplied by a solid fuel supplier such as a coal mine 102, a solid fuel storage facility 112, a solid fuel processing facility, or the like. In an embodiment, the solid fuel treatment facility 132 may test and determine the solid fuel characteristics for storage in the coal sample data 120.

In an embodiment, as previously discussed, the coal desired characteristics 122 may store the final desired solid fuel characteristics for delivery to a customer, for use at the location of the solid fuel treatment facility 132, or the like. For example, the solid fuel treatment facility 132 may be part of a larger facility and may produce final treated solid fuel for the larger facility. In an embodiment, the coal desired characteristics 132 may store the desired characteristics of a customer requested solid fuel, a solid fuel that may be produced from the available received solid fuel, solid fuel characteristics that may have been produced using previously received solid fuel, or the like.

In an embodiment, the solid fuel treatment parameters may be generated by the parameter generation facility 128 based on the desired final treated solid fuel characteristics. The desired final treated solid fuel characteristics may be related to the requirements of a customer for burning, further processing, storage and reselling, or the like.

In an embodiment, solid fuel treatment parameters may be generated based on the desired final solid fuel characteristics and the treatment capabilities of the solid fuel treatment facility 132. In an embodiment, based on a request for the desired final solid fuel, the parameter generation facility 128 may search and retrieve the solid fuel characteristics from the coal desired characteristics 122 for the desired final treated solid fuel. In an embodiment, the parameter generation facility 128 may calculate the preferred characteristics for the received solid fuel required to produce the desired final treated solid fuel. After the calculation, the parameter generation facility 128 may search the coal sample data 120 to identify a raw solid fuel that may be treated by the solid fuel treatment facility 132 to produce the desired final treated solid fuel.

In an embodiment, the calculations performed by the parameter generation facility 128 may relate to the capabilities of the solid fuel treatment facility 132 capabilities. Depending on the configuration of the solid fuel treatment facility 132, the solid fuel treatment facility 128 may have certain capabilities to treat the solid fuel. For example, the solid fuel treatment facility 132 may be able to remove a certain percent of moisture from a solid fuel during a single course of solid fuel treatment. In determining the proper raw solid fuel to select from the coal sample data 120, the parameter generation facility 128 may consider the desired amount of final treated solid fuel moisture and calculated the amount of moisture that can be removed from the raw solid fuel to determine starting solid fuel moisture characteristic. For example, if the desired final moisture percentage is 5 percent moisture content, and the solid fuel treatment facility 132 may be capable of removing 80 percent of the moisture from a raw solid fuel during a single treatment run, then the selected starting solid fuel may be selected from a group of raw solid fuels with 25 percent moisture content. Alternatively, the parameter generation facility 128 may select a raw solid fuel with a higher moisture percentage, and determine that multiple courses of treatment represent the most efficient or cost-effective treatment plan. It would be understood by those of skill in the art that the treatment capability of the solid fuel treatment facility 132 may vary for different types of solid fuel, and may also vary depending upon the other characteristics of the solid fuel, the facility's previous experience with the solid fuels, or the like.

In an embodiment, calculations performed by the parameter generation facility 128 may be performed for each of the characteristics of the desired solid fuel. In an embodiment, the calculations performed on the set of desired final solid fuel characteristics may yield a set of raw solid fuel characteristics. In an embodiment, the parameter generation facility 128 may attempt to match the set of raw solid fuel characteristics to a raw solid fuel for which data has been stored in the coal sample data 120. In an embodiment, the parameter generation facility 128 may attempt to match the set of parameters using an exact match criterion, a best match criterion, a match based on certain characteristics having a higher matching priority, a combination of match criteria, a statistical match criterion, or the like.

In an embodiment, as a result of the matching process, the parameter generation facility 128 may find more than one raw solid fuel that meets the matching criteria. For example, a search of the coal sample data 120 may yield more than one raw solid fuel if a best match criterion is used. In an embodiment, the best match criteria may call for the identification of a raw solid fuel that meet at least some of the desired solid fuel parameters; the best match may be a raw solid fuel that matches the most parameters. In an embodiment, the set of results from the parameter matching process may include a ranked listing of matching raw solid fuels; the solid fuels with the highest rank may be at the top and the lowest rank may be at the bottom of the list. In an embodiment, the ranked list may be sorted as desired by a user.

In an embodiment, the list of matched raw solid fuels may be presented to the operator of the solid fuel treatment facility 132 for the final selection of the solid fuel to use to produce the desired final treated solid fuel. In an embodiment, the operator may be presented the list of matching raw solid fuels; the list may contain a rating to indicate the raw solid fuels that are considered the best match. In an embodiment, where matches are performed for multiple characteristics, the parameter generation facility 128 may set a prioritization schedule reflecting the importance of particular parameter matches. In an embodiment, where matches are performed for multiple characteristics, the parameter generation facility 128 may calculate an aggregate match index that represents the degree of match among all the characteristics. In an embodiment, a prioritization schedule may be used to give more weight to certain characteristic matches for purposes of calculating an aggregate match index. In embodiments, the parameters for evaluating match closeness may be selected by a user so that prioritization, aggregation or other matching measures may be employed in keeping with the user's specifications.

In an embodiment, after a raw solid fuel is selected, the parameter generation facility 128 may generate a set of parameters for the treatment of the selected raw solid fuel.

In another embodiment, the parameter generation facility 128 may calculate solid fuel treatment parameters based on available solid fuel and the capabilities of the solid fuel treatment facility 132. In an embodiment, there may be at least one received solid fuel available to a solid fuel treatment facility 132. In an embodiment, the parameter generation facility 128 may select one of the available raw solid fuels, determine the characteristics of the raw solid fuel from the coal sample data 120, and determine a final treated solid fuel that may be produced based on the treatment capabilities of the solid fuel treatment facility 132. The parameter generation facility 128 may also model the changes that would take place in a raw solid fuel during one cycle of treatment and during multiple cycles of treatment. In considering the capabilities of the solid fuel treatment facility, the parameter generation facility 128 may model the results of treating the raw solid fuel using several different sets of treatment parameters, so that the most efficient and cost-effective treatment schedule may be selected.

In an embodiment, a single raw solid fuel may be able to produce more than one type of final treated solid fuel. For example, a selected raw solid fuel may have 30 percent moisture content and the solid fuel treatment facility 132 may be capable of removing from one-third to two-thirds of the moisture on each treatment run. Therefore the solid fuel treatment facility may be capable of producing a final solid product with moisture content between 10 percent and 20 percent during a single run. If a second run also removes between one-third and two-thirds of the moisture, a final solid product with a moisture content between 3.3% and 13.3% may be attained. The second run and subsequent runs may not produce the same treatment efficiency as the initial run, so that these runs may not remove the same percentage of moisture as the initial run. In addition, treatment in a single run may be more efficient and/or cost-effective than treating with multiple runs, or vice versa. Using a single run, then, the solid fuel treatment facility 132 may be capable of producing a final solid fuel containing between 10 percent and 20 percent moisture. Using multiple runs, the solid fuel treatment facility may be capable of producing a final solid fuel containing between 3 percent and 13 percent moisture. A user desiring a final solid fuel containing 10 percent moisture may be able to produce this result using several different types of treatment protocols, depending at least in part on the economics of running the treatment using different parameters and different schedules.

In an embodiment, the parameter generation facility 128 may determine the final solid fuel characteristics for all the selected raw solid fuel characteristics based on the capability of the solid fuel treatment facility 132. It would be understood by those in the art that optimizing a particular characteristic of the final solid fuel may entail treatment parameters that would not be ideal for optimizing other characteristics. Hence, it is contemplated that multiple treatment runs may be selected, each with different parameters so that the multiplicity of final solid fuel characteristics may be optimized.

In an embodiment, when generating the solid fuel treatment facility 132 operating parameters, the parameter generation facility 128 may considerer final solid fuel characteristics for a desired solid fuel, a requested solid fuel, an historically produced solid fuel, or the like.

In an embodiment, the solid fuel treatment facility 132 operating parameters may be determined from the selected final desired solid fuel.

In another embodiment, the parameter generation facility 128 may calculate the operation parameters for the solid fuel treatment facility 132 based on previous solid fuels treated in the solid fuel treatment facility 132. In an embodiment, the parameter generation facility 128 may store historical information for previously received raw solid fuels and the final treated solid fuels that were produced from the received raw solid fuels. Using this process, when a certain raw solid fuel is received, the parameter generation facility 128 may determine the treated solid fuel characteristics that can be produce with the raw solid fuel. In addition, the parameter generation facility 128 may match the determined final treated solid fuels with a required final treated solid fuel for the calculation of solid fuel treatment facility 132 operation parameters.

In an embodiment, the parameter generation facility 128 may maintain historical operational parameter data for the treatment of previously received raw solid fuels; the historical operational parameters may be used instead of calculating new parameters.

In an embodiment, solid fuel treatment facility 132 operational parameters may be calculated for a continuous process, a batch process, or other solid fuel treatment process.

In an embodiment, after the parameter generation facility 128 has determined the operation parameters for the treatment of the solid fuel, the operational parameters may be transmitted to the monitoring facility 134, the controller 144, the parameter control 140, or the like.

In an embodiment, the treatment of a solid fuel using a continuous treatment process, batch process, combination of the continuous and the batch process, or the like may be monitored using a feedback loop between the monitoring facility 134, controller 144, process sensors 142, and the like.

As previously discussed, the parameter generation facility 128 may calculate the solid fuel treatment parameters to be used by various components of the solid fuel treatment facility 132 to treat the solid fuel to meet particular specifications. The particular specifications may be based on a customer requirement, solid fuel treatment facility 132 capability, available raw solid fuel, or the like.

In an embodiment, during the treatment of the solid fuel in the solid fuel treatment facility 132, the monitor facility 134 may monitor the treatment process by receiving processing information from the process sensors 142. In an embodiment, the controller 144 may provide operational instructions to the various components (e.g. microwave system 148) for the treatment of the solid fuel. In an embodiment, the process sensors 142 may measure the operation of the solid fuel treatment facility 132. The sensors 142 may measure the input and output of the various components of the belt facility 130, non-solid fuel products released from the solid fuel during treatment, non-component measurements (e.g. moisture levels), or the like.

In an embodiment, the monitoring facility 134 may receive the solid fuel treatment parameters from the parameter generation facility 128. In monitoring the solid fuel treatment, the monitoring facility 134 may apply tolerance zones to the provided parameters. In an embodiment, the tolerance zones may be based on the capability of a component, capability of a sensor, the minimum and maximum parameters required for a certain solid fuel treatment, prior solid fuel treatment, or the like.

In an embodiment, the parameter generation facility 128 may determine the tolerance zones that may be applied to the solid fuel treatment parameters.

In an embodiment, the controller 144 may receive the solid fuel parameters without the tolerance zones. The controller may provide operational instructions based on the solid fuel parameters without the tolerance zones.

In an embodiment, a treatment process monitoring and feedback loop may be established between the monitor facility 134, controller 144, and sensors 142 for the continuous monitoring and updating of treatment parameters of the continuous solid fuel treatment, batch solid fuel treatment, or the like.

In an embodiment, the feedback loop may begin with the parameter generation facility 128 providing the operational parameters to the monitoring facility 134 and the controller 144. In an embodiment, the monitoring facility 134 may apply parameter tolerances to the operational parameters; the parameter tolerances may be used to compare the sensor 142 readings to acceptable treatment results. In an embodiment, the operational parameters may include parameters for controlling solid fuel treatment facility 132 components, non-component treatment measurements (e.g. moisture removal rates), and the like. In an embodiment, the monitoring facility 134 may use sensor 142 information for non-component measurements to modify parameters for component parameters.

In an embodiment, the controller 144 may start the solid fuel treatment by transmitting the operational parameters to components of the belt facility 130 such as the microwave system 148, transportation system, preheat 138, parameter control 140, removal system 150, and the like. In an embodiment, the controller 144 may transmit the operational parameters to the solid fuel treatment components without tolerances. Having received the operational parameters, the solid fuel treatment components may begin treating the solid fuel using a continuous process, batch process, or the like.

In an embodiment, once the treatment of the solid fuel begins, the sensors 142 may begin to measure outputs from the operation of the various the solid fuel treatment components. In an embodiment, the treatment outputs may include measurements such as microwave power, microwave frequency, belt speed, temperatures, air flow, inert gas levels, and the like. In an embodiment, the treatment outputs may include measurement of non-component outputs such as moisture removal, ash removal, sulfur removal, solid fuel surface temperature, air temperatures, and the like. As previously discussed, the sensors 142 may be placed in various locations along the belt facility 130 to measure the various solid fuel treatment outputs.

In an embodiment, the sensors 142 may provide sensor measurements of solid fuel treatment outputs to the monitoring facility 134. The monitoring facility 134 may receive the sensor 142 measurements in real time during the treatment of the solid fuel. In an embodiment, the monitoring facility 134 may compare the sensor 142 measurements to the tolerance zone of the operational parameters.

In an embodiment, the monitoring facility 134 may contain various algorithms to modify the operational parameters based on the received sensor 142 measurements. The algorithms may determine the magnitude of a modification to an operational parameter if the sensor 142 measurement is outside of a tolerance zone. For example a sensor 142 measurement may be either within, above, or below the tolerance zone.

In an embodiment, the monitoring facility 134 may base the operational parameter modifications on real time sensor 142 measurements, sampled sensor 142 measurements, average sensor 142 measurements, statistical sensor 142 measurements, or the like.

In an embodiment, operational parameter modifications may be made based on non-component sensor 142 measurements such as moisture removal, ash removal, sulfur removal, solid fuel surface temperatures, solid fuel weight, and the like.

In an embodiment, the modification facility 134 algorithms may associate certain non-component sensor 142 measurements with solid fuel treatment facility 132 component parameters to adjust the non-component sensor 142 readings. For example, a non-component measurement of the moisture levels in the belt facility environment may require the microwave system 148 to increase or decrease parameters such as microwave system power, microwave frequency, microwave duty cycle, number of microwave systems active, or the like. In an embodiment, the monitoring facility 134 algorithms may combine component sensor 142 readings with associated sensor 142 readings to determine if a modification to the component parameter is required. For example, the sensor 142 readings for the microwave system 148 power levels may be combined with the moisture levels in the area of the microwave system 148. The result may be a microwave system 148 parameter modification that accounts for the current power level setting of the microwave system 148 and the amount of moisture in the environment. In this example, the microwave system 148 power setting may have had a high measurement compared to the desired parameter settings but the moisture reading may be low compared to the desired moisture levels. In this case, the power setting parameter may be increased to remove more moisture from the solid fuel even though the power settings of the microwave system are already above the desired settings.

In an embodiment, a non-component sensor 142 measurement may be associated to more than one solid fuel treatment facility 132 component. In an embodiment, there may be a plurality of non-component sensor 142 measurements related to a component. In an embodiment, the monitoring facility 138 algorithms may determine how best to modify component operational parameter(s) to compensate for a non-component sensor 142 measurement that is outside of a parameter tolerance zone. In an embodiment, the monitoring facility 134 may have predetermined sensor 142 adjustments, may have a knowledge base of parameter adjustments, may use a neural net to adjust parameters based on previous adjustments, adjustments may be made by human intervention, or the like. In an embodiment, safety settings for the component operational parameters may be input into the system that cannot be overridden, or that require administrator intervention in order to override.

In an embodiment, the monitoring facility 134 may maintain a history of operational parameter adjustments made during the treatment of a solid fuel. The monitoring facility 134 may refer to the parameter adjustment history in determining the magnitude of the next parameter adjustment. For example, the microwave system 148 power may have been previously adjusted to increase the amount moisture released from the solid fuel. When determining the magnitude of microwave system 148 power adjustment based on a new sensor 142 reading, the monitoring facility 132 may refer to the previous parameter adjustment to determining the magnitude of the next parameter adjustment. For example, the parameter adjustment history may show that the last microwave system 148 adjustment of 5 percent increased the moisture release by 2 percent. This information may be used to determine the microwave system 148 power adjustment to obtain a desired change in the moisture released for the solid fuel. In embodiments, a calibration curve may be derived from a sequence of measurements in the parameter adjustment history, so that an adjustment of a parameter may be made more accurately in response to a certain sensor 142 reading to obtain a desired result.

In an embodiment, once the monitoring facility 134 has made adjustments to the solid fuel operational parameters, the adjusted parameters may be transmitted to the controller 144 for transmission to the various solid treatment facility 132 components. In an embodiment, the adjusted parameters may be transmitted in real time, at certain time period intervals, continuously, or the like.

In an embodiment, once the controller 144 receives the adjusted parameters, the controller may transmit the adjusted parameters to the various components in real time, at certain time period intervals, continuously, or the like.

In this manner, the monitoring facility 134, controller 144, and sensor 142 feedback loop may continuously apply operational parameters to the solid fuel treatment facility 132 components, measure the component and non-component information with sensors 142, transmit the measurements to the monitoring facility 134, adjust the operational parameters, transmit the adjusted operational parameters to the controller, and the like.

In an embodiment, the continuous feedback loop may be applied to operational parameters for a continuous process, batch process, or the like for the treatment of solid fuels.

In an embodiment, the solid fuel belt facility 130 components may be controlled by operational parameters generated by the parameter generation facility 128 and modified by the monitoring facility 134. As previously discussed, the operational parameters may be monitored and adjusted by the monitoring facility 134 and the controller 144 may transmit the operational parameters to the solid fuel belt facility 130 components.

In embodiments, the solid fuel belt facility 130 may include components such as a transport belt, microwave systems, sensors, collection systems, a preheat facility, a cool down facility, and the like. In an embodiment, the solid fuel belt facility 130 may be a continuous treatment facility, batch facility, or the like.

In an embodiment, the treatment of solid fuel to yield a final treated solid fuel meeting a set of desired characteristics may be controlled by the belt facility 130 components using operational parameters selected to produce the desired solid fuel characteristics. It would be understood in the art that the desired characteristics of the final treated solid fuel may be produced by adjusting the control of more than one belt facility 130 component. For example, the moisture released from the solid fuel during the treating process may be controlled by adjusting microwave system 148 power, microwave system 148 frequency, microwave system 148 duty cycle, preheat temperatures, belt speeds, atmosphere composition (e.g. dry air or inert gas), or the like individually or in combinations. The belt facility 130 component parameters may be influenced by other requirements such as processed solid fuel per a time period, the starting raw fuel characteristics, the final treated fuel characteristics, or the like.

In an embodiment, the controller 144 may store the operational parameters for the belt facility 130 components and may transmit the parameters to the belt facility 130 components. In an embodiment, the controller 144 may convert the operational parameters into machine commands that are understood and executed by the belt facility 130 components.

In an embodiment, sensors 142 may be used to measure operations of the belt facility 130 components and to obtain information pertaining to the solid fuel treatment. In embodiments, the sensors 142 may measure information directly from belt facility 130 components such as the microwave system 148 or from environmental conditions that may result from the treatment of the solid fuel such as moisture released from the solid fuel. In embodiments, the environmental conditions may include moisture levels, ash levels, sulfur levels, air temperatures, solid fuel surface temperatures, inert gas levels, cooling rates, or the like. In an embodiment, there may be a plurality of sensors 142 to measure the same environmental condition within the belt facility 130, either to provide redundancy or to make measurements at different locations to follow the progression of treatment. For example, there may a plurality of sensors 142 for measuring the moisture released from the solid fuels, with moisture sensors 142 located at a microwave system 148, following a microwave system 148 station, and the like. Additionally, there may be water sensors to measure the volume of liquid water that collects at a water collection station in the belt facility 130. In an embodiment, there may be a plurality of sensors for each type of measurement made within the belt facility 130.

In an embodiment, the sensors 142 may record the various component and non-component information and transmit the information to the monitoring facility 134. As previously discussed, the monitoring facility may use the received sensor 142 information to make adjustments to the solid fuel treatment parameters. In an embodiment, the monitoring facility 134 may transmit the adjusted solid fuel treatment parameters to the controller to modify the treatment of the solid fuel.

In an embodiment, the treatment of the solid fuel may be continuously measured to assure that the final treated solid fuel characteristics are attained. In this manner, the solid fuel treatment process may be continuously adjusted in response to any changes in the raw solid fuel characteristics. For example, a raw solid fuel characteristic such as the moisture content may vary over the time in which the raw solid fuel is treated. In this example, the moisture content starts at a one level at the beginning of a treatment run and may vary up or down during the treatment process. In an embodiment, any of the measurable solid fuel characteristics may change within a supply of solid fuel. By using sensors 142 within the belt facility 130 while the solid fuel is being treated, the operational parameters may be adjusted to produce a consistent set of characteristics during the entire solid fuel treatment time. In an embodiment, the belt facility 130 operation parameters may be adjusted to obtain a consistent set of characteristics in the final treated solid fuel.

In embodiments, as the solid fuel is treated, parameters that may be adjusted may include microwave energy, air temperatures, inert gas levels, air flow velocities, belt velocity, and the like. In an embodiment, the belt facility 130 operational parameters may be monitored and adjusted individually, as a group, in associated groups (e.g. belt velocity and microwave power), and the like.

In an embodiment, the method of monitoring and adjusting operational parameters may be applied to a continuous treatment process, a batch treatment process, or other solid treatment method. In batch processing, the incoming raw solid fuel characteristics may change from batch to batch and may require different operational parameters to produce a consistent treated solid fuel at the end of the treatment process.

In an embodiment, the solid fuel belt facility 130 sensors 142 may measure products released from the solid fuel as a result of solid fuel treatment, may measure the operational parameters of the solid fuel belt facility 130 components, or the like. Thereafter, the sensors 142 may transmit measurement information to the controller 144, may transmit measurement information to the monitoring facility 134, may transmit measurement information to the pricing/transactional facility, may transmit measurement information to the parameter control 140, or the like. In an embodiment, the solid fuel belt facility 130 may treat solid fuel in a continuous treatment process, batch process, or the like and sensors 142 may record solid fuel treatment information from these processes.

In an embodiment, the sensors 142 may measure the belt facility 130 component parameters that may include belt speed, microwave system 148 power, microwave system 148 frequency, microwave system 148 duty cycle, air temperature, inert gas flow, air flow, air pressure, inert gas pressure, released product storage tank levels, heating rates, cooling rates, and the like. Additionally, the sensors 148 may also measure non-operational or environmental parameter information that may include released water vapor, released sulfur vapor, collected water volume, collected sulfur volume, collected ash volume, solid fuel weight, solid fuel surface temperature, preheat temperatures, cooling temperatures, and the like. In an embodiment, there may be at least one sensor 142 for each component of the belt facility. For example, the microwave system 148 may have one or more sensors 142 to measure power consumption, frequency, power output, and the like. In an embodiment, there may be more than one sensor 142 to measure the non-component parameters. For example, there may be one or more moisture level sensors 142 to measure the release of moisture throughout the solid fuel belt facility 130. There may be a moisture sensor 142 at the microwave system 148 station, just after the microwave system 148 station, or the like. There may also be more than one microwave system 148 station that may also have more than one moisture sensor 142.

In an embodiment, the sensors 142 may be able to measure the consumption of resources by a solid fuel treatment facility 132 such as power consumed, inert gas used, gas used, oil used, or the like. In an embodiment, the sensors 142 may be able to measure the products produced by the solid fuel treatment facility 132 such as water, sulfur, ash, or other product released from the solid fuel during treatment.

In an embodiment, the sensors 142 may transmit the measurement information to the controller 144, monitoring facility 134, the pricing/transactional facility 178, or the like. In an embodiment, the sensors 142 may transmit selectively, for example not transmit all of the solid fuel treatment facility 132 information to all the information-receiving facilities.

In an embodiment, the controller 144 may receive sensor 142 information from various belt facility 130 components. The controller may be responsible for maintaining the operational parameter state of the various belt facility 130 components. For example, the controller may be responsible for maintaining the belt speed in a solid fuel continuous treatment process. The sensors 142 may provide belt speed information to the controller 144 that may allow the controller to maintain the parameter-required speed. For example, as the amount of solid fuel is added or removed from the belt facility 130 different power levels may be required to maintain a uniform belt speed and the controller 144 may make the adjustments to the power required to maintain the uniform belt speed.

In an embodiment, the monitoring facility 134 may receive sensor 142 information that permits control of the operational parameters required to treat raw solid fuel. In an embodiment, the monitoring facility 134 may receive component sensor 142 information that may include microwave system 148 frequency, microwave system 148 power, microwave system 148 duty cycle, belt speed, inert gas levels, and the like. In an embodiment, the monitoring facility 134, may receive non-component sensor 142 information that may include released moisture, released sulfur, released ash, solid fuel surface temperature, air temperature, and the like.

As previously discussed, the monitoring facility 134 may combine the received sensor 142 information for both the components and non-components using algorithms to attain and/or maintain the required operation parameters to treat the solid fuel to produce the desired final treated solid fuel. In an embodiment, the monitoring facility 134 may receive a set of basic operational parameters from the parameter generation facility 128. The monitoring facility 134 may thereupon adjust the basic operational parameters based on the received sensor 142 information. In an embodiment, the monitoring facility 134 may transmit the adjusted operational parameters to the controller 144 for the control of the solid fuel belt facility 130.

In an embodiment, the pricing/transactional facility 178 may receive sensor 142 information pertaining, for example, to the cost/profit of the final treated solid fuel. In an embodiment, the cost/profit related information may include or permit the calculation of the cost to produce the final treated solid fuel, consumables such as inert gases, volume of collected non-solid fuel products, volume of final treated solid fuel, or the like.

In an embodiment, cost related sensor information may include power used, inert gas used, solid fuel input, and the like. In an embodiment, there may be sensors 142 that measure the power consumed by each solid fuel treatment facility 132 component. In an embodiment, the power consumed may include electricity, gas, oil, and the like. In an embodiment, the consumables used may include inert gas volume, water, or the like.

In an embodiment, profit related sensor information may include the volume of water collected, volume of sulfur collected, volume of ash collected, volume of final treated solid fuel, or the like.

In an embodiment, the pricing/transactional facility 178 may receive sensor 142 information in real time, at time increments, on demand, or the like. In an embodiment, the on demand information may be by the demand of the pricing/transactional facility 178, the sensors 142, or the like.

In an embodiment, the pricing/transactional facility 178 may use algorithms to determine the value of the final treated solid fuel using information that may include, the starting raw solid fuel cost per volume, solid fuel treatment facility 132 cost per volume, solid fuel treatment facility 132 profit materials (e.g. water, sulfur, or ash), solid fuel treatment facility 132 consumables per volume, and the like.

In an embodiment, the sensors 142 may provide cost/profit information that may include solid fuel intake volume, energy required for preheating, energy required for the belt, inert gas volume, energy required for the microwave system 148, energy required for solid fuel cool down, the volume of solid fuel outtake, collected water, collected sulfur, collected ash, or the like.

In an embodiment, the pricing/transactional facility 178 may have access to cost per unit of electricity, gas, oil, solid fuel, and the like. In an embodiment, the pricing/transactional facility 178 may have access to the market value of the released products such as water, sulfur, ash, solid fuel, and the like.

In an embodiment, using unit costs, cost information, and product market value the pricing/transactional facility 178 may be able to determine the value of the final finished solid fuel, released products, and the like. In an embodiment, the pricing/transactional facility 178 may calculate final treated solid fuel value in real time, as an average, a mean value, at the end of a solid fuel run, incrementally, or the like.

For example, the pricing/transactional facility 178 may receive initial raw solid fuel cost information from the coal sample data 120. The intake facility 124 sensors may provide the volume rate of the solid fuel entering the solid fuel belt facility 130 for treatment. The solid fuel belt facility 130 sensors may provide information of the energy required to preheat the solid fuel, transport the solid fuel, the rate of inert gas input to the belt facility 130, energy required for the microwave systems 148, energy required for the cooling facility 164, the volume of finished treated solid fuel removed from the solid fuel treatment facility 132, and the like. In an embodiment, the pricing/transactional facility 178 may combine these sensor measurements with the unit cost for each cost type to develop a cost model for the solid fuel being treated. In an embodiment, the cost model may include incrementally adding the individual component cost to treat the solid fuel to the initial raw solid fuel cost to calculate the final treated solid fuel cost.

In an embodiment, the calculated value of the final treated solid fuel may be compared to the market value of the solid fuel to create an efficiency model for the solid fuel treatment facility 132.

Additionally, the pricing/transactional facility 178 may receive information about the volume of non-solid fuel products collected by the solid fuel treatment facility 132 that may have market value such as water, sulfur, ash, other solid fuel released products, or the like. This information may be used to calculate the unit market values of the various solid fuel release product to provide a profit model for the solid fuel released products.

In an embodiment, the pricing/transactional facility 178 may calculate cost models, profit models, efficiency models, and other financial models for the operation of the solid fuel treatment facility 132.

In embodiments, the belt facility 130 microwave system 148 may be one of a plurality of the solid fuel treatment facility 132 treatment components to act on the solid fuel for the removal of undesired products from the solid fuel. The microwave system 148 may be used singularly, in combination with a plurality of microwave systems 148, in combination with other processes for removing undesired products, or the like.

In an embodiment, the microwaves produced by the microwave systems 148 may be used to heat the undesired solid fuel products to a temperature that may cause the undesired solid fuel products to be released from the solid fuel. In an embodiment the undesired solid fuel may be water moisture, sulfur, sulfate, sulfide, ash, chlorine, mercury, or the like. In an embodiment, as the microwave energy is applied to the solid fuel, the undesired products may be heated to temperatures that may cause the undesired products to release from the solid fuel as a gas, liquid, combination of gas and liquid, and or the like. For example, water may release as a gas once the water contained in the solid fuel reaches the temperatures to convert the water to steam. But, depending on the sulfur temperature, sulfur may release as a gas or as a liquid. In an embodiment, as sulfur is heated, the sulfur may be released first as a liquid and then as a gas. In an embodiment, there may be advantages in releasing an undesired product in two release stages to promote the full release of the undesired product from the solid fuel.

In an embodiment, there may be more than one belt facility 130 microwave system 148 for the removal of undesired solid fuel products. In an embodiment, there may be more than one microwave system 148 within the belt facility 130. The more than one microwave system 148 may apply different controlling parameters such as frequency, power, duty cycle, or the like to the solid fuel. In an embodiment, the different microwave system 148 controlling parameters may target certain undesired products for removal from the solid fuel. Additionally, the microwave systems 148 may target a certain method of removing undesired products such as applying energy to convert the undesired products to a gas, applying energy to convert the undesired products to a liquid, or the like.

In an embodiment, a microwave system 148 may include more than one microwave device, each of which may be operated independently, as part a group, or the like.

In an embodiment, a microwave system 148 may operate independently; therefore there may be a set of operational parameters for each of the independent microwave devices. For example, a microwave system 148 may have more than one independent microwave device and each independent microwave device may have controlling parameters such as power, frequency, duty cycle, or the like. In an embodiment, the controller 144 and the monitoring facility 134 may control each of the independent microwave devices.

In an embodiment, the independent controlled microwave devices may perform different functions for effecting undesired solid fuel product removal. For example, a first microwave device may operate at a certain frequency with a steady power setting while a second microwave device may operate at a different frequency using a duty cycle where the power setting may be varied with time. The combined operation of these two microwave devices may target the removal of a particular undesired product using a particular material phase (e.g. gas or liquid).

In an embodiment, a microwave system 148 may include a plurality of microwave devices that operate as a group; therefore there may be one set of operational parameters for the entire microwave group independent of the number of microwave devices that may be in the microwave system 148 group. For example, grouping a number of microwave devices and providing all the microwave devices the same frequency and power setting may be a way of providing high microwave power to the solid fuel using a number of smaller microwave devices instead of one large microwave device. Using a number of smaller microwave devices may allow a configuration of microwave devices to provide effective undesired product removal.

In an embodiment, a microwave system 148 may be changed from operating as an independent set of microwave devices to operating as a microwave device group by the transmission method for the operational parameters. For example, the microwave system 148 may operate as independent microwave devices when independent parameters are transmitted for each microwave device but the microwave system 148 may operate as a group when one group of operational parameters are transmitted to the microwave devices. In an embodiment, the microwave system 148 may operate as independent microwave devices, a group of microwave devices, or the like In an embodiment, the microwave systems 148 may be placed along the belt facility 130 to provide microwave system 148 treatment combinations that may produce the desired final treated solid fuel. For example, more than one microwave system 148 may be spaced along a belt facility 130 to target the removal of water moisture from the solid fuel. A first microwave system 148 may be directed to remove a certain amount of moisture from the solid fuel; a second microwave system 148 may be place a distance from the first microwave system 148 to remove additional moisture from the solid fuel. Additional microwave systems 148 may be placed along the belt facility 130 to continue the reduction of the moisture as the solid fuel moves along the belt facility 130. In an embodiment, the undesired solid fuel product may be removed in an incremental manner by being treated by a plurality of microwave systems 148 along the belt facility 130. In an embodiment, there may be a distance between the microwave systems 148 to allow for the release of the undesired product; the distance may provide for a time period between the treatment steps. In an embodiment, the microwave systems may be placed close together. It may be understood that this treatment process may be applied to the removal of other undesired solid fuel products either independently or in combination with other undesired solid fuel products.

In an embodiment, energy from the microwave systems 148 may be applied in separate belt facilities 130, with a first belt facility 130 treating the solid fuel and at least one more belt facility 130 further treating the solid fuel. In an embodiment, each belt facility 130 may treat the solid fuel and then feed its product to additional belt facilities 130 until the final treated coal characteristics are reached.

In an embodiment, a batch treatment facility may provide for the incremental removal of undesired solid fuel products. In an embodiment, the batch treatment facility may have at least one microwave facility 148 that may be controlled with alternating operational parameters. For example, the microwave system 148 may operate with a first power, frequency, and duty cycle as a first treatment step and a different power, frequency, and duty cycle may be applied as a second treatment step. In an embodiment, there may be a time period between the steps to allow for the undesired product to be completely released as a result of the treatment step before another treatment step is performed. In an embodiment, there may not be a time period between treatment steps, and continuous treatment may be applied to the batched solid fuel. In an embodiment, the batch treatment facility may process the solid fuel with as many treatment steps as needed to produce the final treated solid fuel.

In an embodiment, as previously discussed, the microwave systems 148 may be controlled by a feedback loop that may include the sensors 142, the monitoring facility 134, the controller 144, and the like. In an embodiment, the sensors 142 may be placed along the belt facility 130 or placed within the batch facility to measure the effectiveness of the microwave systems 148 in removing undesired solid fuel products. The sensors may be placed at the microwave system 148 or after the microwave system 148, to measure gas released undesired products, to measure liquid released undesired products, or the like.

In an embodiment, the sensors 142 may transmit solid fuel treatment readings to the monitoring facility 134 from the plurality of sensor locations. In an embodiment, the monitoring facility 134 may have a target reading for each sensor 142 of the treatment process. As the sensor 142 readings are received from the sensors 142, the monitoring facility 134 may compare the received sensor 142 reading with the target sensor reading to determine if the solid fuel treatment process is treating the solid fuel as required. In an embodiment, based on the received sensor 142 readings the monitoring facility 134 may transmit adjusted operational parameters to components of the belt facility 130. In an embodiment, the monitoring facility 134 may associate each sensor 142 within the belt facility to the operation of a component of the belt facility 130. In an embodiment, each sensor 142 reading may be giving a weight as it may be applied to the control of a component. For example, a first sensor 142 placed at the same location as one of the microwave systems 148 may be given more weight than a second sensor placed at some distance downstream from the microwave systems 148. In an embodiment, the monitoring facility 134 may maintain a sensor weight table that specifies the weight that the sensor 142 reading should be given.

In an embodiment, the monitoring facility 134 may store previous sensor 142 readings that may allow the monitoring facility 134 to track an instantaneous sensor reading, average sensor reading, statistical sensor reading, a sensor reading trend, a sensor reading rate of change, or the like. In an embodiment, the monitoring facility 134 may use any of the sensor tracking methods to determine if a component parameter requires adjustment.

In an embodiment, different sensor readings 142 may be used to adjust different parameters of the belt facility 130 components. For example, a first sensor 142 may be used to monitor and adjust the microwave system 148 frequency and a second sensor 142 may be used to monitor and adjust the microwave system 148 power. In an embodiment, a plurality of sensors 142 that may be associated with a microwave system 148 may be used to adjust individual microwave devices within the microwave system 148. For example, if there are four microwave devices within one microwave system 148, a plurality of sensors associated to the microwave system 148 may be used to adjust the four microwave devices individually. Additionally, any of the microwave systems 148 along the belt facility 130 may be similarly controlled, either individually or in groups.

It may be understood that any of the belt facility components may be controlled in the same manner.

In an embodiment, belt facility 130 components may receive monitoring facility 134 adjusted parameters based on the final treated solid fuel characteristics. In an embodiment, after the solid fuel has been completely treated in the solid fuel treatment facility 132, a testing facility 170 may test samples of the final treated solid fuel for determination of the final solid fuel characteristics. In an embodiment, the testing facility 170 may be part of the solid fuel treatment facility 132, may be a testing facility external to the solid fuel treatment facility 132, or the like.

In an embodiment, the testing facility 170 may test the solid fuel for percent moisture, percent ash, percentage of volatiles, fixed-carbon percentage, BTU/lb, BTU/lb M-A Free, forms of sulfur, Hardgrove grindability index (HGI), total mercury, ash fusion temperatures, ash mineral analysis, electromagnetic absorption/reflection, dielectric properties, and the like. In an embodiment, these final solid fuel characteristics may be stored in the coal output parameters 172 where they may be available to the coal desired characteristics 122, feedback facility 174, monitoring facility 134, and the like.

In an embodiment, the final solid fuel characteristics may be determined while the same solid fuel run is being treated in the solid fuel treatment facility 132. In an embodiment, a subset of final solid fuel characteristics may be available while the solid fuel is still being treated. The subset of characteristics may be determined in an onsite testing facility 170 that may allow the feedback to be provided to the monitoring facility 134 in real time.

In an embodiment, the coal output parameters 172 may transmit the testing information to the monitoring facility 134, the monitoring facility 134 may pull the testing information from the coal output parameters 172, or the like.

In an embodiment, the monitoring facility 134 may use the received solid fuel testing information as an added input to be considered in the adjustment of the solid fuel treatment facility 132 operational parameters. In an embodiment, the parameter generation facility 128 may have access to the testing information stored in the coal output parameters 172 through the coal desired characteristics 122 and therefore may use historical test information in the generation of the initial operational parameters. In an embodiment, the parameter generation facility 128 may transmit the historical test information to the monitoring facility 134. In an embodiment, the transmitted historical test information may be an information summary, statistical information, sample information, trend information, test information versus previous operational parameters, or the like.

In an embodiment, the monitoring facility 134 may compare the historical testing information from the parameter generation facility 128 with the new test information from the coal output parameters 172 to determine how the new test information may relate to the historical information. In an embodiment, the monitoring facility 134 may store the new test information as the tests are completed. In an embodiment, the new test information may be stored in the monitoring facility 134 for the time period that a particular run of raw solid fuel is treated by the solid fuel treatment facility 132. In an embodiment, the stored test information may be historical information for the current raw solid fuel treatment run. In an embodiment, the stored information may provide trending information, statistical information, sample information, or the like of the current solid fuel treatment run. In an embodiment, the stored information may be stored with the operational parameters as the test information is received. In an embodiment, the monitoring facility may analyze the relationship of the operational parameters at the time the test information was received for parameter trends versus the final test information.

In an embodiment, as new test information is received by the monitoring facility 134, the information may be compared to the historical test information, compared with the stored test information, or the like. In an embodiment, the monitoring facility 134 may use the test information comparison as a factor in adjusting the operational parameters of the solid fuel treatment facility 132. In an embodiment, the test information may be used as a direct factor for parameter adjustment, indirect factor adjustment for parameter adjustment (e.g. multiplier), combination of direct and indirect factors, or the like.

In an embodiment, the test information may influence the adjustment of the operational parameter by indicating to the monitoring facility 134 if the operational parameters being used to treat the solid fuel are producing the desired final treated solid fuel. For example, the belt facility 130 sensors 142 may indicate that the proper amount of moisture is being removed from the solid fuel during processing, but the test information may provide characteristic data to indicate a different percentage of moisture is being retained in the solid fuel than would have been calculated using the data from the belt facility 130 sensors 142. In an embodiment, the test information may be used to adjust the operational parameters and may revise the treatment of the solid fuel to effect a change in the final test information characteristics.

In an embodiment, the test information may be used by the monitoring facility 134 to make adjustments to the parameter weight table, to adjust factors in the algorithms used to adjust the operational parameters, to determine if additional belt facility components need to be utilized in treating the solid fuel (e.g. more microwave systems 148 active), to determine if additional runs of the solid fuel through a treatment process may be required (e.g. multiple treatment passes), or the like.

In an embodiment, the non-fuel products removed from the solid fuel during treatment may be collected by the solid fuel treatment facility 132. In an embodiment, sensors 142 may measure the release of a product from the solid fuel as a gas, a liquid, or the like. In an embodiment, the monitoring facility 134 and the controller 144 may interface with the sensors 142 to control the released product removal. In an embodiment, the sensors 142, monitoring facility 134, controller 144, or the like may transmit released product information to the pricing/transactional facility 178. The sensor 142 information received at the monitoring facility 134 and the controller 144 may permit the calculation of instantaneous removal rates, average removal rates, total released product, type of released product, or the like.

In an embodiment, as non-fuel products are released from the solid fuel during treatment, they may be collected by a removal system 150 that may be capable of removing released gases, released liquids, released gases that may condense into a liquid, or the like. In an embodiment, there may be more than one removal system 150 in the solid fuel treatment facility 132. In an embodiment, the released gases may be collected into vents, pipes or containers for transporting the gases to a containment facility 162, a treatment facility 160, a disposal facility 158, or the like. In an embodiment, the released liquids and gases that condense into liquids may be collected into liquid caches, pipes or containers for transporting the liquids to a containment facility 162, a treatment facility 160, a disposal facility 158, or the like.

In an embodiment, there may be sensors 142 that measure the amount of released non-fuel products and transmit the measurements to the monitoring facility 134, controller 144, and the like. In an embodiment, the monitoring facility 134 may determine the amount of released product, the rate of product release, the amount of released product collecting in the caches, the released gas removal rates, and the like. In an embodiment, the monitoring facility 134 may determine whether the removal rates for non-fuel products need to be increased, decreased, or otherwise altered, in keeping with the release rates of the solid fuel products. For example, the monitoring facility 134 may receive sensor 142 information that more released liquid product is being formed than is being removed from the solid fuel treatment facility 132 by the liquid collection cache. In response to this information, the monitoring facility 134 may direct the controller 144 to increase the rate of liquid removal. In an embodiment, this may involve increasing the pump speed to alter the removal rate, starting another pump to alter the removal rate, or the like. In a similar manner, a gas sensor 142 may transmit to the monitoring facility 134 that the properties of the gas release atmosphere (pressure, temperature, gas concentration and the like) indicate that the released gas is not being removed at the proper rate. In an embodiment, the monitoring facility 134 may direct the controller 144 to alter the gas removal rates by adjusting a fan speed, starting another fan, stopping a fan, changing pressures in gas containment chambers, or the like. In an embodiment, the removal systems 150 of the solid fuel treatment facility 132 may be controlled individually or as part of a group.

In an embodiment, the sensors 142 may be placed at various locations along the belt facility 130 to measure the results of the various solid fuel treatments. In an embodiment, the monitoring facility 134 may make adjustments to the operation of the release system 150 based on the sensor 142 readings that indicate, for example, the rate or the amount of released products. The monitoring facility 134 may calculate non-fuel product release rates based on the sensor 142 readings and may adjust the removal system 150 removal rates based on the product release rates, product levels, product atmosphere readings, or the like. In an embodiment, there may be sensors 142 that measure release products such as water, sulfur, ash, and the like for a treatment location of the solid fuel treatment 132. In an embodiment, the monitoring facility 134 may be able to adjust the treatment location removal system 150 to maintain the proper removal rates for the non-fuel products.

In an embodiment, as previously discussed, the collected released non-fuel products may be processed by the containment facility 162, the treatment facility 160, the disposal facility 158, and the like. In an embodiment, there may be sensors 142 that may provide information to the monitoring facility 134 on the state of these facilities. In an embodiment, the monitoring facility 134, controller 144, removal system 150, or the like may control the rates at which the collected released non-fuel products are collected, separated, disposed, or otherwise handled. In an embodiment, collection of the removed released non-fuel products proceeds until a threshold amount is collected, at which time the operator of the solid fuel treatment facility 132 may be signaled that the released product needs to be removed from the collection facilities. In an embodiment, a release product, such as water, may be released from the solid fuel treatment facility 132 without being otherwise collected or aggregated.

In an embodiment, the sensors 142, monitoring facility 134, controller 144, or the like may transmit released product information to the pricing/transactional facility 178. In an embodiment, the pricing/transactional facility 178 may have market-related information, such as market value or disposal cost, available for each of the removed non-fuel products. In an embodiment, decisions regarding the disposition of the removed released non-fuel products may be based on their market value, their disposal cost, or the like. Market-related information may include information related to the regulatory aspects of a particular product, for example, environmental taxes or surcharges applicable to the generation or disposition of a particular substance. In an embodiment, based on the information transmitted by the sensors 142, monitoring facility 134, controller 144, or the like, the pricing/transactional facility 178 may be able to calculate the value of a released non-fuel product, the cost of a released product, or the like. For example, collected liquid sulfur may have a market value for uses in industry, while collected ash may have no market value and may cost money to dispose of in a landfill.

It is understood that market-related information may apply to a number of different markets. For example, collected ash may have market values ranging from negative (due to disposal costs) to a set of positive values depending on demand for it in different industrial applications. In an embodiment, the pricing/transactional facility 178 may calculate released non-fuel product values per unit time, average value per unit of solid fuel, instantaneous values based on the rate of removal, or the like. In an embodiment, the pricing/transactional facility 178 may calculate the value of the treated solid fuel to include the value or cost of the released non-fuel product that was collected from the solid fuel run. For example, the pricing/transactional facility 178 may receive released product information for a particular run of treated solid fuel. The pricing/transactional facility 178 may calculate the overall cost, and therefore the value, of the solid fuel treatment by the calculating the cost to treat the solid fuel and the costs/value of the total released non-fuel product.

In an embodiment, the pricing/transactional facility 178 may contain algorithms to calculate the cost of producing final treated solid fuel, the value of the final treated solid fuel, cost for the disposal of released product materials, value of released product materials, or the like. In an embodiment, the algorithm may include receiving raw solid fuel value from the coal sample data 120, final treated solid fuel cost from the coal output parameters 172, in process treatment costs from the solid fuel treatment facility 132, and the like.

In an embodiment, the pricing/transactional facility 178 may aggregate cost information, value information, or the like for a full solid fuel treatment run or for any portion of a solid fuel treatment run. In an embodiment, the pricing/transactional facility 178 may aggregate cost and value information periodically, at the end of a run, on demand for a portion of a run, or the like.

In an embodiment, the pricing/transactional facility 178 may aggregate the value information of the raw solid fuel from the coal sample data 120. In an embodiment, the value of the raw solid fuel may be in value per unit, total value of the entire received raw solid fuel, or the like. In an embodiment, the pricing/transactional facility 178 may calculate the value of the raw solid fuel used during treatment by determining the total amount of solid fuel treated during a run or portion of a run and using the value per unit of the raw solid fuel to calculate the total value of the raw solid fuel. In an embodiment, the value of the used raw solid fuel may be an input to the solid fuel value algorithm.

In an embodiment, as previously described, the operational parameters may be provided as feedback to the pricing/transactional facility 178 over the run of the solid fuel treatment. In an embodiment, the operational parameters may include costs involved in treating the solid fuel such as electricity used, gas used, oil used, inert gas used, and the like. In an embodiment, the pricing/transactional facility 178 may aggregate all the operational costs from the solid fuel treatment run. In an embodiment, the pricing/transactional facility 178 may store cost per unit information for all the operation parameters. In an embodiment, the pricing/transactional facility 178 may calculate the operational parameter cost for the solid fuel treatment run using the cost per each individual unit and the amount of operational units used. In an embodiment, the operational solid fuel treatment costs may be an input to the solid fuel value algorithm.

In an embodiment, the pricing/transactional facility 178 may aggregate the market value of the solid fuel released products, the cost of disposal of the solid fuel released products, and the like. In an embodiment, the pricing/transactional facility 178 may store cost per unit information, market value per unit information, or the like for all the solid fuel released products. In an embodiment, the aggregated released products cost and market value may be input to the solid fuel value algorithm.

In an embodiment, the pricing/transactional facility 178 may store operating profit information. In an embodiment, the operating profit information may be related to the type of solid fuel being treated, the marketability of the treated solid fuel, the amount of treatment the solid fuel required, or the like. In an embodiment, the operational profit may be a percentage of the solid fuel treatment cost, a fixed profit per unit of solid fuel treated, a fixed profit for the unit of solid fuel delivered to a customer, or the like. In an embodiment, the operational profit may be input to the solid fuel value algorithm.

In an embodiment, the pricing/transactional facility 178 may combine the value of the used raw solid fuel, operational costs, cost/market value of the released solid fuel product, operational cost, and the like to determine the final market value of the treated solid fuel. In an embodiment, the pricing/transactional facility 178 may store the final market value, report the final market value to the solid fuel treatment facility, report the final market value to a customer, and the like. In an embodiment, the stored solid fuel market value may be available for further analysis and calculation, including historical aggregation, querying, data trending, or the like.

In an embodiment, raw solid fuel may be treated for a particular end-use facility. In embodiments, the end-use facility may one of many end-use customers, a dedicated customer, an end-use facility directly associated with the solid fuel treatment facility 132, or the like. In embodiments, the end-use facility may be coal combustion facility 200, coal conversion facility 210, coal byproduct facility 212, or the like.

In an embodiment, the coal combustion facility 200 may include a power generation facility 204, metallurgical facility 208, or the like. The power generation facility 204 may include a fixed bed coal combustion facility 220, a pulverized coal combustion facility 222, a fluidized bed combustion facility 224, combination combustion facility using a renewable energy source 228, or the like.

In an embodiment, the coal conversion facility may include a gasification facility 230, an integrated gasification combined cycle facility 232, a syngas production facility 234, a coke formation facility 238, a purified carbon formation facility 238, a hydrocarbon formation facility 240, or the like.

In an embodiment, the coal byproduct facility 212 may include a coal combustion byproduct facility 242, coal distillation byproduct facility 244, or the like.

In an embodiment, the end-use facility may communicate a request for treated solid fuel by placing the solid fuel treat requirements in the coal output parameters 172. The requirements may provide the desired characteristics of the end-use facility solid fuel. In an embodiment, the solid fuel desired characteristics may include percent moisture, percent ash, percentage of volatiles, fixed-carbon percentage, BTU/lb, BTU/lb M-A Free, forms of sulfur, Hardgrove grindability index (HGI), total mercury, ash fusion temperatures, ash mineral analysis, electromagnetic absorption/reflection, dielectric properties, and the like.

In an embodiment, the end-user facility may specify a particular raw solid fuel to treat, allow the solid fuel treatment facility 132 to select the best raw solid fuel to treat, or some combination thereof.

In an embodiment, once the solid fuel treatment requirements have been input as coal output parameters 172, the solid fuel treatment facility may determine whether the solid fuel is to be treated by a continuous treatment process, batch process, or other processing method. In an embodiment, the solid fuel treatment facility 132 may determine the processing method based on factors including the volume of end-user solid fuel requested, the end user facility solid fuel characteristics required, the raw solid fuel available, capabilities of the different processing methods, or the like. For example, a batch process may be useful for smaller amounts of requested treated solid fuel, while a continuous treatment process may advantageously yield larger amounts. For treated solid fuel with a narrow band of treatment specifications, the solid fuel treatment facility 132 may choose a batch process to maintain better control over the output on a characteristic-by-characteristic basis. A person skilled in the art may understand other reasons for choosing either a batch or continuous treatment process to treat the end-user requested solid fuel.

In an embodiment, the end-user facility may request a particular solid fuel to use, or may request a raw solid fuel with certain characteristics, or may request a range of raw solid fuels as input, or the like. In an embodiment, the end-user facility may have information about the particular lots of raw solid fuel available for treatment in the solid fuel treatment facility 132, and the end-user facility may select one of the raw solid fuels from the available lots. In embodiments, the solid fuel treatment facility 132 may provide a listing of available raw solid fuels to the end-user facility, or the solid fuel treatment facility 132 may provide the end-user facility with a list of treated solid fuels that may be produced. Other methods of allowing the end-user to determine the raw solid fuel input will be apparent to skilled artisans. In an embodiment, the solid fuel treatment facility 132 may make the final decision regarding raw solid fuel input. In an embodiment, the determination of the raw solid fuel selection may be based on the solid fuel treatment facility 132 capability, the historical treatment of a particular raw solid fuel, properties of the raw solid fuel, or the like.

In an embodiment, once the solid fuel treatment facility 132 has received the end-user facility requirements, the solid fuel treatment facility 132 may select the best match raw solid fuel to produce the requested final treated solid fuel. In an embodiment, the coal sample data 120 may be searched by the parameter generation facility 128 to determine the best match raw solid fuel. In an embodiment, the best match solid fuel may be selected according to criteria such as the characteristics of the end-user requested final treated solid fuel, the capability of the continuous treatment facility, the capability of the batch facility, the tolerances of the end-user facility solid fuel requirements, or the like.

In an embodiment, once a raw solid fuel is selected, the parameter generation facility 128 may determine the parameters that may be used to treat it to attain the characteristics requested by the end-user. As previously described, the parameter generation facility 128 may obtain the final treated solid fuel characteristics from the coal desired characteristics 122, where the coal desired characteristics 122 may be defined by an end-user. In an embodiment, the parameter generation facility 128 may use algorithms to calculate the operational parameters for the treatment of the raw solid fuel. In an embodiment, the algorithms may consider variables such as the capability of the solid fuel treatment facility 132, the differences between the selected raw solid fuel and the end-user facility required solid fuel, historical results in treating similar raw solid fuel, or the like. In an embodiment, the parameter generation facility 128 may then set the operational parameters of the belt facility 130 components (e.g. microwave systems 148), the number times the raw solid fuel may be treated, heating rates, cooling rates, atmospheric conditions that may be used during treatment of the solid fuel, removal of released products from the raw solid fuel, and the like. In an embodiment, the parameter generation facility 128 may transmit the operational parameters to the monitoring facility 134 and controller 144 to control the treatment of the raw solid fuel.

The parameter generation facility 128 may select the raw solid fuel to use to produce the end-use facility requested solid fuel using various methods that would be apparent to the skilled artisan. In an embodiment, the parameter generation facility 128 may retrieve the end-use facility solid fuel characteristics from the coal desired characteristics 122. In an embodiment, the parameter generation facility 128 may use key characteristics from the end-use facility solid fuel characteristics to select the raw solid fuel. In an embodiment, key characteristics of the desired end product may be provided by the end-use facility, or determined by the parameter generation facility 128, or determined by the solid fuel treatment facility 132 capabilities, or the like.

The key characteristics may be used to determine the treatment process for the raw solid fuel. In an embodiment, the key characteristics may be ranked in order of importance for the end-use facility solid fuel characteristics. Alternatively, the ranking may be provided by the end-use facility, the parameter generation facility 128, or any other appropriate facility. In an embodiment, the ranking may be ordered according to the final use of the solid fuel. For example, an end-use facility may indicate that a certain moisture level in the final treated solid fuel is required, while other characteristics are less important. Because moisture level would have the highest ranking of desired treated fuel characteristics, settings needed to maintain the desired moisture level would take precedence over other settings.

In an embodiment, the parameter generation facility 128 may use the key characteristics to select the raw solid fuel from the available raw solid fuels. In an embodiment, the parameter generation facility 128 may use the key characteristics to determine operational parameters for treating the raw solid fuel to produce the end-use facility solid fuel. In an embodiment, the parameter generation facility 128 may set the operational parameters based only on the key characteristics, or the parameter generation facility 128 may use the key characteristics along with other characteristics for determining operational parameters.

In an embodiment, the determined operational parameters may be transmitted to the monitoring facility 134, controller 144, or the like. In an embodiment, the monitoring facility 134, using the belt facility 130 sensors 142, may monitor and adjust the operational parameters during the solid fuel treatment process. In an embodiment, as the solid fuel is treated, the sensors 142 may measure the operational parameters for the key characteristics and transmit the sensor 142 readings to the monitoring facility 134. If the monitoring facility determines that the operational parameters require adjusting to obtain the solid fuel key characteristics, the monitoring facility 134 may transmit the adjusted operational parameters to the controller 144. In an embodiment, the controller 144 may provide control over the belt facility 130 components to treat the solid fuel to the operational parameters.

In an embodiment, using the treatment feedback loop of the monitoring facility 134, controller 144, and sensors 142, the solid fuel treatment facility 132 processes the raw solid fuel into the end-use facility requested solid fuel. In an embodiment, the solid fuel may be processed using a continuous treatment process, a batch process, combination of continuous treatment and batch process, or the like.

In an embodiment, at the end of the treatment process, the final treated solid fuel may be tested at a testing facility 170 to determine the characteristics of the final treated solid fuel. In an embodiment, the characteristics of the tested solid fuel may be compared to the original end-use facility solid fuel characteristics. In an embodiment, the compared characteristics may be the key characteristics, all the solid fuel characteristics, or combinations or subsets thereof. In an embodiment, the testing facility 170 may determine if the final treated solid fuel is within the required characteristics of the end-use facility required solid fuel. In an embodiment, as the solid fuel is treated, the tested characteristics may be transmitted to the monitoring facility 134. In an embodiment, the monitoring facility 134 may adjust the operational parameters based on the characteristics provided by the testing facility 170.

In an embodiment, if it is determined that the final treated solid fuel does not meet the requirements of the end-use facility, the final treated solid fuel may be subjected to further treatment in the solid fuel treatment facility 132. In an embodiment, as the solid fuel is treated, the final treated solid fuel may be stored in a temporary storage area until it is determined that it meets the requirements of the end-use facility. When it is determined that the final solid fuel meets the end-use facility requirements, the final solid fuel may be transported to the end-use facility.

In an embodiment, the tested characteristics of the final treated solid fuel may be stored with the coal output parameters 172. In an embodiment, the stored final treated solid fuel test characteristics may be used for historical purposes, for future selection by the end-use facility as a desired solid fuel, for final verification of the completed treatment of the raw solid fuel into the end-use facility required solid fuel, or for other uses, as would be envisioned by skilled artisans.

In an embodiment, a transaction may be carried out for treating raw solid fuel for a particular end-use facility. In an embodiment, the transaction may be the calculation of cost for treating raw solid fuel for an end-use facility. In an embodiment, the cost for treating the raw solid fuel may include costs relating to electricity, gas, oil, inert gas, disposition of released solid fuel products, transportation of the raw solid fuel, transportation of the final treated solid fuel to the end-use facility, and the like. In an embodiment, the transaction may include the revenue realized from the treatment of solid fuel, including proceeds from sales of released solid fuel products or final treated solid fuel.

In an embodiment, each end-use facility request for treated solid fuel may be treated as a transaction. In an embodiment, once the end-use facility communicates the characteristics for the desired final treated solid fuel the pricing/transactional facility 178 may begin aggregating the financial metrics of treating the raw solid fuel to attain the desired characteristics. For example, the pricing/transactional facility may start a cost file, ledger, database, spreadsheet or the like to aggregate the financial metrics (e.g., costs, revenues, profits and losses) associated with the treating of the raw solid fuel.

In an embodiment, once the parameter generation facility 128 has selected a raw solid fuel, the raw solid fuel identification may be communicated to the pricing/transactional facility 178. Using the raw solid fuel identification, the pricing/transactional facility 178 may retrieve the raw solid fuel cost information from the coal sample data 120. In an embodiment, the pricing/transactional facility 178 may store the raw solid fuel cost information to the cost file for a particular treatment run. The cost information may include cost per unit (e.g. cost/ton), total cost of the raw solid fuel, the total number of units available, and the like. Based on the amount of processed solid fuel requested by the end-use facility, the pricing/transactional facility 178 may be able to calculate the cost and cost ratio of the raw solid fuel required to produce the solid fuel as requested by the end-use facility.

As previously described, the parameter generation facility 128 may generate operational parameters to treat the raw solid fuel and may transmit the operational parameters to the monitoring facility 134, controller 144, or the like. The monitoring facility 134, controller 144, or the like may control the treatment of the raw solid fuel by providing operational information to components such as heaters, belts, microwave systems 148, vents, pumps, removal systems 150, and the like. During the treatment of the raw solid fuel, energy cost may be incurred to operate the various components that may consume electricity, gas, oil, or the like. In an embodiment, the solid fuel treatment facility 132 may have sensors 142 that may measure the operation of the various components. In an embodiment, the sensors 142 may also measure the energy that each of the components consumes during the treatment of the raw solid fuel.

In an embodiment, the sensors may transmit the energy use of each component to the pricing/transactional facility 178 during the treatment of the raw solid fuel. In an embodiment, the pricing/transactional facility 178 may store the cost per unit for the various energy types and may be able to convert the energy usage of the solid fuel treatment facility 132 in to cost values. For example, the sensors may transmit data about the number of kilowatts used by the microwave systems 148 to the pricing/transactional facility 178, which has access to information about the cost per kilowatt. Using these usage data and this pricing information, the pricing transactional facility 178 may calculate the cost of operating the microwave systems 148 to treat a given lot of raw solid fuel. In an embodiment, the pricing/transactional facility 178 may aggregate the cost of treating the raw solid fuel during the treatment run and may store these aggregated costs in the cost file for the end-use facility solid fuel treatment. In an embodiment, the pricing/transactional facility 178 may aggregate the costs related to a number of treatment runs for further calculations and analysis.

In an embodiment, additional cost and profits/losses may be associated with non-fuel products that are collected during the processing of the raw solid fuel. In an embodiment, during the treatment of the raw solid fuel, non-fuel products may be obtained, such as water, sulfur, ash, and the like. Some of these collected non-fuel products may have market value, so that they may be sold (e.g. sulfur). There may not be a market for certain other non-fuel products, so that they require disposal at a cost.

In an embodiment, sensors 142 may measure the amount of released non-fuel products collected in the containment facility 162, treatment facility 160, disposal facility 158, and the like. These sensors 142 may then transit data regarding the amount of such products to the pricing/transactional facility 178. In an embodiment, the pricing/transactional facility 178 may store information about the market value, disposal cost, and the like of the various non-fuel products and may calculate the costs and profits/losses associated with each profit or cost of each of the released products. For example, the monitoring facility 134, controller 144, sensors 142, or the like may indicate to the pricing/transactional facility 178 that a certain amount of sulfur (a non-fuel product) has been collected and is available to be sold. The pricing/transactional facility 178 may arrange for the sale of the collected sulfur and its subsequent transfer to a sulfur using enterprise. Subsequently, the pricing/transactional facility 178 may calculate the coal treatment facility's 132 cost of producing the sulfur, or may calculate the revenues from the sulfur sale as a function of production cost, or may perform other financial calculations that would be apparent to skilled artisans.

Calculations regarding costs, profits/losses, anticipated revenues and the like may also be performed at any point during the coal treatment as non-fuel products are collected, using, for example, actual data or projections about the market prices for the particular non-fuel products being tracked, so that a projected set of production costs, revenues, profits/losses and the like may be obtained. Actual figures obtained after the sale and/or transfer of the non-fuel product may be compared with projections, or projections may be compared with historical actual figures. Other uses for and combinations of real-time, projected and historical financial information will be readily apparent to skilled artisans. In an embodiment, the pricing/transactional facility 178 may store financial information regarding the non-fuel products (including production costs, revenues, and the like) in a cost file for the end-use facility solid fuel treatment.

In an embodiment, based on the end-use facility location, the amount of final treated solid fuel, the transportation method to transport the solid fuel, and the like, the pricing/transactional facility 178 may calculate the transportation cost to transport the processed fuel to the end-use facility. In an embodiment, the pricing/transactional facility 178 may use data about transportation costs to calculate the total cost for the end-use facility solid fuel. In an embodiment, the pricing/transactional facility 178 may store the transportation costs in the cost file for the end-use facility solid fuel treatment.

In an embodiment, the pricing/transactional facility 178 may determine the operational profit/loss for the treatment of the raw solid fuel into the requested end-use facility solid fuel. A number of algorithms are available to determine this operational profit/loss, as would be understood by those of ordinary skill in the art. For example, the operational profit/loss may be determined as a percentage of the total cost to treat the raw solid fuel, or as a set profit/loss per unit of treated solid fuel. In an embodiment, the pricing/transactional facility 178 may store the operational profit in the cost file for the end-use facility solid fuel treatment.

In an embodiment, the pricing/transactional facility 178 may receive an indication from the monitoring facility 134, controller 144, sensors 142, or the like that the treatment of the raw solid fuel for the end-use facility is complete. In an embodiment, at the indication that the raw solid fuel treatment is complete, the pricing/transactional facility 178 may aggregate all the solid fuel treatment cost and profits/losses for the final end-use facility solid fuel value. In an embodiment, the aggregation of the cost and profits may use standard accounting practices. In an embodiment, the final end-use solid fuel value may be transmitted to the end-use facility. Alternatively, as described above, the pricing/transactional facility may provide projections about costs, profits/losses, anticipated revenues and the like throughout the course of treatment, allowing the end-use facility to make economic decisions during the processing itself.

In an embodiment, solid fuel information may be stored in at least one storage facility as a database. In an embodiment the at least one storage facility may be a hard drive, a CD drive, a DVD drive, a flash drive, a zip drive, a tape drive, or the like. In an embodiment, the at least one storage facility may be a single storage facility, a plurality of local storage facilities, a plurality of distributed storage facilities, a combination of local and distributed storage facilities, or the like. In an embodiment, the databases may be a database, a relational database, SQL database, a table, a file, a flat file, an ASCII file, a document, an XML file, or the like.

In an embodiment, the solid fuel information may be information relating to raw received solid fuel, end-use facility desired solid fuel characteristics, solid fuel treatment facility 130 operational parameters, final treated solid fuel testing information, or the like. The solid fuel information may be stored in facilities such as a coal sample data 120, a coal desired characteristics 122, a coal output parameters 172, a parameter generation facility 128, a monitoring facility 134, a controller 148, or the like.

In an embodiment, the coal sample data 120 may store the raw solid fuel characteristics as a database for access by facilities such as the parameter generation facility 128, the coal desired characteristics 122, pricing/transactional facility 178, or the like. In an embodiment, the coal characteristics may include percent moisture, percent ash, percentage of volatiles, fixed-carbon percentage, BTU/lb, BTU/lb M-A Free, forms of sulfur, Hardgrove grindability index (HGI), total mercury, ash fusion temperatures, ash mineral analysis, electromagnetic absorption/reflection, dielectric properties, and the like. These solid fuel characteristics may be provided by a mine 102, a storage facility 112, a testing facility 170, or the like. In an embodiment, the characteristics in the database may describe the starting condition of the solid fuel prior to treatment into an end-use facility solid fuel.

In an embodiment, the coal sample data 120 database may be searchable to allow the retrieval of raw solid fuel information. In an embodiment, the raw solid fuel information may be retrieved by the parameter generation facility 128 to select the raw solid fuel to use for the treatment transformation into the end-use facility solid fuel. In an embodiment, the stored raw solid fuel information database may contain a single record for each raw solid fuel or a plurality of records for each raw solid fuel. In an embodiment, there may be a plurality of records as a result of raw solid fuel periodic samples, statistical samples, random samples, or the like. In an embodiment, when the coal sample data 120 is searched, more than one matching record may be returned for each raw solid fuel.

In an embodiment, the coal desired characteristics 122 may store the end-user solid fuel characteristics, treated solid fuel characteristics based on available raw solid fuel, historical treated solid fuel characteristics, or the like as a database for access by the parameter generation facility 128, the coal sample data 120, coal output parameters 172, or the like. In an embodiment, the coal characteristics may include percent moisture, percent ash, percentage of volatiles, fixed-carbon percentage, BTU/lb, BTU/lb M-A Free, forms of sulfur, Hardgrove grindability index (HGI), total mercury, ash fusion temperatures, ash mineral analysis, electromagnetic absorption/reflection, dielectric properties, and the like. These solid fuel characteristics may be provided by facilities such as the parameter generation facility 122, coal output parameters 172, end-use facility, or the like. In an embodiment, the characteristics in the database may describe the final condition of the treated solid fuel after treatment of a raw solid fuel.

In an embodiment, the coal desired characteristics 122 database may be searchable to allow the retrieval of the final treated solid fuel information. In an embodiment, the final treated solid fuel information may be retrieved by the parameter generation facility 128 to select the end-use facility solid fuel characteristics for generation of the solid fuel treatment facility 132 operation parameters. In an embodiment, the stored final treated solid fuel information database may contain a single record for each solid fuel or a plurality of records for each solid fuel. In an embodiment, there may be a plurality of records as a result of periodic samples, statistical samples, random samples, or the like. In an embodiment, when the coal desired characteristics 122 is searched, more than one matching record may be returned for each raw solid fuel.

In an embodiment, using the coal sample data 120 and the coal desired characteristics 122, the parameter generation facility 128 may generate solid fuel treatment facility 132 operational parameters. The operational parameters may be a data set for the control of the various components of the solid fuel treatment facility 132 for the treatment of raw solid fuel into end-use facility solid fuel. The operational parameters may be stored in a database in any relevant facility, including the parameter generation facility 128, monitoring facility 134, or controller 144. In addition to the operational parameters, the parameter generation facility 128 may generate a set of tolerances for each functionality that may be stored in the same database as the operational parameters or that may be stored in a separate database. In an embodiment, the combined data sets of the operational parameters and the tolerances may provide substantially all of the requirements for control of the solid fuel treatment. In an embodiment, the parameter generation facility 128 may generate blending protocols for blending various treated and untreated solid fuels to arrive at a blend of solid fuels.

In an embodiment, the treatment process may be directed by the operational parameters, with sensor 142 measurements being used to determine whether a particular solid fuel treatment facility 132 component is functioning within the preset tolerances. Based on the sensor 142 measurement, the operation of a particular component may be adjusted so that it falls within the tolerance limits. In addition, operational parameters may be adjusted so that the function of particular components falls within preset limits. For example, the operational parameter for the microwave system 148 may be adjusted from the original operational parameter if a sensor 142 measurement is beyond either the low or high limit of the tolerance for the microwave system 148. In an embodiment, the operational parameter database may be modified to match the adjustment to the operational parameter transmitted to the component.

In an embodiment, after the final treatment of the solid fuel is completed, the monitoring facility 134 may transmit the final modified operational parameter database to the parameter generation facility 128, where the modified operational parameters may be stored. In an embodiment, the stored modified operational parameters may be associated with the stored characteristics of the raw solid fuel that was treated using the modified operational parameters. According to this embodiment, when a similar future raw solid fuel is to be treated, the parameter generation facility 128 may search the stored modified operational database to retrieve a data set to use as the initial operational parameters. In embodiments, a single operational parameter record may be retrieved, a range of modified operational parameters may be retrieved, or a set of modified operational parameters may be retrieved, so that the initial operational parameters for processing a new raw solid fuel may use an average of the modified operational parameters, a single operational parameter record, a statistical aggregation of the modified operational files, or the like.

In another aspect of the present invention, the final treated product may be subjected to the step of briquetting when the product comes off the line, after the treatment. This step may be known as a post-process briquetting step. Briquetting may also be performed during treatment, as has been previously disclosed herein.

In an aspect of the present invention, the final treated product may be ground using grinding equipment such as a grinder, milling machine, and the like. After grinding, the final treated product may be subjected to pressure-briquetting. During pressure-briquetting, the treated product particles may be bonded by pressures sufficient to form solid briquettes. In embodiments, briquette formation may be facilitated by adding binders such as starch, molasses, plastic clay, or some other type of binder to the treated product.

As described above, after the solid fuel has been treated in the solid fuel treatment facility 132, the treated solid fuel may be tested at a testing facility 170 to determine the final treated solid fuel treatment characteristics. In an embodiment, the final treated characteristics may include percent moisture, percent ash, percentage of volatiles, fixed-carbon percentage, BTU/lb, BTU/lb M-A Free, forms of sulfur, Hardgrove grindability index (HGI), total mercury, ash fusion temperatures, ash mineral analysis, electromagnetic absorption/reflection, dielectric properties, and the like. In an embodiment, the final solid fuel characteristics may be stored in the coal output parameters 172. In an embodiment, the characteristic data may be used to provide feedback to the monitoring facility 134 for control of the solid fuel treatment process, may be associated to the coal desired characteristics 122, may provide data to the pricing/transactional facility 178, or the like.

In an embodiment, during a solid fuel treatment run, at least one set of final treated solid fuel treatment characteristics data may be stored in the coal output parameters 172. As previously described, the final treated solid fuel treatment characteristics may be transmitted to the monitoring facility 134 as an added data set for the monitoring facility 134 to consider when adjusting the operational parameters of the solid fuel treatment facility 132. In an embodiment, the final treated solid fuel treatment characteristics may be associated with the coal desired characteristics 122 for determining operational parameters for a particular raw solid fuel.

For example, the parameter generation facility 128 may be requested to determine the operational parameters for processing a particular raw solid fuel. The parameter generation facility 128 may search the coal desired characteristics 122 for a final treated solid fuel that resulted from previous treatment of the selected raw solid fuel. The parameter generation facility 128 may also retrieve the final tested characteristics from a solid fuel run that may have produced the final treated solid fuel. The parameter generation facility 128 may consider all of this information when determining the raw solid fuel operational parameters.

In embodiments, the parameter generation facility 128 may aggregate a set of solid fuel characteristics for a plurality of solid fuel samples, aggregate a set of specifications for solid fuel substrates used by a set of end-user facilities, aggregate a set of operational parameters used to transform a raw solid fuel into a solid fuel used by an end-use facility, or the like. In an embodiment, the aggregation of the databases may result in the generation of a plurality of predetermined solid fuel treatment facility 132 operational parameters. The predetermined plurality of operational parameters may be used for later selection by the solid fuel treatment facility 132 for the treatment of raw solid fuel for the end-use facility. In an embodiment, the databases may be a database, a relational database, SQL database, a table, a file, a flat file, an ASCII file, a document, an XML file, or the like. As described above and depicted in FIGS. 1 and 2, the end-use facility may be coal combustion facility 200, coal conversion facility 210, coal byproduct facility 212, or the like.

In an embodiment, the parameter generation facility 120 may aggregate a set of raw solid fuel characteristics for a plurality of solid fuel samples from the coal sample data 120. In an embodiment, the coal sample data 120 may contain information for raw solid fuel that may be available to the solid fuel treatment facility 132, may contain information for the historical raw solid fuel that has been used by the solid fuel treatment facility 132, or the like. There may be more than one data record for each raw solid fuel in the coal sample data 120 resulting from the same raw solid fuel having a plurality of sample test results. In an embodiment, the parameter generation facility 128 may aggregate the set of raw solid fuel characteristics based on the available raw solid fuel, recently treated raw solid fuel, a set of raw solid fuels selected by the solid fuel treatment facility 132, or the like.

In an embodiment, the aggregated database of raw solid fuel characteristics may contain a plurality of duplicate records that contain information from the same raw solid fuel; the plurality of duplicate records may be a result of a plurality of samples taken from the same raw solid fuel. In an embodiment, the aggregation of the database of raw solid fuel characteristics may have several steps. A first step may involve the total aggregation of the sample solid fuel data into an aggregated raw solid fuel database. In a second step, the parameter generation facility 128 may use an algorithm to sort the records, handle the duplicate records, store the finalized raw solid fuel database to a storage device, and the like. In embodiments, the duplicate records may be deleted from the raw solid fuel database, the duplicate records may be averaged, the duplicate records may be statistically selected, or the like. In an embodiment, the finalized raw solid fuel database may contain all the records raw solid fuels that may be transformed into end-use facility solid fuel.

In a similar manner, the end-use facility solid fuel information may be aggregated into a final treated solid fuel database. In an embodiment, the end-use facility solid fuel information may be stored in the coal desired characteristics 122 database. In an embodiment, the coal desired characteristics 122 database may contain characteristic information on final treated solid fuel requested by end-use facilities, historical characteristic information of previous final treated solid fuels, and the like. In an embodiment, the aggregated final treated solid fuel database may contain a plurality of records that contain information pertaining to the same final treated solid fuel; the plurality of duplicate records may be a result of a plurality of samples taken from the same final treated solid fuel taken during the treatment of the solid fuel.

In an embodiment, the aggregation of the final treated solid fuel database may have several steps. A first step may involve the total aggregation of the sample solid fuel data into a final treated solid fuel database. In a second step, the parameter generation facility 128 may use an algorithm to sort the records, handle the duplicate records, store the finalized final treated solid fuel database to a storage device, and the like. In an embodiment, the duplicate records may be deleted from the final treated solid fuel database, the duplicate records may be averaged, the duplicate records may be statistically selected, or the like. In an embodiment, the finalized final treated solid fuel database may contain all the records of final treated solid fuels that may have been treated by the solid fuel treatment facility 132.

In an embodiment, the parameter generation facility 128 may use the aggregated raw solid fuel database and the aggregated final treated database to obtain a set of operational parameters used to transform raw solid fuel into a final treated solid fuel used by an end-use facility.

In an embodiment, the operational parameters may be determined by the parameter generation facility 128 selecting a raw solid fuel characteristic record from the aggregated raw solid fuel database and matching it to each of the final treated solid fuel aggregated database records to calculate operational parameters for each of the matched records. In an embodiment, as the operational parameters are determined for the matched records, the operational parameters may be stored in the aggregated operational parameter database. For example, if there are fifty raw solid fuels in the raw solid fuel aggregated database and one hundred final treated solid fuels in the final solid fuel aggregated database, each of the fifty raw solid fuels may be matched to each of the one hundred final solid fuels for determination of the operational parameters that would be required to transform the raw solid fuel into the desired solid fuel. This may result in five thousand aggregated operational parameter records.

In an embodiment, the parameter generation facility 128 may determine that a certain raw solid fuel cannot be transformed into a final treated solid fuel and therefore may not determine operational parameters for that particular match of solid fuels.

In another embodiment, the parameter generation facility 128 may select a raw solid fuel characteristic record from the aggregated raw solid fuel database and determine the final treated solid fuel that may be transformed by the solid fuel treatment facility 132. In an embodiment, the parameter generation facility 128 may determine the operational parameters for each raw solid fuel characteristic records in the aggregated raw solid fuel database. In an embodiment, the operational parameters may be determined by the operational capabilities of the solid fuel treatment facility 132. In an embodiment, the operational parameters for each of the raw solid fuel characteristic records may be stored in the aggregated operational parameter database.

In an embodiment, the parameter generation facility 128 may determine operational parameters by matching the raw solid fuel characteristics with final treated characteristics, by using solid fuel treatment facility 132 capability to determine operational characteristics from the raw solid fuel characteristics, or the like. In an embodiment the operational parameter determination methods may be used individually or in combination.

In an embodiment, the aggregated operational parameters may be stored to be selected at a later time for the treatment of a raw solid fuel into an end-use facility solid fuel. In an embodiment, the aggregated operational parameters database may also store the raw solid fuel and final treated solid fuel information that was used to create the operational parameters. Therefore the aggregated operational parameter database may include the operational parameters, raw solid fuel characteristics, final treated solid fuel characteristics, or the like. The raw solid fuel characteristics and final treated solid fuel characteristics may include an identification of the solid fuel.

In an embodiment, if an end-use facility requests a certain final solid fuel from a solid fuel treatment facility 132, the parameter generation facility 128 may match the requested final solid fuel characteristics to one of the final treated solid fuels whose characteristics have been stored in the appropriate database. In an embodiment, the matching of the end-use facility requested solid fuel to the aggregated final treated solid fuels may be by best match, by key characteristic, by ranking of the most important solid fuel characteristics, or the like.

In an embodiment, after finding a match for the end-use facility requested solid fuel, the parameter generation facility 128 may select all the possible raw solid fuels that may be used to create the end-use facility solid fuel, may select all the possible operational parameters that may be used to create the end-use solid fuel, or the like. In an embodiment, using all of the possible raw solid fuels that may be used to create the end-use facility solid fuel, the parameter generation facility 128 may search the coal sample data 120 to determine which, if any, of the possible raw solid fuels are available. In an embodiment, the parameter generation facility 128 may select a raw solid fuel from the coal sample data 120 that is within a certain tolerance of the needed raw solid fuel. If at least one of the raw solid fuels is available to the solid fuel treatment facility 132, the parameter generation facility 128 may select the stored operational parameters that match the selected raw solid fuel and the end-use facility solid fuel. The selected operational parameters may be transmitted to the monitoring facility 134 and the controller 144 for treatment of the selected raw solid fuel into the end-use facility solid fuel.

In an embodiment, a method of modeling costs associated with processing solid fuel for a specific end-use facility may be performed by providing a database containing a set of solid fuel characteristics for a plurality of solid fuel samples, a set of specifications for solid fuel substrates used by a set of end-user facilities, a set of operational parameters used to transform a solid fuel sample into a solid fuel substrate used by an end-user, a set of costs associated with implementation of the set of operational parameters, and the like. In an embodiment, the cost modeling may be used to provide a variety of cost reports, such as invoice estimates to an end-use facility for solid fuel treatment, internal cost estimates to compare to actual treatment costs, cost/value predictions, solid fuel treatment facility 132 efficiency, or the like. In an embodiment, the databases may be a database, a relational database, SQL database, a table, a file, a flat file, an ASCII file, a document, an XML file, or the like.

In embodiments, the end-use facility may be coal combustion facility 200, coal conversion facility 210, coal byproduct facility 212, or the like.

A solid fuel treatment facility 132 may utilize a method of modeling the value of the treatment solid fuel for a specific end-use facility. In an embodiment, an end-use facility may request that a solid fuel treatment facility treat raw solid fuel into a final solid fuel with particular characteristics. The end-use facility may not indicate the starting raw solid fuel to use; the solid fuel treatment facility 132 may select the appropriate raw solid fuel based on the end-use facility solid fuel characteristics.

In an embodiment, the end-use facility characteristics may be transmitted and stored in the coal desired characteristics 122. The pricing/transactional facility may receive notification that the characteristics have been transmitted to the coal desired characteristics 122.

In an embodiment, once there is notification that the solid fuel characteristics have been received, the pricing/transactional facility 178 may request that the parameter generation facility 128 identify the raw solid fuel to transform into the end-use facility solid fuel. As previously described, the parameter generation facility 128 may determine the proper raw solid fuel by knowing the required characteristics and the solid fuel treatment facility 132 capability, by retrieving solid fuel treatment history to determine a starting raw solid fuel, by querying a database of possible raw solid fuels and operational parameters from a predetermined database, or the like.

In an embodiment, once the parameter generation facility 128 has selected an available raw solid fuel suitable for transformation into the end-use facility solid fuel, the parameter generation facility 128 may query the coal sample data 120 for the available raw solid fuel characteristics.

In an embodiment, the parameter generation facility 128 may transmit the identification and characteristic information for the raw solid fuel, the identification and characteristic information for the end-user facility solid fuel, the operational parameters for transforming the raw solid fuel into the end-use facility solid fuel, and the like to the pricing/transactional facility 178. In an embodiment, the pricing/transactional facility 178 may have a database associating operational cost with the operational parameters for a particular set of solid fuels. In an embodiment, the pricing/transactional facility 178 may be able to model the operation of the solid fuel treatment facility 132, providing for the virtual treatment of the raw solid fuel into the end-use solid fuel using the operational parameters from the parameter generation facility 128. Using the operational parameters, the pricing/transactional facility 178 may be able to determine the volume of solid fuel treated per time period, the amount of energy used, the amount of inert gases used, the amount of released solid fuel product, and the like. For example, the model may be able to determine the solid fuel tons per hour produced by using a given operational parameter for the belt speed or the size of the batch facility. In another example, the model may be able to calculate the amount of electricity the microwave systems 148 require based on the operation parameter settings.

In an embodiment, using the operational parameters, the pricing/transactional facility 178 model may determine a value for the completed transformation of the raw solid fuel into the end-use facility solid fuel, an instantaneous value at any time during the solid fuel transformation, an incremental value added by any of the various solid fuel treatment facility 132 components, or the like.

In an embodiment, the pricing/transactional facility 178 may model the solid fuel treatment facility 132 on a user interface on a computer device. In an embodiment, the user interface may present tools to allow a user to run the model, stop the model, pause the model, resume the model, reverse the model, run the model in slower time, run the model in faster time, focus in on a particular component, or the like. In an embodiment, the focus on a particular component may provide additional information to the user, for example a drill down of information for the particular component. In an embodiment, the information derived from the modeling may be presented in graphic form or in any other output format that would be requested by a user.

In an embodiment, the pricing/transactional facility 178 may be able to report the information from the model for the value of the completed transformation of the raw solid fuel into the end-use facility solid fuel, for an instantaneous value at any time during the solid fuel transformation, for the incremental value added by any of the various solid fuel treatment facility 132 components, or the like. In an embodiment, the report may be a printed report, a viewed report, a document report, a database, a spreadsheet, a file, or the like. The reports may show a summary, detail by time, detail by component, or the like.

In an embodiment, the pricing/transactional facility 178 may have at least one database that contains the cost assumptions associated with the model of the solid fuel treatment. For example, the database may have the electrical rates for the microwave systems 148, the cost per cubic foot of the inert gases, the human resource cost for monitoring the solid fuel treatment facility 132, the cost/value of the released solid fuel product recovered by the removal system 150, cost/value of the raw solid fuel used, and the like. These costs may represent the assumptions used in the modeling. In an embodiment, the pricing/transactional facility 178 may apply the cost assumptions to the model for the determination of the cost/value of the treated end-use facility solid fuel.

In an embodiment, the pricing/transactional facility 178, using the solid fuel treatment facility 132 model, may provide the end-use facility an estimate of the pricing value of the requested treated solid fuel. The estimate may be based on the model using the operational parameters, costs and pricing value for the operational parameters, and the like. In an embodiment, the estimated pricing value may be for the specific end-use facility requested solid fuel using a particular raw solid fuel.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method comprising:
transporting a solid fuel through a solid fuel treatment facility;
detecting solid fuel that is thermally aberrant;
selectively removing the thermally aberrant solid fuel;
briquetting the remaining solid fuel to create a solid fuel briquette;
transporting the solid fuel briquette through the heat treatment facility; and
heating the solid fuel briquette as the solid fuel briquette is moved through the heat treatment facility to a pre-determined specified internal temperature.

2. The method of claim 1, wherein the briquette comprises a binder.

3. The method of claim 2, wherein the binder is at least one of a starch, a wheat starch, a corn starch, a sugar, molasses, saw dust, gilsonite, ground asphalt, rosin, plastic, guar gum, lignin, and poly(ethylene terephthalate)).

4. The method of claim 1, wherein the solid fuel is at least one of a biomass product, an agro-forestry product, a coal, a sub-bituminous coal, a bituminous coal, and a waste coal.

5. The method of claim 1, wherein the specified internal temperature is at least 400 degrees F.

6. The method of claim 1, wherein the specified internal temperature is at least 250 degrees F.

7. The method of claim 1, wherein the specified internal temperature ranges between 60 degrees F. to about 500 degrees F.

8. The method of claim 1, further comprising, maintaining the specified internal temperature for a specified duration of time.

9. The method of claim 8, wherein the specified duration of time is at least one second.

10. The method of claim 8, wherein the specified duration of time ranges from 1 to 30 seconds.

11. The method of claim 8, wherein the specified duration of time is at least thirty seconds.

12. The method of claim 1, further comprising, transporting the solid fuel briquette through a cooling station to cool the solid fuel briquette prior to transporting the solid fuel briquette to an accumulation site.

13. The method of claim 12, wherein the cooling station comprises a surface application of cooling chemicals to control the solid fuel briquette temperature.

14. The method of claim 12, wherein the cooling station comprises a facility for applying a cooling gas to control the solid fuel briquette temperature.

15. The method of claim 12, wherein the cooling station comprises a facility for applying a mist of water to enable evaporative cooling of the solid fuel briquette.

16. The method of claim 12, wherein the cooling station comprises inert gas or nitrogen.

17. The method of claim 1, wherein the heat treatment facility comprises a non-oxidizing environment.

18. The method of claim 17, wherein the non-oxidizing environment is obtained by injecting steam into the heat treatment facility.

19. The method of claim 1, wherein the heat treatment facility comprises at least one of an electromagnetic energy source and a furnace.

20. The method of claim 1, wherein the heat-treated solid fuel briquette is resistant to degradation upon exposure to water.

21. The method of claim 1, wherein exposure to water does not significantly change the structural integrity of the heat-treated solid fuel briquette.

22. The method of claim 1, wherein the structural integrity of the solid fuel briquette is sufficient to enable obtaining a heat-treated solid fuel briquette that is resistant to degradation upon exposure to water.

23. A solid fuel briquette produced by the method of claim 1.

24. The briquette of claim 23, wherein the briquette is resistant to degradation upon exposure to water.

25. The briquette of claim 23, wherein exposure to water does not significantly change the structural integrity of the briquette.

26. A method of heat treating a solid fuel briquette, comprising:
transporting the solid fuel through a solid fuel treatment facility, wherein the solid fuel is processed with electromagnetic radiation to a desired percent moisture;
detecting treated solid fuel that is thermally aberrant;
selectively removing thermally aberrant treated solid fuel;
briquetting the remaining treated solid fuel to form a solid fuel briquette; and
placing the solid fuel briquette in a vessel until the solid fuel briquette reaches a predetermined specified internal temperature.

27. The method of claim 26, wherein the vessel is insulated.

28. The method of claim 26, wherein an inert gas is introduced to the vessel when the briquette reaches the specified internal temperature.

29. The method of claim 26, wherein oxygen is partially or completely removed from the vessel when the briquette reaches the specified internal temperature.

30. The method of claim 26, wherein the specified internal temperature is at least 400 degrees F.

31. The method of either claim 1, wherein detecting solid fuel that is thermally aberrant comprises treating the solid fuel using energy from a microwave system and detecting that the solid fuel exceeds a predetermined temperature with an infrared (IR) facility or a thermographic camera facility.

32. The method of claim 31, wherein detecting solid fuel that is thermally aberrant further comprises transporting the solid fuel past a metal detector, transporting the solid fuel past a mass spectrometer, transporting solid fuel past a magnetic resonance imaging (MRI) facility or any combination thereof and detecting that the solid fuel contains a predetermined amount of metallic material.

33. The method of either claim 1, wherein selectively removing the thermally aberrant solid fuel is done by a robotic device.

* * * * *